United States Patent
Kelly et al.

(10) Patent No.: US 12,499,160 B2
(45) Date of Patent: Dec. 16, 2025

(54) ANALYZING SOCIAL MEDIA DATA TO IDENTIFY MARKERS OF COORDINATED MOVEMENTS, USING STANCE DETECTION, AND USING CLUSTERING TECHNIQUES

(71) Applicant: GRAPHIKA TECHNOLOGIES, INC., Beaverton, OR (US)

(72) Inventors: John W. Kelly, Beaverton, OR (US); Vladimir D. Barash, Beaverton, OR (US); Amruta J. Deshpande, Beaverton, OR (US); Elizabeth Mcquillan, Beaverton, OR (US); Denitsa D. Nikolova, Beaverton, OR (US); Eugene Imas, Beaverton, OR (US); Kyle D. Weiss, Beaverton, OR (US); Cristina M. Lopez Guevara, Beaverton, OR (US); Joseph A. Carter, Beaverton, OR (US); Erin R. Mcaweeney, Beaverton, OR (US); Arman A. Setser, Beaverton, OR (US); Ari G. Decter-Frain, Beaverton, OR (US)

(73) Assignee: GRAPHIKA TECHNOLOGIES, INC., Beaverton, OR (US)

(*) Notice: Subject to any disclaimer, the term of this patent is extended or adjusted under 35 U.S.C. 154(b) by 43 days.

(21) Appl. No.: 18/591,949

(22) Filed: Feb. 29, 2024

(65) Prior Publication Data

US 2024/0378247 A1   Nov. 14, 2024

Related U.S. Application Data

(63) Continuation of application No. PCT/US2022/042118, filed on Aug. 31, 2022.

(Continued)

(51) Int. Cl.
*G06F 16/906* (2019.01)
*G06N 5/022* (2023.01)

(52) U.S. Cl.
CPC ......... *G06F 16/906* (2019.01); *G06N 5/022* (2013.01)

(58) Field of Classification Search
CPC .............................. G06F 16/906; G06N 5/02
(Continued)

(56) References Cited

U.S. PATENT DOCUMENTS

| 8,312,056 B1 | 11/2012 | Peng et al. |
| 9,558,265 B1 * | 1/2017 | Tacchi .................. G06F 16/338 |

(Continued)

FOREIGN PATENT DOCUMENTS

WO   WO 2018/237098 A1 * 12/2018 ............. G06F 17/30

OTHER PUBLICATIONS

Giasemidis, Georgios, et al., "A semi-supervised approach to message stance classification", arXiv, Cornell University arXiv, document: arXiv:1902.03097v1 [cs. SI] Jan. 29, 2019, pp. 1-33.*

(Continued)

*Primary Examiner* — Robert Stevens
(74) *Attorney, Agent, or Firm* — RMCK Law Group PLC

(57) ABSTRACT

The present disclosure relates to methods for analyzing social media data using various techniques, including classifying at least one contagious phenomenon propagating on a network, providing stance detection based on the social media data, clustering the social media data, and/or generating and analyzing knowledge graph embeddings using the social media data.

14 Claims, 55 Drawing Sheets

Related U.S. Application Data

(60) Provisional application No. 63/333,266, filed on Apr. 21, 2022, provisional application No. 63/326,582, filed on Apr. 1, 2022, provisional application No. 63/239,649, filed on Sep. 1, 2021.

(58) Field of Classification Search
USPC .......................................................... 707/739
See application file for complete search history.

(56) References Cited

U.S. PATENT DOCUMENTS

| | | | |
|---|---|---|---|
| 9,740,368 B1 | 8/2017 | Love et al. | |
| 10,324,598 B2* | 6/2019 | Kelly | G06F 16/9535 |
| 11,514,321 B1 | 11/2022 | Chen et al. | |
| 11,934,937 B2* | 3/2024 | Limsopatham | G06N 3/0442 |
| 12,101,280 B2* | 9/2024 | Zhang | G06F 16/313 |
| 2011/0173264 A1* | 7/2011 | Kelly | G06Q 10/10 |
| | | | 709/205 |
| 2013/0124653 A1 | 5/2013 | Vick et al. | |
| 2013/0311462 A1 | 11/2013 | Khan | |
| 2014/0101557 A1* | 4/2014 | Kelly | G06F 16/358 |
| | | | 715/734 |
| 2016/0048556 A1 | 2/2016 | Kelly et al. | |
| 2016/0150002 A1* | 5/2016 | Hildrum | H04L 67/10 |
| | | | 709/201 |
| 2016/0294907 A1 | 10/2016 | Conklin et al. | |
| 2018/0091611 A1* | 3/2018 | Liu | H04L 67/025 |
| 2019/0164234 A1 | 5/2019 | Barash et al. | |
| 2019/0361951 A1* | 11/2019 | Jayavelu | G06F 16/9538 |
| 2019/0370270 A1* | 12/2019 | Rezaei | G06Q 50/01 |
| 2020/0065857 A1* | 2/2020 | Lagi | G06Q 30/0254 |
| 2020/0104337 A1* | 4/2020 | Kelly | H04L 51/52 |
| 2020/0356725 A1 | 11/2020 | Okonkwo et al. | |
| 2021/0217050 A1 | 7/2021 | Perkins et al. | |
| 2021/0390270 A1 | 12/2021 | Fei et al. | |

OTHER PUBLICATIONS

Jiang, Yan, et al., "Using Machine Learning for Stance Detection", Texas Scholar Works, Master's Thesis, Univ. of Texas at Austin, Jan. 31, 2019, 52 pages.*

Aldayel, Abeer, et al., "Stance Detection on Social Media: State of the Art and Trends", arXiv, document: arXiv:2006.03644v5 [cs.SI] Apr. 15, 2021, 34 pages.*

Küçük, Dilek, et al., "Stance Detection: A Survey", ACM Computing Surveys, vol. 53, No. 1, Article 12, Feb. 2020, pp. 12:1-12:37.*

Barash, Vladimir, et al., "A Twitter Social Contagion Monitor", Asonam 2020, The Hague, Netherlands, Dec. 7-10, 2020, pp. 523-530.*

Song, Sonya Yan, et al., "Beyond the Wall: Mapping Twitter in China", Auto '93, The Berkman Center for Internet & Society, Harvard University, Boston, MA, Research Publication No. 2015-14, Nov. 2, 2015, 47 pages.*

Zaharieva, Maia, et al., "Cross-Platform Social Event Detection", IEEE MultiMedia, vol. 22, Issue 3, Jul.-Sep. 2015, pp. 14-25.*

Aldayel, A. et al., "Stance Detection on Social Media: State of the Art and Trends," Information Processing & Management, vol. 58, No. 4, Apr. 2021, 33 pages.

Al-Ghadir, A. et al., "A novel approach to stance detection in social media tweets by fusing ranked lists and sentiments," Information Fusion, vol. 67, Oct. 2020, 17 pages.

Chen, Q. et al., "Zero-shot Text Classification via Knowledge Graph Embedding for Social Media Data," IEEE Internet of Things Journal, vol. 9, Issue 12, Jun. 15, 2022, 10 pages.

Kucher, K. et al., "StanceVis Prime: visual analysis of sentiment and stance in social media texts," J. Vis. vol. 23, Aug. 2020, pp. 1015-1034.

Li, Z. et al., "Temporal Knowledge Graph Reasoning Based on Evolutional Representation Learning," Woodstock '18, Jun. 3-5, 2018, Woodstock, NY, 10 pages.

PCT International Search Report and Written Opinion dated Mar. 8, 2023 for International Application No. PCT/US2022/042118, 12 pages.

Extended European Search Report dated Apr. 3, 2025 for EP Application No. 22865469.5, 9 pages.

PCT International Search Report and Written Opinion dated Mar. 22, 2024 for International Application No. PCT/US2023/082677, 9 pages.

* cited by examiner

300

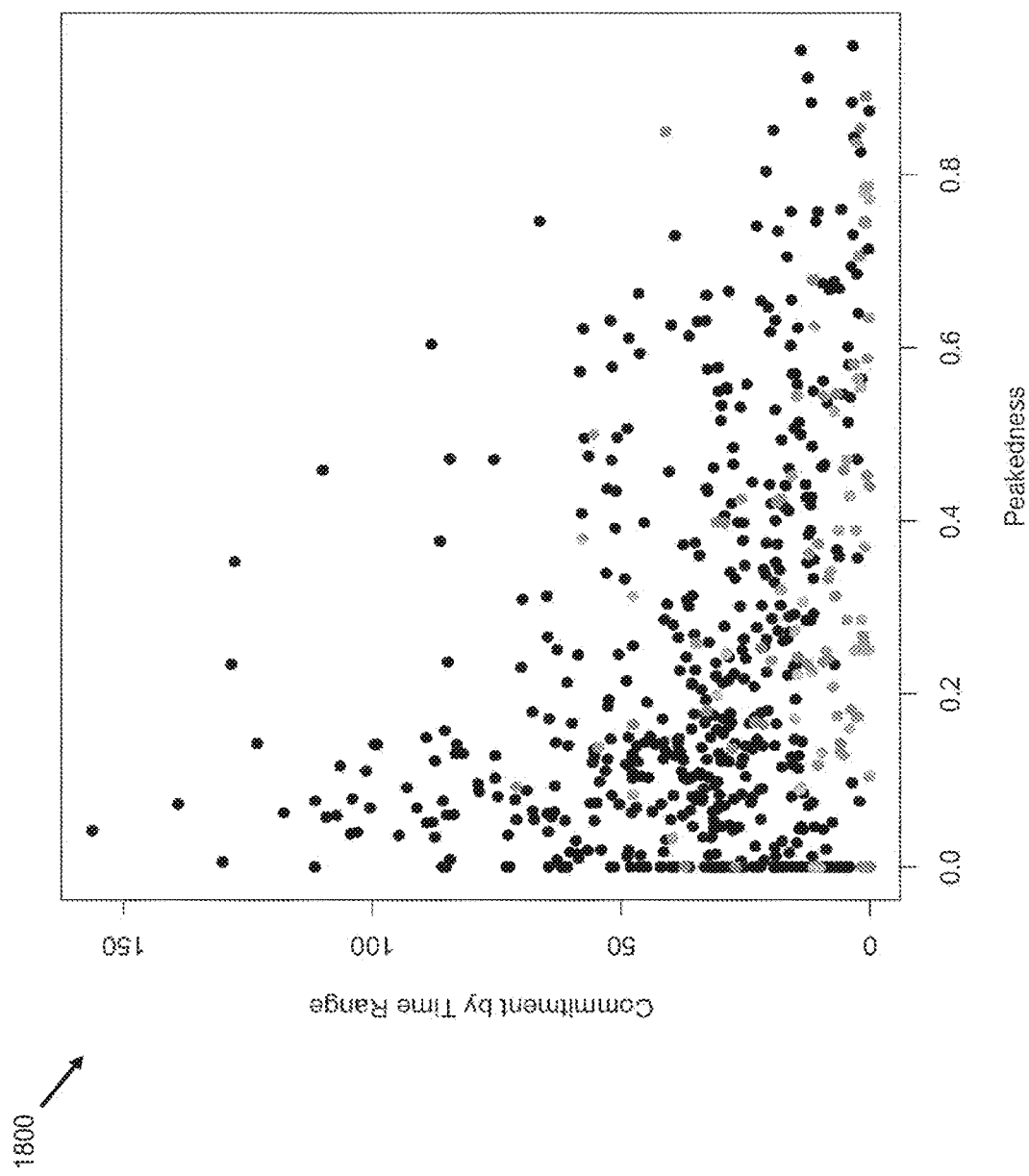

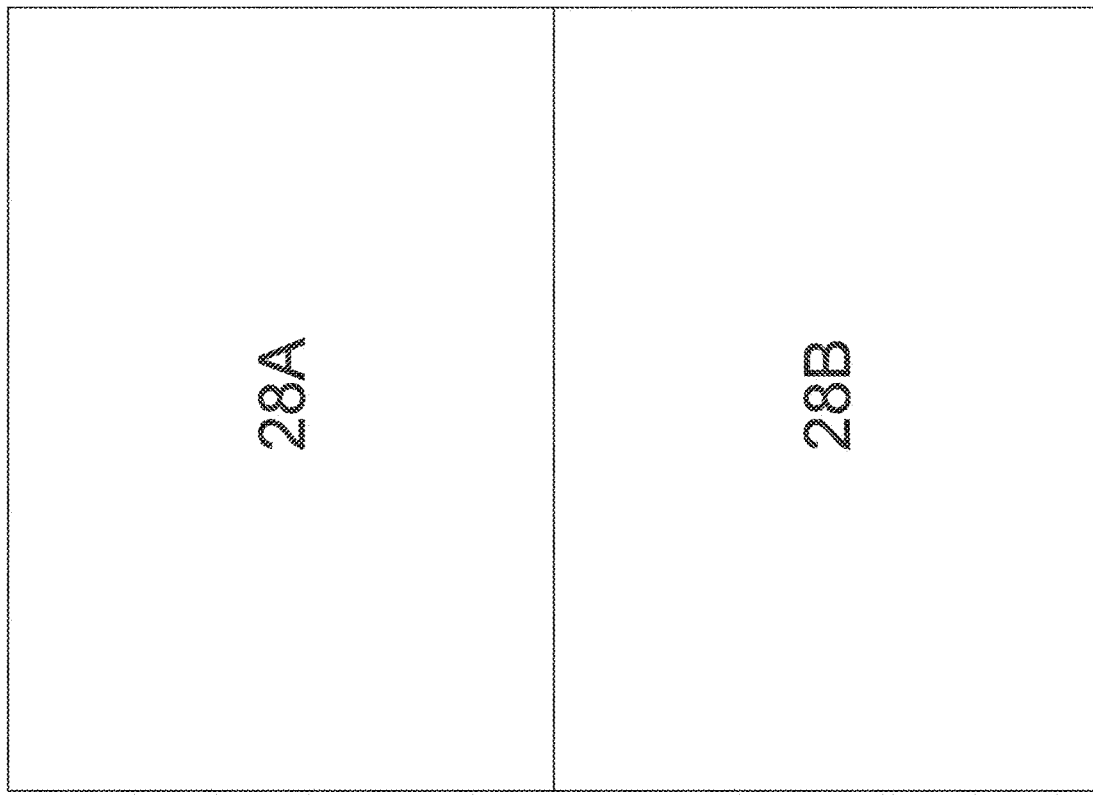

ANALYZING SOCIAL MEDIA DATA TO IDENTIFY MARKERS OF COORDINATED MOVEMENTS, USING STANCE DETECTION, AND USING CLUSTERING TECHNIQUES

CROSS-REFERENCE TO RELATED APPLICATIONS

This application is a bypass continuation of International Application No. PCT/US2022/042118, filed Aug. 31, 2022, which claims the benefit of priority to the following U.S. Provisional Patent Application Ser. No. 63/239,649, filed Sep. 1, 2021; Ser. No. 63/326,582, filed Apr. 1, 2022; and Ser. No. 63/333,266, filed Apr. 21, 2022. Each of the above applications is hereby incorporated by reference in its entirety as if fully set forth herein.

BACKGROUND

1. Field

The present disclosure relates to methods for analyzing social media data using various techniques, including classifying at least one contagious phenomenon propagating on a network, providing stance detection based on the social media data, clustering the social media data, and/or generating and analyzing knowledge graph embeddings using the social media data.

2. Description of the Related Art

Internet-based technologies, and the manifold genres of interaction they afford, are re-architecting public and private communications alike and thus altering the relationships between all manner of social actors, from individuals, to organizations, to mass media institutions. Internet technologies have enabled shifts in methods and practices of interpersonal communication. Many-to-many and social scale-spanning Internet communications technologies are eliminating the channel-segregation that previously reinforced the independence of classes of actors at these levels of scale, enabling (or more accurately in many cases, forcing) them to represent themselves to one another via a common medium, and increasingly in ways that are universally visible, searchable and persistent.

Online readers typically navigate hyperlinked chains of related stories, bouncing between numerous websites in a hypertext network, returning periodically to favored starting points to pick up new trails. Hyperlinks result from a combination of choices, from those made by individual, autonomous authors to those made programmatically by designed systems, such as permalinks, site navigation, embedded advertising, tracking services, and the like. Human authors practice the same kind of information selectivity online that they do offline, i.e., what authors (including those representing organizations) write about and link to reflect somewhat stable interests, attitudes, and social/organizational relationships. The structure of the network formed by these hyperlinks is a product of these choices, and thus large-scale regularities in choices will be evident in macro-level structure. This structure will thus bear the mark of individual preferences and characteristics of designed systems and allows a kind of "flow map" of how the Internet channels attention to online resources. Discriminating among types of links, and the ability to select categories of those which represent author choices, allows structural analytics to discover similarities among authors. Errors, randomness, or noise in linking at the individual level has local, independent causes, and does not bias large-scale macro patterns.

Thus, in order to understand and leverage the online information ecosystem, there remains a need for systems and methods for structural analytics aimed at identifying clusters of online readers and influential authors, discovering how they drive traffic to particular online resources, and leveraging that knowledge across various applications ranging from targeted advertising and communication to expert identification, and the like. This need includes a need for understanding the role of structures and similarities among authors and readers in situations involving phenomena that follow a pattern of contagion, i.e., where an item of interest, such as a news story, a political topic, a product, an item of entertainment content, or the like, initiates with a single point or a small group, then spreads and grows through the network. Predicting the pattern of spread or contagion, the parties who will take interest in, be involved with, or be influenced by a particular item, and the like may have great value in a range of applications; accordingly, a need exists for methods and systems that assist in or enable such prediction of the behavior of contagious phenomena.

Additionally, conventional processes for analyzing social media data, including narratives and trends, the spread of information and/or misinformation/disinformation, and other such analyses frequently require manual gathering and analysis of very large amounts of data, which is time-consuming and inefficient. Moreover, attempts at automating the analysis of social media data have frequently produced results that do not provide enough context to fully understand a situation. For example, an analysis that discovers that a particular hashtag is trending on a particular network may not reveal whether the hashtag is being posted by supporters of a particular narrative, critics of the narrative, or both, and may not reveal the spread of related information on other social media networks.

Conventional processes may also rely upon stance detection. Stance detection is generally defined as detecting whether a producer of a message is in favor or against a given target or neutral towards the given target (e.g., neither in favor nor against the given target). Stance detection can utilize natural language processing in different application areas. In various examples, stance detection processes utilize either supervised tasks, semi-supervised tasks, or unsupervised tasks.

There are various example uses of stance detection processes. For example, a content scoring system that is used primarily with journalistic and other media content includes stance detection for fact checking. This content scoring process includes stance vector generation that involves use of unsupervised emotion detection. For unlabeled data, a semi-supervised approach of stance vector generation can assist in generating stance vector representations.

In another example, a stance detection process includes stance classification of multi-perspective consumer health information. This consumer health system uses sentiment supervised and unsupervised approaches for stance detection.

SUMMARY

According to some embodiments of the present disclosure, a computerized method of analyzing social media data is disclosed. The method may comprise retrieving social media data indicating a plurality of social media posts on at least one social media platform, where the social media data may indicate a plurality of source entities and a plurality of content entities. The method may comprise processing the social media data to identify at least a first subset of the plurality of source entities and at least a second subset of the plurality of content entities. The method may comprise generating one or more data structures, where each of the data structures may associate at least one of the plurality of source entities with at least one of the plurality of content entities. The method may comprise generating, based on the data structures, a plurality of clusters, where each cluster may include a plurality of related content and/or source entities. The method may comprise generating, for at least one cluster of the plurality of clusters, a contagion score indicating a spread of the content corresponding to the at least one cluster.

According to some embodiments, the social media data comprises social media data from at least two platforms, where the one or more data structures may be cross-platform data structures. In some of these embodiments, the one or more data structures may comprise a cross-platform knowledge graph. In some of these embodiments, a user account for a first platform and a user account for a second platform may correspond to a single node of the cross-platform knowledge graph.

According to some embodiments, the method further comprises generating knowledge graph embeddings using the one or more data structures, where generating the plurality of clusters may comprise performing dimension reduction on the knowledge graph embeddings to yield reduced dimension data. The method may comprise using a density-based clustering algorithm to cluster the knowledge graph embeddings and/or the reduced dimension data. Additionally or alternatively, generating the plurality of clusters may comprise generating a source-content matrix relating source entities to content entities; generating a first plurality of clusters using attentive clustering to cluster the source-content matrix; inverting the source-content matrix; and generating a second plurality of clusters using the inverted source-content matrix.

According to some embodiments, the method further comprises generating a homophily metric for at least one cluster of the plurality of clusters. Additionally or alternatively, the method further comprises generating a heterophily metric for at least one cluster of the plurality of clusters. Additionally or alternatively, the method further comprises generating a focus score for a subset of entities within a first cluster of the plurality of clusters. Additionally or alternatively, the method further comprises generating a relevance score for a subset of entities within a first cluster of the plurality of clusters. Additionally or alternatively, the method further comprises generating a digital fingerprint for at least one cluster of the plurality of clusters. Additionally or alternatively, the method comprises generating an information flow metric for at least one content entity within a cluster of the plurality of clusters. In some of these embodiments, the information flow metric indicates one or more of movement of the content entity within a cross-platform knowledge graph over time; or engagement with the content entity within the cross-platform knowledge graph over time. Additionally or alternatively, the method further includes computing a cross-platform bridging metric for at least one entity within a cluster of the plurality of clusters.

According to some embodiments of the present disclosure, a computerized method for analyzing a knowledge graph embedding is disclosed. The method comprises retrieving timestamped social media data indicating a plurality of social media events involving a plurality of source entities and a plurality of content entities. The method comprises generating, from the timestamped social media data, a plurality of temporal knowledge graphs, where each temporal knowledge graph may correspond to a different time period. The method comprises generating, from the plurality of temporal knowledge graphs, an aggregated knowledge graph embedding representative of the overall temporal information. The method comprises analyzing the knowledge graph embedding to detect an influence operation.

In some embodiments, the social media data may comprise social media data from at least two platforms, where the temporal knowledge graphs may be cross-platform temporal knowledge graphs. In some of these embodiments, a user account for a first platform and a user account for a second platform may correspond to a single node of a temporal knowledge graph.

In some embodiments, the method further comprises performing dimension reduction on the knowledge graph embeddings to yield reduced dimension data, and performing density-based clustering on the reduced dimension data to yield a plurality of clusters of entities. In some of these embodiments, the method comprises characterizing the plurality of clusters of entities based on social media data associated with each cluster. In some of these embodiments, the method further comprises generating a homophily metric for at least one cluster of the plurality of clusters. Additionally or alternatively, the method further comprises generating a heterophily metric for at least one cluster of the plurality of clusters. Additionally or alternatively, the method further comprises generating a focus score for a subset of entities within a first cluster of the plurality of clusters. Additionally or alternatively, the method further comprises generating a relevance score for a subset of entities within a first cluster of the plurality of clusters. Additionally or alternatively, the method further comprises generating a digital fingerprint for at least one cluster of the plurality of clusters. Additionally or alternatively, the method comprises generating an information flow metric for at least one content entity within a cluster of the plurality of clusters. In some of these embodiments, the information flow metric indicates one or more of movement of the content entity within a cross-platform knowledge graph over time; or engagement with the content entity within the cross-platform knowledge graph over time. Additionally or alternatively, the method further includes computing a cross-platform bridging metric for at least one entity within a cluster of the plurality of clusters.

In some embodiments, the method further comprises predicting a future connection between a first entity of the knowledge graph embedding and a second entity of the knowledge graph embedding, wherein the prediction represents a likelihood of the first entity engaging with the second entity via a social media platform.

In some embodiments, the method further comprises repeatedly generating knowledge graph embeddings using different machine learning parameters; comparing the knowledge graph embeddings generated using the different machine learning parameters; and determining optimal machine learning parameters based on the comparison.

According to some embodiments of the present disclosure, a computerized method of analyzing stance is disclosed. The method comprises generating a map of social media data for a selected topic of interest. The method comprises training a stance model based on the social media data. The method comprises analyzing the map to generate one or more features for the selected topic of interest. The method comprises re-training the stance model based on the features. The method comprises applying the trained stance model to the generated map.

In some embodiments, training the stance model comprises using a supervised learning process. In some of these embodiments, the supervised learning process may be a zero-shot learning process. Additionally or alternatively, training the stance model comprises using a semi-supervised learning process. Additionally or alternatively, training the stance model comprises using an unsupervised learning process.

In some embodiments, the one or more features include knowledge graph embeddings. Additionally or alternatively, the one or more features include one or more of a number of hashtags; a list of frequently-used hashtags; a number of retweets; a list of frequent retweets; a homophily; a heterophily; a focus score; or topic modeling.

In some embodiments, re-training the stance model comprises identifying thresholds for the one or more features and adjusting the stance model based on the identified thresholds.

In some embodiments, generating the map of social media data comprises determining geographic locations for at least a subset of the social media data; and geotagging the social media data in the map of social media data.

In some embodiments, applying the trained stance model to the generated map comprises generating an aggregated stance value. In some of these embodiments, the aggregated stance value represents the stance of a particular node of the generated map towards complementary targets.

According to some embodiments of the present disclosure, a computing system is disclosed including one or more processors and one or more memories storing computer readable instructions that, when executed by the one or more processors, cause the computing system to perform any of the methods described herein.

According to some embodiments of the present disclosure, a computer program product is disclosed that resides on a computer readable storage medium and has a plurality of instructions stored thereon which, when executed across one or more processors, causes any of the methods described herein to be executed.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The structures, methods, systems, inventions and the following detailed description of certain embodiments thereof may be understood by reference to the following figures:

FIG. 18 depicts Peakedness vs. Commitment by Time Range for two sets of hashtags.

FIG. 24 depicts a recent activity page for a social media map platform.

FIG. 25 depicts a recent activity page for a social media map platform.

Figure 28A:
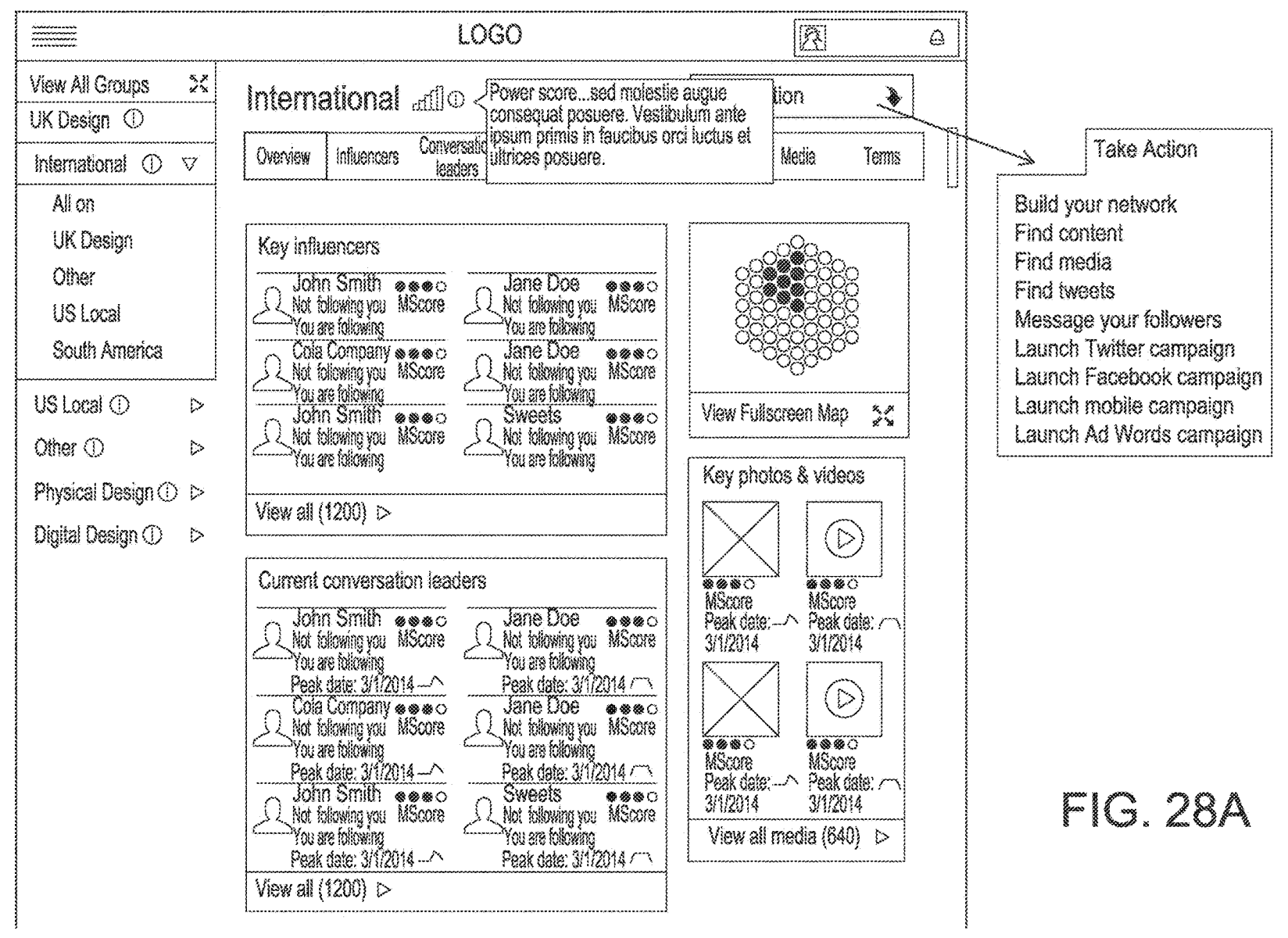

FIGS. 28, 28A and 28B depict an overview page for a social media map platform.

Figure 29A:
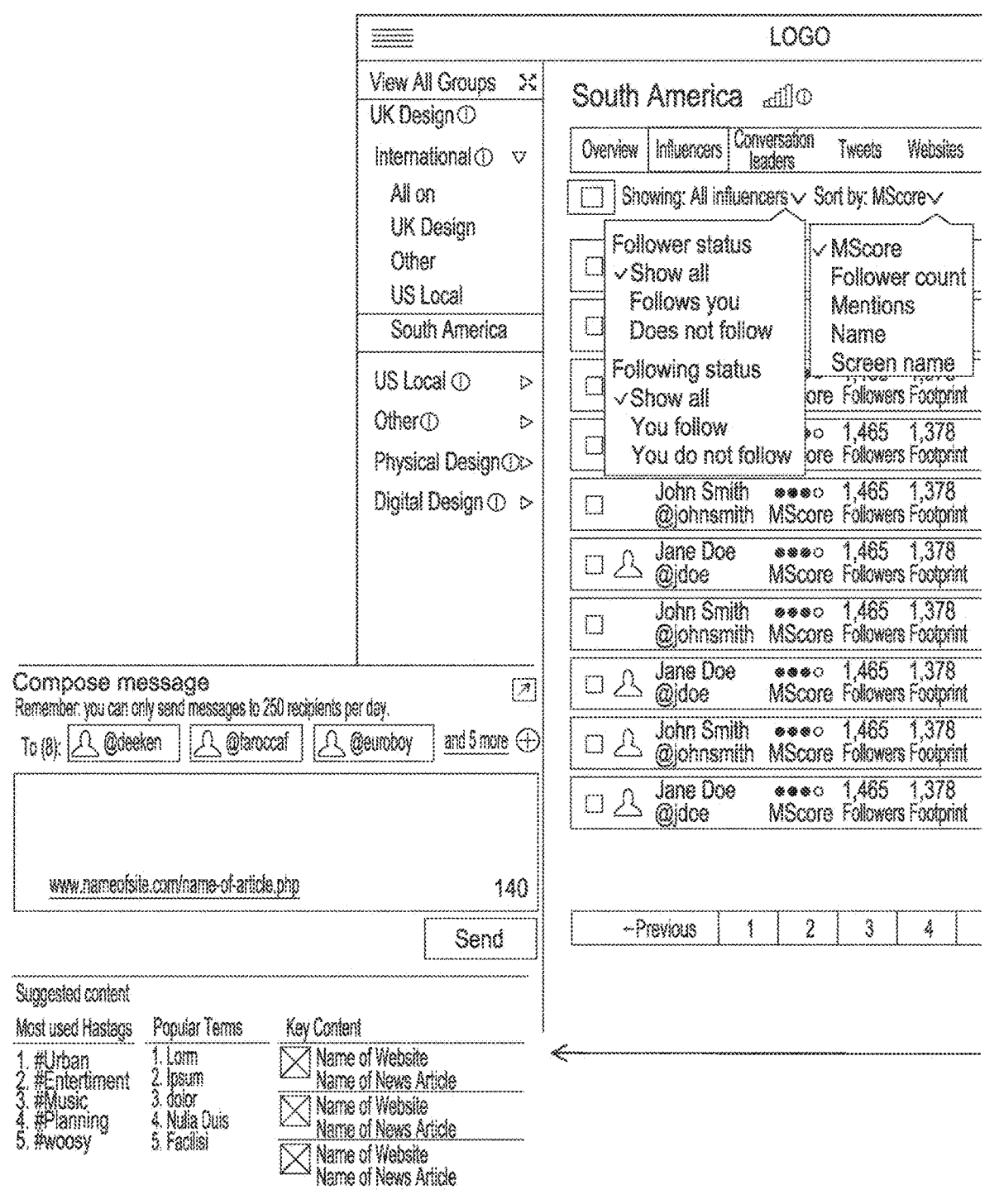

FIGS. 29, 29A and 29B depict an influencers page for a social media map platform.

FIG. 30 depicts an influencer detail for a social media map platform.

FIG. 31 depicts a conversation leaders page for a social media map platform.

FIGS. 32, 32A and 32B depict a tweets page for a social media map platform.

FIG. 33 depicts a websites page for a social media map platform.

FIGS. 34, 34A and 34B depict a key content page for a social media map platform.

FIG. 37 depicts a lists page for a social media map platform.

DETAILED DESCRIPTION

Figure 1:
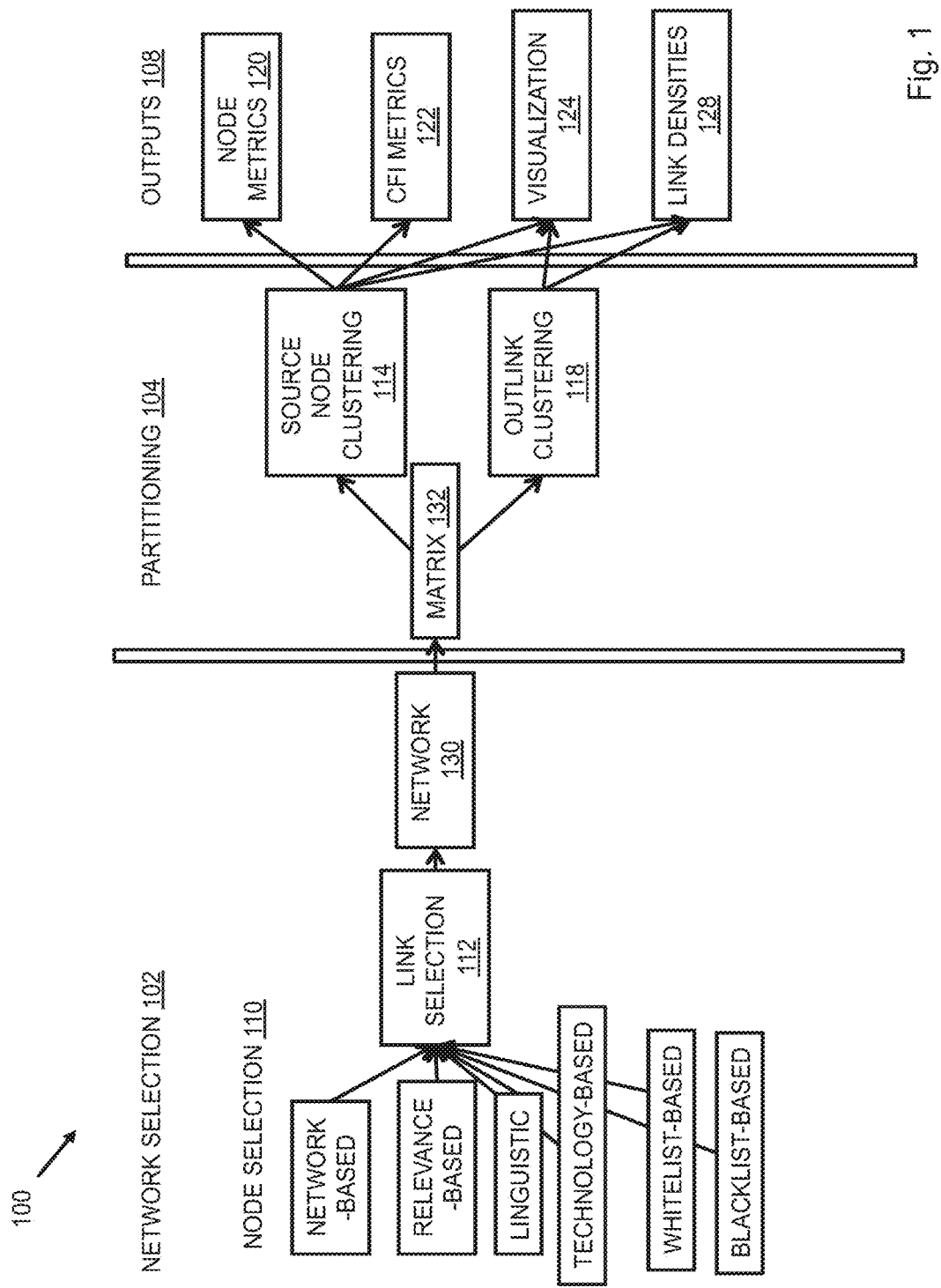
FIG. 1 depicts a process flow for attentive clustering.

Embodiments of the present disclosure relate to a computer-implemented method for attentive clustering and analysis. Attentive clusters are groups of authors who share similar linking profiles or collections of nodes whose use of sources indicates common attentive behavior. Attentive clustering and related analytics may include measuring and visualizing the prominence and specificity of textual elements, semantic activity, sources of information, and hyperlinked objects across emergent categories of online authors within targeted subgraphs of the global Internet. The disclosure may include a set of specialized parsers that identify and extract online conversations. The disclosure may include algorithms that cluster data and map them into intuitive visualizations (publishing nodes, blogs, tweets, etc.) to determine emergent clusterings that are highly navigable. The disclosure may include a front end/dashboard for interaction with the clustering data. The disclosure may include a database for tracking clustering data. The disclosure may include tools and data to visualize, interpret and act upon measurable relationships in online media. The approach may be to segment an online landscape based on behavior of authors over time, thus creating an emergent segmentation of authors based on real behavior that drives metrics, rather than driving metrics based on pre-conceived lists. Because the analysis is a structural one, rather than language-based, the analysis is language agnostic. In an embodiment, the segmentation may be global, such as of the English language blogosphere. In an embodiment, the segmentation may involve a relevance metric for every node based on semantic markers and a custom mapping of high-relevance nodes. The disclosure enables identifying influencers, such as who is authoritative about what to whom.

One method of obtaining attentive clusters may involve construction of a bipartite matrix, however, any number and variety of flat or hierarchical clustering algorithms may be used to obtain an attentive cluster in the disclosure. In an embodiment, a set of content-publishing source nodes ("authors") may be selected based on a chosen combination of linguistic, behavioral, semantic, network-based or other criteria. A mixed-mode network may be constructed, comprising the set S of all source nodes, the set T of all outlink targets from selected types of hyperlinks, and the set E of edges between them defined by the selected type or types of links from S to T found during a specified time period. A matrix, such as a bipartite graph matrix, may be constructed of source nodes in S linked to targets in T', derived by any combination of a.) normalizing nodes in T, optionally to a selected level of abstraction, b.) using lists of target nodes for exclusion ("blacklists"), and c.) using lists of target nodes for inclusion ("whitelists"). The matrix may represent a two-mode network (or actor-event network) that associates two completely different categories of nodes, actors and events, to build a network of actors through their participation in events or affiliations. In embodiments, the matrix is, in effect, an affiliation matrix of all authors with the things that they link to, wherein the patterns of their linking may be used to do statistical clustering of their nodes.

The matrix may be processed according to user-selected parameters, and clustered in order to perform one or more of the following: 1.) partition the network into sets of source nodes with similar linking histories ("attentive clusters"); 2.) identify sets of targets (linked-to websites or objects) with similar citation profiles ("outlink bundles"); 3.) calculate comparative statistical measures across these partitions/attentive clusters; 4.) construct visualizations to aid in interpretation of network features and behavior; 5.) measure frequencies of links between attentive clusters and outlink bundles, allowing identification and measurement of large-scale regularities in the distribution of attention by authors across sources of information, and the like. An arbitrary number and variety of flat or hierarchical clustering algorithms may be used to partition the matrix, and the results may be stored in order to select any solution for output generation. The resulting outputs (measures and visualizations) may provide novel, unique, and useful insights for determining influential authors and websites, planning communications strategies, targeting online advertising, and the like.

In an embodiment, systems and methods for attentive clustering and analysis may be embodied in a computer system comprising hardware and software elements, including local or network access to a corpus of chronologically-published internet data, such as blog posts, RSS feeds, online articles, Twitter™ "tweets," Facebook™ postings, and the like.

In addition, example embodiments of the disclosure relate to stance detection systems and processes.

In example embodiments, systems and methods may generate clusters of content features in addition to or as an alternative to generating clusters of users. For some examples, prior approaches may not be able to efficiently and effectively find and characterize content-based narratives on social media. For example, given growing concerns related to the spread of mis/disinformation across social media, improved tools may be needed that may automatically discover social media narratives or other content collections and provide sufficient context that may reveal information about the content itself, who is spreading the content, and other relevant information, and may analyze such information to enable rapid decision making.

The detection of content clusters that correspond to emerging social media narratives, trends, campaigns, and other information flows, has heretofore been difficult and has required time-consuming manual analysis. As an illustrative example of the type of problem solved by the system and/or process disclosed herein, in a first social media community, certain URLs, images, hashtags, words, phrases, etc. may predominate, but in a second social media community, a different set of these may be more salient. In this instance, simply understanding that there are two distinct communities, as some automated analyses have done, may not provide sufficient information for understanding the communities. Moreover, even understanding that the first community may be more likely to engage with one piece of content may not reveal how the community is engaging with that content or reveal what other content the community may be engaging with. What is needed is a solution that finds and characterizes clusters of content, thereby revealing and generating information for better understanding of information flows, while doing so in a highly automated and a scalable way.

Provided herein are systems and methods for automatically processing social media data to reveal content that may relate to social media stories, narratives, trends, or other flows of information across one or more social media platforms, and that may further automatically analyze content collections to reveal contextual information that may enable characterizing of the content collections, visualization of the content collections, and may provide other analyses to allow rapid and accurate decision-making. In embodiments, tools and datasets that may be useful for detecting and analyzing groups of source/actor data (e.g., finding clusters of similar social media accounts) may be re-configured and repurposed to find and analyze groups of content data (e.g., finding clusters of related hashtags, words, phrases, URLs, and/or other content items). In embodiments, these content groups or "clusters" may then be analyzed in different ways, such as by using artificial intelligence (AI)-driven approaches to automatically characterize the clusters, calculate measures of information spread and/or the coordinated manipulation of information, analyze content clusters as against source clusters to discover how groups of actors relate to groups of content, and other such analyses.

Moreover, according to embodiments described herein, social media knowledge graphs may be developed, and knowledge graph embedding techniques may be used to generate cross-platform clusters of both source and content entities, which may be used to reveal the coordination and/or manipulation of the spread of information across multiple social media networks. Such information clusters may be further analyzed to predict knowledge graph links (e.g., to fill in the gaps in sparse information datasets and/or as a measure of the likelihood of future activity), may be compared against clusters of information developed using other techniques, and otherwise may be analyzed to provide rich and detailed information about the spread of information across multiple social media networks.

At least two approaches to identifying key communities in cyber-social landscapes and/or solving other related problems are described herein, although the approaches may be used together in a single approach, as will be described in more detail in the disclosure. In brief, and without limitation, an example process described with respect to FIG. 42 may be used by a computing platform to automatically and scalably find and analyze content clusters using datasets and tools that may also be used to find actors/source clusters. Moreover, an example process described with respect to FIG. 43 may be used by a computing platform to generate social media knowledge graphs and reduce the knowledge to high-dimensional and cross-platform knowledge graph embeddings, which may be further analyzed to track the spread of content across different social media networks, and for other reasons described in more detail in the disclosure.

Attentive Clustering and Analysis

Referring to FIG. 1, attentive clustering and analysis may include: 1.) network selection 102, 2.) partitioning 104, which may include two-mode network clustering in this embodiment, and 3.) visualization and metrics output 108. Network selection 102 may include at least two operations: a.) node selection 110, and b.) link selection 112. Optionally, a third may be applied in which network analytic operations are used to further specify the set of source nodes under consideration for clustering. For example, the operation may be filtering. Filtering may be technology-based, blacklist-based, whitelist-based, and the like.

In an embodiment, nodes may be URLs, at which chronologically published streams or elements of content may be available. An initial set containing any number of nodes may be selected based on any combination of node-level characteristics and/or calculated relevance scores. Regarding node-level characteristics, there may be a number of different kinds of nodes publishing content online, such as weblogs (blogs), online media sites (like newspaper websites), microblogs (like Twitter™), forums/bulletin boards (like http://www.biology-online.org/biology-forum/), feeds (like RSS/ATOM), and the like. In addition to different technical genres of node, nodes may differ according to an arbitrary number of other intrinsic or extrinsic node-level characteristics, such as the hosting platform (e.g., Blogspot, LiveJournal), the type of content published (text, images, audio), languages of textual content (e.g., French, Spanish), type of authoring entity (individual, group, corporation, NGO, government, online content aggregator, etc.), frequency or regularity of publication (daily, regular, monthly, bursty), network characteristics (e.g., central, authoritative, A-list, isolated, un-linked, long-tail), readership/traffic levels, geographical or political location of authoring entity or focus of its concern (e.g., Russian language, Russian Federation, Bay Area Calif.), membership in a particular online ad distribution network (e.g., BLOGADS, GOOGLE™ ADSENSE), third-party categorizations, and the like.

To support node selection 110 based on relevance to particular issues or actors, or relevance-based node selection 110, lists of relevance markers may be used to calculate composite scores across nodes. These lists may include such items as key words and phrases, semantic entities, full or partial URLs, meta tags embedded in site code and/or published documents, associated tags in third-party collections (e.g., DELICIOUS tags), and the like. For example, tags may be collected automatically, such as by "spidering" sites for meta keywords. The corpus of internet data may be scanned and matches on list elements tabulated for each node. A number of methods may be used to calculate a relevance score based on these match counts. In an embodiment, relevance scores may be calculated by calculating individual index scores for text matches (T), link matches (L), and metadata matches (M), and then summing them. These individual index scores (I) may be calculated for each node by scanning all content published by a node during a specified period of time using a list of j relevance markers: I=sum $((x_1 * w_1)/t_1 + (x_2 * w_2)/t_2 \ldots (x_j * w_j)/t_j)$, where x is the number of matches for the item, w is a user-assigned weight (a scale of 1 to 5 is typical), and t is the total number of item matches in the scanned corpus. In an example, an initial set of source nodes may include the 100,000 Russian language weblogs most highly cited during a particular time frame. In another example, the initial set may include the 10,000 English language weblogs with the highest relevance scores based on relevance marker lists associated with the political issue of healthcare. In another example, the initial set may include all nodes by Indian and Pakistani authors in whatever language that have published at least three times within the past six months.

With respect to the link selection 112 component of network selection 102, objects may be particular units of chronologically published content found at a node, such as blog posts, "tweets," and the like. Links, also referred to as outlinks herein, may be hyperlink URLs found within a node's source HTML code or its published objects. Many kinds of links exist, and the ability to choose which kinds are used for clustering may be a key feature of the method. There are links for navigation, links to archives, links to servers for embedded advertising, links in comments, links to link-tracking services, and the like. Link selection 112 may be applied to links that represent deliberate choices made by authors, of which there may also be many kinds. These links may be to nodes (e.g., a weblog address found in a "blogroll"), objects (e.g., a particular YOUTUBE™ video embedded in a blog post), and other classes of entity, such as "friends" and "followers." Some node hosting platforms define a typology of links to reflect explicitly defined relationships, such as "friend," "friend-of," "community member," and "community follower" in LIVE-JOURNAL, or "follower" and "following" in Twitter™, Facebook™ and the like. In other cases, informal conventions, such as "blogrolls," define a type of link. Some of these link types are relatively static, meaning they are typically available as part of the interface used by a visitor to a node website, while others are dynamic, embedded within published content objects. Link types may be parsed or estimated and stored with the link data. These links represent different types of relationships between authors and linked entities, and therefore, according to the user's objectives, certain classes of links may be selected for inclusion. Different sorts of links also have time values associated with them, such as the date/time of initial publication of an object in which a dynamic link is embedded, or the first-detected and most recently seen date/time of a static link. Links may be further selected for clustering based on these time values.

From the parameters defined for node selection 110 and link selection 112, a mixed-mode network X 130 may be constructed, consisting of the set S of all source nodes, the set T of all outlink targets from selected types of hyperlinks, and the set E of edges between them defined by the selected type or types of links from S to T found during a specified time period. The network 130 may be considered "mixed mode" because while it may be formally bipartite, a number of nodes in S may also exist in T, which may be considered a violation of the normal concept of two-mode networks. Rather than excluding nodes that may be considered either S or T nodes, the systems and methods of the present disclosure consider them logically separate. A particular node may be considered a source of attention(S) in one mode, and an object of attention (T) in the other. Before clustering, the set of nodes may be further constrained by parameters applied to X, or to a one-mode subnetwork X' consisting of the network 130 defined by nodes in S along with all nodes in T that are also in S (or at a level of abstraction under an element in S, collapsed to the parent node). Standard network analytic techniques may be applied to X' in order to reduce the source nodes under consideration for clustering. For instance, requirements for k-connectedness may be applied in order to limit consideration to well-connected nodes.

In an embodiment, partitioning 104 may include: 1.) specification of node level for building the two-mode network, 2.) assembly of bipartite network matrix 132 using iterative processing of matrix to conform with chosen threshold parameters, and 3.) statistical clustering (multiple methods possible) of nodes on each mode, that is, source node clustering 114 and outlink clustering 118. Outlink clustering 118 to form an outlink bundle may involve identifying sets of web sites that are accessed by the same kinds of people.

With respect to specification of node level, distinction may be made between "nodes" and "objects," considering the node as a stable URL at which a number of objects are published. This may result in a generation of a straightforward two-level hierarchy (object-node); however, nodes sometimes have a hierarchical relationship among each other (object-node-metanode). Consider the following three URLs:

1.) http://www.bloghost.com/;
2.) http://www.bloghost.com/users/johndoc/blog/; and
3.) http://www.bloghost.com/users/johndoe/blog/09/6/21/myblogpost.html-.

Here, a three-level hierarchy with a metanode [1], node [2], and object exists. In some embodiments, the node URL may correspond very simply to a "hostname" (the part of a URL after "http://" and before the next "/") or a hostname plus a uniform path element (like "/blog" after the hostname). In other embodiments though, multiple nodes may exist at pathnames under the same hostname. Depending on the objective of the user, a "node level" may be selected for building the two-mode network, such that second mode nodes include (from most general to most specific level) a.) metanodes (collapsing sub-nodes into one) and independent nodes, b.) child, or sub-nodes (treated individually) and independent nodes, or c.) objects (of which a great many may exist for any given parent node). In embodiments, it may be possible to mix node levels according to a rule set based on defining levels for particular sets of nodes and metanodes, or on link thresholds for qualifying objects independently. Furthermore, a node with a webpage URL may often have one or more associated "feed" URLs, at which published content may be available. These feeds are generally considered as the same logical node as the parent site, but may be considered as independent nodes. If a target URL is not a publishing node, but another kind of website, the level may likewise be chosen, though more levels of hierarchy may be possible, and typically the practical choice may be between hostname level or full pathname level.

With respect to the assembly of the bipartite network matrix 132 using iterative processing of the matrix 132 to conform with chosen threshold parameters, links may be reviewed and collapsed (if necessary) to the proper node level as described hereinabove, and the two-mode network may be built between all link sources (the initial node set) and all target (second-mode) nodes at the specified node level or levels. Optionally, blacklists and whitelists may be used to, respectively, exclude or force inclusion of specific source or target nodes. From this full network data, an N×K bipartite matrix M, in which N is the set of final source nodes and K is the set of final target nodes, may be constructed according to user-specified, optional parameters, such as maxnodes, nodemin, maxlinks, linkmin, and the like. An iterative sorting algorithm may prioritize highly connected sources and widely cited targets, and then use these values to determine which nodes and targets from the full network data may be included in the matrix. Maxsources and maxtargets may set the maximum values for the number of elements in N and K. Nodemin may specify the minimum number of included targets (degree) that a source is required to link to in order to qualify for inclusion in the matrix. Linkmin similarly may specify the minimum number of included sources (degree) that must link to a target to qualify it for inclusion in the matrix. Two other optional parameters, nodemax and linkmax may be used to specify upper thresholds for source and target degree as well. Each value (Vij) in M, is the number of individual links from source i to target j.

With respect to statistical clustering in each mode, that is node clustering 114 and outlink clustering 118, there may be a number of clustering algorithms which may be used to partition the network, including hierarchical agglomerative, divisive, k-means, spectral, and the like. They may each have merits for certain objectives. In an embodiment, one approach for producing interpretable results based on internet data may be as follows: 1.) make M binary, reducing all values>0 to 1; 2.) calculate distance matrices for M and its transpose, yielding an N×N matrix of distances between sources, and a K×K matrix of distances between targets. Various distance measures may be possible, but good results may be obtained by converting Pearson correlations to distances by subtracting from 1; 3.) using Ward's method for hierarchical agglomerative clustering, a cluster hierarchy (tree) may be computed and stored for each distance matrix. Results of an arbitrary number of clustering operations may be saved in their entirety, so that any particular flat cluster solutions may be chosen as the basis for generating outputs.

In an embodiment, the clustering algorithm may be language agnostic, that is, forming attentive clusters around similar targets of attention without a constraint on the language of the targets. In an embodiment, clustering may make use of metadata that may enable the system to know about the content of various websites without having to understand a language. In another embodiment, the algorithm may have a translator or work in conjunction with a translation application in order to find terms across publications of any language.

Now that the first two stages of attentive clustering, network selection and two-mode network clustering, have been described we turn to a description of visualization and metrics output. Any particular set of cluster solutions for source nodes (an assignment of each node to a cluster) may be selected by the user in order to generate one or more of the following classes of output: 1.) per-cluster network metrics for source nodes 120; 2.) across clusters comparative frequency measures of link, text, semantic and other node and link-level events, content and features; 3.) visualizations 124 of the partitioned network combined with these measures and other data on node and link-level events, content and features; and 4.) aggregate cluster metrics reflecting ties among clusters taken as groups. Further, any particular set of cluster solutions for target nodes may be selected and used in combination with the set of cluster solutions for source nodes in order to generate: 1.) measures of link frequencies and densities 128 between source clusters and target clusters; 2.) visualization 124 of the previous as a network of nodes representing clusters of sources and targets with ties corresponding to link densities 128; and 3.) visualizations 124 of one-mode calculated (network of target nodes) networks with partition data.

In one class of output, and with respect to per-cluster network metrics for source nodes 120, in addition to standard network metrics for source nodes that are generated over the entire network, and which reflect various properties important for determining influence and role in information flow, user-selected cluster solutions may be used to generate a set of measures for each node, per-cluster. These measures may represent the node's direct and indirect influence on, or visibility to, each cluster, as well as its attentiveness to each cluster. For every node i, these measures may include the following: same-in: the number of nodes in the same cluster that link to i; same-out: the number of nodes in the same cluster i links to; diff-in: the number of nodes in other clusters that link to i; diff-out: the number of nodes in other clusters that i links to; same-in-ratio: the proportion of in-linking nodes from the same cluster; same-out-ratio: the proportion of in-linking nodes from other clusters; w-same-in: same-in scores where value of in-linking blogs is weighted by its centrality measure; w-diff-in: diff-in scores where value of in-linking blogs is weighted by its centrality measure; and per-cluster influence scores: similar scores (raw and weighted) for in-links from, and out-links to, each cluster on the map.

In another class of output, and with respect to across clusters comparative frequency measures of link, text, semantic and other node and link-level events, content and features, the partitioning of the network into sets of source nodes may allow independent and comparative measures to be generated for any number of items associated with source nodes. These may include such items as: a) the set of target nodes K in M; b.) any subset of all target nodes, including those on user-generated lists; c.) any set of target objects, such as all URLs for videos on YOUTUBE™, or all object URLs on user-created lists; d.) any other URLs; e.) any text string found in published material from source nodes; f.) any semantic entities found in published material from source nodes; g.) any class of meta-data associated with source nodes, such as tags, location data, author demographics, and the like. For any item i in a set of items associated with source nodes, the following examples of measures may be generated per each cluster: 1.) total count: number of occurrences of item within the cluster (multiple occurrences per source node counted); 2.) node count: number of nodes with item occurrence within cluster (multiple occurrences per source node count as 1); 3.) item/cluster frequency: total count/#of nodes in the cluster; 4.) node/cluster frequency: node count/#of nodes in the cluster; 5.) standardized item/cluster frequency: multiple approaches are possible, including z-scores, and one approach is to use standardized Pearson residuals, which control for both cluster size and item frequency across clusters and items in the set; and 6.) standardized node/cluster frequency: multiple approaches are possible, including z-scores, and one approach is to use standardized Pearson residuals, or Cluster Focus Index scores 122. The higher the CFI score for the item, the greater the degree of its disproportionate use by the cluster. A score of zero indicates that the cluster cites the source at the same frequency as the network does on average. Other detailed data may be possible to obtain, such as the top nodes in each cluster, lists of all nodes in the cluster, lists of relevant Internet sites that each of the clusters link to (which enables identifying target outlinks where a message can be placed in order to reach specific clusters), the relative use of key terms across the clusters (which enables developing specific messages to communicate to each cluster), a hitcount (the raw number of times each outlink and term was found within all the identified nodes), source node and/or cluster geography and demographics, sentiment, and the like.

For example, differential frequency analysis can be done on meta-data, such as tags, that are associated with different attentive clusters to facilitate cluster interpretation. In the example, by sorting cluster focus scores 122 on the metadata tags, interpretations of what the clusters are about may be derived without any manual review. The meta-data associated with the clusters may be used to facilitate interpretation of the meaning of the clusters. In an example, the meta-data may be language independent, such as GIS map data.

Figure 2:
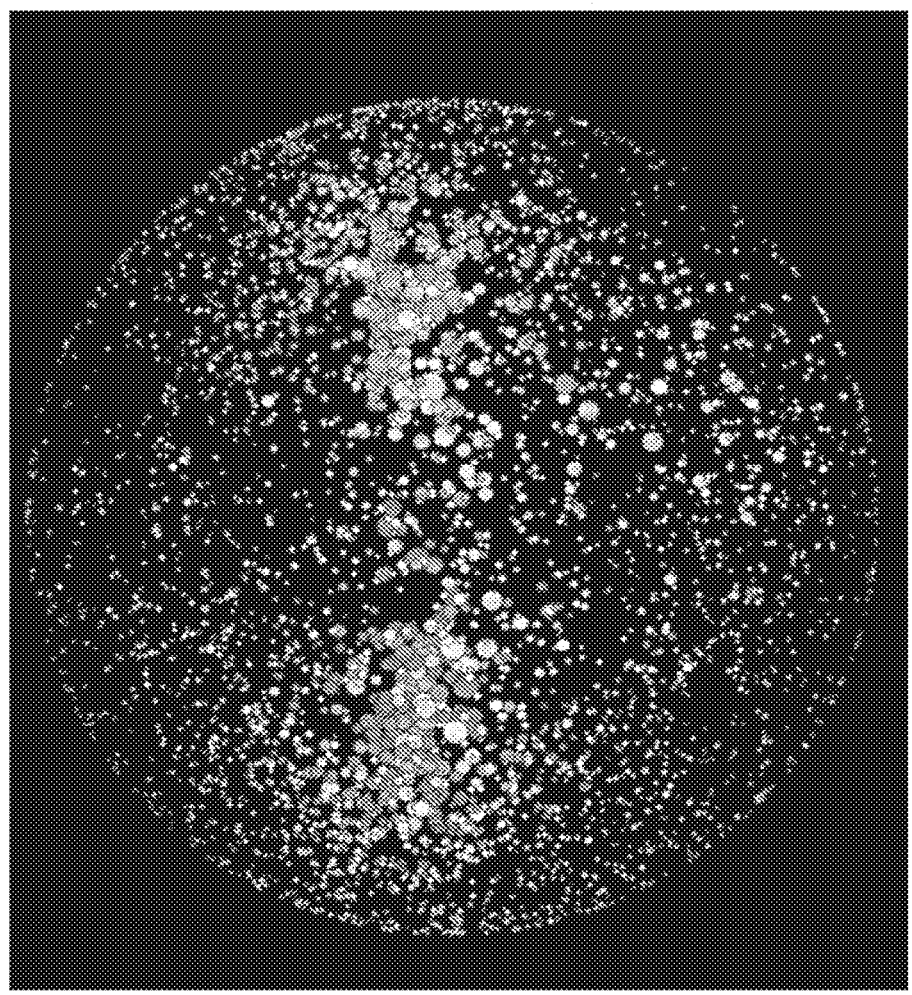
FIG. 2 depicts a social network map in the form of a proximity cluster map.

In another class of output, and with respect to visualizations of the partitioned network 124, a social network diagram may be generated and used to display link, text, semantic and other node and link-level events, content and features ("event data"), such as that shown in FIG. 2. The network map may be static or it may be the basis of an interactive interface for user interaction via software, software-as-a-service (SaaS), or the like. There may be two components to this process of visualization: 1.) creating a map of source nodes in a dimensional space for viewing; and 2.) use of colors, opacity and sizes of graphical elements to represent clusters, nodes and event data. With the dimensional mapping component, multiple approaches may be possible. One method may be to use a "physics model" or "spring embedder" algorithm suitable for plotting large network diagrams. The Fruchterman-Reingold algorithm may be used to plot nodes in two or three dimensions. In these maps, every node is represented by a dot, and its position is determined by link to, from, and among its neighbors. The size of the dot can vary according to network metrics, typically representing the chosen measures of node centrality. The technique is analogous to a locally-optimized multidimensional scaling algorithm. With the component related to use of colors, opacity and sizes of graphical elements to represent clusters and event data, nodes may be colored according to selected cluster partitions, to allow easy identification of various partitions. This projection of the cluster solution onto the dimensional map may facilitate intuitive understanding of the "social geography" of the online network. This type of visualization may be referred to as a "proximity cluster" map, because proximity of nodes to one another indicate relationships of influence and interaction. Further, projection of event data onto the map may enable powerful and immediate insight into the network context of various online events, such as the use of particular words or phrases, linking to particular sources of information, or the embedding of particular videos. This may be produced as static images, and may also be the basis of software-based interactive tools for exploring content and link behavior among network nodes.

In another class of output, and with respect to aggregate cluster metrics 128, metrics may be calculated for partitions at the aggregate level. Event metrics may include raw counts, node counts, frequencies (counts/#nodes in cluster), normalized and standardized scores, and the like. Examples typically include values such as: the proportion of blogs in a cluster using a certain phrase; the number of blogs in a cluster linking to a target website; the standardized Pearson residual (representing deviation from expected values based on chance) of the links to a target list of online videos; the per cluster "temperature" of an issue calculated from an array of weighted-value relevance markers; and the like.

As described above, any particular set of cluster solutions for target nodes may be selected and used in combination with the set of cluster solutions for source nodes in order to generate additional outputs. Visualizations produced may include: 1.) two-mode network diagram of relationships between clusters of sources and targets, treated as aggregate nodes and with tie strength corresponding to link density measures; and 2.) second-mode ("co-citation") network diagram, in which targets are nodes, connected by ties representing the number of sources citing both of them, and colors corresponding to cluster solution partitions. Another output may be macro measurement of link density. To reveal and measure large-scale patterns in the distribution of links from source nodes to targets, the matrix M may be collapsed to aggregate link measures among clusters of sources and clusters of targets. A series of S×T matrices may be used, with S as the set of source clusters ("attentive clusters") and T as the set of clustered targets ("outlink bundles"). These matrices may contain aggregated link measures, including: counts (c): the number of nodes in source cluster s linking to any member of target set t; densities (d): c divided by the product of the number of members in s and the number of members in t; and standard scores(s): standardized measures of the deviation from random chance for counts across each cell. Various standardized measures are possible, with standardized Pearson residuals obtaining good results. Any of these measures may be used as the basis of tie strength for two-mode visualizations described above.

In an embodiment, a density matrix may be constructed between attentive clusters and outlink bundles. The attentive clusters may be represented as row headers and the outlink bundles may be represented as column headers. The density matrix may allow users to see patterns in attention between certain sets of websites and certain bundles. The density matrix may provide a way to identify similar media sources. Further, the density matrix may provide information about attentive clusters that may be based on particular verticals.

Having described the process for attentive clustering, we now turn to examples of applications of the technique and various related analytical applications thereof for measuring frequencies of links between attentive clusters and outlink bundles, thus enabling identification and measurement of large-scale regularities in the distribution of attention by online authors across sources of information.

In an embodiment, and referring to FIG. 2, a social network map of the English-language blogosphere is depicted. The social network map graphically depicts the most linked-to blogs in the English language blogosphere. The size of the icons representing each individual blog may be representative of a network metric, such as the number of inbound links to the blog. This visualization depicts the output from a method for attentive clustering and analysis which identified attentive clusters of linked-to blogs, wherein the attentive clusters included authors with similar interests.

Figure 3:
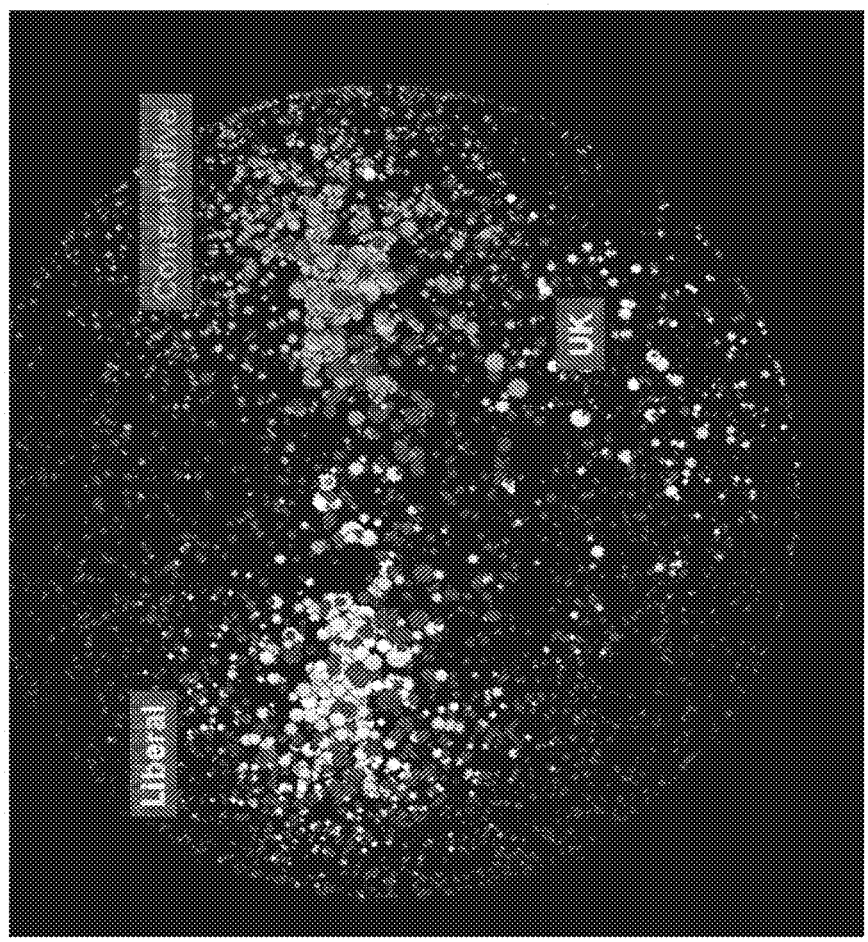
FIG. 3 depicts a social network map in the form of a proximity cluster map highlighting attentive clusters of liberal and conservative U.S. bloggers, and British bloggers.

Referring to FIG. 3, the method for attentive clustering and analysis analyzes bloggers' patterns of linking to understand their interests. The visualization in FIG. 3 highlights liberal and conservative U.S. bloggers, and British bloggers as attentive clusters. By zooming in on the visualization, subgroups such as conservatives focused on economics or liberals focused on defense may be identified from among the attentive clusters depicted.

Figure 4:
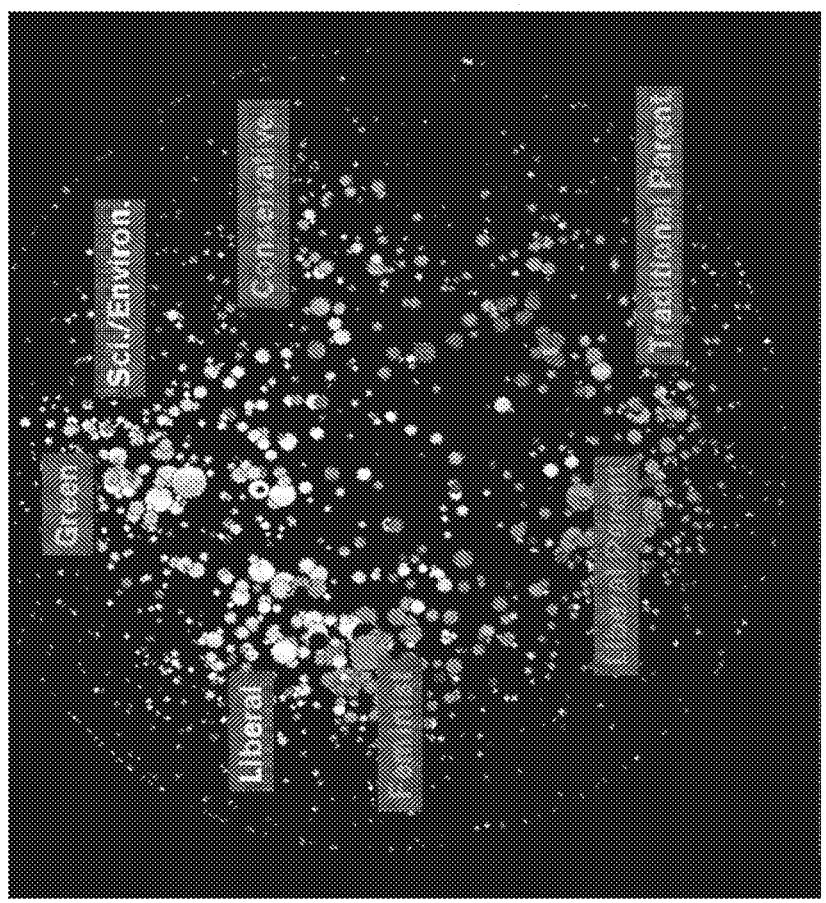
FIG. 4 depicts a social network map in the form of a proximity cluster map focused on environmentalists, feminists, political bloggers, and parents.
Figure 5:
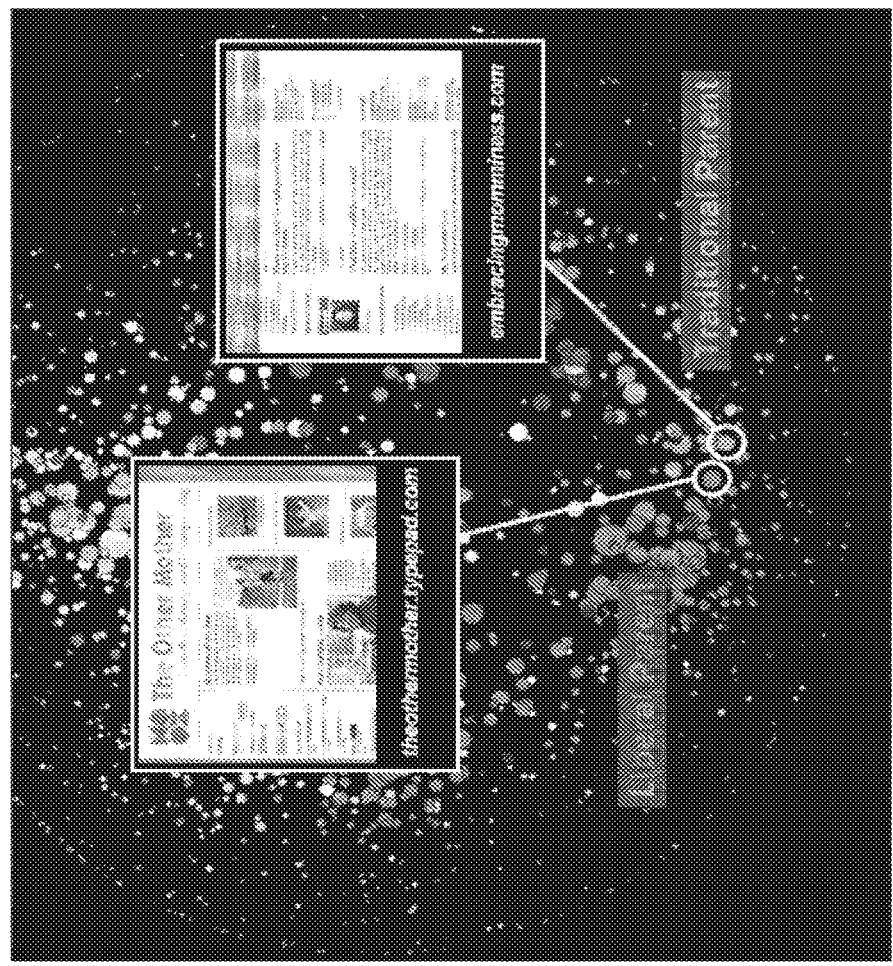
FIG. 5 depicts a social network map in the form of a proximity cluster map with a cluster relationship identified.

Referring to FIG. 4, the method for attentive clustering and analysis enables building a custom network map. In FIG. 4, the network map features attentive clusters of bloggers attuned to these topics: environmentalists, feminists, political bloggers, and parents. Subgroups within each topic may be delineated by a different color, a different icon shape, and the like. For example, within the parent bloggers, icons representing the liberal parent bloggers may be colored differently than the traditional parent bloggers. Surprising relationships may be discovered among groups of bloggers. For example, in FIG. 5, two parent bloggers with very different social values are closer in the network than either is to political bloggers who share their broader political views.

Figure 6:
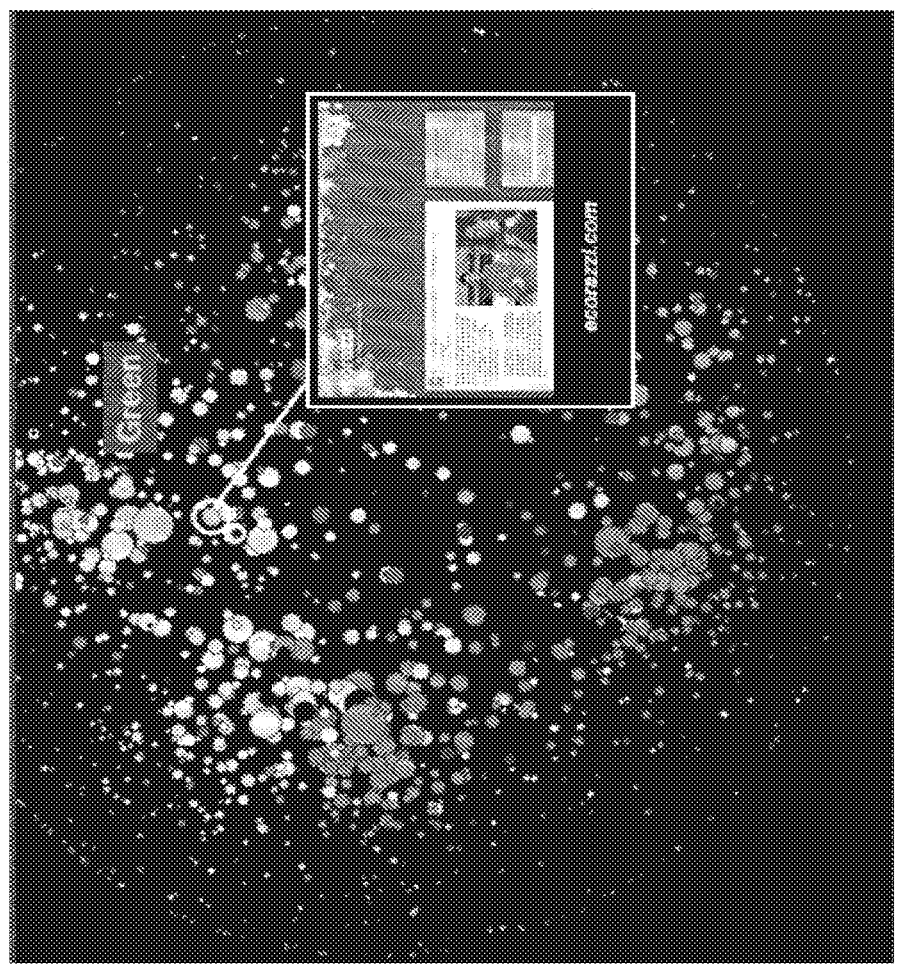
FIG. 6 depicts a social network map in the form of a proximity cluster map with a bridge blog identified.

Referring to FIG. 6, each attentive cluster may have its own core concerns, viewpoints, and opinion leaders. The method for attentive clustering and analysis enables identification of blogs that are considered bridge blogs, such as the one shown circled, which indicates that the blog is popular among multiple attentive clusters. The method for attentive clustering and analysis enables identification of whose opinions matter, about what, and among what groups.

Figure 7:
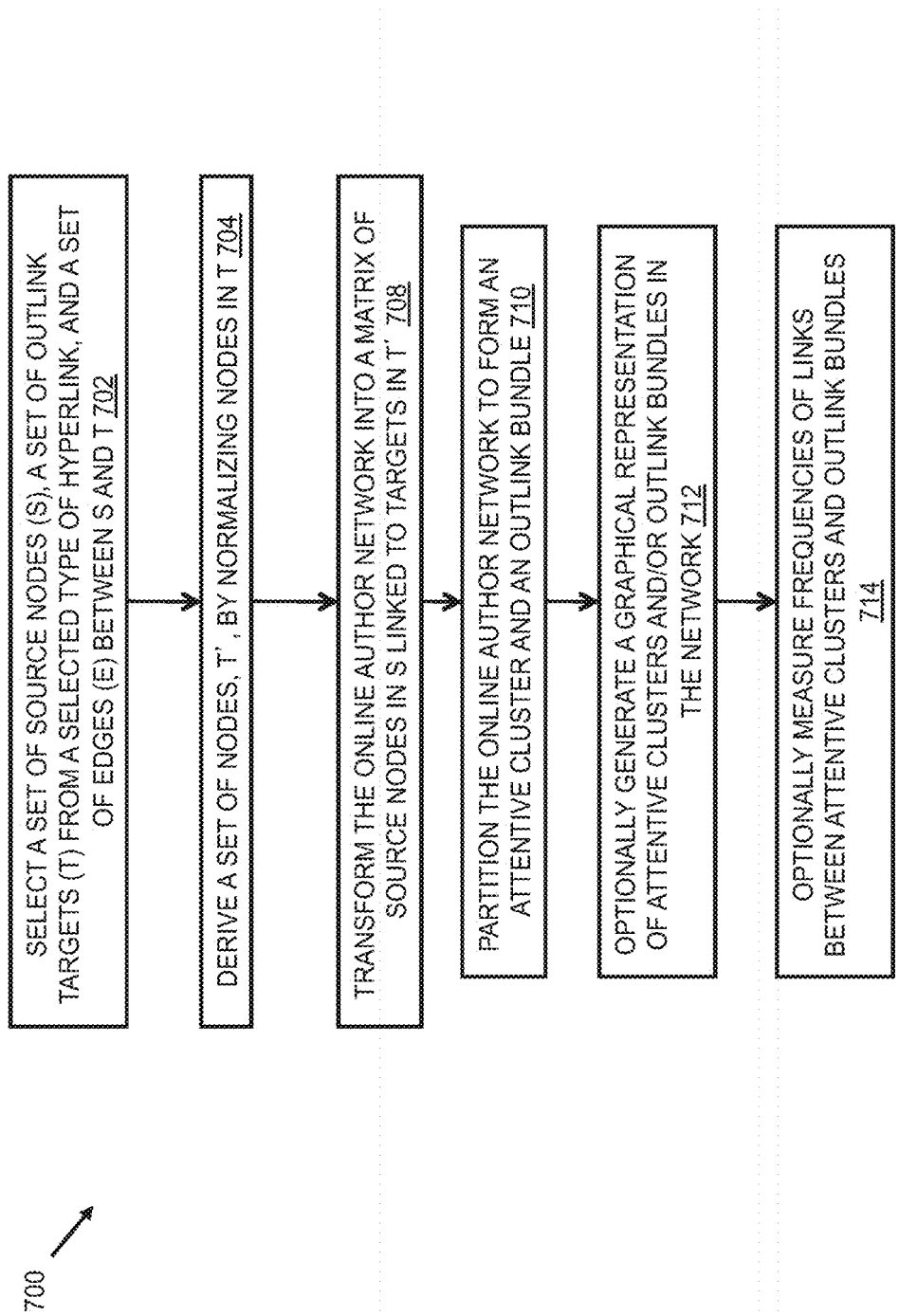
FIG. 7 depicts a flow diagram for attentive clustering.

Referring to FIG. 7, the steps of attentive clustering and analysis may include constructing an online author network, wherein constructing the online author network includes selecting a set of source nodes(S), a set of outlink targets (T) from at least one selected type of hyperlink, and a set of edges (E) between S and T defined by the at least one selected type or types of hyperlink from S to T during a specified time period 702; deriving a set of nodes, T', by any combination of a.) normalizing nodes in T, optionally to a selected level of abstraction, b.) using lists of target nodes for exclusion ("blacklists"), and c.) using lists of target nodes for inclusion ("whitelists") 704; transforming the online author network into a matrix of source nodes in S linked to targets in T' 708; and partitioning the online author network into at least one set of source nodes with a similar linking history to form an attentive cluster and at least one set of outlink targets with a similar citation profile to form an outlink bundle 710. The steps may optionally include generating a graphical representation of attentive clusters and/or outlink bundles in the network to enable interpretation of network features and behavior and calculation of comparative statistical measures across the attentive clusters and outlink bundles 712, wherein at least one element of the graphical representation depicts a measure of an extent of a type of activity within the network; and optionally measuring frequencies of links between attentive clusters and outlink bundles enabling identification and measurement of large-scale regularities in the distribution of attention by online authors across sources of information 714. The element of the graphical representation may use at least one of size, thickness, color and pattern to depict a type of activity. Attentive clusters may be visually differentiated in the graphical representation by at least one of a color, a shape, a shading, and a size. The size of the object representing the attentive clusters in the graphical representation may correlate with a metric. The nodes, targets, and edges may be collected from public and private sources of information. Constructing the matrix may include applying at least one threshold parameter from the group consisting of: maxnodes, targetmax, nodemin, targetmin, maxlinks, and linkmin. Constructing the matrix may include applying a minimum threshold for the number of included nodes that must link to a target to qualify it for inclusion in the matrix. Constructing the matrix may include applying a minimum threshold for the number of included targets that must link to a node to qualify it for inclusion in the matrix. Constructing the matrix may include using blacklists to exclude particular nodes, and whitelists to force inclusion of particular nodes. The matrix may be a graph matrix.

By identifying and measuring the frequencies of links between attentive clusters and outlink bundles, all manner of information about the distribution of attention by online authors across sources of information may be obtained. Various examples of the sorts of information, visualizations, applications, reports, APIs, widgets, tools, and the like that are possible using the methods described herein will be described. For example, two playlists for YOUTUBE™ videos may be identified, one that has fraction with sub-cluster A the other with sub-cluster B. In another example, two RSS feeds may be organized that supply a user with items that have more attention from sub-cluster A versus sub-cluster B. In another example, a valence graph may be constructed that depicts words, phrases, links, objects, and the like that are preferred by one sub-cluster over another sub-cluster; such valence graphs may use aggregated sets of clusters defined by users to display dimensions of substantive interest, such as in FIG. 11. In yet another example, works from authors who are most relevant in a particular cluster may be displayed and then published as a widget, which may be custom-based on a valence graph, as a way of monitoring an ongoing stream of information from that cluster. Clusters may be customizable within the widget, such as via a dialog box, menu item, or the like. Further examples will be described hereinbelow.

A user may be able to, optionally in real time through a user interface, select a stream of information based on looking at the environment, zoom in based on clustering, figure out a valid emergent segmentation, and then set up monitors to watch the flow of events, such as media objects, text, key words/language, and the like, in real time.

In an embodiment, differences in word frequency use by attentive clusters may be used to differentiate and segment clusters. For example, the attentive clusters "militant feminism" and "feminist mom" may both frequently use terms associated with feminism in their publications, but additional use of terms related to militantism in one case and maternity in another case may have been used to subdivide a cluster of feminists into the two attentive clusters "militant feminism" and "feminist mom." In extending this concept, not just word usage but the frequency of word usage, may also be useful in segmenting clusters. For example, in clusters of parents, the ones actually doing home schooling did not use the term "home school" frequently, but rather used the term "home education" with greater frequency. By identifying the specific language/words used by a cluster, the system may enable crafting messages, brands, language, and the like for particular clusters. In an embodiment, an application may automatically craft an advertisement to be placed at one or more outlinks in an outlink bundle using high frequency terms used by an attentive cluster. Further in the embodiment, the advertisement may be automatically sent to the appropriate ad space vendor for placement at the one or more outlinks.

In an embodiment, a method of using attentive clustering based on analysis of link structures to steer a further data collection process is provided. The data collection may include collection of web-based data, such as, for example, clickstream data, data about websites, photos, emails, tweets, blogs, phone calls, online shopping behavior, and the like. For example, tags may be collected automatically or manually for every website that is a node. The tags may be non-hierarchical keywords or terms. These tags may help describe an item and may also allow the item to be found again by browsing or searching. In an example, tags may be associated in third-party collections such as DELICIOUS tags, and the like. In another example, web crawlers may extract meta keywords and tags included within node html. Further, specific keywords and phrases may be exported to a database. In yet another example, the tags may be generated by human coders. Once a cluster partitioning exists, the system may do differential frequency analysis on the tags that are associated with different attention clusters. By sorting cluster focus index (CFI) scores along with the tags, the system can come up with an interpretation of the meaning of a cluster without requiring further analysis of the cluster itself. In an embodiment, the system may apply a further data collection process in order to associate respondents to a survey and their news sources with various corners of the internet landscape. For example, the influence of a particular news outlet across a segmented environment of the online network may be obtained by examining clustering in conjunction with a downstream data collection process, such as obtaining survey research, clickstream data, extraction of textual features for content analysis including automated sentiment analysis, content coding of a sample of nodes or messages, or other data.

In an embodiment, clustering data may be overlaid on GIS maps, "human terrain" maps, asset data on a terrain, cyber-terrain, and the like.

In an embodiment of the present disclosure, a method of determining a probability that a user will be exposed to a media source given a known media source exposure is provided. The media source may include newspapers, magazines, radio stations, television stations, and the like. For example, a user who may be exposed to a particular media source may be clustered in a specific attentive cluster. Accordingly, the system may determine that users in that particular attentive cluster are more likely to be exposed to another media source because the second media source may also be present in an outlink bundle preferred by the cluster.

In an embodiment of the present disclosure, a method of attentive clustering on a meso level is provided. The method may enable identifying emergent audiences (Attentive Clusters) and monitor how messages (as specific as a single article in print; as broad as core campaign themes) traverse cyberspace. The method may involve mapping the attentive clusters where messages have, or are likely to find, receptive audiences. Mapping may enable identifying opinion leaders, and information sources, online and offline, which help shape their views.

The method may enable identification of the mindset/social trends of a group of users. For example, the system may be able to associate an attentive cluster with a known network, such as a political party, a political movement, a group of activists, people organizing demonstrations, people planning protests, and the like. Via the ability to associate attentive clusters with particular groups of people, the system may be able to track the evolution of a movement or identity over time. Further, if a cluster supports a political movement, the system may track the impact of the political movement of the cluster on society. The system may track if the political movement has been accepted by majority of the people of the society, rejected by the society, if there is debate about the political movement, and the like. Accordingly, the method may enable growth of a brand, sale of a product, conveying a message, prediction of what people care about or do, and the like.

In an embodiment of the present disclosure, a system and method for multi-layer attentive clustering may be provided. In the system and method, attentive clusters may be tracked across various layers of a social segmentation, such as specific social media networks (Twitter™, Facebook™, Orkut™, and the like), a blogosphere, and the like. The system may be able to track development of an attentive cluster in a single layer or across multiple layers at every stage of the development of the cluster. When different layers of online media (such as weblogs, microblogs, and a social network service) are clustered individually, measures of association may be created between clusters across layers, based on density of hyperlinks between them, common identities of underlying authors, mutual citation of the same sources, mutual preference for certain topics or language, and the like. The system may also track the major players of clusters at every stage of development of the cluster.

For example, the growth of an attentive cluster supporting a political movement may be tracked back in time and over a period of a time. In the example, once an attentive cluster may be identified, the system may examine the nodes associated with specific players in the attentive cluster in order to determine characteristics, such as who is talking to whom, identify key nodes or hubs that link many other layers and/or media sources, identify apparent patterns of affinity or antagonism among clusters or other known networks, who may have started the political movement, when the political movement may have started, what messages were used at the forefront of the political movement's establishment, the size of the movement, the number of people who initially joined the political movement, growth of the political movement, influential people from various stages of the political movement, and the like. In this example, all of the analysis may be confined to activity in a single layer of a social segmentation or it may be undertaken across multiple layers. Continuing with the example, the impact of the political movement on society may be examined by tracking the penetration of an attentive cluster or its message across layers or the expansion of the attentive cluster in a single layer. Likewise, attentive cluster analysis may enable predictions. For example, an attentive cluster may be tracked in a single layer, such as by monitoring the number of Twitter™ followers (or other applicable social platforms), the frequency of new followers added, the content associated with that attentive cluster, inter-cluster associations, and the like, to determine if a political movement may be being spawned, expanded, diminished, or the like. In an embodiment, the socio-ideological configuration of the people who spawned the political movement may be evident from analyzing one or more of a blog layer, a social networking layer, a traditional media layer, and the like.

For example, a Twitter™ (or other applicable platform) map may be formed where each colored dot is an individual Twitter™ account and the position is a function of the "follows" relationship. People are close to people they are following or who are following them. The pattern of the map may be related to the structure of influence across the network.

In an embodiment, the system may be deployed on a social networking site to identify and track attentive clusters and linkage patterns associated with the attentive clusters. For example, the system for attentive clustering may be applied on Facebook™ to identify attentive clusters in the Facebook™ audience and track the cluster's activity within Facebook™. In an example, the system may be used to identify a group of people who may be susceptible to a message. By identifying and tracking an attentive cluster in the Facebook™ layer that may be susceptible to a message, downstream activities, such as organizing in response to the message, may be examined. For example, an attentive cluster of university students may be presented with a message regarding a proposed law lowering the drinking age. The system may track activity within the cluster related to the message, identify new groups formed around the topic of the message, invitations to other groups regarding the message, opposition from other groups in response to the message, and the like. Indeed, the system may be able to track the formation of new attentive clusters in the Facebook™ layer in response to the message. In this case, the system may identify individuals or groups that link to one another who share a common interest or target of attention, such as concerned parents opposing the proposed law, anti-government groups supporting the proposed law, child advocate groups opposing the law, and the like. Discoveries related to the original layer may be applied to strongly associated clusters in other layers. For instance, determination about the interests of a cluster in the Facebook™ layer may be used to drive a communications or advertising strategy in associated clusters of other layers such as weblogs or Twitter™.

Measures for characterizing contagious phenomena propagating on networks may include peakedness, commitment (such as by subsequent uses and time range), and dispersion (including normalized concentration and cohesion) and will be further described herein.

In other embodiments, two-mode networks may be generated by projecting modes one onto another. For example, certain social networks may not allow handling of individual data, but may allow public page data to be accessed. In this way, data from individuals who comment on public pages may be obtained. Public pages may be treated as a two-mode network that is collapsed to one mode. For example, a two-mode network may be formed from two classes of actors, people and cocktail parties that the people attend. One class of actors could be labeled 1-5 and the other A-E to generate a scatter diagram depicting a two-mode network, either a network of cocktail parties attended by the same people or a network of people who attended the same cocktail parties. Likewise, networks may be formed based on who participates in the stream of objects that come from different public pages, the relationship between public pages, such as if there is a direct "like" relationship between public pages, weighted by how many people commented on objects from two or more pages, and the like.

These data may be clustered as described herein. In embodiments, the weight between public pages indicated by the number of users commenting on object from both pages may be used to visually indicate a stronger connection between pages with higher weights.

Clustering of this public page data may result in the formation of poles. For example, two poles may form where one set of pages is interacted with by one population and another set of pages interacted with by a very different population. There may be individuals who are interacting with both of these sets of pages at either pole. In any event, in the process of attentive clustering, users who are most tenuously connected to anything are forced to the outer edges of the cluster map.

In an embodiment of the present disclosure, a method of analyzing attentive clusters over time is provided. The analysis of these attentive clusters may enable the system to depict changes in the linking patterns of attentive clusters over a time period. Further, the analysis may allow depiction of any changes in the structure of the network itself.

In an embodiment, a time-based reporting method may be used by the system to demonstrate the effects of events/actions throughout a network of attentive clusters for a period of time. In the method, bundles that may be lists of semantic markers, including text elements embedded in a post or tweet, links to pieces of online content, metadata tags, and the like, may be tracked in clusters across a network, such as a blogosphere.

For example, a bundle of semantic markers related to obesity may be tracked over time to determine how the topic of obesity is being discussed. In the example, a particular bundle (with text, link and meta data elements) can be tracked across clusters to see where they are getting attention or not. The measure of attention may be defined as a "temperature." The "temperature" is based conceptually on Fahrenheit temperatures (without negatives) as compared to other issues where 100 is very hot and 0 is ice cold. The method may have a tracking report as an output for tracking issues in a map across time. In this example, the tracking report may be focused on a collection of blogs most focused on childhood obesity organized into attentive clusters over a moving 12-month period of time. The blogs may be clustered broadly into policy/politics, issue focus, culture, family/parenting, and food attentive clusters. There may be sub-clusters defined for each of those clusters, such as conservative, social conservative, and liberal sub-clusters under the policy/politics cluster. The report may indicate the issue intensity for each cluster/sub-cluster by assigning it an average temperature per blog of conversation on the broad topic of childhood obesity within each group. The report may indicate the issue distribution for each cluster/sub-cluster by calculating a percentage of childhood obesity conversations taking place on blogs not in the map and within each cluster within the map. Continuing with this example, specific terms may be tracked across the clusters/sub-clusters over time and the method may indicate an average temperature based on the uses of specific terms in blogs within each cluster. In the example, the term "school lunch" has a high "temperature" in certain issue focus clusters, liberal policy clusters, and foodie clusters and steadily increased over the last eight moving 12-month periods. Similarly, the intensity of sites, or the average temperature based on links to specific web sites on blogs within each cluster, may be provided by the report. The intensity of source objects, or the average temperature based on the links to specific web content (articles, videos, etc.), may be provided by the report. The intensity of sub-issues, or the average temperature of conversation on identified issues defined by a set of terms and links, may be provided by the report. In the report, specific terms may be tracked on a monthly and per-cluster basis, specific sites may be tracked on a monthly and per-cluster basis, and specific objects may be tracked on a monthly and per-cluster basis.

In an exemplary embodiment, the system may identify and track structural changes in a network. For example, during the recent US elections, blogs appeared instantaneously that were anti-Obama, Pro-Palin, or Pro-McCain but were outside the conservative blogosphere. This rapid change in the network structure may be indicative of a coordinated, synchronized campaign to message and blog.

In an embodiment of the present disclosure, a method of attentive clustering by partitioning an author network into a set of source nodes with similar adoption and use of technology features is provided. For example, instead of a website being a target of attention for an attentive cluster or around which an attentive cluster forms, a feature or a piece of technology, such as an embedded Facebook™ "Like" button, may be a target of attention or clustering item.

In an embodiment, a method of creating clusters of people and describing probabilistic relationships with other clusters, such as words, brands, people, and the like, is provided. The system may describe any probability of any relation between them.

Figure 9:
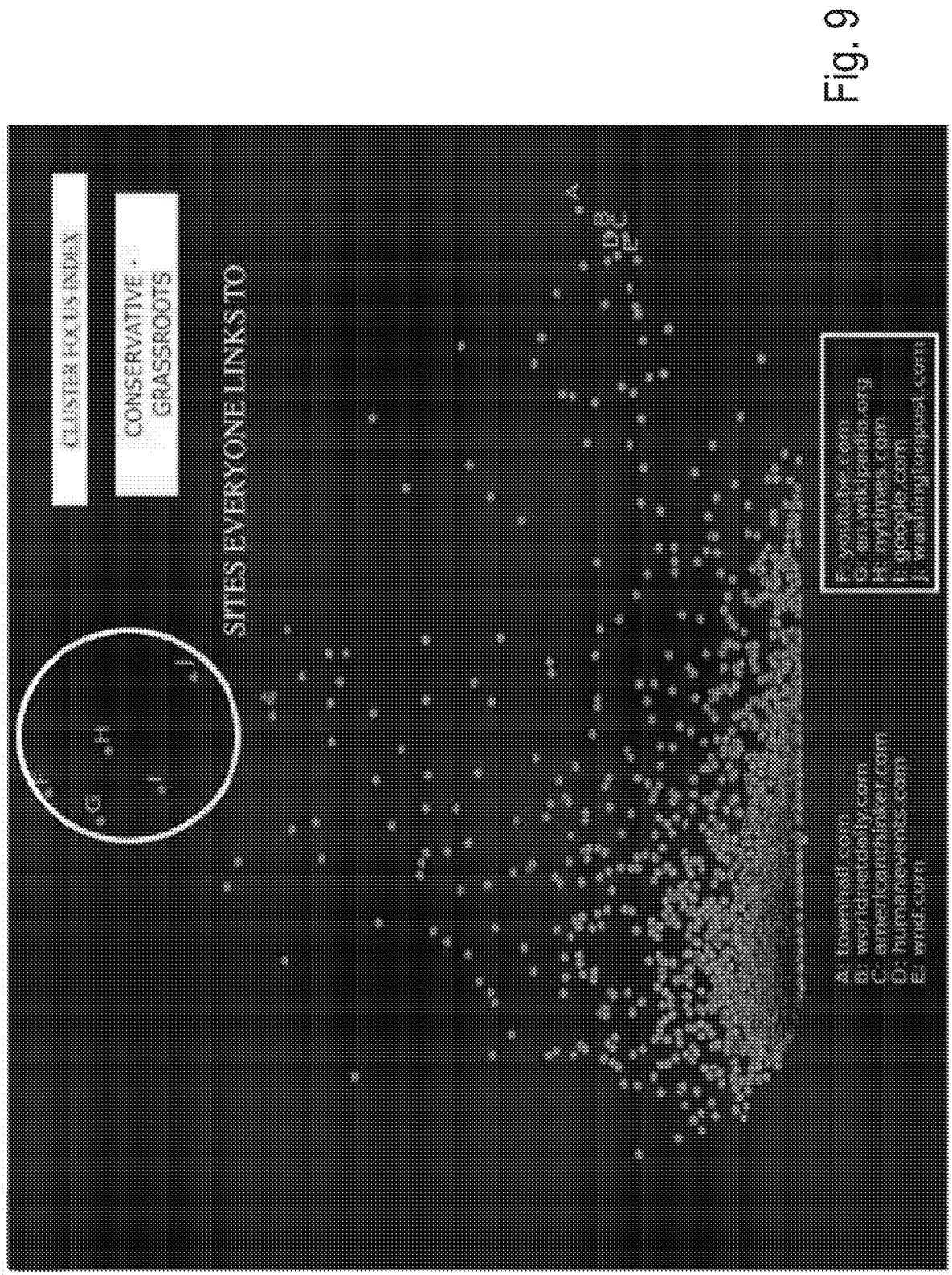
FIG. 9 depicts a graph of CFI scores.
Figure 10:
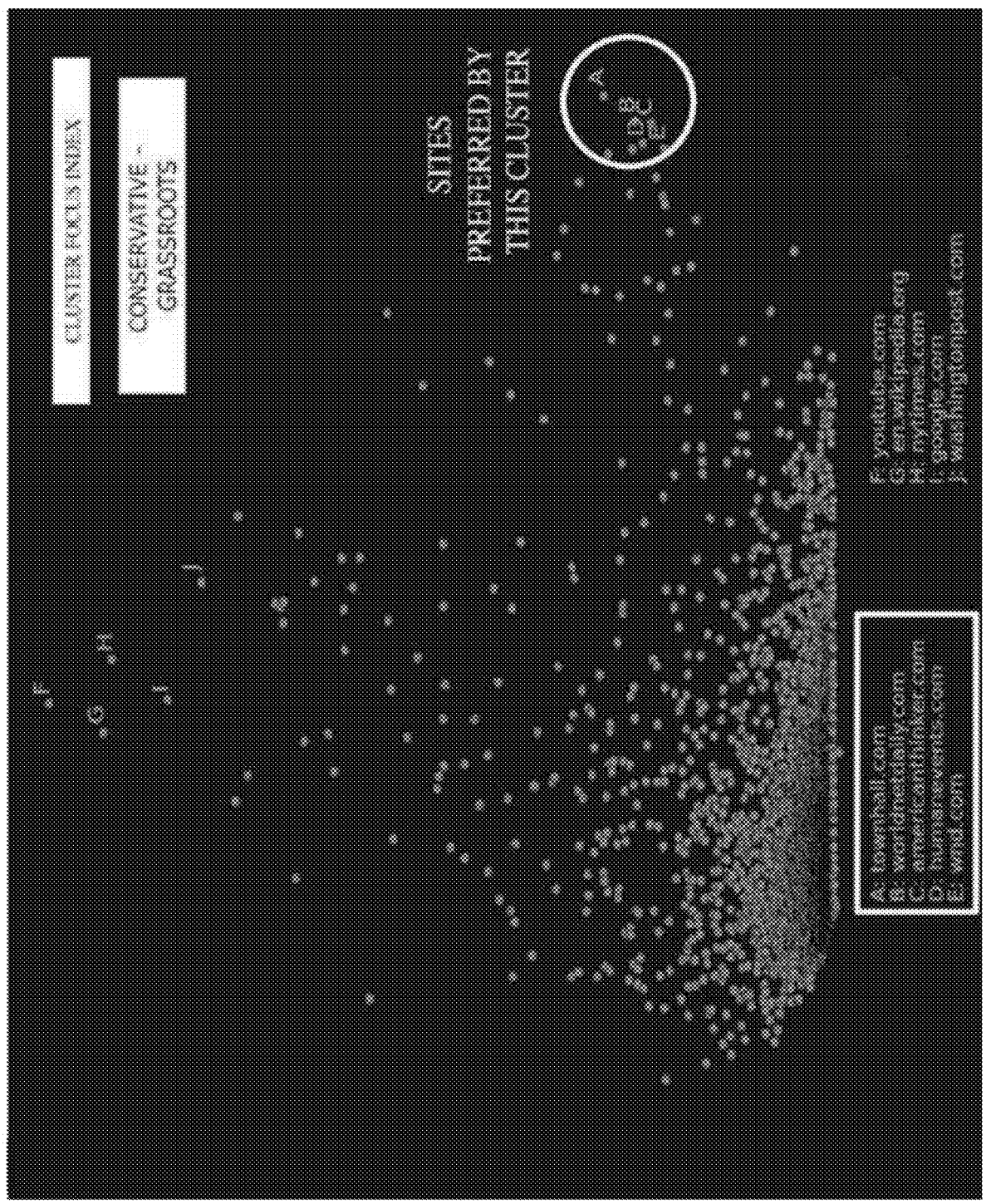
FIG. 10 depicts a graph of CFI scores.

To identify what an attentive cluster links to more than the network average or what words and phrases they use more than the network average, a cluster focus index score (CFI) may be calculated. CFI represents the degree to which an event, characteristic, or behavior disproportionately occurs in a particular cluster, or a particular cluster, relative to the network, preferentially manifests an event, characteristic, or behavior. For example, CFI score could be generated for a particular cluster across a set of target nodes, representing the degree to which a particular target is disproportionately and preferentially cited by members of the particular cluster, or the degree to which the particular cluster, relative to the network, preferentially cites the target. The CFI gives a sense of what is important to an attentive cluster, where they go for their information, what words, phrases and issues they discuss, and the like. FIG. 9 depicts a graph of cluster focus index scores for targets of a conservative-grassroots attentive cluster. The targets circled on FIG. 9 (F through J) are those that everyone in the network links to, according to their CFI. The targets circled in FIG. 10 (A through E) are those that are disproportionately linked to by the conservative-grassroots attentive cluster, according to their CFI.

In an embodiment, a method of identifying websites with high attention from an identified attentive cluster or author is provided. The method may include determining the websites frequently or preferentially cited by identified authors by examining the websites' cluster focus index (CFI) score. Further, the method may include automatically sending or placing advertisements, alerts, notifications, and the like to the websites. For example, a social network analysis may generate a network map with thousands of nodes clustered into attentive clusters. In an example with bloggers, influence data that results from the network analysis may be influence metrics for sites from across the Internet which bloggers link to, including mainstream media, niche media, Web 2.0, other bloggers, and the like. These are the influential sources (also called outlinks, or targets) used by specific groups of nodes across the map. For example, influencing a targeted cluster of bloggers can often be accomplished by targeting these sources, "upstream" in the information cycle, rather than going after the bloggers directly. In other embodiments, influence data may be metrics that reveal network influence among bloggers directly. Bloggers are usually thought of as simply being more influential or less, but this data lets the analyst discover which blogs are influential among which online clusters (segments), a far more granular and targeted approach. Each of these data sets can be sorted to examine either influence over the entire map or disproportionate influence over particular clusters (i.e., how to reach particular audiences). Cluster targeting can be further refined to identify which nodes in a specific cluster have influence on any of the other clusters on the map. Because the conversation within social media covers a wide variety of topics, source and network influence alone do not necessarily reflect influence on a specific topic. A relevance index metric for discussion regarding particular topics, events, and the like may be added to a social network analysis to identify which nodes are most focused on this topic.

For both data sets there are two main sorts metrics representing influence. First are metrics representing the influence of nodes in the one-mode network (set of source nodes S) as a whole, or directly among particular clusters or among specific other nodes. For example, for any given node in S, count (also called in-degree) is the number of other nodes in S that link to it. Count can be calculated across the whole map, or per cluster. Second, score can be calculated that shows the influence of target nodes (nodes in T or T') on clusters of nodes in S. Count can also be used, and CFI scores can be calculated that represent the influence of particular targets on specific attentive clusters. In other words, how specifically interesting or authoritative the target is for that cluster. Relevance index scores may for nodes may also be calculated using lists of semantic markers, to provide further metrics of value for targeting communications, advertising, and the like. Depending on the communications strategy, specific sorts of the data will create lists of likely high-value targets for further action. While count, CFI, and relevance index scores are all important, they can be combined in order to maximize certain objectives. The following use case examples include combining count and relevance into a targeting index, by multiplying their values. Other, more complicated maximization formulas are possible as well. The examples demonstrate specific influence sorts that can be generated from the Russian network data to address each use case. The network data is based on the linking patterns of the nodes in the RuNet map over a nine-month period ending in February 2010.

Use Case 1 and Use Case 2 involve finding influential sources. Use Case 1 involves identifying sources with the most influence over the entire map by doing a sort using the highest values of count. While extremely influential, and in many cases suitable for advertising campaigns, these universally salient sites also tend to be much harder to reach out to than sites that are smaller but specifically important to targeted segments.

Use Case 2 involves identifying sources that reach a targeted cluster by sorting on sources by Cluster Focus Index. CFIs may be sorted for any of the attentive clusters. Count metrics from the map as a whole and from the targeted cluster can be used to further prioritize for action. This sort is the equivalent of identifying traditional media trade press, the go-to sites for the selected segment. Frequently, these include specifically influential bloggers in addition to niche media and other sources.

Use Cases 3-6 involve finding influential nodes. Use Case 3 involves identifying the greatest network influence by sorting the nodes by indeg (total number of links from other nodes within the entire network). This sort specifically identifies the network's "A-list" nodes, the most influential network members (bloggers). Like prominent sources, these are often more difficult to reach than more targeted niche influentials, but they contribute greatly to spreading viral niche messages across the wider network.

Use Case 4 involves finding the most targeted influencers for a particular cluster by sorting the Cluster Focus Index scores for a targeted cluster to find nodes with cluster-specific influence. This identifies the nodes with particular influence, interest or prestige among the target cluster. These nodes tend to be much more "on topic" than others, and much easier to reach that map-wide A-list nodes. Cluster-specific influentials are not always from the target cluster itself, which can be very useful for trying to move discussion between particular clusters. Link metrics provide further assistance in deciding targeting priorities.

Use Case 5 involves following a particular topic at the map level by sorting using topic focus target scores, which combine links (network influence) and topic focus index (issue relevance). Formulas for calculating focus target scores can be varied, but the default may be to multiply links by topic focus index. This may allow identification of those nodes in the entire map that discuss the target issue most frequently. These may be monitored to gauge dominant threads of discussion and opinion about the issue, and targeted for outreach.

Use Case 6 involves targeting a particular cluster's conversation on a topic by sorting within a cluster by the topic focus target score. This may allow members of the target cluster who write about the target issue to be identified for monitoring or persuasion. Variations of the formula for combining influence and relevance metrics into a single targeting metric can be used to bias the sort toward relevance, or toward influence, depending on strategic objective.

In an embodiment, a proximity cluster map method may be used to visualize 124 attentive cluster-based data and generate a network map. In the method, attentive clusters and their constituent nodes may be displayed in a proximity cluster map. Nodes in the network map may be represented by individual dots, optionally represented by different colors, whose size is determined based on the number of other nodes on the map that link to them. A general force may act to move dots toward the circular border of the map, while a specific force pulls together every pair of nodes connected by a link. In static images or an interactive visualization via software connected to a database, nodes may receive a visual treatment to display additional data of interest. For example, dots representing nodes may be lit or highlighted to represent all nodes linking to a particular target, or using a particular word, with other nodes darkened. In another example dot size may be varied to indicate a selected node metric.

Figure 8:
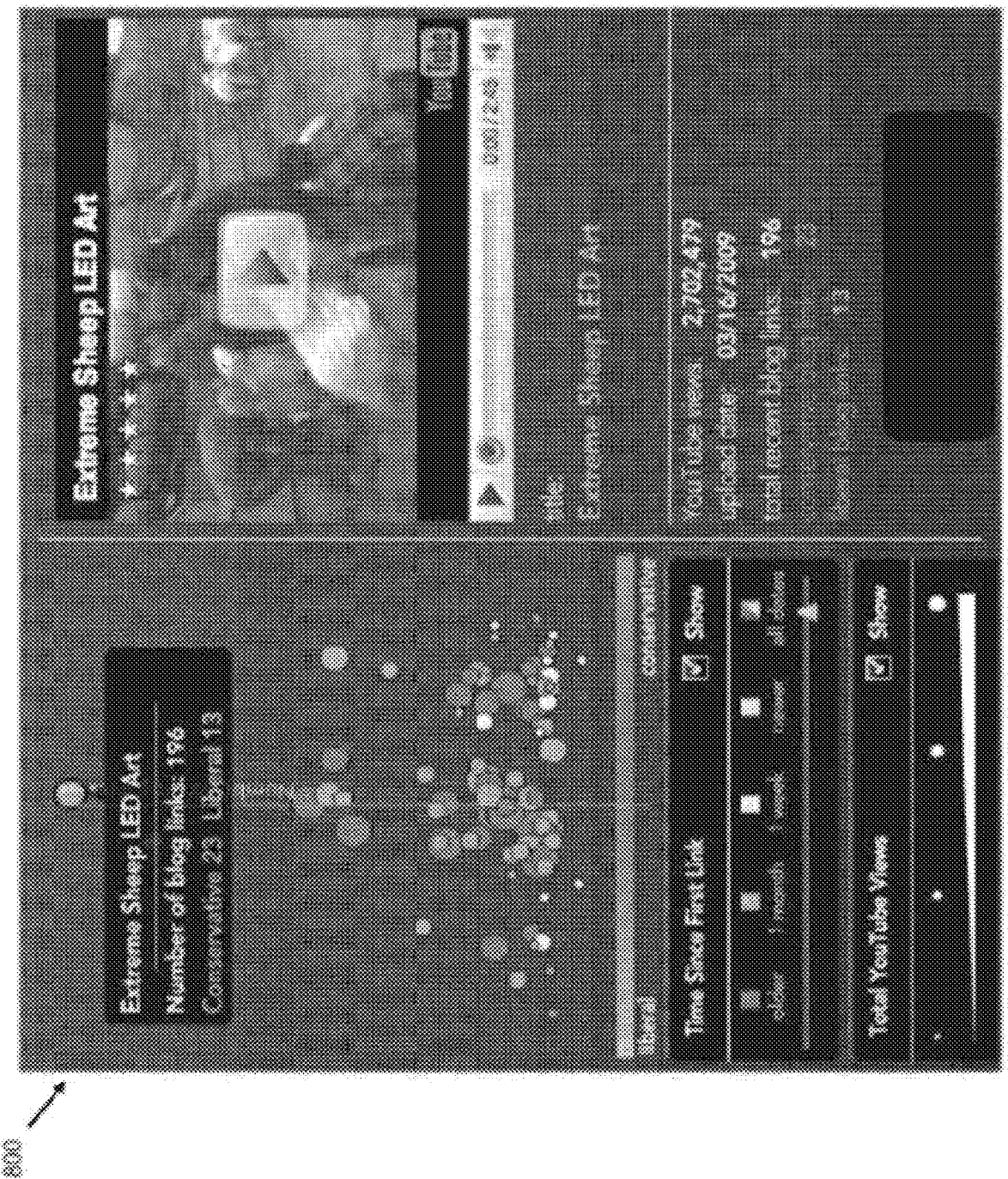
FIG. 8 depicts a Political Video Barometer valence graph.

In an embodiment, a valence graph method may be used to visualize 124 attentive cluster-based data and generate a valence graph. In the method, targets of attention or semantic elements occurring in the output of nodes may be displayed in a valence graph. The valence graph method may be understood via description of how a particular valence graph is built, such as a Political Video Barometer valence graph (FIG. 8) useful for discovering what videos liberal and conservative bloggers are writing about. This particular valence graph may be used to watch and track videos linked-to by bloggers who share a user's political opinions, view clips popular with the user's political "enemies," and the like.

The videos shown in the Barometer are chosen by queries against a large database built by network analysis engines performing network selection 102. Periodically, a crawler (or "spider") visits millions of blogs and collects their contents and links. Next, the system mines the links in these blogs to perform partitioning 104 and forms attentive clusters based on how the blogs link to one-another (primarily via their blog rolls), and, over time, what else the bloggers link to in common. Attentive clusters may be large or small, and the bigger ones can contain many sub-clusters and even sub-sub-clusters. In embodiments, determining what the blogs have in common may be done by examining meta-data, tags, language analysis, link target patterns, contextual understanding technology, or by human examination of the blogs or a subset thereof. In the example, American liberal bloggers and American conservative bloggers form the two largest sets of clusters in the English language blogosphere, and the Barometer draws upon roughly the 8,000 "most linked-to" blogs in each of these groups to position the videos on the graph by calculating proportions of links to each target by the two political cluster groupings.

The Barometer may be continually updated by scanning the blogs periodically, looking for new links to videos (or videos embedded right in the blogs). By counting these links, it can be determined what videos political bloggers are promoting. In embodiments, the link count may be displayed on the valence graph using an identifier such as icon or marker. In this example, some videos are linked to almost exclusively by liberal bloggers, some are linked to mostly by conservative bloggers, and a few are linked to more or less evenly by both groups. Once the system determines that a video has traction in the political clusters, it scans through data from other parts of the blogosphere to count how many "non-political" bloggers link to it as well.

The Political Video Barometer example illustrates one kind of valence graph and the insight that can be gained and the applications that can be built based on the method and the data obtained by the method. It should be understood that the method may be used to examine any sort of potentially cluster-able data, such as technology, celebrity gossip, the use of linguistic elements, the identification of new sub-clusters of particular interest, and the like. All aspects of the valence graph method, and the underlying attentive clustering analysis, may be customized along multiple variables to enable planning and monitoring campaigns of all kinds.

In an embodiment, a multi-cluster focus comparison method may enable comparing cluster focus index (CFI) scores of multiple attentive clusters. The CFI score may be a measure of the degree to which a particular outlink is of disproportionate interest to the attentive cluster being analyzed; in other words, the CFI indicates what link targets are of specific interest to a particular cluster beyond their general interest to the network as a whole. In an example, X may be the CFI score for cluster A and Y may be the CFI score for cluster B. The multi-cluster focus comparison method may compare the two clusters, A and B, based on their CFI scores, X and Y. This would allow a user to discern elements of common interest vs. divergent interest between the two clusters. Insights derived from this method would be of great value in creating and targeting advertising and communications campaigns.

Figure 11:
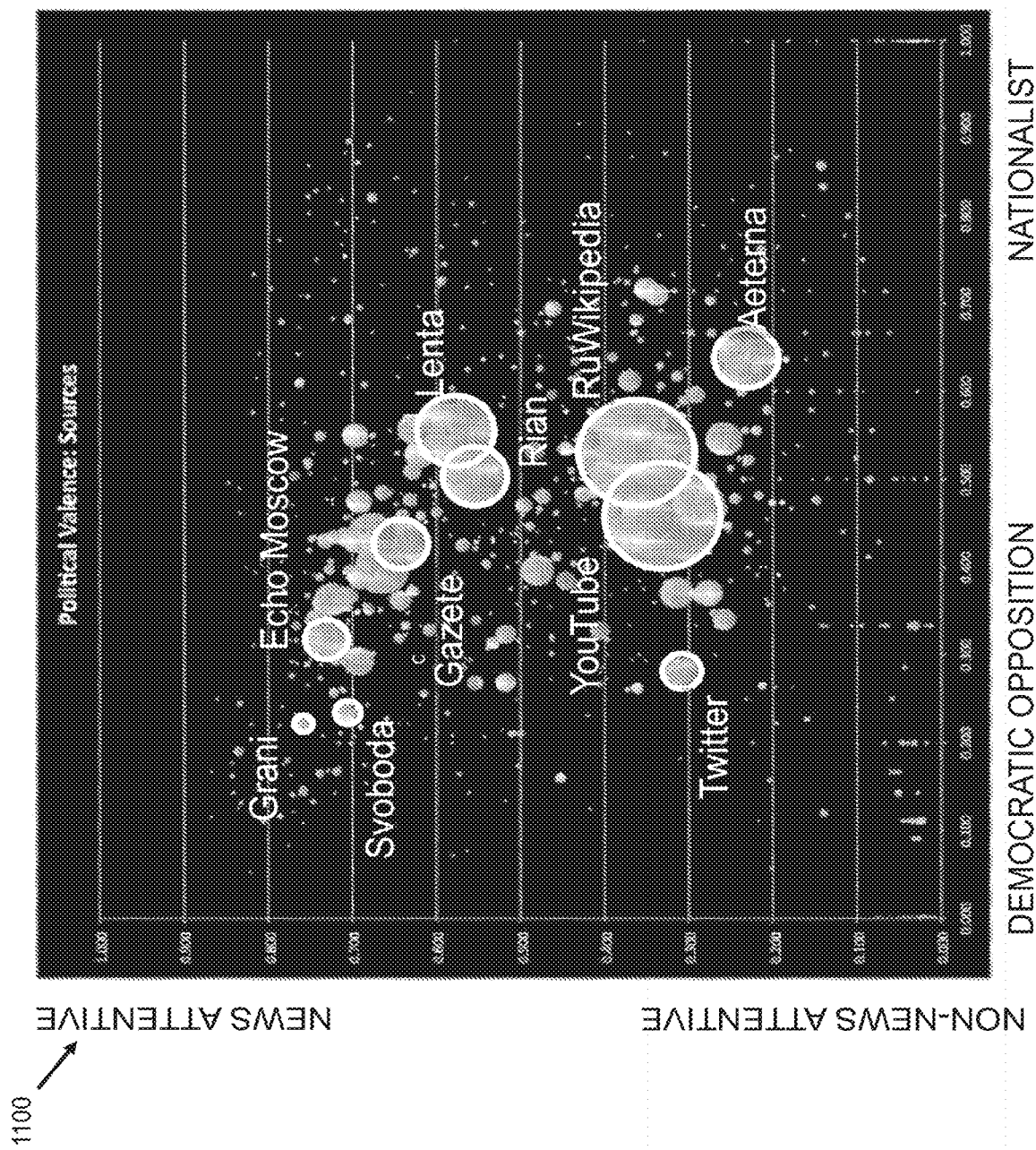
FIG. 11 depicts a bi-polar valence graph of link targets in the Russian blogosphere.
Figure 13:
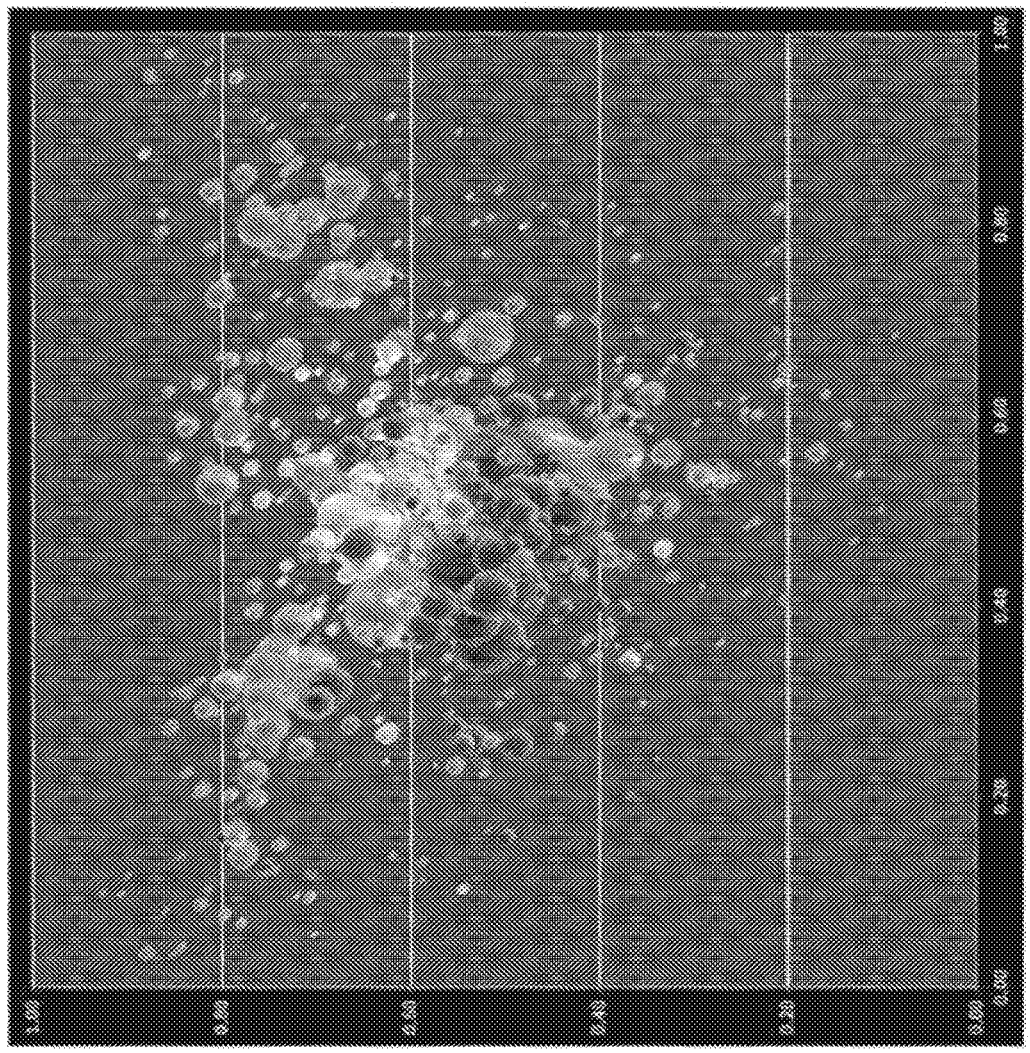
FIG. 13 depicts a valence graph of outlink targets organized by proportion of links from liberal vs. conservative bloggers.

In another embodiment, link targets, semantic events, and node-associated metadata may be scattered in an x-y coordinate space, and the dimensions of the graph may be custom-defined using sets of clusters grouped to represent substantive dimensions of interest for a particular analysis. Elements are plotted on X and Y according to the proportions of links from defined cluster groupings. For example, and referring to FIG. 11, using data from the Russian blogosphere, the top 2000 link targets for Russian bloggers may be plotted such that the proportion of links from "news-attentive" blog clusters vs. links from "non-news attentive" clusters determined the position on Y, while the proportion of links from the "Democratic Opposition" cluster vs. the "Nationalist" cluster determines the position on X, as shown in FIG. 11. In another example, popular outlink targets for the US blogosphere may be displayed with the X dimension representing the proportion Liberal vs. Conservative bloggers linking to them, and the proportion of political bloggers of any type vs. non-political bloggers represented by the Y dimension, as shown in FIG. 13. Various data may be visualized in the graph associated with the clusters of news-attentive and political bloggers, such as meta-data tags, words, links, tweets, words that occur within 10 words of a target word, and the like. These visualizations may be used in interactive software allowing user-driven exploration of the data graphed in valence space, optionally allowing user-defined sets of clusters to be used in calculating valence metrics.

In an embodiment, a method of node selection 110 based on node relevance to a defined issue, also known as semantic slicing, is provided. Semantic slicing may involve clustering according to a relevance bundle. A relevance bundle may include one or more of key markers, what the nodes may have linked to, what the nodes have posted, text elements, links, tags, and the like. In essence, semantic slicing involves pre-screened nodes for relevance based on semantic analysis.

The relevance bundles may be used to sort through all of the network data to select the top high relevance nodes. In an embodiment, a custom-mapping of a sub-set of the link economy may be done.

In an embodiment, semantic slicing may enable generating a contextualized report of interest to a user on an industry level. Semantic slicing may enable focusing attentive clustering on selected vertical markets. The vertical markets may be a group of similar businesses and customers who may engage in trade based on specific and specialized needs. Lists of semantic markers, such as key words and phrases, links to relevant websites and online content, and relevant metadata tags, are built which represent the relevant vertical market. Relevance metrics are calculated for candidate nodes, and a selection of high-relevance nodes are mapped and clustered. Continuing the example, the semantic slice may be done to analyze an energy policy vertical market by focusing the attentive clustering around one or more selected, highly relevant nodes. Thus, the attentive clusters may be more specific to identified domain interest of interest or vertical market. In this example, instead of just forming an attentive cluster of Conservative bloggers, by focusing attentive clustering on one or more key markers related to energy policy, the attentive clusters discovered include topic-relevant segmentations of particular kinds of Conservative bloggers discussing the issue, such as Conservative-Grassroots and Conservative-Beltway. Additional high-relevance attentive clusters may be identified, such as Climate Skeptics, Middle East policy, and the like. Cluster focus index scores may be used to determine what sites everyone in each cluster links to and which sites are preferred by the cluster. In an embodiment, semantic slicing may be done using a single node, such as a particular website, a particular piece of content, and the like. In an embodiment, semantic slicing may be done over a period of time to enable monitoring the impact of a campaign.

In an embodiment, a tool, such as software-as-a-service, for enabling users to define one or more semantic bundles for attentive clustering and as the basis of report outputs is provided. The tool may be an on-demand tool that may be used for semantic slicing. In such models, a user may declare a semantic bundle of nodes and/or links prior to attentive clustering.

In an embodiment, the system may provide an application programming interface (API) for delivering a segmentation to track one or more particular clusters of attention, or track how an audience is interacting with a piece of content, and the like. The data about the various clusters may be collected directly from the API. For example, a user may wish to track a cluster. The user may enter keywords related to the cluster in a search option provided by the API. Thereafter, the tool may track various websites and report back the weblinks and data that may be relevant to the cluster. The API may be used to interact with a valence graph at various resolutions. The API may provide segmentation data and metadata derived from the segmentation to other analytics and web data tracking firms, for use in their own client-facing tools and products. The segmentation and resultant data from attentive clustering provide an additional dimension of high value against which third-party tools and other analytic capabilities such as automated sentiment monitoring may be leveraged.

In an embodiment, the system may enable real-time selection of elements to visualize based on attentive clustering of social media. The system may facilitate selection of a stream of information based on looking at the environment, zooming in on a data element based on clustering, determining a valid emergent segmentation, and monitoring the flow of events in real time. The events may include media objects, text, key words/language, and the like. For example, the real-time selection of elements may facilitate an analysis of trends/events especially for financial purposes.

In an embodiment, a search engine may be provided that prioritizes search results being displayed to a user based on a determination of real-time attention including attention from a particular cluster or set of clusters. A user may be able to customize the prioritization of search results, such as by getting real-time attention from a particular cluster, from a particular sub-cluster, and the like.

In an embodiment, a search engine is provided that searches within only those sites/accounts with high cluster focus for a chosen segment. For example, a GOOGLE™ search may be restricted to the 30 websites with the highest CFI scores for the Dirt Bike racing cluster of OAKLEY's TWITTER™ followers map. Thus, the search may only return results from a list of key influential sites related to the chosen segment. In other embodiments, the search may be restricted to websites (or domains within them) with a particular CFI score, websites (or domains) that meet a threshold CFI score, websites that fall into a range of CFI scores for a chosen segment, websites with a particular M score, and the like. In an embodiment, the search query may restrict the search to particular websites that are identified based on the CFI scores. In an embodiment, the search query may be restricted by the CFI score of a website and the CFI score restriction may be indicated in the settings of the search engine. In other embodiments, the CFI score for sites to search may be indicated in the search string itself. For example, a user may indicate a particular search they want to perform and they may be provided with a slider bar where the user indicates that the search should be restricted to those websites with a CFI score falling into the range selected on the slider bar. The slider may be provided with a normalized scale, such as ascribing 1 to low CFI scores and 10 to high CFI scores, such as using a linear, logarithmic, or other scaling process. The system may then search a database of websites for the range of CFI scores to identify one or more websites to which to limit the search. These websites are then included in a search string that is provided to a search engine.

Similarly, the search can be restricted to only specific content, or specific content may be promoted to high ranking within a search, leaving other content to the lower ranked results. One way to do this restriction is to utilize the valence mapping functionality of the system. As described herein, a valence graph may be constructed for a chosen segment that depicts words, phrases, links, objects, and the like that are preferred by one cluster over another cluster. Content indicated in the valence graph may be indexed by the system and only that content in the valence graph may be searched by a search engine. Further restriction of the content may be employed, such as by website, CFI score, and the like.

In an embodiment, attentive clustering and related analyses may result in identifying issues, attitudes and messaging language that may be specific to discourse for a target market, and may be suitable for presentation in a report. For example, in a clustering of bloggers sympathetic to Arts in Schools, by examining intra-cluster linking patterns, it may be determined that most of the bloggers within each cluster tend to keep the discussion within their cluster except for the bloggers in the "Interesting/teachers/educators" cluster who have a tendency to spread conversation to each of the other clusters. This behavior points to an opportunity to work with these bloggers to spread messages across the space. In continuing with the example, by examining clustering related to specific keywords, websites, outlinks, objects, and the like, it may be determined that there is a broader discussion about education and education reform than about arts and arts education. Therefore, a conclusion may be that introducing an arts education message to education discussions has more potential than introducing arts education messages to arts discussions. In the report, various valence graphs may be presented, such as cluster specific term valence maps, maps of sources, outlink maps, term specific maps, issue maps, and the like. Alternatively, the report may be presented as a spreadsheet of data.

In an embodiment of the present disclosure, the report may feed into a method of generating a campaign blueprint for both social and upstream media sources and a method of identifying influence inter-cluster and intra-cluster in order to plan a campaign. The blueprint may include target audience, demographic details, objectives of the campaign, flow of the campaign, messaging to use in the campaign, outlinks to target, and the like. Systems and methods for measuring the success of a campaign in various online segments and generating targeted data sets identifying sub-clusters specific to a user's identity or objective are provided.

In an exemplary embodiment, the campaign tracker may track data from a variety of sources to provide closed-loop return on investment (ROI) analysis. The tool may parse the information of each website accessed by the users, keywords entered, any information about the campaign, and the like. Further, the tool may track how people react to the campaigns and which ones are most successful. The campaign tracker may track and analyze results in real-time to determine the effectiveness of the campaigns.

In addition, the tool may enable the system to generate reports for clients. The reports may include details about the campaigns such as campaign type, number of people who have viewed the campaign, any feedback from the people, and the like.

In an embodiment, analyst coding tools (ACT) and a survey integrator may support distributed metadata collection for qualitative analysis to best interpret quantitative findings. The tools may include an interactive visual interface for navigating complex data sets and harvesting content. This interface may contain an interactive proximity cluster map which can display specific node data, metadata, search results, and the like. This proximity cluster map interface may enable the user to click on nodes to see node-specific metadata and to open the node URL in a browser window or external browser. Using the tools, a user can add metadata and view metadata about any given blogger on a map. The tools enable grabbing whole sets of blogs or items to add to semantic lists, and may enable a user to define surveys so a team of human coders can open the website and fill out surveys.

In an embodiment of the present disclosure, a dashboard may be provided. The dashboard may combine advanced network and text analysis, real-time updates, team-based data collection and management, and the like. In the embodiment, the dashboard may also include flexible tools and interfaces for both "big picture" views and minute-by-minute updates on messages as they move through networks. Using the dashboard, a user may define bundles and track them in the aggregate through networks over time. Using the dashboard, a user may be able to see how specific media objects are doing with a particular cluster over time.

Figure 12:
FIG. 12 depicts an interactive burstmap interface.

In an embodiment, the dashboard may provide a burstmap feature in which the history of selected events or sets of events over a timeframe may be displayed using a proximity cluster map. During playback, nodes in the map will light up at a time corresponding to their participation in the selected event or events. For example, at a time in playback representing a certain date, every node which linked to a particular YOUTUBE™ video will light up, allowing the user to see the pattern of linking as it unfolded over time. Optionally, this burstmap feature may include a timeline view displaying event-related metrics over time, such as the number of nodes linking to a particular video. Optionally, the burstmap feature may include lists of events available for display. An example of a burstmap interface is found in FIG. 12.

In an embodiment, techniques disclosed herein may be used to generate social media maps that visualize social media relationship data and enable utilization of a suite of metrics on the data. Social media maps may be constructed via clustering of various social media communities including TWITTER™, FACEBOOK™, blogs, online social media, and others. In one embodiment, the clustering technique used may be manual, relationship-based, attentive clustering such as previously disclosed herein, network segmentation, or another analogous technique. The social media maps may be organized in portfolios that are targeted to market segments or relate to an issue/topic campaign. Social media maps may be offered via an API or as raw data to plug into a third party dashboard. Services related to the social media maps that may be offered include robust tools for searching, comparing and generating integrated reports across multiple maps, searchable indexing and map browsing. Pricing for social media maps may be via subscription, for one or more maps, a portfolio of maps, the whole portfolio of maps, the whole portfolio maps save some exclusive/custom items, or the like. Systems and methods for how to generate, utilize, update and offer social media maps will be further described herein.

A comprehensive catalog of social media maps and network segmentations may be offered and updated on a regular basis. The catalog may include targeted portfolios for key markets, such as consumer goods, media and entertainment, politics and public policy, energy, science and technology, government, and more. The catalog may contain maps for each layer of the social media system, such as blogs, Twitter™, social network services, forums, and the like. It may contain maps for all major languages, countries and regions of the world. Social media map data may be used within partner dashboard systems, so that a range of commercial tools can be leveraged by subscribers and so that the social media map data are "portable" across various tools. In addition, a suite of reporting tools may be used in conjunction with the social media maps.

Figure 14:
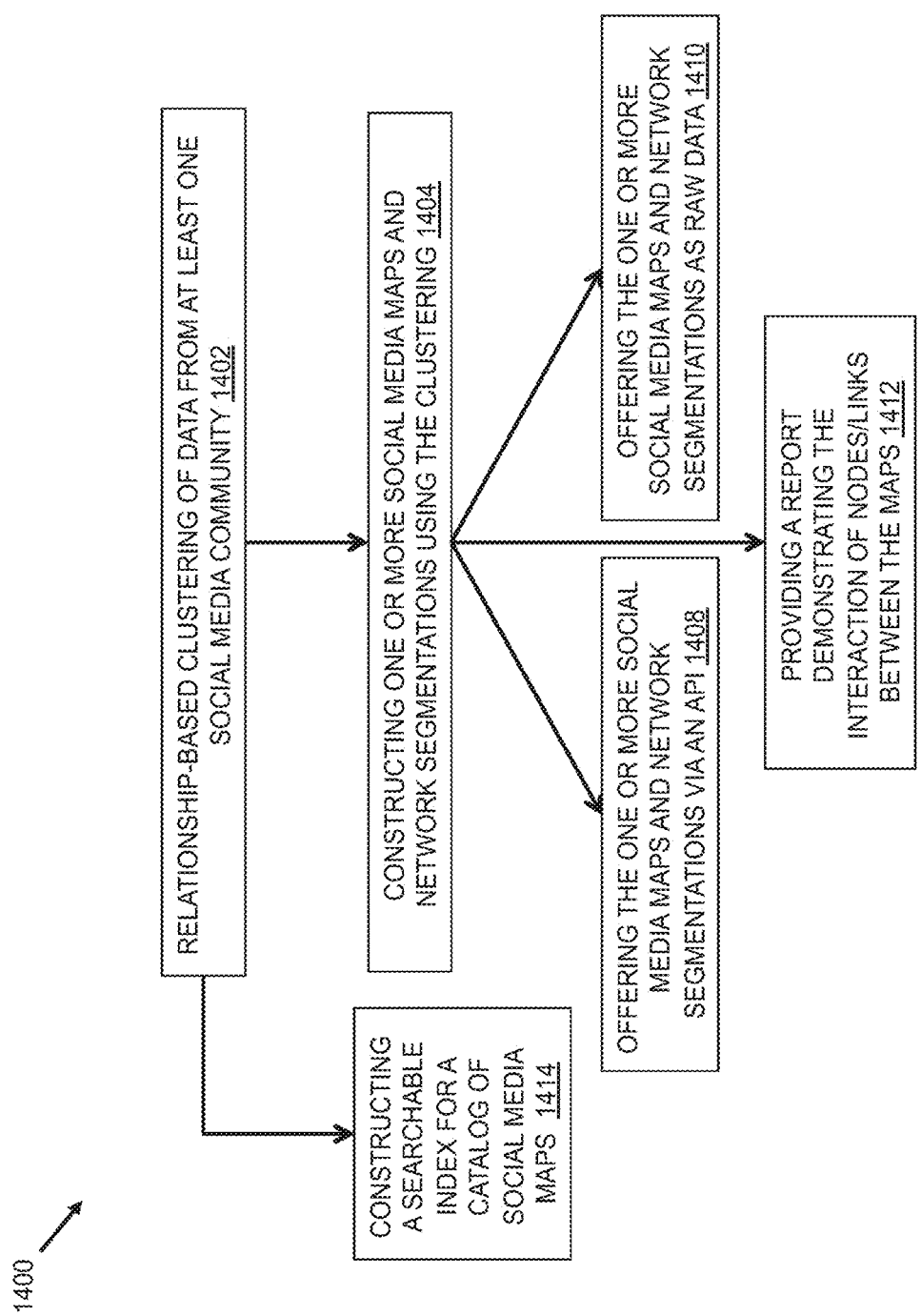
FIG. 14 depicts a flow diagram relating to social media maps.

In an embodiment, one or more social media maps and network segmentations may be constructed via clustering of data from at least one social media community. The social media map or network segmentation may be offered via an API or as raw data. The social media community may be based on at least one of a social media layer, a language, a country, a region, or the like. In some embodiments, the clustering technique may be attentive clustering, as described previously herein, relationship-based, manual, network segmentation, or the like. Referring now to FIG. 14, relationship-based clustering of data from at least one social media community 1402 is used to construct one or more social media maps and network segmentations using the clustering 1404. One or more social media maps and network segmentations may be offered via an API 1408 or as raw data 1410. A report may demonstrate the interaction of nodes/links between the maps 1412.

In embodiments, the maps may be generated by an autonomous process. The autonomous process may create maps based on one or more criteria, a scope definition, an instruction, or the like. For example, a social graph may be generated based on followers of an individual or entity in a social network. In another example, the map criteria may be semantically based, such as based on key words or hashtags. In yet another example, the maps may be geo-based, such as based on which users/nodes are in a territory. In still another example, the maps may be based on previous mappings. In this example, segments in other maps on health and fitness may be used to triangulate or iterate to a mapping of a new category. In another example, the map may be based on an arbitrary set of accounts generated by a third party. One scenario might be a mapping of the social network accounts for all the users of a mobile application. In still another example, the maps may be based on a nomination of individuals based on some criteria, such as demographics. Once generated, the maps may be stored and indexed.

In embodiments, maps may be based on CFI scores for dynamic data (e.g., YOUTUBE™ videos). However, the amount of data may be increased to obtain a better indication of what the segment is communicating about whether data can be obtained on the influencers of a segment, which may be coming from off the map. In addition to looking at data coming from the segment, the system may be able to access data from social media accounts that have high CFI for that segment (not just the ones that are "in" the segment). Thus, calculating cluster focus for the dynamic data may be improved. CFI scores may be calculated for a first segment. Then, CFI scores may be calculated for those influencers on the first segment. For example, the first segment may be followers of a particular art gallery but the system can also examine the CFI for the first segment's influencers, which may be several well-known Art Gallery aficionados who may or may not be followers of the particular art gallery. In embodiments, certain maps may be based only on the CFI scores calculated for the influencers.

A searchable index for a catalog of social media maps may be constructed 1414. Further, social media maps in the catalog may be searchable. For example, the maps may be searchable by a keyword, a URL, a semantic marker, and the like. In embodiments, the social media maps may be indexed by one or more of a keyword, URL or semantic marker so as to form a searchable index of social media maps. In embodiments, the searchable index may include metrics to indicate a statistic regarding the social media maps. For example, the statistic may represent a dimension of popularity, relevance, semantic density, or similar feature. For example, a search engine may be enabled to return maps in terms of relevance by using certain statistics in the searchable index.

For example, a semantic marker may include a keyword, a phrase, a URL (node or object level), a tag (such as those from bookmarking and annotation services, meta keywords extracted from HTML, tags assigned by coders, etc.), and the like. Semantic markers may also include those used in particular social network environments, such as TWITTER™, and may include follows relationships, mentions, retweets, replies, hashtags, URL targets, and the like. Any of these semantic markers may be used to index a social media map.

Based on at least one of the search terms or the search results, a new social media map subscription may be suggested. For example, if a user searches a social media map index for the terms "Nissan LEAF™," "electric vehicle," and leafstations.com, subscriptions to social media maps such as automobiles, eco-friendly products, and California trends may be suggested.

In an embodiment, a dashboard may be used for browsing, visualizing, manipulating, and calculating metrics for one or more social media maps constructed via clustering of data from at least one social media community. Clustering techniques may include relationship-based, manual, attentive clustering, or the like. In some embodiments, the dashboard may be a third party dashboard that supports visualization of data from clustering, wherein the data may be delivered by a raw data feed, an API plug-in, or any other data delivery method. In embodiments, the data from clustering may be joined with or otherwise integrated with data from other data sources to form a new data set. The new data set may be similarly browsed, visualized, manipulated, and processed by dashboards.

In an embodiment, APIs, dashboards, and partner tools may be used with social media maps for planning/assessment. For example, social media maps may be used for enterprise resource planning, business insight, marketing, search engine optimization, intelligence, politics, industry verticals, financial industry, and the like. For example, an entertainment promotion company may own a plurality of social media accounts. If they could navigate sector-level mappings related to genres of music, they could use the maps to target music genre-specific messages using the most appropriate of those accounts for maximum effectiveness.

In embodiments, custom maps may be derived from mashing up sets of social media maps.

In an embodiment, the social media maps may be constructed via clustering (e.g., relationship-based, manual, attentive, etc.) of data from at least one social media community targeted to a specific market segment. For example, the market segments may include government intelligence, public diplomacy, social media landscapes in other countries, pharmaceuticals, medical, health care, sports, parenting, consumer products, energy, and the like. In these embodiments, the market segment may be used to index the social media maps.

In an embodiment, a reporting product may leverage social media maps to demonstrate the interaction of nodes and/or links between social media maps. For example, a multi-map report may be generated comparing the nodes and links in different social media communities in a particular market/environment. The reporting product may be integrated with a dashboard or analytics platform. Multi-map reports generated by the reporting product may be used to demonstrate various phenomena, such as how particular items can be found in particular social media layers. For example, a multi-map report may demonstrate how weblog hosts are having customers driven to them from TWITTER™. In another example, a multi-map report may demonstrate how FACEBOOK™ pages are getting attention from a segment of TWITTER™.

In an embodiment, information derived from the social media maps, including portions of or the entire map itself, may be published or displayed as a map widget, which may enable monitoring an ongoing stream of information from one or more clusters or one or more maps. Information being displayed that is derived from the social media map may be customizable within the widget, such as via a dialog box, menu item, or the like. A user may be able to, optionally in real time through a user interface, select a stream of information based on looking at the environment, zoom in based on clustering, figure out a valid emergent segmentation, and then set up monitors to watch the flow of events, such as media objects, text, key words/language, and the like, in real time. The published, widgetized map acts as a sensor network to obtain a host of behavioral data and leads that can be leveraged by the map's user or hosts. In embodiments, users may interact with other users' map widgets to discover content and individuals/entities. Using other users' map widgets, users may grow their own networks by engaging with the content and people/entities in the widget, such as to start following a person or to retweet an item.

There are at least three processes that yield attributes of nodes, including calculating a relevance score, performing a CFI bias weighting, and identifying nodes as "allowed" or "not allowed" (e.g., blacklist/whitelist). Automated social media map refresh may leverage one or more of these processes.

Figure 15:
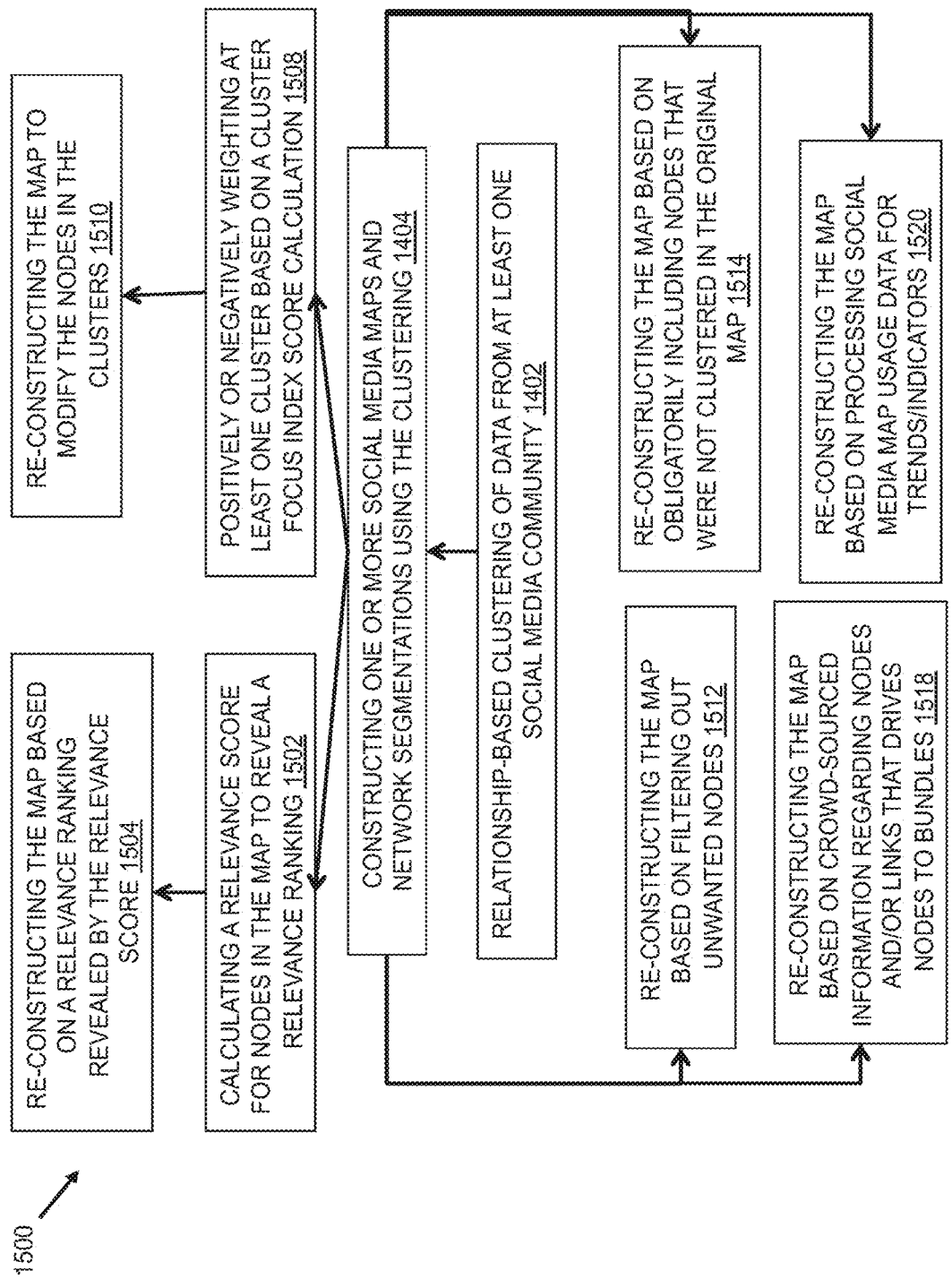
FIG. 15 depicts a flow diagram relating to refreshing social media maps.

In an embodiment and referring to FIG. 15, a social media map may be automatically refreshed via calculating a relevance score for nodes or bundles in the map 1502 and re-constructing the map based on a relevance ranking revealed by the relevance score 1504. Semantic/relevance marker bundles may include lists of semantic markers like key words, phrases, relevant link targets, accounts that are followed on TWITTER™, and the like. Semantic markers may be manually curated. In an embodiment, the refresh process may involve performing the relevance search/semantic slice that generated the original map for new relevance/semantic markers. A relevance calculation may be performed on the nodes to calculate a relevance score.

In another embodiment, a social media map may be automatically refreshed via positively or negatively weighting at least one cluster based on a CFI score calculation 1508 and re-constructing the map to modify the nodes in the clusters 1510. Modifying the nodes may be done to include positively weighted nodes and exclude negatively weighted nodes. CFI scores for clusters may be leveraged to evolve a map in a certain direction. Clusters in the map that include preferred/wanted nodes/links are positively weighted. Clusters are negatively weighted in they are deemed to not be relevant. Applying weightings to the map may enable pulling in additional nodes that are more relevant. Weighting map clusters for the CFI bias operation may be done by humans.

In an embodiment, a social media map may be automatically refreshed via filtering out unwanted nodes 1512. In an embodiment, a social media map may be automatically refreshed via obligatorily including nodes that were not clustered in the original map 1514. Semantic markers that are known to not fit based on their relevance ranking or for some other reason are not allowed are filtered out. In embodiments, nodes may be forced into the map whether or not they were identified in the relevance search/semantic slice. Curating black lists of nodes may be done by humans.

In an embodiment, a social media map may be automatically refreshed via crowd-sourced information regarding nodes and/or links that drive nodes to bundles 1518. In an embodiment, a social media map may be automatically refreshed via processing social media map usage data for trends/indicators 1520. Usage data may relate to one or more of what is ignored, what is further explored, what is used, how clusters are grouped, what name/label is assigned to a cluster, what color is used for a cluster, what order/position the cluster is placed in a report, and the like. Nodes preferentially interacted with may be weighted more heavily.

In embodiments, community feedback may influence each of the three streams of automated map refresh described herein. Community feedback provides an indication of news, events, information, etc. that may drive addition of nodes to the bundles, such as for example, if a new website is a target link. This sort of feedback may provide feedback or guidance as to the CFI bias operation. For example, if feedback suggests that a cluster is relevant, then that cluster may be positively weighted.

Feedback and updating may be based on how people are using the maps, such as, understanding what they ignore, what they drill down on, what they use, how they want to group things, what name/label they assign a cluster, what color they use for a cluster, what clusters are most important to a client based on an order/position the client places it in a report, and the like. Refreshing the maps may leverage this captured information.

In an embodiment, feedback may be received passively from clickable/interactive maps via a built-in feedback system. This feedback system may be used as a naive weighting system. In an embodiment, the map may include a flag available to provide commentary or feedback.

In an example, a map may include raw clusters and human-made groupings and the attachment of other sort of metadata such as the coloring of a cluster. The example may be that of the Russian blogosphere, which may contain 40 clusters and 7-8 groups, including 5 right wing Russian nationalist groups and a liberal opposition group. Clusters may be processed by human-assigned re-aggregation, and metrics may be run against them to progressively refine the clusters. Different clients, even on a base map, may want to group things differently, name a cluster in an interface differently, color a cluster in an interface differently, and the like. Users need to be able to define groups, re-label clusters, select clusters and the like. Community feedback may provide observations as to how users are grouping the same map and that yields data about which clusters are related to each other that is "crowd-sourced" to the user. Users may define the order in which the data are presented in the reporting. For example, a user may want to place data on preferred clusters higher in a chart. Cluster ordering and positioning information is customizable, which can be harvested as an importance weighting by the community.

In another example, map users may contribute to map metadata to generate a community data set established and/or expanded by users. For example, users could input the gender of a Tweeter/blogger. The user community itself may be a segmentable population. The user community can contribute to scoping a map for a particular topic. For example, something about a disease might appear in various places: Consumer segments, Politics, Medical/science, Sports, and the like. User feedback may also help scope the size of the map. For example, a user may ask: Should the map be constructed on the first 5,000 targets or should 20,000 targets be used? In an embodiment, user-contributed data may be used to provide metadata for a social media map constructed via clustering (e.g., relationship-based, manual, attentive, or the like) of data from at least one social media community.

Figure 16:
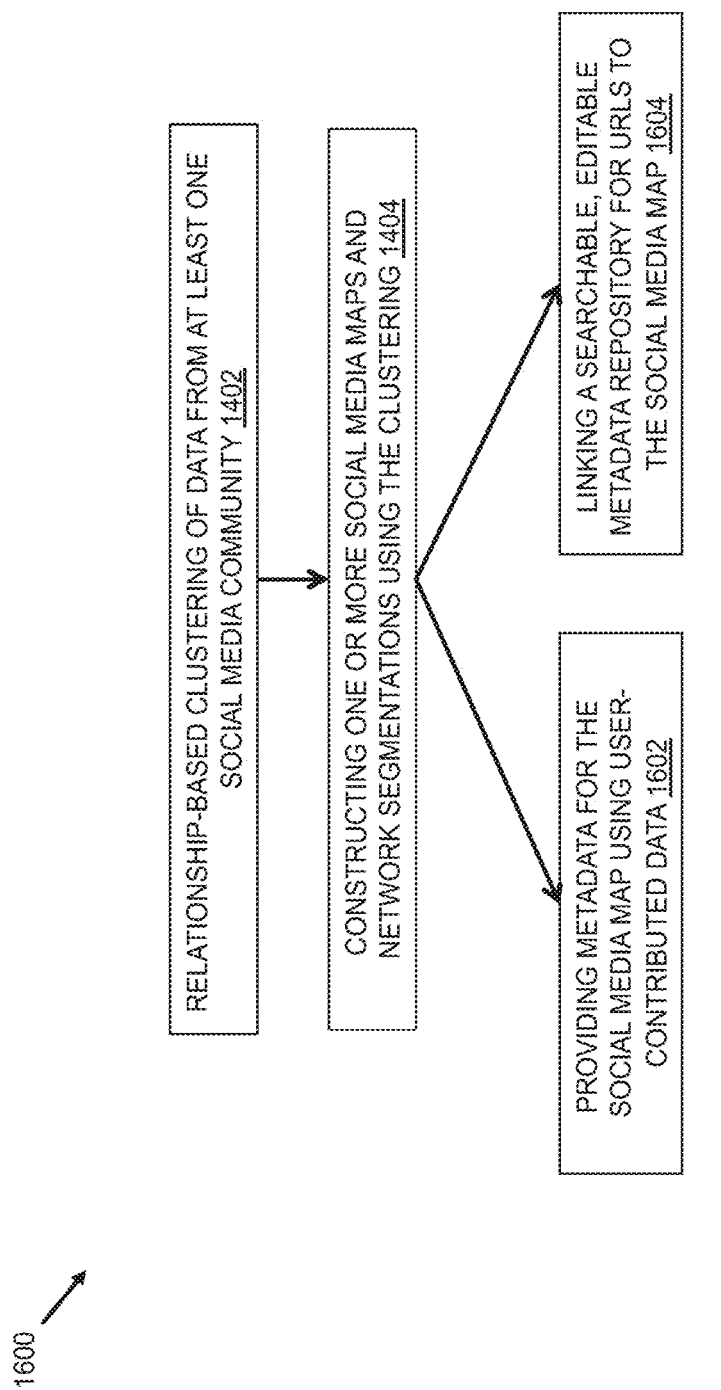
FIG. 16 depicts a flow diagram relating to social media maps.

In an embodiment and referring to FIG. 16, data, including user-contributed data, may form a searchable, editable metadata and basic information repository for URLs 1602, such as to form a URLipedia. The repository may be linked to one or more social media maps 1604.

Figure 17:
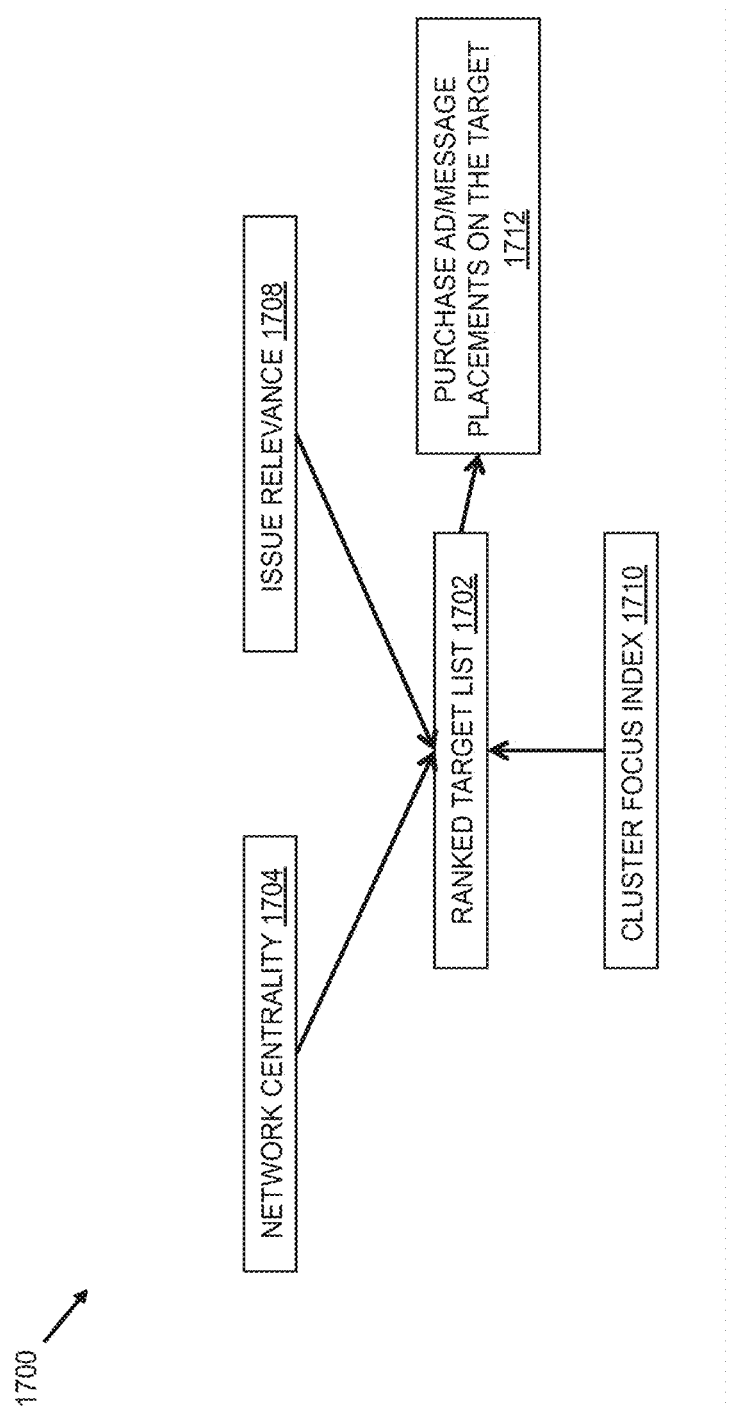
FIG. 17 depicts formation of a ranked target list.

In an embodiment and referring to FIG. 17, clustering (e.g., relationship-based, manual, attentive, or the like) of data from at least one social media community may be used to generate an actionable targeting list. Targeting lists combine network centrality 1704, issue relevance 1708 and CFI for a cluster 1710 into a ranked target list 1702 that may be used by marketers or other interested parties in order to reach certain nodes in some meaningful order for targeting for strategic communication or other business purpose. The formula of combination may be adjusted to maximize ranking to suit client/user objectives. In an embodiment, network centrality may be a universal score related to how central a node is in the network. For example, daytime talk show hosts may have a network centrality of 100 in the general population, while economists may be a zero. In an embodiment, a Cluster Focus Index score may be calculated for each cluster. For example, daytime talk show hosts may be a zero CFI for economics, but economists are 100. In an embodiment, an issue relevance score may be calculated for each cluster. For example, the issue relevance related to the budget deficit may be calculated based on a publication frequency score (e.g., #of tweets). Other score techniques may be used to calculate an issue relevance.

In an embodiment, users may be able to purchase ads or message placements on a target from the targeting list 1712. From the targeting list, users may be enabled to buy an ad placement or message placement on the target site at the click of a button. In an embodiment, the effect, or impact, of the ad/message placements may be tracked for the node and across a social media map. Thus, the system may enable users to identify targets according to a ranked list based on network centrality, CFI, and issue relevance, and then place and track ads/messages on the targets from the lists. In another embodiment, targeting lists may be used in connection with any ad network for ad/message placement. Tracking ads/messages may involve receiving feedback on actions taken with respect to the ads/messages, calculating impact metrics, and the like.

In an embodiment, a historical data browser may provide a mechanism for visualizing archived, historical social media map data, such as for research or historical purposes. For example, there may be value to academia of accumulating old social media maps and showing the delta between them, such as to explore how the market has evolved over some period of time. Historical social media map data may also be useful for financial industry forensics and intelligence analysis.

In an embodiment, CFI metrics may be displayed on a social media map. A CFI metric for items in clusters indicates how much attention there is to that item for that cluster. An attention score indicates the relative attention to an item as compared to other items for a cluster for a range of time or for a "point" in time. A higher attention score means the item is more specific to the cluster. Attention scores are non-linear in the sense that anything below two is not significant and greater than two, it is exponentially significant.

CFI scores may be a metric for measuring search engine optimization and/or advertising effectiveness because it represents cluster specificity. CFI metrics would have to be combined with a more global metric to enable companies to shift from thinking at the execution/implementation layer (e.g., where do I advertise?) to the strategic layer (e.g., where are we going with this community?).

In an embodiment, a CFI Graph may include CFI scores for sources and nodes on the map. In the upper right of the map are clusters with high focus on the particular cluster, high overall level of attention, and many in-links. On the CFI graph, users can see various items at a glance. For example, users may find the key players related to a topic or the landscape of players to determine who has influence.

In an embodiment, a CFI graph may include a Cluster Map Properties Editor/User Interface. The interface enables users to label clusters, assign clusters to a group, and perform group metrics.

Maps may be generated based on semantic elements, bundles, white lists, black lists, and the like in an automated fashion in come embodiments but labeling the clusters in an automated way, such as when a map update is made, may be difficult. Draft labels may be assigned when the cluster is created or updated based on a previous storehouse of knowledge. A confidence score as to that labeling may be generated. To automate the labeling, members of a cluster may be compared with membership of clusters of past maps and if a high percentage are the same then it is assumed the clusters relate to the same thing and are labeled similarly. In another embodiment, automated labeling is based on a structural equivalence. Labeling a node or an object that has well defined properties may be easier than labeling a cluster, which is a collection of objects. Structural equivalence involves examining the node's outlinks. For example, if people are friends with the same people, then they may have similar interests. In another example, blogs that link to the same sets of things are likely to be similar. In yet another example, if there are two people who have superior relationships to twenty soldiers, chances are that the two people are sergeants or some other form of commander. While this may work at the node level, it is harder to do at the cluster level. CFI scores, which are already generated for clusters, may be used in the generation of labels. For example, for two clusters with numerous links from nodes in these clusters to other nodes, it is difficult to compare the clusters at face value. One might just be larger, more popular, or have more links. However, CFI scores enables a comparison between two items or sets of items that a cluster may be disproportionately paying attention to. For example, Cluster 1 is very interested in horses and baseball, while Cluster 2 is very interested in horses and basketball. Given the CFI scores, vector cosine similarity can be used to determine the relationship between the two clusters. For each cluster, vectors can be built based on the CFI scores calculated for each of the clusters for the same items (e.g., Cluster 1=CFI 1 (1), CFI1 (2) . . . etc.; Cluster 2=CFI2 (1), CFI2 (2) . . . , etc.). The vectors may be plotted in a 3D vector space. The cosine of the angle between the two vectors may be one indication of the relationship between the two clusters. If the cosine is small, the confidence is high. As maps are updated with new content, clusters in the new map can be compared to clusters of old maps. When there is a match, that is, a small angle between two cluster vectors, the label from the cluster in the old map is assigned to the cluster in the new map. In embodiments, the cosine of the angle may also act as a similarity score. There are a number of measures for vector distance, including correlation distance, cosine similarity, Euclidian distance, and the like.

In embodiments, to limit the number of CFI's to include in vector generation the CFI's may be filtered to include only a CFI of two or more on a particular cluster. This effectively reduces the dimensionality of the space.

In other embodiments, items that are similar may be aggregated in labeling. For example, using outlink bundles rather than an individual CFI score may enable grouping items into target clusters and examining the density of links to the target cluster.

In an embodiment, an advertising campaign planning tool can enable running a campaign on blogs, and tracking success in other layers (e.g., TWITTER™; FACEBOOK™; segment-specific online forums).

In an embodiment, URL shorteners included in social media content may be tracked. The system may provide reporting outputs that track the success of a social media campaign including a URL shortener in different layers of the social media system. The system may not only be used to plan the campaign, but may also be used to report on the TWITTER™ bounce from blog activity or the FACEBOOK™ bounce from blog activity, for example.

In an embodiment, the system may enable campaign planning (e.g., domestic, international, multi-platform, multi-network, etc.) where language is not a required first limitation. For example, the system may enable campaign planning in marketing, such as, for consumer goods, media and entertainment, movie marketing, video games, social games, music, international product launches, talent agencies, public diplomacy, public health, political campaigns, and the like. Campaigns may be tracked, such as with a chronotope analysis, as will be further described herein, to determine a pattern that exists in time and space determined by combining temporal and network features in the analysis of the segments/clusters.

In an embodiment, the system may marry internal reporting with other reporting tools such as splash, resonance, clicks, transactions, and the like.

In an embodiment, the system enables analysis and prediction, such as in the financial industry (e.g., market predictions and trading positions), social media firms whose value is built around prediction, and the like.

In embodiments, third party data and clusters may be used with the mapping techniques described herein.

In embodiments, models may be built on one or more clusters using tools that can be accessed across clusters.

Figure 23:
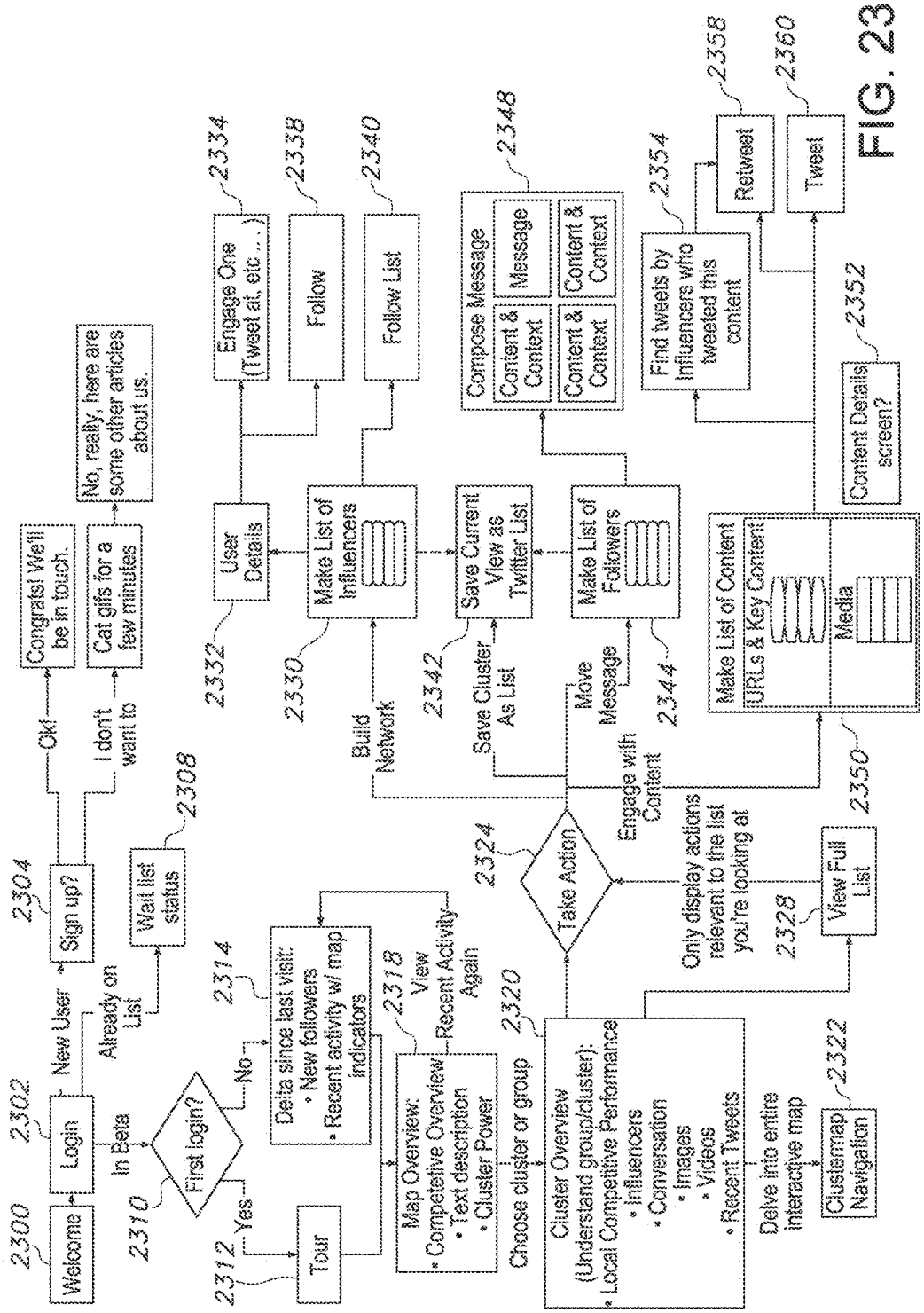
FIG. 23 depicts a social media map platform user flow.

In some embodiments, a social media map and network segmentation may be constructed via clustering of data from a single user's social media community. Referring now to FIG. 23, a user flow for becoming a user and interacting with a map is depicted. Starting from logical block 2300, processing flow proceeds to a login screen at logical block 2302 where users may log in, such as via a social media authorization. If the user is a new user, the user is sent to a sign up page at logical block 2304, where they may sign up or be given additional content to entice a sign-up. If the user is already on a list as having requested access, processing flow proceeds to logical block 2308 to check a wait list status. If the user is a beta user, processing flow proceeds to logical block 2310 where it is determined if the login is a first login. If so, processing flow proceeds to logical block 2312 where a tour may be taken. After the tour, processing flow may proceed to logical block 2318 where a map overview is presented, including a competitive overview, a text description, a cluster power, and the like. If the user is not a beta user, processing flow may proceed to logical block 2314, where the delta since last visit is presented, including new followers, recent activity with map indicators, and the like. Processing flow may then proceed to logical block 2318. From logical block 2318, processing flow may proceed back to logical block 2314 if recent activity is requested again.

Alternatively, if the user chooses a cluster or group at logical block 2318, processing flow may proceed to logical block 2320 to obtain a cluster overview, including local competitive performance, influencers, conversations, images, videos, recent tweets, and the like. If the user chooses to delve into the entire interactive map, processing flow may proceed to logical block 2322 for clustermap navigation. Processing flow may alternatively proceed to logical block 2324 from logical block 2320 where the user may take action. In an alternative embodiment, processing flow may first proceed to logical block 2328 where the user may first view full lists, and then processing flow may proceed to logical block 2324 where only actions that are relevant to the list being reviewed are displayed at logical block 2324. From logical block 2324, the user may choose to build a network, save one or more clusters as a list, move a message, engage with content, or the like. If choosing to build a network, processing flow may proceed to logical block 2330, where the user is prompted to make a list of influencers. From there, user details may be entered at logical block 2332, and then actions such as engaging one of the users make current logical block 2334 or a follow action may be taken at logical block 2338. From logical block 2330, a follow list may be generated at logical block 2340, or the current view may be saved as a Twitter™ list or some other social media list at logical block 2342. Likewise, if the "Save Cluster as List" action is selected, processing flow may proceed to save the current view as a Twitter™ list or some other social media list at logical block 2342. If the move message action is selected, a list of followers may be made at logical block 2344 and from there the current view may be saved as a Twitter™ list or some other social media list at logical block 2342, or a message may be composed at logical block 2348 which may include content and context and the message. If engage with content is chosen at logical block 2324, processing flow may proceed to logical block 2350, where a list of content, such as URLs, key content and media, may be made. Users may choose to screen content details at logical block 2352 after which processing flow may proceed to logical block 2360 where a word tweet is generated, logical block 2358, where a re-tweet is generated, or logical block 2354 where tweets by influencers who tweeted the content are found and then potentially re-tweeted at logical block 2358.

In order to scale the amount of information in the social media maps, clustering techniques may need to be modified. In general, some set of nodes pay attention to some set of targets and the nodes get clustered based on the targets they pay attention to. There are at least two extensions of this general approach. In one embodiment, a very large number of nodes pay attention to a very large number of targets. Thus, for clustering, the number of operations scales at least polynomially (e.g., the cube of the number of nodes). For example, for 10,000 nodes the number of operations is in the billions. To accommodate this scale, computing power may need to be augmented.

In another embodiment, attentive gravity may be used to scale up the size of the social media maps. Nodes pay attention to targets (input data), however an object may be created where nodes are not discretely assigned to a cluster but are drawn to different poles, such as ideological, thematic, or topical poles. Depending on which nodes a target pays attention to, it can be drawn to one pole, another pole, or the middle. Instead of discrete maps with a plurality of clusters (e.g., 40) in a plurality of colors (e.g., 40), an attentive gravity map may have poles where the nodes are distributed based on how close they are to each pole. A node may have a set of scores which represent a gravitational coefficient for each of the poles of gravity. The gravitational coefficient may be used with other visualizations in order to modify the size, color, or opacity of the cluster representation based on the attentive gravity toward a pole. In another embodiment, the gravitational coefficient may simply be used as a metric on the cluster map previously described herein. The gravitational coefficient provides the degree to which a node matches a segmentation (e.g., a sports weight and a parenting weight for the same node, rather than just sorting the nodes into different clusters/segmentations and throwing out the relationship to other clusters or segmentations).

Clusters themselves may not really be definitive. For example, a node might not be in just one cluster. Such characteristics may be reflected in mapping technologies.

One technique may be a Discrimination Function. In an example, 1,000,000 nodes may be clustered. An initial condition may be a seed attentive clustering for a small number of nodes, such as 10,000. To expand the clustering, the centroids of the clusters are used to assign values to the other clusters (the X, Y average of the dots). For example, it can be determined if a new node is closer to the centroid of one cluster or of another. As many nodes as desired to be incorporated into a map may be clustered via this technique. In this example, this technique applies to nodes 10,001 through 1,000,000.

Another technique may be to iteratively cluster the 1,000,000 nodes in batches of 10,000. Then, the CFI scores of those clusters may be used to cluster like clusters with each other. The clusters may be combined at a meta-cluster level. To make that work well, how similar some clusters are may need to be tracked across large groups of sub-clusters to see which ones are idiosyncratic and should standalone versus ones that are somewhat consistent and should be joined.

In an embodiment, it may be desired to reduce the scale of the map to just those actors connected at a mesoscale while eliminating actors who are not really active members of the network and are just "star" followers. An Influence Network Discovery method may be used to reduce very large networks to their most influential core communities and obtain a sub-graph of maximally connected sub-actors. A variable $K_{corr}$ may be assigned to each member of the network, where $K_{corr}$ relates to a minimum connectedness, or the number of other nodes in the network to which the individual is connected (e.g., a known measure of connectedness in networks). One way to reduce the network quickly is to restrict the network by $K_{corr}$ value. For example, a network may be restricted to only those with a $K_{corr}$ of five and up, that is, only those people connected to at least five other people. Another way to reduce the network may be done iteratively. For example, a network of people surrounding the Democratic Party may be reduced iteratively. In a first step, inactive members and members with few followers may be eliminated. Then, certain network members, such as public figures or those who have a lot of followers may be removed temporarily from the network and reserved in a "keep" set. Then, the remaining network may be examined and refined by $K_{corr}$. In the example, members of the network with a $K_{corr}$ of one are removed from the network. Removal of these people from the network may change the $K_{corr}$ values for the remaining members of the network. The process iterates, removing those network members with the lowest $K_{corr}$ values. The process can iterate until a specified number of network members is obtained. At this point, any members in the keep set may be added back to the network. As a second pass, a $K_{corr}$ of the keep set members may be done and limited to the node threshold. Based on the follow patterns of the members retained in the map, they may be assigned to a cluster.

In an embodiment, a delta report may be provided to examine the evolution of a cluster map and capture the most salient points of change in the last interval. The delta report may identify which clusters have grown, which sites are being targeted more by clusters now than before, which topics are being discussed more now than before, which clusters are more active than before, and the like. The delta report may be provided on a periodic basis, such as weekly, monthly, and the like. Generating the delta report may involve reporting which CFI scores changed the most and which clusters are more active than before. Delta reports may be enabled by organization into a self-updating database with time snapshots. A delta report may be useful in customizing a stream of content. For example, a stream of new objects of interest for clusters in the map can be provided as a delta report and feed to a user.

In an embodiment, a self-service tool may be designed to let users access the system and initiate generation of a social media map. In an embodiment, a user may log into the system or, in embodiments, to a social network or other third party website, in order to initiate the map creation process. A bot may be spawned that harvests data and maps the data to clusters. The bot may further provide cluster labels and CFI scores. The output may be a social media map data object with CFI scores. The self-service tool may enable user browsing of clusters and the map, tagging nodes, grouping and labeling clusters, and the like. In an embodiment, a machine learning labeler may suggest cluster labels. The user-generated labels may be fed into the machine learning facility used to label clusters for the social media maps. The focus of the self-service tool may be on actions that strategically build a user's network and strategically message to components of the network. CFIs can be used to determine a similarity among maps so that an existing social media map that is similar to the self-service map may be recommended for review.

Social media maps may be used to enable users to strategically message components of their network. In an example, a social media map may be created for the Twitter™ followers of a live entertainment company. Certain clusters relate to dense communities around particular stars or particular genres of music. For the live entertainment company, there are relatively few messages that they transmit that everyone in the map cares about; however, using social media maps, clustering enables more discrete message targeting. If the company wants to use Twitter™ to get the word out about a country artist, for example, they can target the country music cluster only with their messaging. If the company wants to target only those nodes within the country music cluster that have the highest influence, CFI scores may be used to limit the messaging in order to maximize the impact on the cluster. Such discrete targeting may be particularly useful in the case where direct messaging to followers may be limited.

Social media maps may be used to enable users to strategically build their network. For example, in the live entertainment company, the country music cluster may be growing in size. The social media map may be used to identify niche influential nodes for the country music cluster, such as by using segment CFI data to maximize connections with targeted segments/key influencers. Then, the user can start following those influential nodes in hopes that they will follow back. Such a process may help build the network in a desired strategic direction. Users may be able to see how they are doing against competitors for any given segment by examining the proportion of influencers (high CFI target), who may or may not be in the map, following them versus others.

In one embodiment, social media maps may be organized and navigated as a map of maps, where each map appears as a node on a larger map. The strength of the connection between maps is the maximum of ratios of how many nodes are in one map versus another map. In navigating and searching the maps for a particular target, an indication may be given when a cluster in one map is very similar to another cluster in another map that may or may not be accessible by the user, for example, if one map relates to diabetes and another relates to obesity, a common cluster may be groups actively modifying lifestyles to avoid both pathologies. In embodiments, the system may provide an interface from the search screen with which the user may purchase the map they do not currently have access to.

In an embodiment, user segmentation may be used to find segments for targeting as customers. Maps may be automatically generated for the target customer and conversion rates to paying customers may be tracked.

Described herein is a system for examining social media phenomena, such as hashtags, and how they spread in a network. Patterns of spreading may include salience, commitment, or a combination thereof termed resonant salience, where there is a burst of activity followed by a sustained commitment, or resonance, pattern. By combining temporal and network features in the analysis of the segments/clusters, chronotopes (i.e., patterns that exist in time and space) emerge.

In an embodiment, a timeline view may be used to examine messages across clusters. The timeline may include the chronotope as the drill down. For example, a primary timeline may be organized in rows by grouping of clusters (e.g., similar clusters are assigned together into a group). There may be several bands for groups (e.g., things for which there is a CFI score). The timeline may be examined for objects of interest that have very high CFI scores at some point. One example may be hash tags in a Twitter network. A dot may be placed at the point in time when the activity (attention) peaked (had the most citations, re-tweets, etc.) for that object of interest. A dot may be placed in the macro timeline for the group (showing the peak points of all objects of interest) where the peaks were for each group (a group corresponds to a band below the main timeline). When the dot that corresponds to the peak of attention to an object of interest for a group/cluster is clicked, the chronotope is revealed. The chronotope for that object of interest may appear in a window below the timeline. The timeline view may include time on the X axis and groups/clusters on the Y axis. Peak interest points for objects may appear as dots at points in time corresponding to the groups that have interest. Clicking on that object reveals the chronotope for that object for all of those groups.

Interacting with data in the chronotope view may reveal what the object of interest is. In some embodiments, a group of items may be selected at a time period for a certain cluster/group and a word cloud or semantic analysis of proper nouns that appear in those items may be assembled.

Social media sites enable users to engage in the spread of contagious phenomena: everything from information and rumors to social movements and virally marketed products. For example, Twitter™ has been observed to function as a platform for political discourse, allowing political movements to spread their message and engage supporters, and also as a platform for information diffusion, allowing everyone from mass media to citizens to reach a wide audience with a critical piece of news. Different contagious phenomena may display distinct propagation dynamics, and in particular, news may spread differently through a population than other phenomena. Described herein is a system for classifying contagious phenomena based on the properties of their propagation dynamics, by combining temporal and network features. Methods and systems described herein are designed to explore the propagation of contagious hashtags in two dimensions: their dynamics, that is, the properties of the time series of the contagious phenomena, and their dispersion, that is, the distribution of the contagious phenomena across communities within a population of interest. Further described is a method for simultaneously visualizing both the dynamics and dispersion of particular contagious phenomena. Using this method, particular contagious phenomenon chronotopes, or persistent patterns across time and network structure, may help emerge a taxonomy for contagious phenomena in general.

Given some contagious phenomenon p, p may be considered to have spread to user u the first time that u engages with p. For simplicity, engagement is measured as mentioning the phenomenon. For news, mentioning is likely a sufficient form of engagement, while for a political movement, stronger evidence of engagement may be preferable (contributing money, attending a rally, etc.). However, in social media sites, higher levels of mentioning often correlate with higher levels of engagement (e.g., users tweet about a political rally), while false indicators of engagement are rare: if a user wishes to mention a political movement to disagree with it, she will often not use a tag or specific name referring to that movement, but use a variant of it (e.g., a Twitter™ user who wants Vladimir Putin out of power may use the tag #Putinout instead of #Putin when tweeting about the prime minister and future Russian president). Therefore, the number of first mentions of p by users in some social media site is used as a proxy for the number of users that p has spread to.

In an embodiment, measures for characterizing contagious phenomena propagating on networks may include peakedness, commitment (such as by subsequent uses and time range), and dispersion (including normalized concentration and cohesion).

The peakedness of a contagious phenomenon is a scale-invariant measure of how concentrated that phenomenon is in time. A peak may be defined as a day-long period where total first mentions by day lies two standard deviations above the median first mentions. The specific duration of the peak window and the required deviation can be varied to maximize usefulness for particular kinds of phenomena and for particular social media networks. Median may be used instead of mean because, due to the skewed distribution of first mentions by day for most contagious phenomena, the mean is over-inflated. Contagious phenomena with short lifespans tend to have a sharp peak, when a large number of people mention the phenomenon, but the number of mentions is very small on either side of the peak. In contrast, long-lifespan contagious phenomena tend to grow slowly, with a less pronounced peak of mentions. The peakedness of a contagious phenomenon is the fraction of all engagements with that phenomenon that occur on the day with the most engagements with that phenomenon. A high peakedness means that most of the network's engagement with the phenomenon (e.g., for a social network, people in the network mentioning it) occurs within a short span of time, typically, hours to days. In contrast, a low peakedness means that the network's engagement with the phenomenon is spread over a long period of time, typically, weeks to months. Phenomena with high peakedness, such as news stories, may propagate rapidly through the network and then dissipate just as rapidly in the course of the daily news cycle. Phenomena with low peakedness may include popular websites and videos, which may maintain a slow but steady rate of engagement—individuals in the network are constantly discovering these phenomena, even as others get tired of them and stop engaging.

Commitment is the measure of the average scope of engagement with a particular contagious phenomenon by nodes in the network, or the staying power of a phenomena. Using the example of people engaging with online content in a social network, the commitment with a particular piece of online content can be the average scope of mentions of that content by pieces of the network. This measure would, for example, differentiate between a political movement that is just a fad, and one that accumulates a number of diehard supporters who keep the movement alive. Scope may be measured in at least two ways, which leads to the following two sub-measures: Commitment by Subsequent Uses and Commitment by Time Range. In social media sites, the cost in terms of time and effort to mention something for the second or third or tenth time is relatively small; therefore, for a second dimension, two quantities may be defined: first, the average number of subsequent mentions (all mentions excluding the first mention of the phenomenon by a user) of a contagious phenomenon among the adopting users; and second, the average time difference (in days) between first and last mention of the phenomenon among the adopting users. While the first measure, "Commitment by Subsequent Uses," is relatively easy to inflate by mentioning the phenomenon multiple times in a short period, the second measure, "Commitment by Time Range", indicates long-term commitment to mentioning the phenomenon by a set of users.

Commitment by Subsequent Uses is the average number of subsequent engagements with a phenomenon after a node's first engagement. For instance, if each person in a social network played an online game at most once, Commitment by Subsequent Uses for that story would be zero. In contrast, if just one percent of the people in a social network played an online game thirty times each, Commitment by Subsequent Uses for that game would be twenty-nine. Phenomena with high Commitment by Subsequent Uses may include online games, which encourage repeat engagements. Other phenomena with high Commitment by Subsequent Uses may include astro-turfed content, where a third party may encourage repeated interest in the content by paying or otherwise endorsing people who engage with it.

Commitment by Time Range is the average time period between the first and last engagement with a phenomenon by nodes in the network, measured over some large time window (e.g., a year). For example, if each person in a social network read articles on a blog ten times over the course of one day and never visited it again, Commitment by Time Range for that blog would be one day. However, if just one percent of the people in a social network read articles on a blog once every week for ten weeks and then abandoned it, Commitment by Time Range for that blog would be ten weeks. Phenomena with high Commitment by Time Range include blogs with loyal followers who keep coming back for more content. Phenomena with low commitment by Time Range include news stories that, on average, a person reads only once and never sees again.

In addition to measuring the dynamics of contagious phenomena (the properties of the time series of engagements with a phenomenon), the dispersion of contagious phenomena (the properties of distribution of a contagious phenomenon throughout a population) may be measured. Dispersion is a measure of the distribution of engagements with a contagious phenomenon over the network through which it propagates. Phenomena that are highly dispersed are broadly popular but may have less focused engagement from a particular group; phenomena that are not dispersed are not broadly popular, but may have focused engagement with a particular group. There are many ways of measuring the distribution of engagements with a phenomenon over a network, including the following two sub-measures: Normalized Concentration and Cohesion.

The Normalized Concentration of a contagious phenomenon presupposes a partition of the underlying network into discrete clusters, which usually represent communities. Given such a partition, the Normalized Concentration of a contagious phenomenon is the fraction of all engagements that come from the cluster that engages most with the phenomenon, or the Majority Cluster. For instance, if a social network were divided into two clusters, one of which engaged with a particular news story nine times, and the other, only once, the Normalized Concentration for that phenomenon would be 0.9. However, if both clusters had engaged with the story five times, the Normalized Concentration for that phenomenon would be 0.5. Phenomena with high Normalized Concentration tend to be the cause célèbre of a particular community, e.g., political and social movements that have not gained wide traction. Phenomena with low Normalized Concentration may include headline news stories that touch many communities at once. Depending on the size of individual communities, Concentration may or may not correlate inversely with popularity.

In addition to Normalized Concentration, some aspect of the connections between the engaged users may be measured. For example, it is possible that a contagious phenomenon is widely spread across a number of communities, but diffuses only through strong ties so that the engaged users form a clique. Conversely, it is possible that a contagious phenomenon is confined to a single community, but spreads through weak ties and the engaged users are sparsely interconnected. Therefore, a measure of Cohesion may be defined as the network density over the subgraph on all users engaged in a particular contagious phenomenon. Contagious phenomena that spread over strongly connected sets of users will have a Cohesion close to one, whereas phenomena that spread over weakly connected sets of users will have a Cohesion close to zero. The Cohesion of a contagious phenomenon is the network density of the sub-graph of all nodes engaging with the phenomenon. The network density of a graph is the total number of actual connections between nodes in the graph divided by the total possible number of connections (usually $n*(n-1)/2$ for undirected graphs, where n is the number of nodes in the graph). For example, if only three people read a particular blog, but all those people knew each other, the Cohesion of that blog would be 1.0. In contrast, if ten people read a particular blog, but every one of those ten people knew exactly two of the others (the people were connected in a circle graph), the Cohesion of that blog would be $10/(10*9/2)=10/45\sim0.22$. Phenomena with high Cohesion may include stories and memes that propagate in an "echo chamber" of people who already know each other and engage with similar kinds of online content. Phenomena with low Cohesion include news and rumors that move between acquaintances, such that, for example, after multiple propagations, the person who hears the rumor and the person who started it may be total strangers.

In embodiments, phenomena with high Peakedness tend to have low Commitment, making those two measures a natural pair for comparing different online phenomena. For example, FIG. 18 depicts Commitment by Time Range on the Y axis and Peakedness on the X axis for two different sets of data depicted by different icons. In this example, the two datasets are: 1.) 112 Bundled hashtags relating to specific topics shown in red or as icon #1; and 2.) a baseline dataset of the top 500 hashtags for all users shown in black or as icon #2. The bundled hashtags display a generally lower level of Commitment by Time Range than the top 500 hashtags at the same level of Peakedness. Some of the top 500 hashtags have extreme levels of Commitment, up to 150 days. Hashtags with the highest levels of Commitment are of several sorts, which notably include regional/location tags, tags for particular sports, religion tags (e.g., "Catholic," "Jewish"), tags for particular news outlets, and general tags related to investing and financial markets. Intuitively, all of these are topics that might engage a stable set of users over a long time.

Figure 19A:
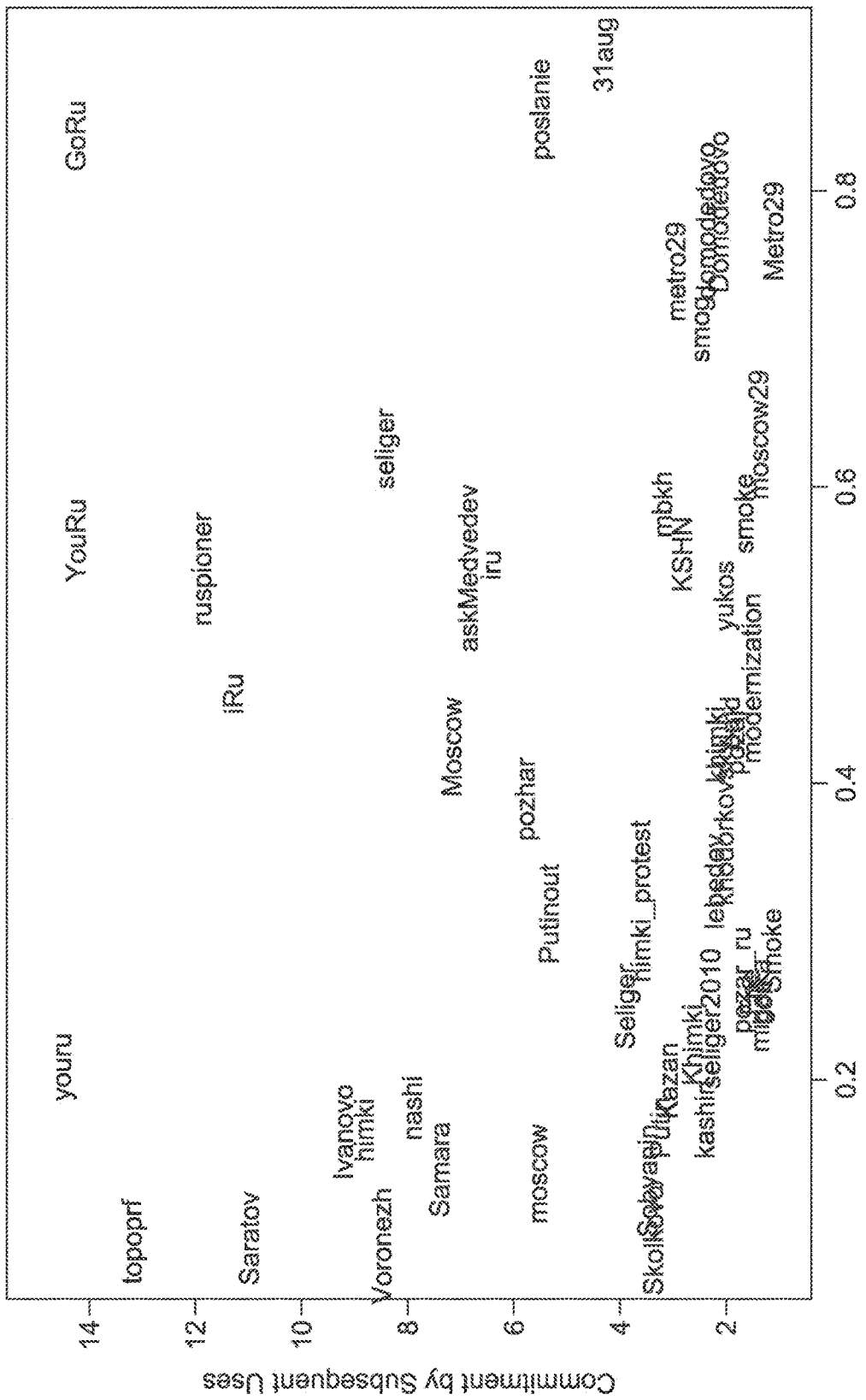
FIG. 19A depicts Peakedness vs. Commitment by Subsequent Uses.
Figure 19B:
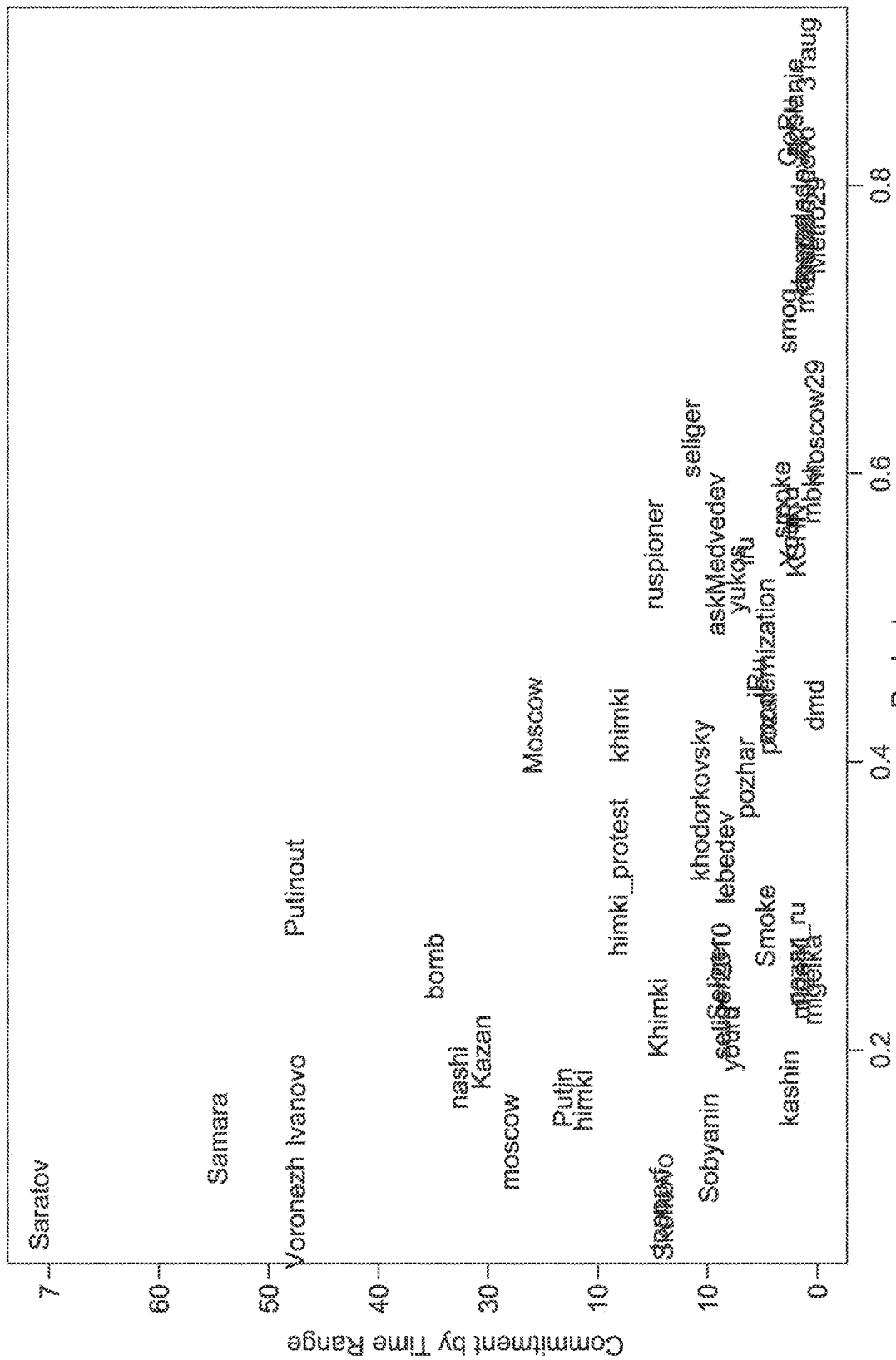
FIG. 19B depicts Peakedness vs. Commitment by Commitment by Time Range.

Referring to FIG. 19, and in an example, dealing primarily with topics related to Russia, peakedness is plotted for the bundled hashtags against both levels of Commitment: subsequent uses (FIG. 19A) and time range (FIG. 19B). In FIG. 19A, there are several distinct regions of the distribution. On the bottom right, hashtags with high Peakedness and low Commitment by Subsequent Uses are all directly related to salient news events, which in this case are the airport and metro bombings in Russia (#Domodedovo, #explosion, #metro29, #Moscow29). On the bottom left, hashtags with low Peakedness and low Commitment by Subsequent Uses are generally not very popular. Some of them are very generic (#moscow, #metro), and some just never had a peak nor became adopted by a committed user base. Some of these are tags that are similar to popular tags, but reflect less-used variations. On the top left, hashtags with low Peakedness and high Commitment by Subsequent Uses are all regional hashtags (with the exception of the Nashi hashtag that refers to a pro-government political youth movement in Russia). These regional hashtags were tangentially related to the forest fire events, but their main use is likely in talking about local affairs, hence the high commitment of a few users. Finally, on the top right, there are a number of hashtags with both high Peakedness and high Commitment by Subsequent Uses. These tend to be pro-government political hashtags (#iRu and #GoRu are both related to Medvedev's policy of modernization while #ruspioner and #seliger are both related to the Seliger youth camp). This observation suggests that pro-government political hashtags have some event (such as the Seliger camp) that is linked to a sudden burst of popularity, but subsequent to that event, users continue to include the hashtag in their tweets. This suggests that pro-government political hashtags may have "staying power" in the Russian Twitter™ community. Alternatively, or in combination with this, a committed set of users may use the pro-government hashtag both before and after the event, perhaps in an organizational or mobilizing capacity.

In contrast, and referring to FIG. 19B, some of the same clustering seen in FIG. 19A is depicted, where news is on the bottom right, regional hashtags are on the top left, but the top right group dominated by pro-government hashtags has moved down, indicating that these hashtags do not have staying power over long periods of time; they may be mentioned multiple times, but in a relatively short time range around the peak (days or weeks, not months). In contrast, the hashtags on the top right in FIG. 19B are the regional hashtag #Moscow and the political hashtag #Putinout (referring to the anti-Putin movement). It is important to note that #Putinout in particular has relatively long temporal staying power (an average of 50 days between first and last mention by a user in the dataset) but relatively short staying power by mentions (an average of less than six subsequent mentions).

Figure 20:
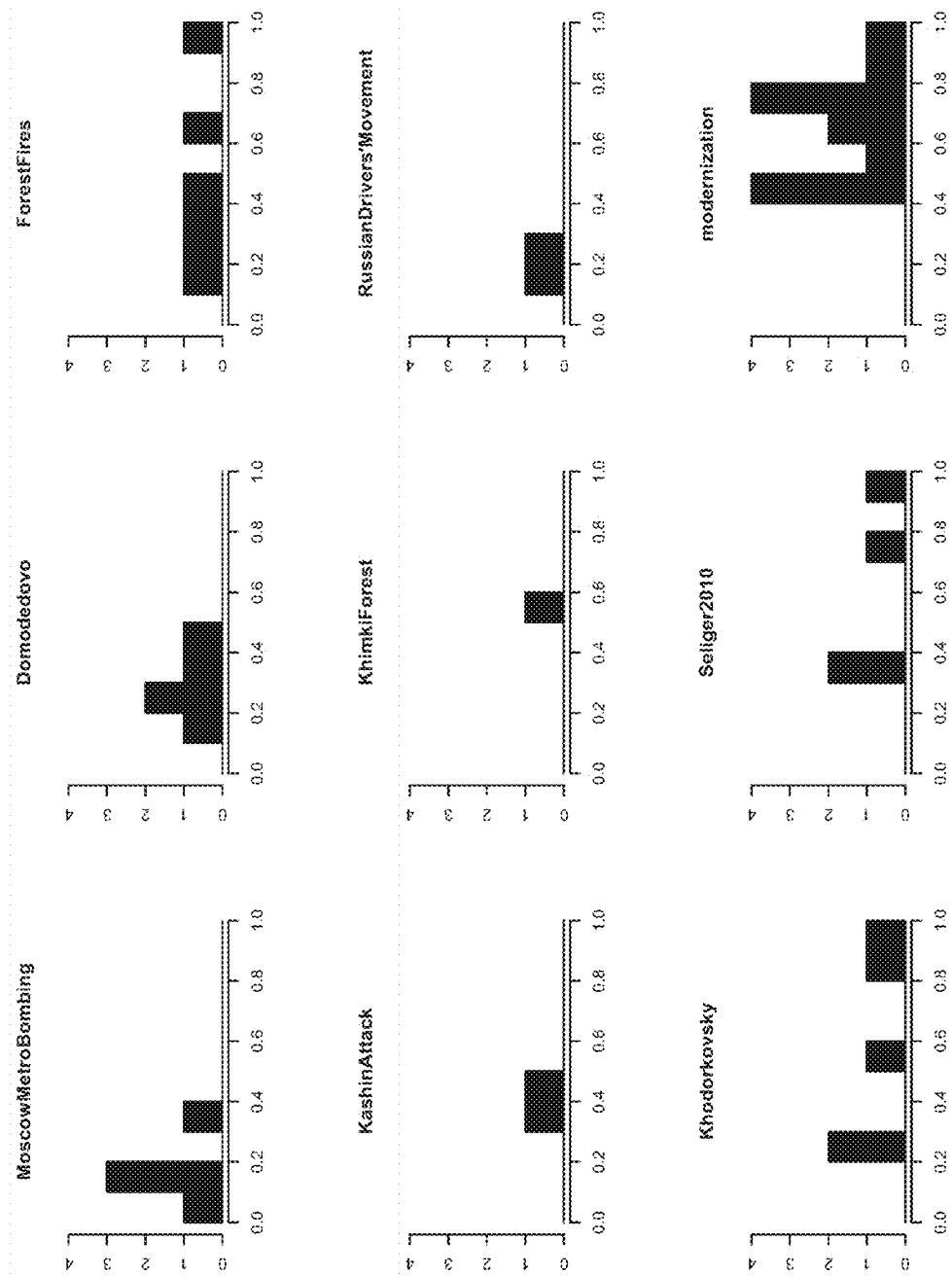
FIG. 20 depicts a distribution of mention-weighted normalized concentration by topic.
Figure 21:
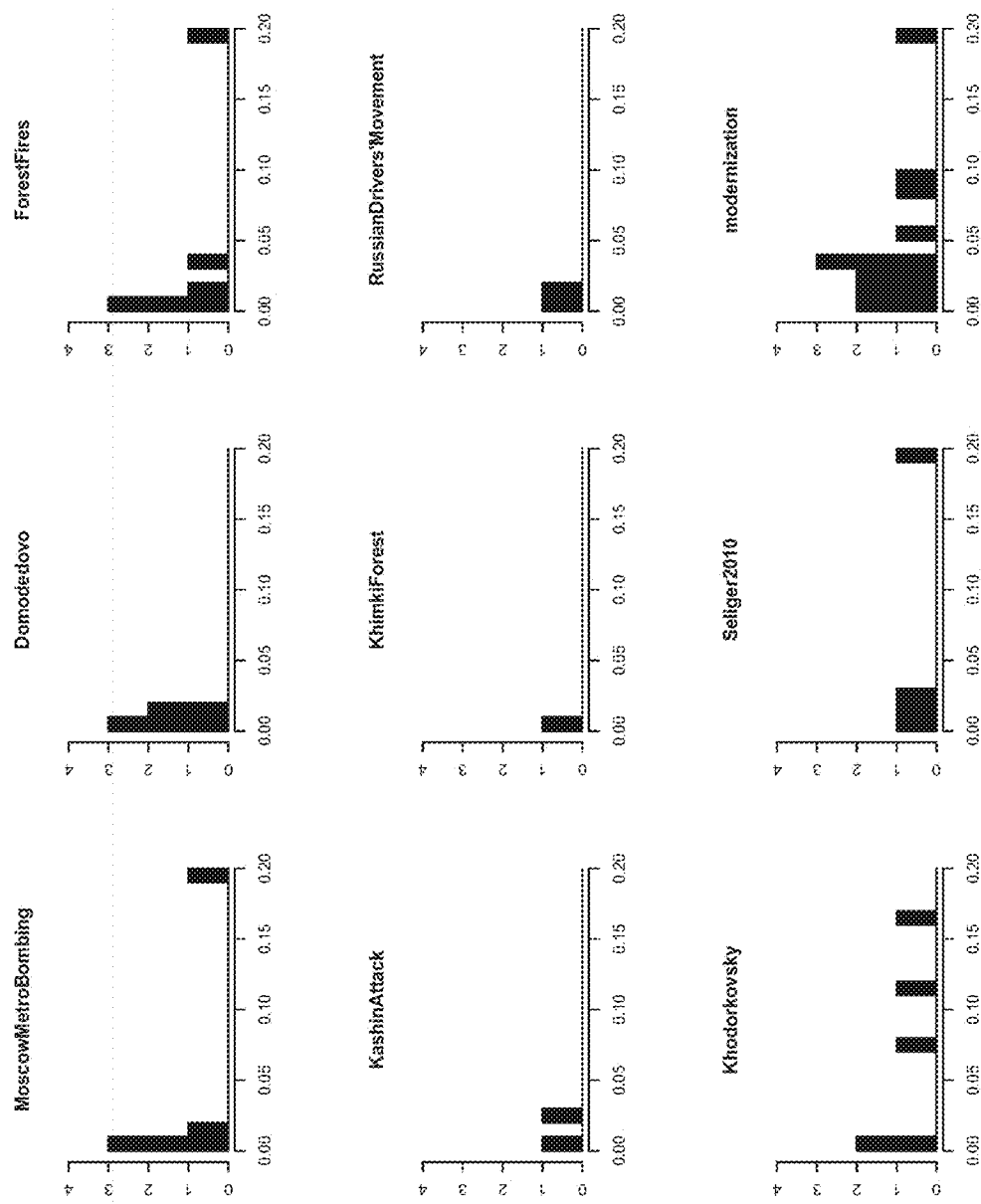
FIG. 21 depicts a distribution of Cohesion by topic.

Referring to FIG. 20 and FIG. 21, measures of dispersion of hashtags are analyzed across a core set of Twitter™ users. In FIG. 20, the distribution across nine topics of Normalized Concentration are plotted by hashtag within each topic. Comparing across all nine topics enables distinctive patterns to emerge; the minimum Concentration among pro-government hashtags in the Seliger and modernization topics is between 0.3 and 0.4. In contrast, the maximum Concentration among opposition hashtags in the Kashin and Russian Drivers' Movement topics, is between 0.4 and 0.5. Pro-government hashtags are on the whole more concentrated within one cluster than opposition hashtags. Hashtags related to news events, such as the Moscow Metro Bombing and the Domodedovo attack, tend to be diffuse, which is in line with the intuition that major news events tend to engage the population as a whole rather than specific communities.

In FIG. 21, the distribution across nine topics of Cohesion are plotted by hashtag within each topic. For case of visualizing, the distribution plots are cut off at 0.2 and all hashtags with Cohesion>0.2 are assigned a value of 0.2. Again, there is a contrast between opposition hashtags, which have extremely small Cohesion of 0.03 and below, and some pro-government hashtags (especially those in the Seliger and modernization topics), that have the much higher Cohesion of 0.10-0.30. Curiously, a few news-related hashtags have very high Cohesion, which suggests that some news-related hashtags may spread through strong ties.

Figure 22A:
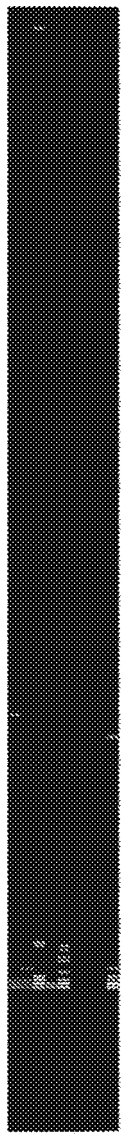
FIG. 22a depicts a chronotope of the #metro29 hashtag.
Figure 22B:
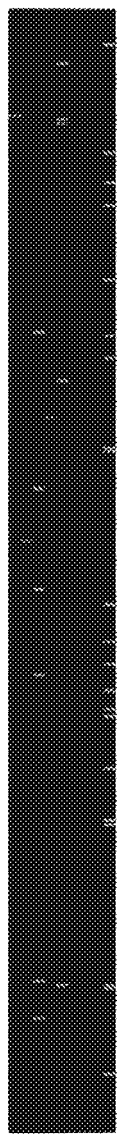
FIG. 22b depicts a chronotope of the #samara hashtag.
Figure 22C:
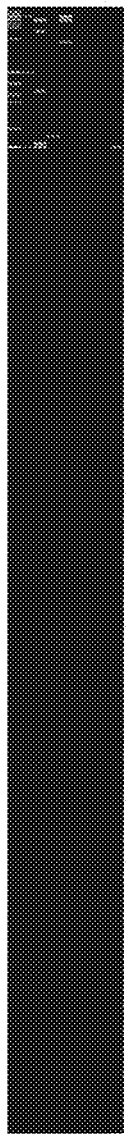
FIG. 22c depicts a chronotope of the #iRu hashtag.

FIGS. 18 through 21 provide a high-level analysis of hashtag diffusion among the Russian-speaking Twitter™ community, both from the temporal and the spatial (network) perspective. However, this analysis necessarily leaves out the idiosyncrasies of individual hashtags. Referring now to FIG. 22a, FIG. 22b, and FIG. 22c, chronotopes of the #metro29 (a), #samara (b), and #iRu (c) hashtags are depicted. In typical chronotope images, color indicates cluster group, and color brightness indicates volume of engagements. Detailed analysis of individual contagious phenomena enables crossing the dimensions of dynamics (loosely, temporal properties) and dispersion (loosely, spatial properties) of the latter. Therefore, spatiotemporal analyses of contagious phenomena, such as hashtags, may be constructed, and patterns in their diffusion across time and space may be discovered. Such patterns may be called the chronotopes of the hashtags. A chronotope is simply a pattern that persists across a spatiotemporal context, originally used in literary theory to describe genres or tropes.

In order to discover hashtag chronotopes, the diffusion of individual hashtags is visualized both across different communities and across time. First, a particular hashtag is selected and the set of engagements of Twitter™ users with this hashtag is binned by day. Next, for each day, the volume of engagements for that day is broken down by cluster group. Finally, a grid where columns correspond to cluster groups and rows correspond to days is created. Each row-column cell of the grid is filled with a color corresponding to the cluster group. A cue as to the volume of engagements corresponding to a particular cell is given via the brightness of the color: the brighter the cell, the more engagements with a hashtag on that day from that cluster group. Black cells correspond to days when a particular cluster group has no engagements with the hashtag.

FIG. 22 shows three such visualizations: the #metro29 hashtag related to the Moscow Metro bombings on Mar. 29, 2010; the #samara hashtag related to the Russian city of Samara; and the #iRu hashtag, related to President Dmitri Medvedev's policy of modernizing Russia. These three visualizations display three distinctive patterns across space and time; #metro29, in FIG. 22a has a "salience" chronotope, with engagements across the spectrum of cluster groups during the week around March 29. In contrast, #samara in FIG. 22b has a "resonance" chronotope, with consistent engagements from the local cluster group, presumably residents of Samara talking about their city. Finally, #iRu in FIG. 22c has a "resonant salience" chronotope, with an initial cross-group burst of activity in late November 2010 (around the time of Medvedev's announcement of his new policies), followed by consistent engagements from the Pro-Government cluster group over the next month. Note that FIG. 22 does not contrast with FIG. 19, which suggests that pro-government hashtags have low staying power, but instead presents a more subtle picture; the cluster group of pro-government users remains active in the #iRu hashtag over the course of a month, but, as FIG. 19B indicates, individuals within that cluster rarely carry on with adoptions for more than 5 days. There may be a high turnover of users of the #iRu hashtag, with new enthusiasts coming in even as the original adopters lose interest in the topic.

In embodiments, phenomena with the Salience Chronotope tend to have high Peakedness and low Commitment, while phenomena with the Resonance Chronotope tend to have low Peakedness and high Commitment by Time Range. Phenomena with the Resonant Salience Chronotope tend to have both high Peakedness and high Commitment by Time Range.

In an embodiment, a flexible algorithm may be used for optimizing a targeted network influence campaign. For example, a user may have a high CFI score, but they may not message their social networks frequently, thus targeting these individuals may not optimize the campaign. The algorithm may output an M Score, which may be calculated from a CFI score plus some other network or behavioral metric. In embodiments, wherever it is described to use the CFI score, the M score may instead be used to maximize campaign effectiveness. In embodiments, the M score may be an interpolation of the number of followers of the target item (influence) and the CFI score of the target item (specificity). This mathematical calculation may result in a normalized score on a scale, such as a scale from 1 to 10 where 1 is low impact and 10 is high impact. Thus, the M score is a general measure of influence and specificity.

One way to calculate the M score is to combine CFI and count, where count is the overall number of members on the map that have engaged with that target, in a formulaic way. The formula is M score=count (alpha)+CFI (1−alpha) [normalized 1 to 10].

In embodiments, the M-score may be user-tunable, so that there is a choice to prioritize "segment specificity" vs. "global footprint," and/or "network position" vs. "behavioral profile" (e.g., someone who retweets frequently) when selecting behavioral and/or network metrics to calculate the M score. In an embodiment, for example, a slider 2902 may be provided to users so that can select a target that is more niche or more global. The M score enables optimizing a campaign on network position or on behavior. If the slider is dragged towards "niche," alpha approaches zero and the M score is near equivalent to just the CFI score of the target item (high specificity). If the slider is dragged towards "broad," alpha approaches 1 so that the M score is near equivalent to just the number of followers of the target item (high influence). Setting the slider somewhere in between "niche" and "broad" allows users to tune the set of individuals/entities that they want to target.

In an embodiment, direct ad placement may be enabled by CFI scores/M scores. Using CFI scores and/or M scores, a list of targets/websites may be created and ads may be placed directly on the target/website via integration with various products, such as Twitter™ sponsored tweets, Facebook™ ad exchange, Google™ AdSense/Adwords, third party online ad networks, and the like.

Figure 24:
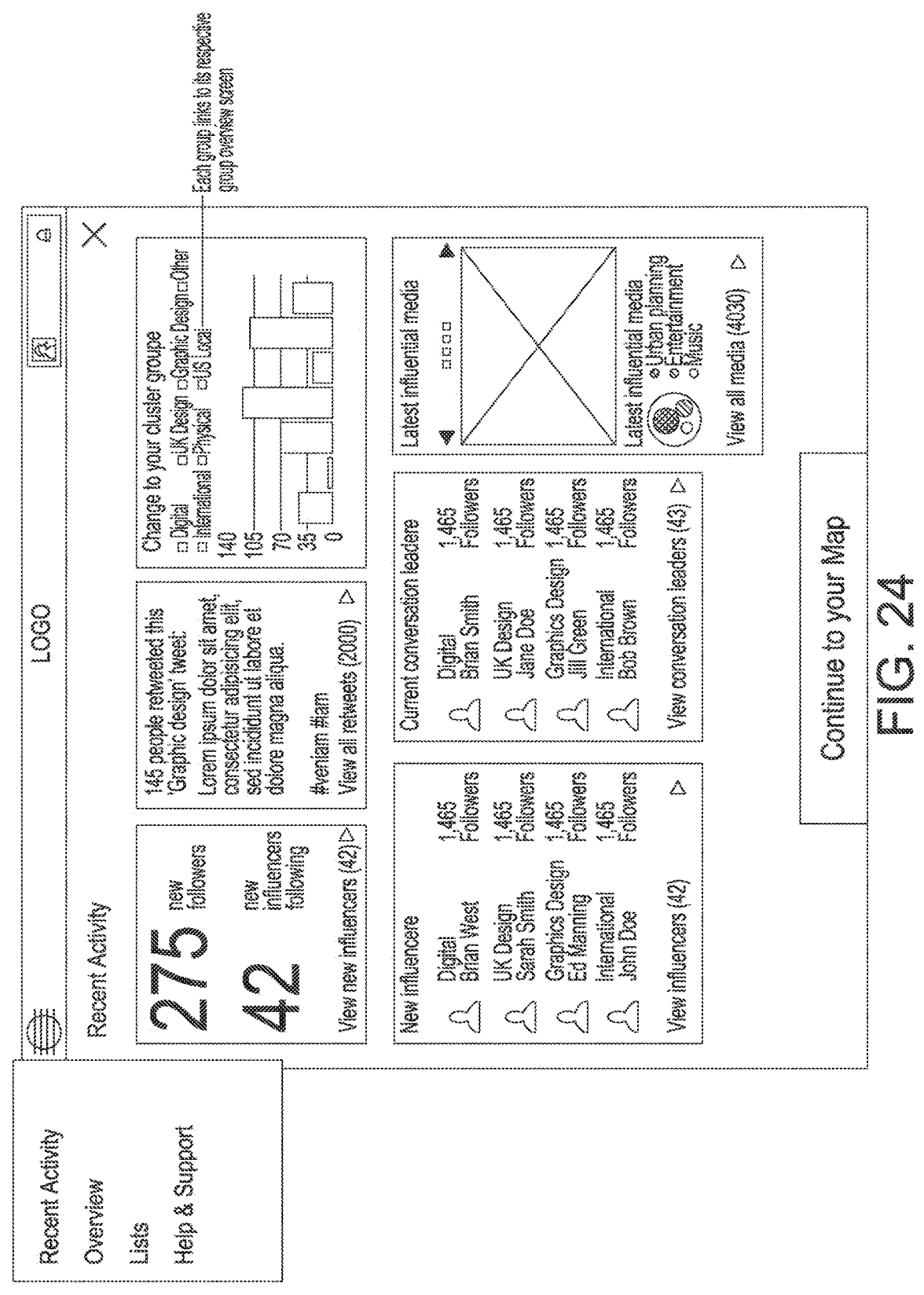

Referring now to FIG. 24, a recent activity page of a social media map platform provides recent activity, such as new followers, new influencers following the user, an indication of any re-tweets including the number of people who have retweeted an item, changes to the user's cluster groups with links to respective group overview screens, a list of new influencers including their cluster group and their number of followers, the current conversation leaders including their cluster group and their number of followers, a view of all media being shared in the network including the latest influential media and the segments in which the media is influential, links to an overview page, links to a lists page, links to a help and support page, and the like. The user may continue to their map from this screen. Graphics, such as a bar graph, may be included in the changes to the user cluster groups box to indicate the number of users in each cluster group. Graphics, such as a bubble chart, may also be included in the media box to indicate the size of the segments in which the displayed latest media is influential.

Figure 25:
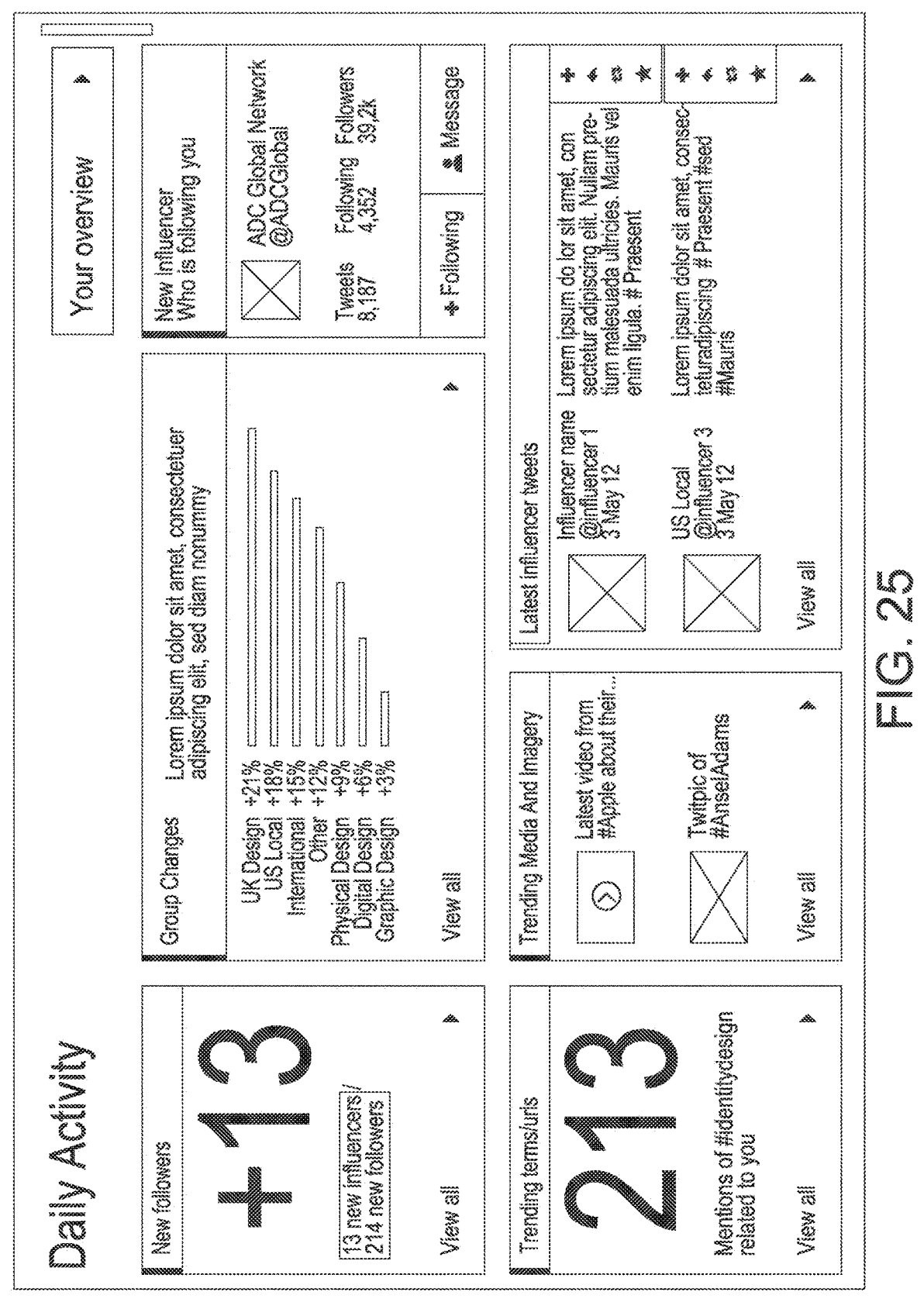

Referring now to FIG. 25, another example of a recent activity page of a social media map platform is shown. In this example, new followers are shown; included in the number of followers are new influencers and group changes, including a percent change for each cluster group, information on new influencers, such as their name, handle, number of tweets, number of followers, number of people they are following, and a button to message them or follow them. Also on this page are trending terms/URLs, including the number of mentions of a hashtag that is related to the user, trending media and imagery, and latest influencer tweets. Icons may be provided to reply, retweet, favorite a tweet, share or embed a tweet, and the like.

Figure 26:
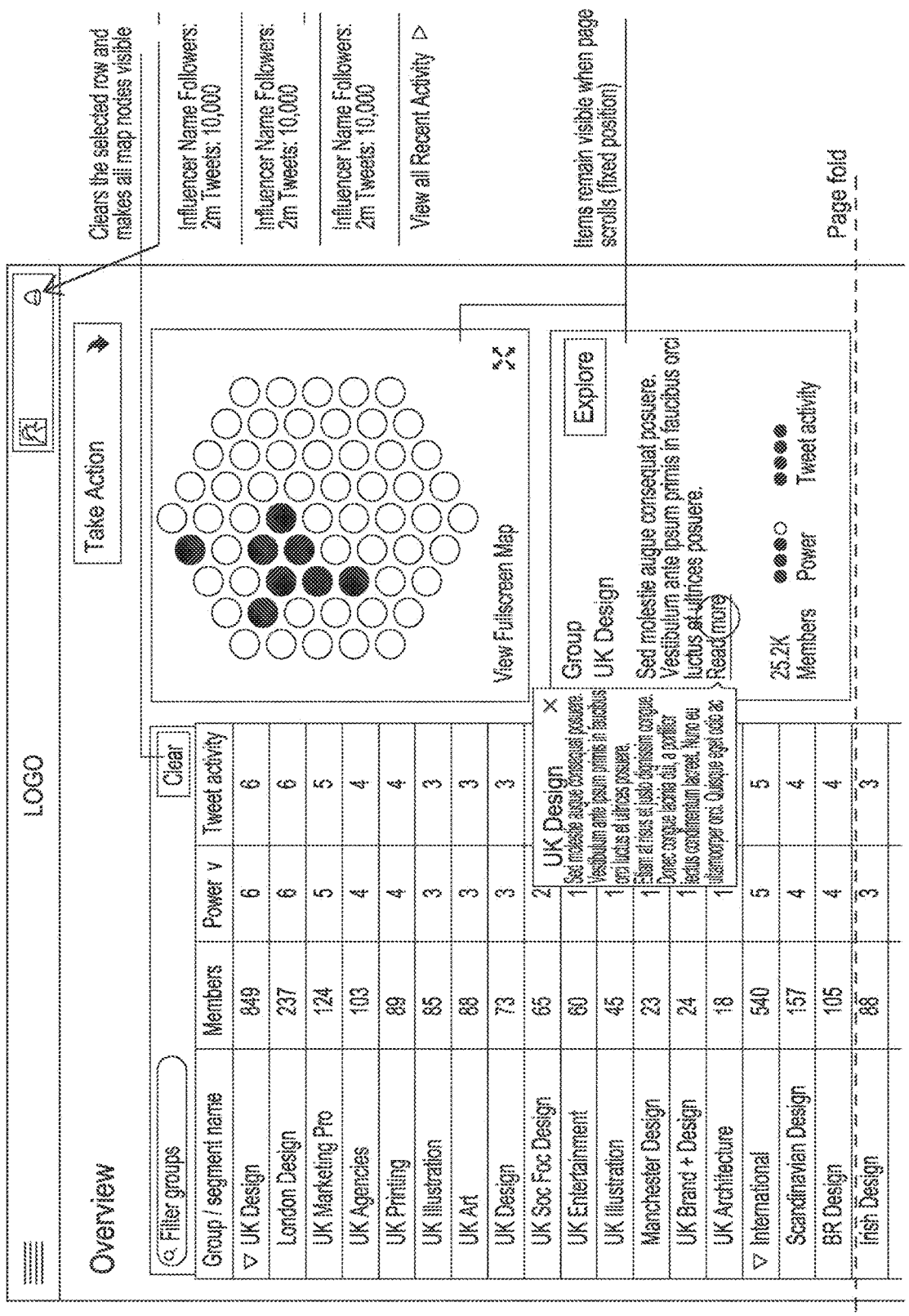
FIG. 26 depicts an overview page for a social media map platform.

Referring now to FIG. 26, an overview page is shown. The overview page includes a table of cluster groups, the number of members in the group, the power of the cluster, and the tweet activity. A power score is an indication of which segment is worth engaging with and may be an indication of which segments are most dense and represent the greatest signal of interest. In one embodiment, power may be calculated based on network density: the number of connections divided by the number of possible connections. In another embodiment, power is calculated based on coordinates, such as the average distance from the center of a cluster map. In another embodiment, power may be calculated as the average distance from the centroid of the cluster that emerges in the clustering computation. In embodiments, power is like the segment/cluster version of the M score.

Figure 27:
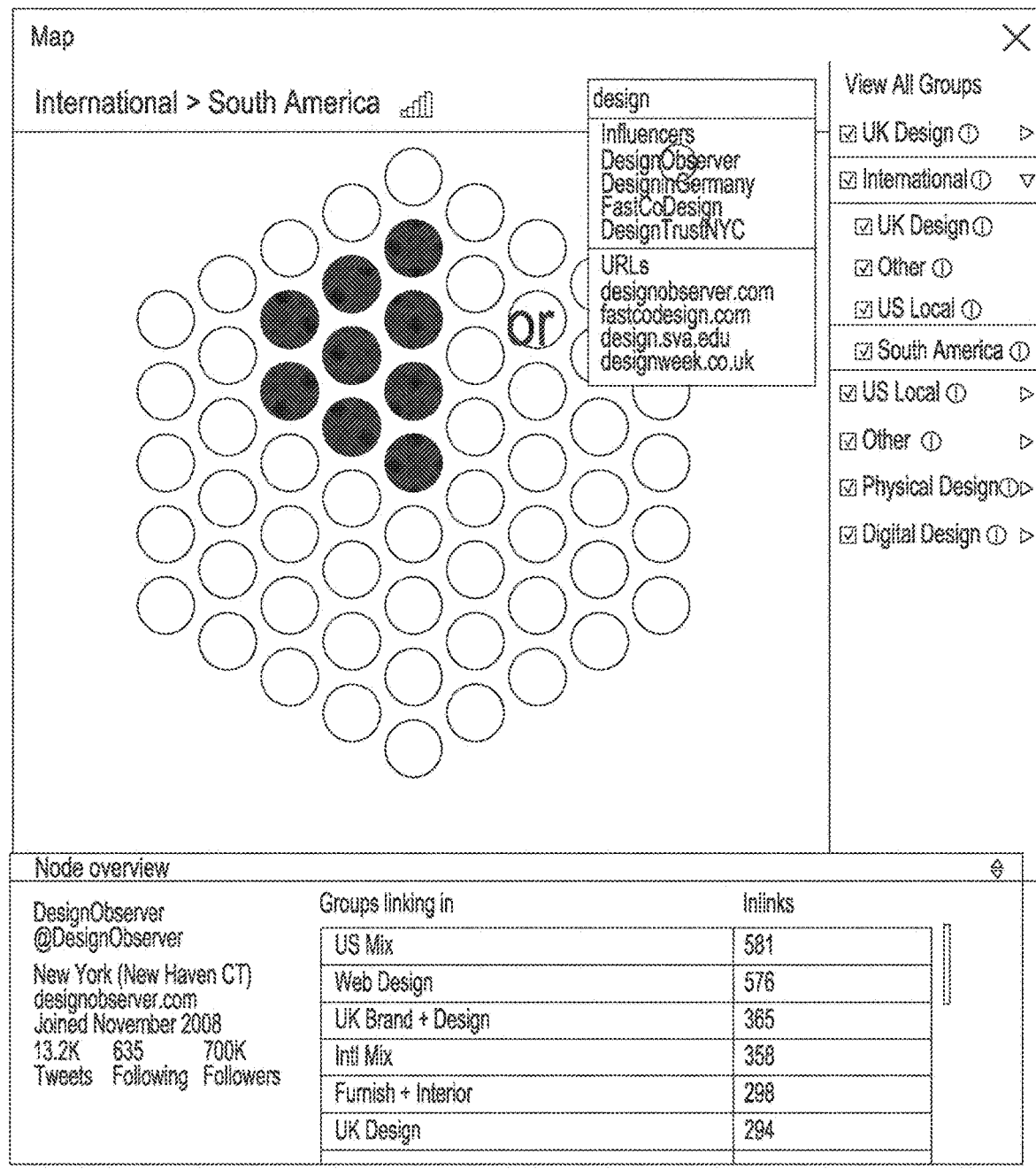
FIG. 27 depicts an interactive map for a social media map platform.

Continuing with the page on FIG. 26, an individual cluster may be selected and a representation of that cluster in a map may be highlighted. For example, the UK design cluster has been highlighted and a dialog box appears showing more information about the individual group, including number of members and graphics depicting the power and tweet activity associated with the group. When the user clicks the "Read more" link, a box may appear with more information. The map and group information items may remain visible when the page scrolls such that they are in a fixed position. Selecting clearer on the page overview causes the selected row to be cleared and makes all map nodes visible. An alarm icon on the overview page allows the user to review all recent activity including number of tweets from various members of the network. Selecting "view full-screen map"

will send the user to a screen such as that shown in FIG. 27. Referring now to FIG. 27, a full-screen map is displayed. In this map, the international cluster has been selected and the South America sub-cluster was selected. The colored nodes in the map may indicate one or both of the selected clusters and sub-clusters. The influencers in a particular sub-cluster may be viewed and when an influencer is selected, the URLs associated with that influencer there may be shown. A node overview may appear including the influencer name, their handle, their location, their URL, when they joined the social network, their number of tweets, their number of followers, the number of people they are following, the groups they are linking in, the number of in-links in each group, as well as any other relevant information.

Referring now to FIG. 28, an embodiment of an overview page is shown. In this view, a segment or cluster has been selected and data regarding that segment is displayed, such as key influencers, current conversation leaders (mentions), an interactive map, key photos and videos or other media, key tweets/retweets, key websites, key content, latest conversation terms, and the like. Effectively, this page shows an enhanced version of cluster-focused data and makes it more accessible. The power score for the segment is displayed as well as an icon from which the user may take certain actions such as build their network, find content, find media, find tweets, message followers, launch a Twitter™ campaign, launch a Facebook™ campaign, launch a mobile campaign, launch a social media campaign, launch an AdWords campaign, launch an advertisement campaign, and the like. The overview page may be a user interface. Notifications of certain data and data presentation may be made in the user interface, for example, which may be implemented by software and embodied in a tangible medium, such as a mobile device, smartphone, tablet computer, or the like. The user interface may be a touchscreen embodiment, such that to utilize the user interface, a user is required to touch the screen of the device displaying the user interface. The user interface may be accessible on different computing devices and capable of dynamically accessing user specific data stored on a network server and/or local device.

Figure 29:
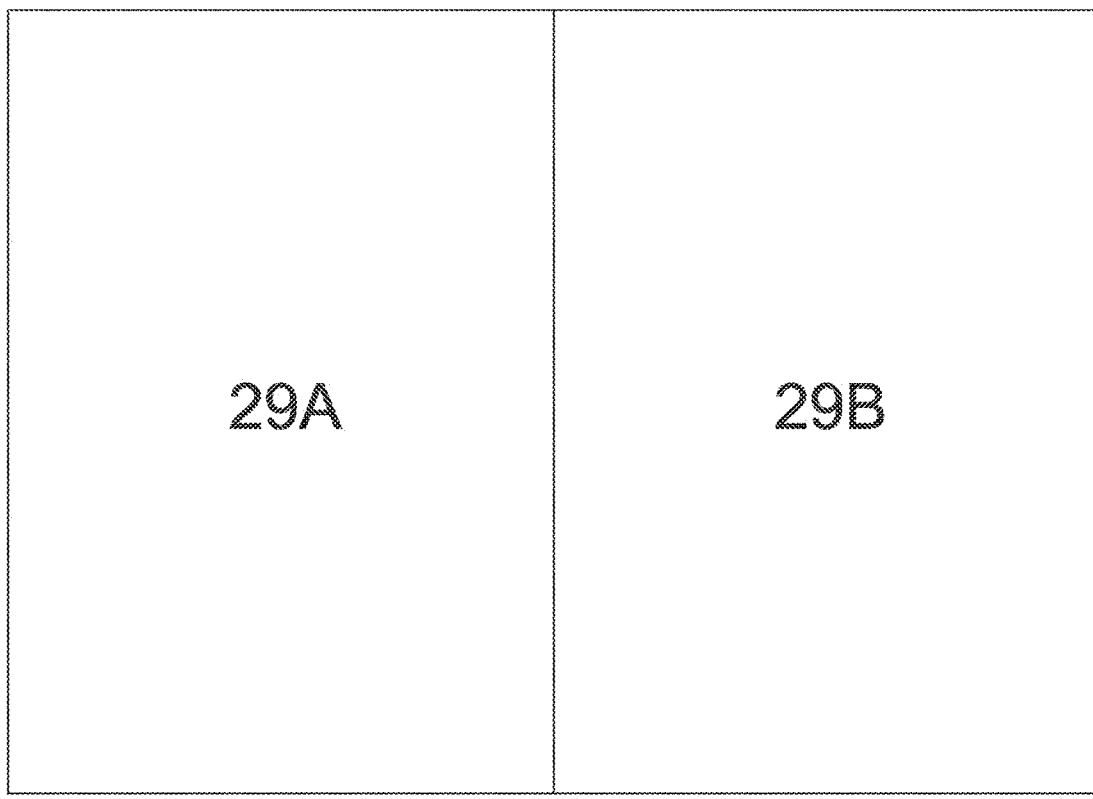
Figure 30:
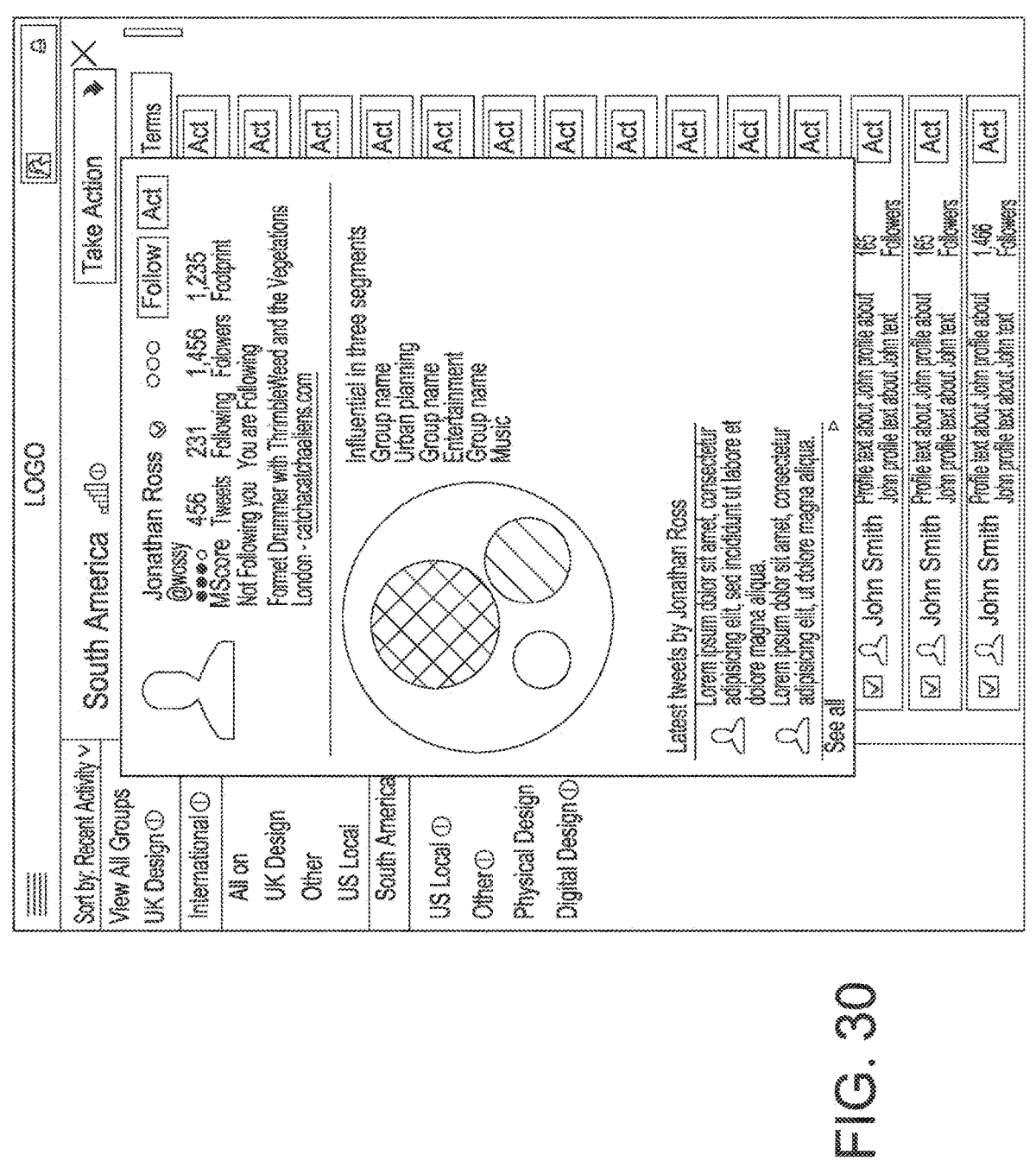

Referring now to FIG. 29, the "influencers" tab has been invoked. Various ways to filter the influencers are provided such as by follower status (all followers, follows the user, does not follow the user) or by following status (show all, the user follows, the user does not follow). Another way to filter influencers may be by M score, follower count, mentions, name, screen name, and the like. One way to filter by M score is by use of a slider 2902 to obtain more niche or broader individuals/entities as described elsewhere herein. Another way to filter individuals/entities may be by their exposure to particular content. By utilizing this filter, the user may target individuals/entities who have not already been exposed to the content. Users may take action from this page such as to follow selected individuals/entities, save individuals/entities to a Twitter™ list, create a new list, add a selection to a list, send a direct message, send a sponsored tweet, and the like. When saving individuals/entities to a Twitter™ list, a dialog box may appear with list choices for the user, such as a list for my influencers following me, a list for my influencers and not following me, a branding group, and the like. In this example, one action being taken is to follow seven new users. By following individuals/entities and engaging in behaviors that might cause them to be aware of the user, the users network may potentially expand to include the newly followed individuals/entities. Another action that is taken is to compose a message. The compose message screen may include suggested content such as most used hashtags or other media based on a CFI, popular terms, key content such as high M score media, and the like. Influencer information may be leveraged in determining whom to message. The suggested content may be filtered by the exposure of target individuals/entities to the content. Data related to the content such as its peakedness, first appearance, and the like may be exposed to the user so that the user can decide whether it makes sense to share the content with other individuals/entities. Referring to FIG. 30, users may be able to drill down to the individual influencer level to see in what other segments/clusters the individual is influential, their latest tweets, M score, number of tweets, number of followers, number following, footprint, following/follower status with respect to the user, demographic information, URL, and the like. Icons may be available to follow, act (i.e., add the person to a list, retweet their latest tweet, send a direct message, etc.), view a social media profile, and the like.

Figure 31:
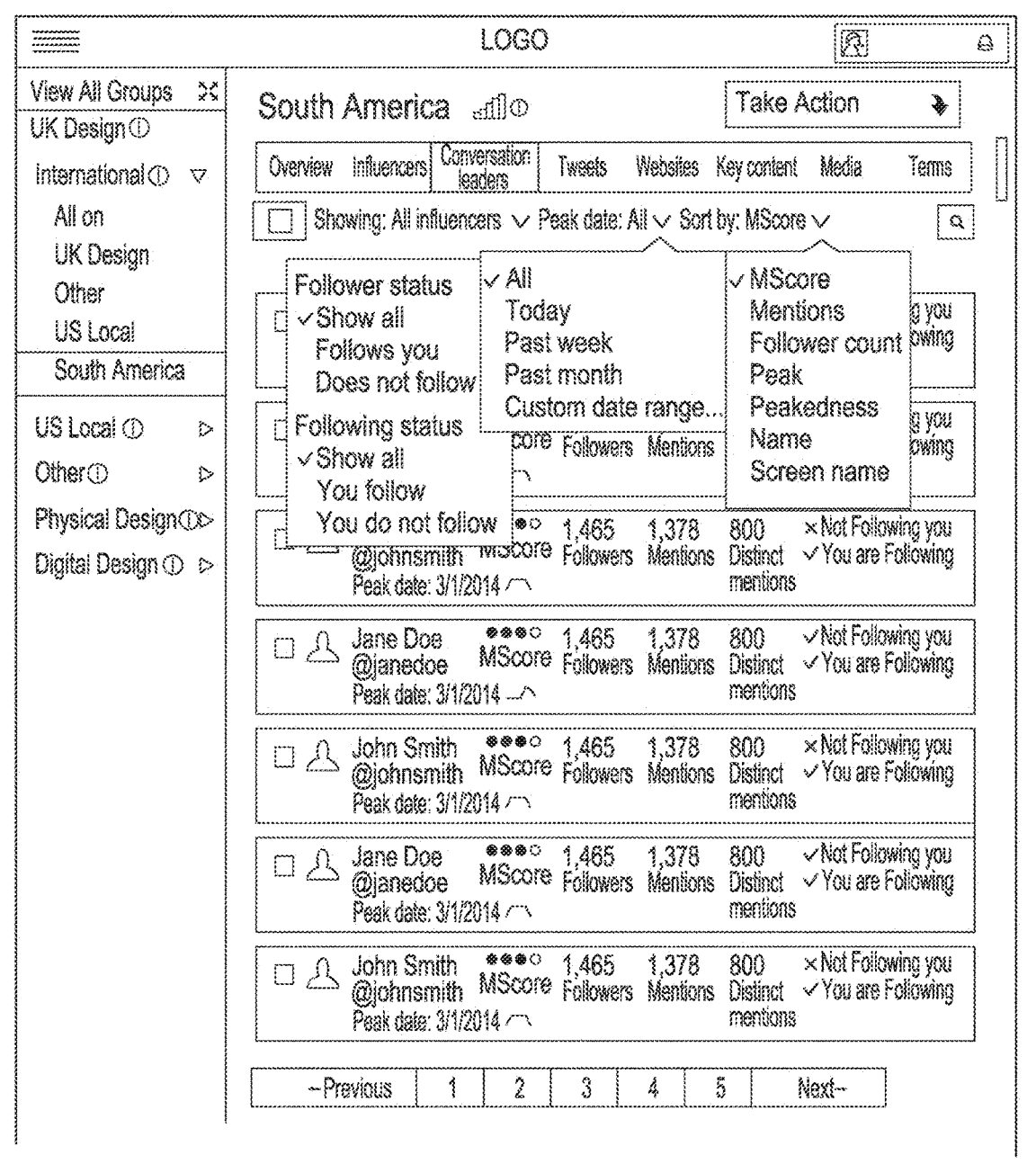

Referring now to FIG. 31, a tab for conversation leaders is displayed. Various ways to filter the conversation leaders are provided such as by follower status (all followers, follows the user, does not follow the user) or by following status (show all, the user follows, the user does not follow). Another way to filter conversation leaders is by peak date such as all, today, past week, past month, custom date range, and the like. Another way to filter conversation leaders may be by M score, follower count, mentions, peak, peakedness, name, screen name, and the like. Another way to filter conversation leaders may be by their exposure to particular content. By utilizing this filter, the user may target individuals/entities who have not already been exposed to the content. Users may take action from this page such as to follow selected individuals/entities, save individuals/entities to a Twitter™ list, create a new list, add a selection to a list, send a direct message, send a sponsored tweet, and the like.

Figure 32:
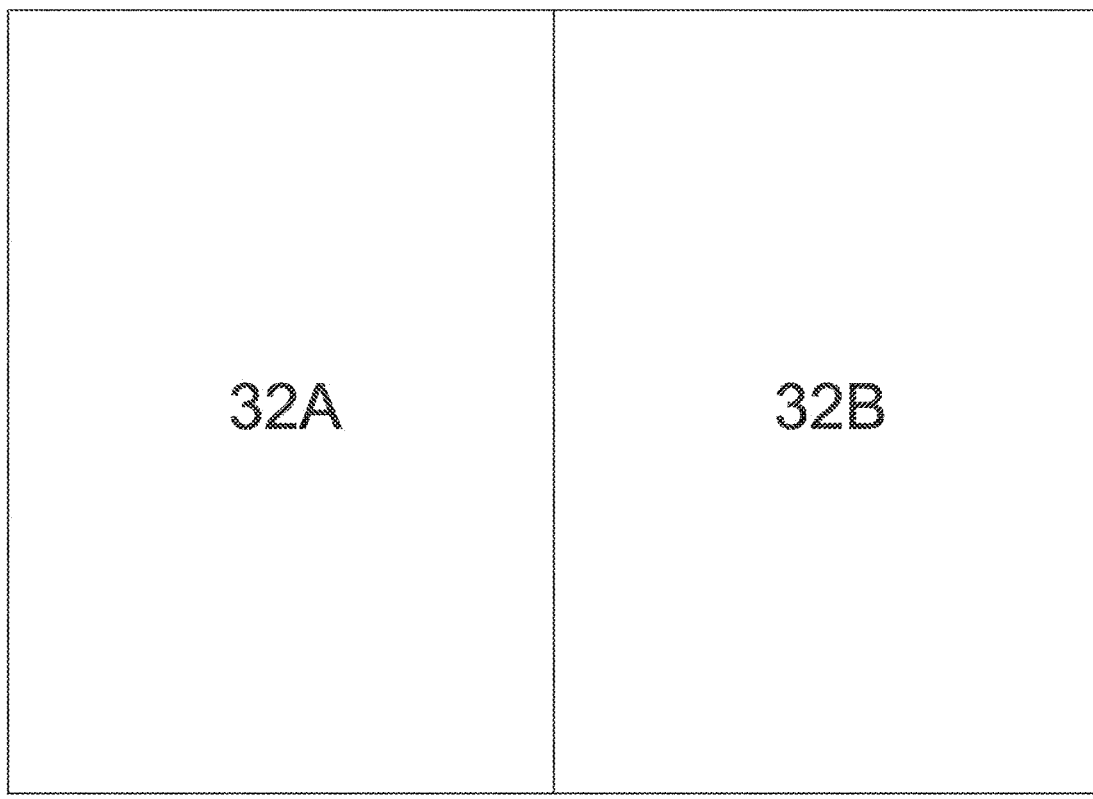
Figure 32A:
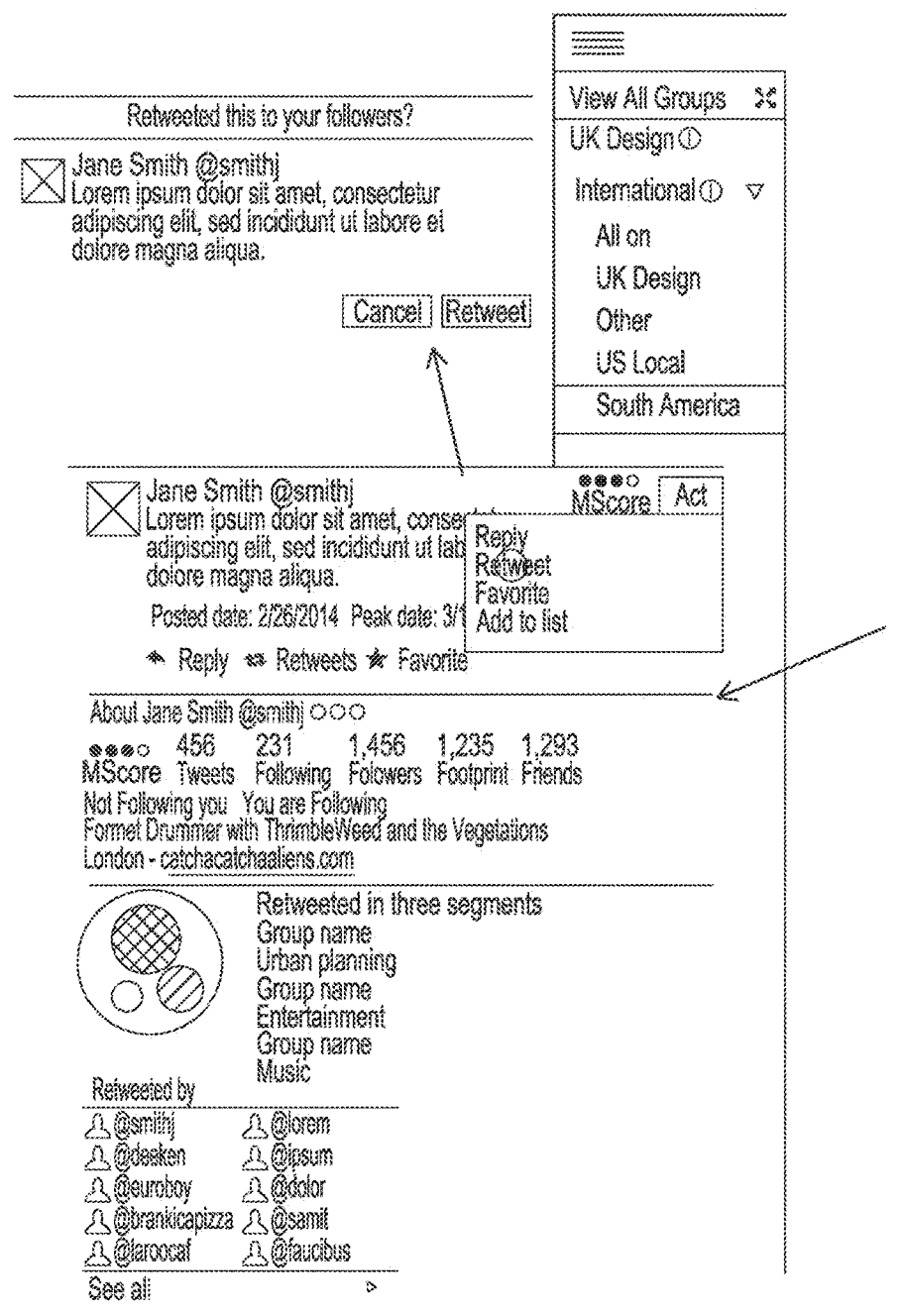
Figure 32B:
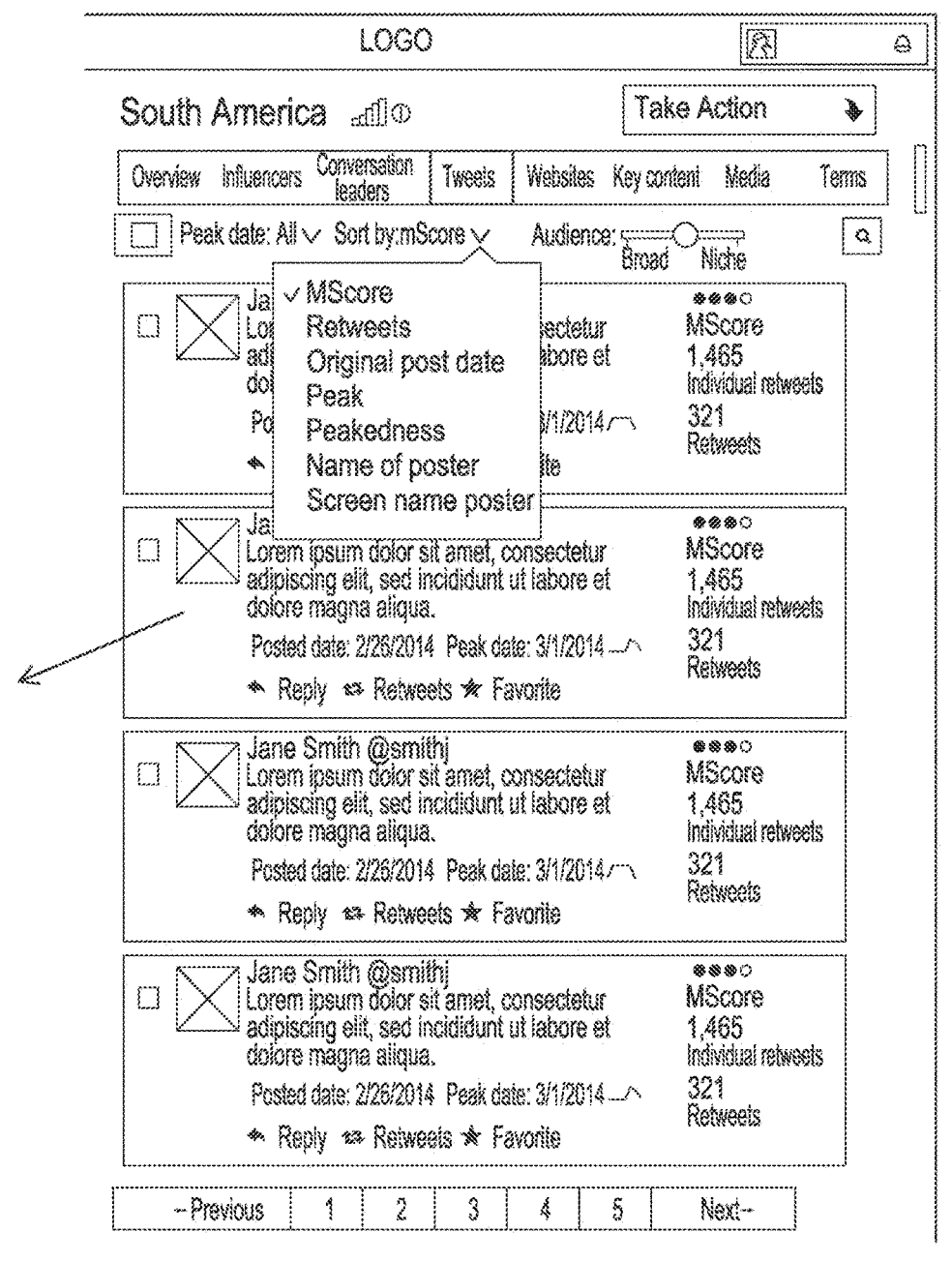

Referring now to FIGS. 32, 32A, and 32B, a tweets tab is displayed. The tweets may be filtered by peak date such as all, today, past week, past month, custom date range, and the like. The tweets may be filtered by M score, re-tweets, original postdate, peak, peakedness, name of poster, screen name of poster, and the like. One way to filter by M score is by use of a slider to obtain an audience that is more niche or broader, as described elsewhere herein. Data regarding each displayed may include an M score the number of influential re-tweets, the number of retweet, the posted date, the peak date, a graphic of the peak pattern, icons with which to take action such as reply/retweet/favorite, name, screen name, and the like. Selecting one of the tweets may cause a drill down box to appear with additional information about the individual/entity who made the tweet, such as M score, number of tweets, number of followers, number following, footprint, number of friends, follower/following status, demographic data, URL, which segments the individual/entity is retweeting in, who have they been retweeted by, icons to social media profiles, icons with which to take actions such as reply/re-tweet/favorite/add to list, and the like.

Figure 33:
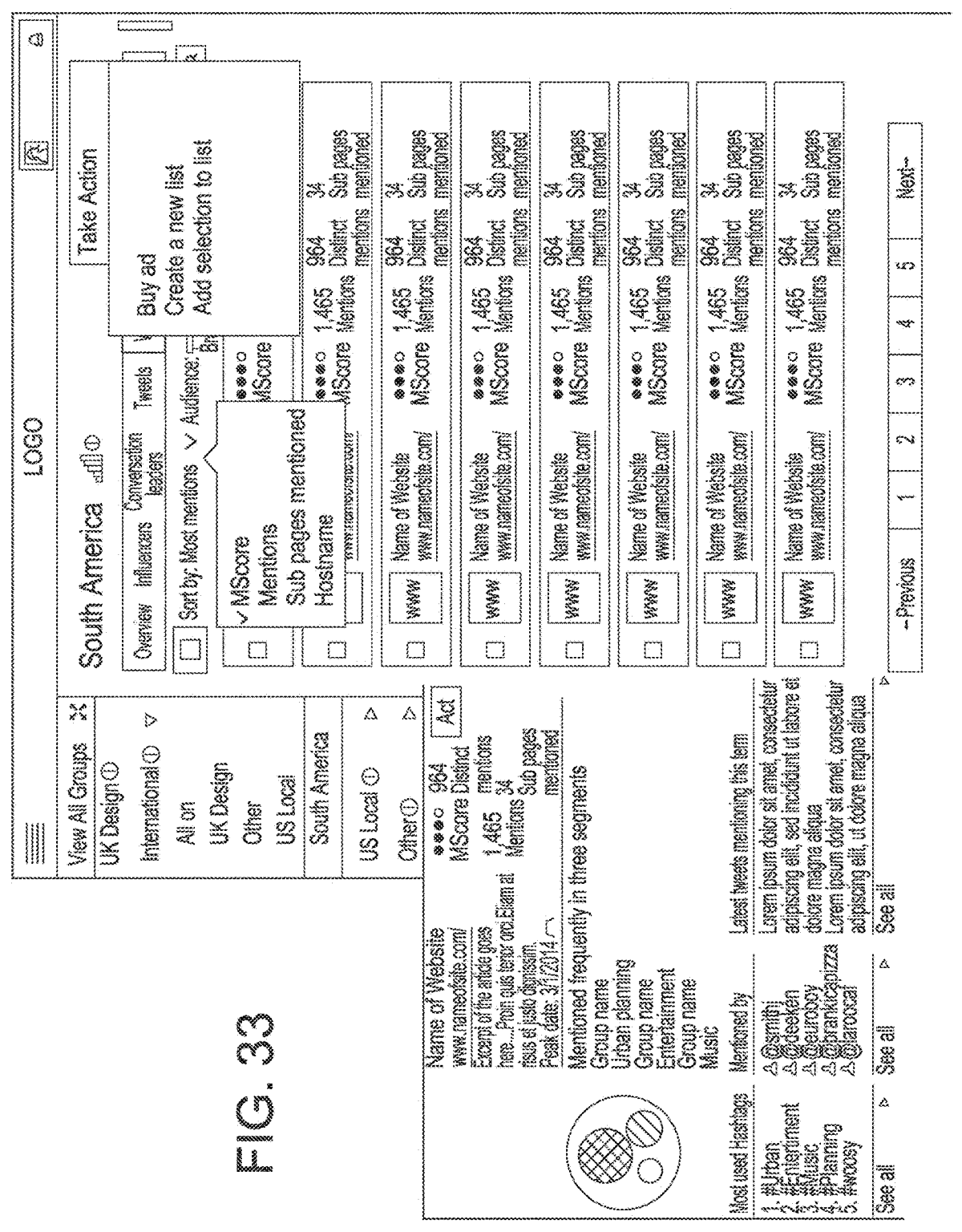

Referring now to FIG. 33, a websites tab is displayed. The websites can be sorted by mentions, M score, subpages mentioned, hostname, and the like. One way to filter the websites by M score is by use of a slider to obtain an audience that is more niche or broader, as described elsewhere herein. Users may take action from this page such as to buy an ad, create a new list, add a selection to a list, and the like. Selecting a website reveals a drill down box for the website. Information about the website in the drill down box may include M score, distinct mentions, mentions, subpages mentioned, excerpt, peak date, a graphic of the peak pattern, segments/clusters the website is mentioned in, who mentioned the website, latest tweets mentioning this URL, a button to take action, and the like.

Figure 34:
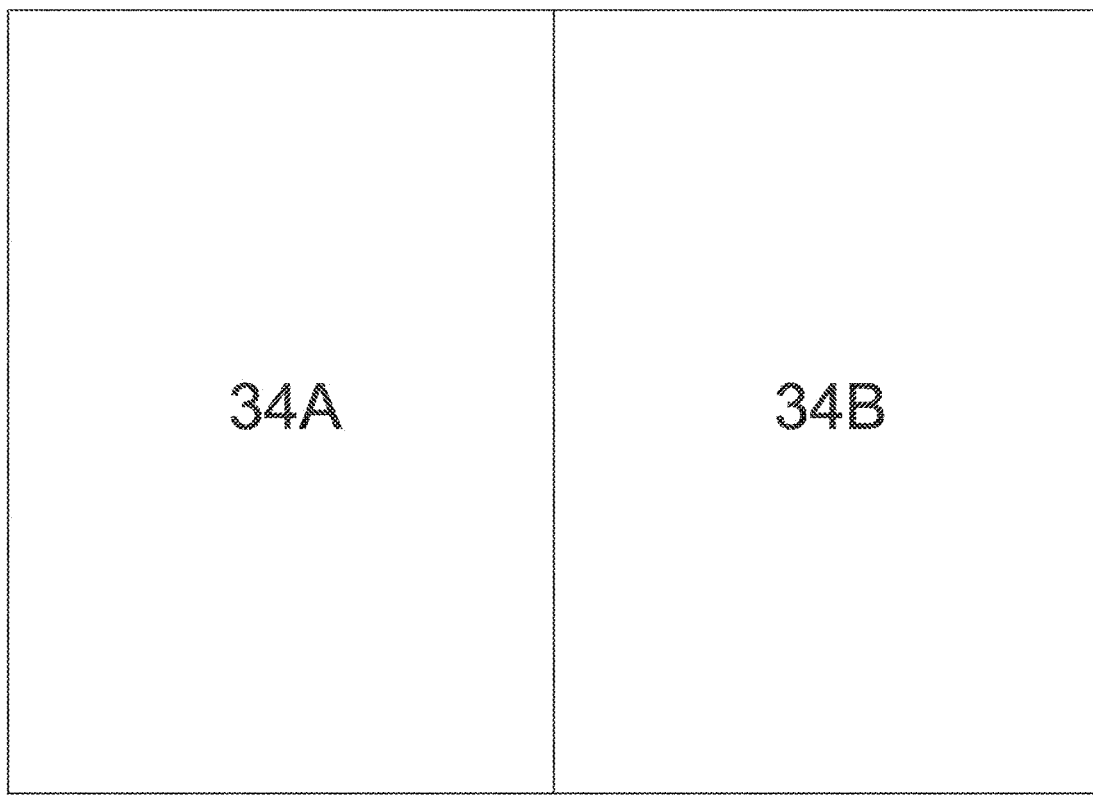
Figure 34A:
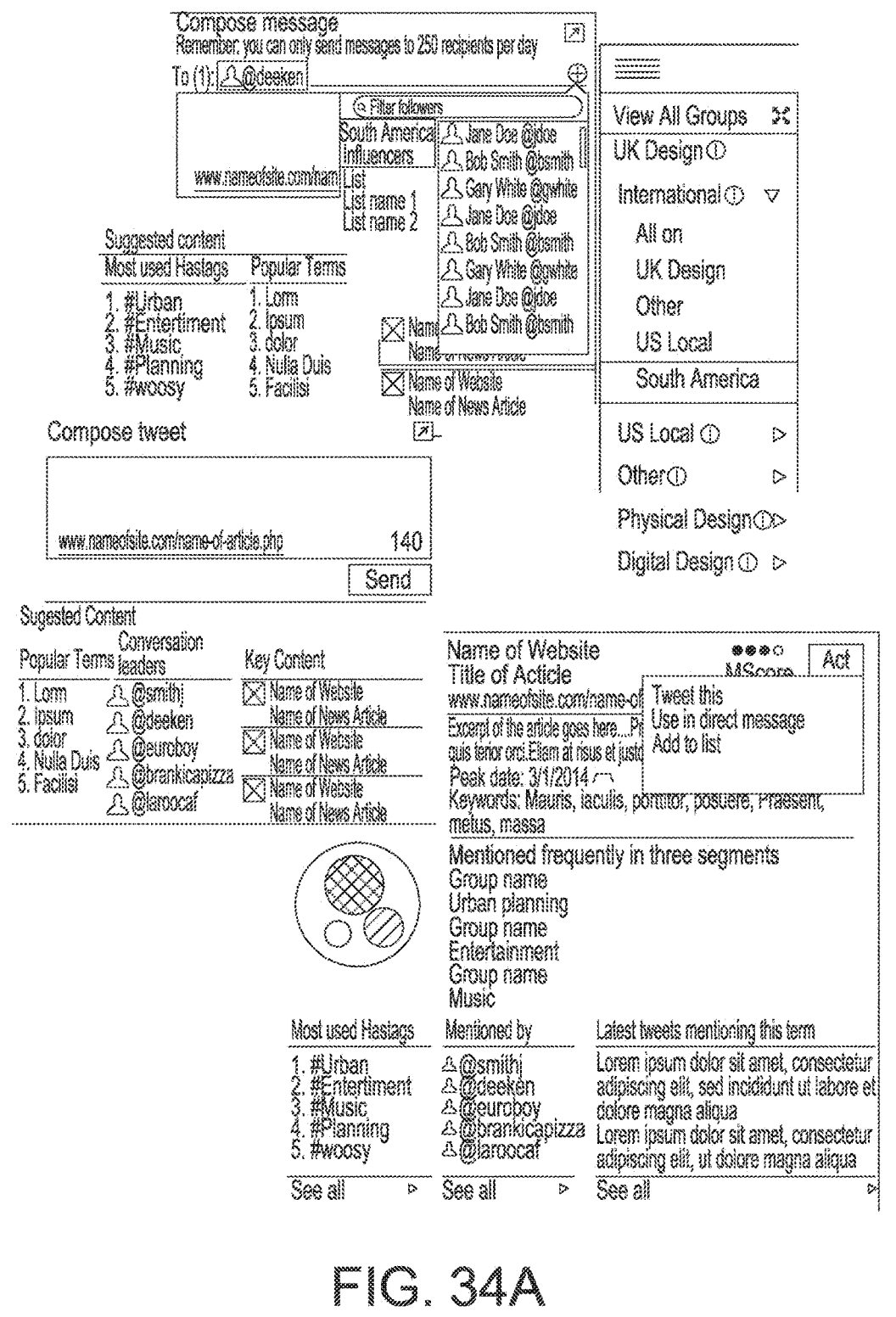
Figure 34B:

Referring now to FIG. 34, 34A, 34B, a tab for key content may be displayed. Information about the key content included in this view includes the name of the website, name of an article, URL, peak date, a peak pattern, M score, citations, distinct citations, and the like. The key content may be sorted by M score, citations, peak, peakedness, host name, content title and the like. One way to filter by M score is by use of a slider to obtain an audience that is more niche or broader, as described elsewhere herein. The key content may be filtered by peak date such as all, today, past week, past month, custom date range, and the like. Users may take action from this page such as to compose a message, compose a tweet, view a drill down box for the key content, and the like. In the compose message or compose Tweet view, users may be able to select one or more individuals/entities or and influencers/conversation leaders to message with suggested content (most used hashtags, popular terms, key content, etc.). In one embodiment, the individuals/entities may be part of a list such that either certain members of the list or the entire list may be easily included as recipients of the message. Selecting a key content reveals a drill down box for the content. Information about the content in the drill down box may include name of website, title of article, M score, distinct mentions, mentions, subpages mentioned, excerpt, peak date, a graphic of the peak pattern, segments/clusters the content is mentioned in, who mentioned the content, latest tweets mentioning this URL, most used hashtags, a button to take action (tweet this, use in direct message, add list, etc.), and the like.

Figure 35:
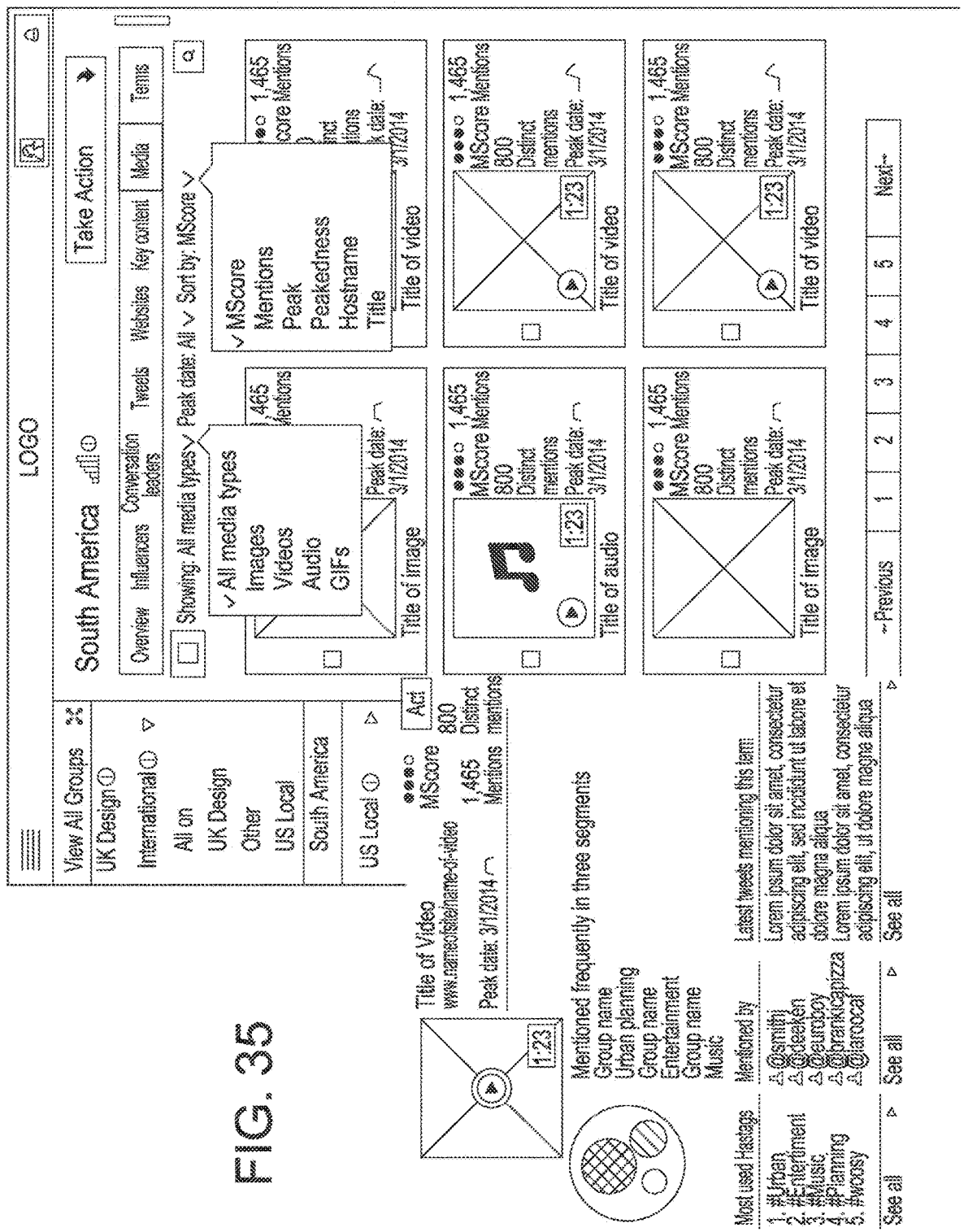
FIG. 35 depicts a media page for a social media map platform.

Referring now to FIG. 35, a media tab is displayed. Media may be filtered by images, videos, audio, GIFs, and the like. The media may be filtered by peak date such as all, today, past week, past month, custom date range, and the like. The media may be sorted by M score, citations, peak, peakedness, host name, content title and the like. Information about the media in this view may include title, duration, media type, M score, mentions, distinct mentions, peak date, peak pattern, and the like. By selecting one of the media items, a drill down box may appear. Information in the drill down box may include title of media, URL, M score, mentions, distinct mentions, peak date, peak pattern, media type, duration, what segments/clusters the media is mentioned in, most used hashtags, who has mentioned the media, latest tweets mentioning this media, an icon to take action with, and the like.

Figure 36:
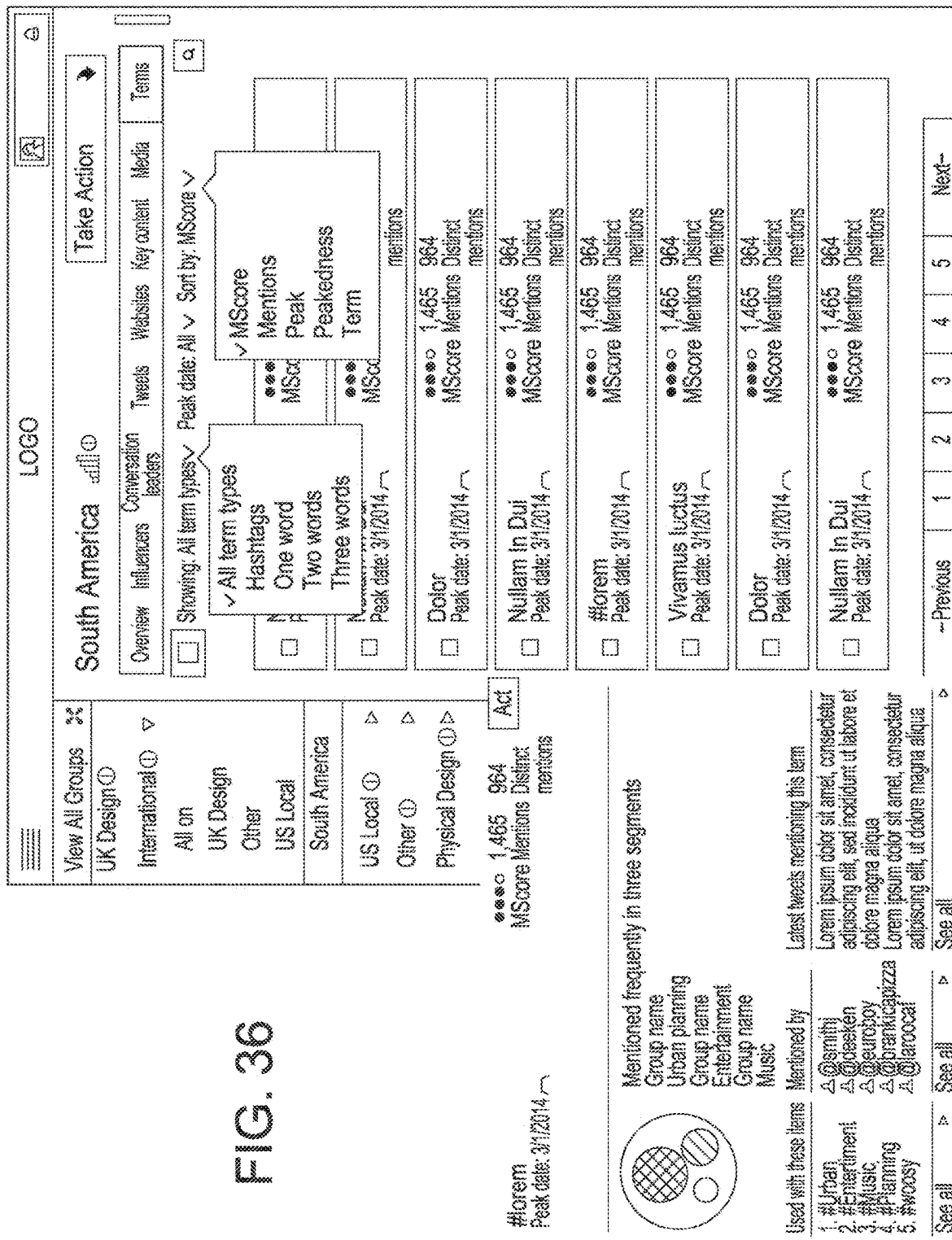
FIG. 36 depicts a terms page for a social media map platform.

Referring to FIG. 36, a tab for terms is displayed. The terms may be filtered by hash tags, one word, 2 words, 3 words, and the like. The terms may be filtered by peak date such as all, today, past week, past month, custom date range, and the like. The terms may be sorted by M score, citations, peak, peakedness, host name, content title and the like. Information about terms in the list may include the term, peak date, peak pattern, M score, mentions, distinct mentions, and the like. Selecting a term may reveal a drill down box where additional information about the term may be displayed including which segments/clusters the term has been mentioned in frequently, what other terms have been mentioned with the selected term, who has mentioned the term, latest tweets mentioning this term, an icon to take action with, and the like.

Figure 37:
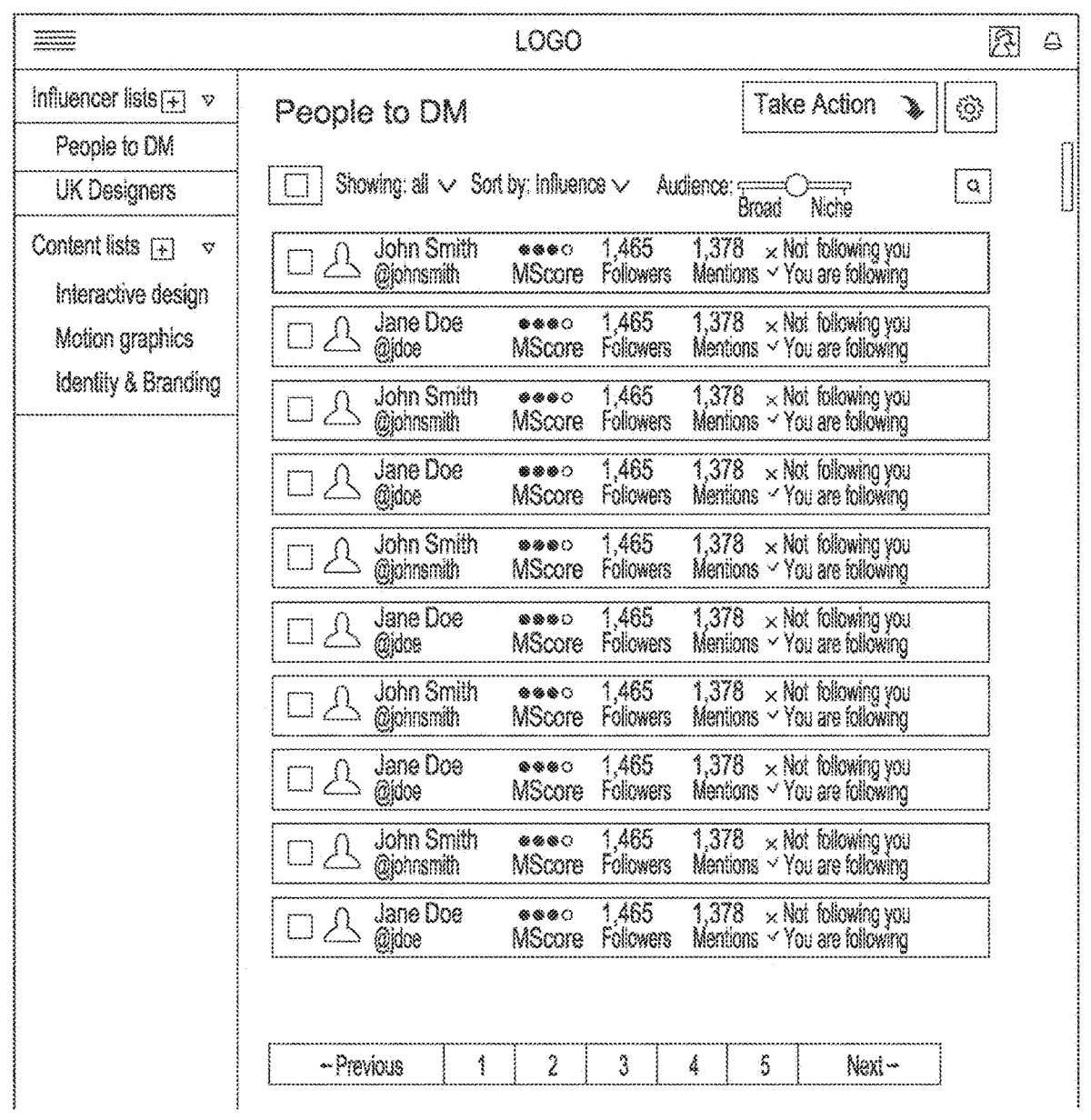

Referring now to FIG. 37, a list page of a social media map platform is displayed. In this view, information may be provided in the form of lists, such as lists of influencers, conversation leaders, key content, terms, and the like. Information about each list member may include name, screen name, M score, followers, mentions, follower/following status, and the like. Lists may be sorted/filtered by any of the techniques mentioned herein including by influence, M score (such as with a slider or other user input), and the like. Users may take action from the list view.

In further embodiments, an analytical framework for a coordinated campaign identification includes proposing a framework for analyzing fabricated social movements. In many embodiments, not only is there the ability to distinguish these movements from truly organic ones, there is also the ability to create a formal method for studying patterns of fabricated, pseudo-grassroots (also, "astroturf") collective action.

It will be appreciated in light of the disclosure that any such collective action may be required to give the impression of a large group of people coalescing around a movement that is easy to describe and share with others. If the group is not well-connected enough, then it may be logistically difficult for any actor to organize the group's online behavior. If the group is not acting in temporal lockstep, then its message may not achieve a high frequency. In embodiments, low-frequency messages do not appear as global trends; for example, Twitter's "trending" algorithm appears to identify topics that are popular now, rather than topics that have been popular for a while or on a daily basis, to help you discover the hottest emerging topics of discussion on Twitter™. The many examples remain applicable to the myriad social platforms. Finally, if the group behind a fabricated social movement does not promote it with a coherent message, the movement's impact on the general public may be blunted by conflicting information.

It will be appreciated in light of the disclosure that these constraints suggest a natural set of three dimensions for analyzing fabricated social movements: 1.) the semantic dimension (how messages are formulated), 2.) the network dimension (how accounts within the campaigns are connected to one another), and 3.) the temporal dimension (when messages spread throughout the campaign). In many embodiments, these dimensions, and their intersections, yield discrete signals that can be used to scrutinize social media operations and assess if they display a suspicious degree of hidden coordination.

In embodiments, the framework operates on three levels: 1.) Event, the level of an entire social campaign; 2.) Segment, the level of a community of users participating in a social media campaign (e.g., Russian social media troll accounts), and 3.) Actor, the level of an individual user participating in a social media campaign.

Table 1 below shows examples of the three-dimensional analysis framework in more detail specifically, the signals relevant for particular combinations of level and dimension. It will be appreciated in light of the disclosure that not every combination of level and dimension has corresponding relevant signals.

TABLE 1

Three-Dimensional Analysis Framework

|  | Network | Temporal | Semantic |
|---|---|---|---|
| Network | Event: How concentrated is online participation in the movement? Does it cover a broad range of politically/socially/culturally distinct communities, or is it contained in a homogeneous "echo chamber"? Segment: Do communities of actors who participate in the movement pay disproportionate attention to each other? Actor: Do actors who participate in the movement do so in conjunction with their communities, or independently of them? | Segment: How does participation in the movement vary between different communities and over time? Are particular communities always lagging behind the rest in participation (taking time to formulate a response)? Actor: How long does the average actor participate in the movement? | Segment: How topically diverse is all discourse among communities participating in the movement? |
| Temporal |  | Event: Does participation in the movement follow an unusually temporally regular pattern, when compared to spontaneous human posting behavior? Segment: do communities of actors coordinate their activities, even across time zones? Actor: Do some actors behave similarly to pre-identified troll or spambot accounts with regard to their temporal posting patterns? | Event/Segment/Actor: How does the diversity of the discourse among all participants/specific communities/individual actors participating in the movement vary over time? |
| Semantic |  |  | Event/Actor: How topically diverse is the discourse around the movement among all actors/individual actors? |

This framework is a helpful methodological tool, but it would not be useful without operational definitions, which are captured via mathematical metrics of campaign activity. In embodiments, each signal in Table 1 above is mapped to a discrete metric in Table 2. Further detail regarding key definitions for understanding these metrics, and any non-obvious activity metrics are provided herein.

TABLE 2

Mapping of Signals to Metrics

| Table 1 Row | Table 1 Column | Table 1 Level | Metric |
|---|---|---|---|
| Network | Network | Event | Entropy E |
| Network | Network | Segment | Inter-community homophily H |
| Network | Network | Actor | % of actor's community participating in campaign, by number of individuals or total posts |
| Network | Temporal | Segment | Time delta between peak date of campaign participation by segment |
| Network | Temporal | Actor | Commitment by actor M |
| Network | Semantic | Segment | Semantic Diversity by Segment Omega $\Omega_S$ |
| Temporal | Temporal | Event | Campaign Peakedness P |
| Temporal | Temporal | Segment | Dynamic Time Warp alignment between Segments DS |
| Temporal | Temporal | Actor | Dynamic Time Warp alignment between Users DU |
| Temporal | Semantic | Event/Segment/Actor | Semantic Diversity over time by Event/Segment/Actor $\Omega_{TE}$, $\Omega_{TS}$, $\Omega_{TA}$ |
| Semantic | Semantic | Event/Segment/Actor | Semantic Diversity by Event/Actor $\Omega_E$, $\Omega_A$ |

Key Definitions

Network

In many embodiments, the network dimension assumes that actors participating in a campaign are connected to each other in a directed network G (i.e., a connection from user a to user b does not imply the reverse). Twitter™ following networks are an example of directed networks: many people follow Twitter™ celebrities, but those celebrities do not follow their fans back as a general rule. Other social media platforms and connected platforms are applicable.

Segment

When calculating metrics at the network level, it is assumed that each actor participating in a campaign belongs to exactly one community c, where c represents a group of actors with similar interests, whether social, political, or otherwise.

Identifying Networks and Communities

In order to identify relevant networks and communities within those networks, network segmentation technologies are leveraged such as hierarchical agglomerative clustering. In many examples, it may be shown that network segmentation framework, based on hierarchical agglomerative clustering has been tested on more than eight hundred different sociocultural contexts with many academic applications. By way of many examples, the unit of analysis is a "map," which may be a collection of key social media accounts around a particular social context. A map may be composed of "nodes," which are the social media accounts in question. Each node may be connected to one or more nodes in the map through "edges" and edges may represent social relationships embedded in the respective social media platform (e.g., "following" for Twitter™, Facebook™, or the like).

In embodiments, each node in the map may belong to exactly one "segment" and one "group." By way of these examples, a segment may be a collection of nodes with a shared pattern of interests (e.g., a collection of Twitter™ accounts who all follow US Tea Party politicians). Each segment may have a label (e.g., "Tea Party"). A group may be a collection of segments with similar interest profiles (e.g., a collection of "Tea Party," "Constitutional Conservatives," etc. segments into a "Conservative" group). The process for generating segments, groups, labels, and colors for a map be fully or partially automated, as follows: a proprietary clustering algorithm may automatically generate segments and groups for a map; subsequently, the map-making process may use supervised machine learning to generate labels for segments and groups from human-labeled examples. At the end of the automated process, a Subject Matter Expert, an individual well-versed in the topic and/or geographical area covered by the map, may perform a quality assurance check on the segment and group labels.

Key Metrics Explained

To illustrate metrics in this section, a toy campaign example may be employed. The example consists of 100 users connected in a network G. The network G further breaks down into exactly two communities A and B, each with exactly one half of the total population. The overall number of connections from members of A to any other actor in the network is 500, while the number of connections from members of A to members of B is 200. The campaign proceeds over the course of ten days, and the first of those days features the highest level of campaign activity, with exactly one quarter of all actors participating.

Entropy E

This metric is the degree to which a particular campaign is concentrated in one community versus diffused among many different communities. Given a mapping of users to Communities, which is described in more detail below, the entropy of a campaign may be, as known in the art, the information theoretic entropy of the distribution of users active in the campaign among different communities. In the toy example, the Entropy of the campaign may be:

$$E = -\sum_{i=1}^{|c|} p(c(i)) \log_b(c(i)) = -0.5 \log_2 (0.5) - 0.5 \log_2 (0.5) = 1$$

In general, it may be shown that low values of E represent campaigns concentrated in one community, while high values of E represent campaigns distributed among a wide array of communities.

Inter-Community Homophily H

It is known in the art that the inter-community Homophily H is the degree to which communities active around the campaign are more interconnected than one would expect by random chance. Mathematically, H is calculated for an ordered pair of communities A, B. The quantity H(A, B) is the ratio of the actual number of connections from members of A to members of B, E(A,B), to a normalizing factor ρ that assumes that members of A make their connections to all other nodes at random. In the random baseline, the number of connections from members of A to members of B is the number of all connections from members of A to any other node in the network G, multiplied by the fraction of G that B represents. In the toy example, the Homophily from community A to community B is:

$$H(A, B) = \frac{E(A, B)}{\rho} = \frac{200}{500 * 0.5} = 0.8$$

Values of H below 1.0 may be shown to represent heterophily, or lower-than-expected interconnectivity between communities. Values of H equal to 1.0 may be shown to represent the baseline random expectation. Values of H above 1.0 may be shown to represent homophily, or higher-than-expected interconnectivity.

H is superlinear, so a value of H=4.0 is much more than twice as interconnected as H=2.0.

While the random baseline for Homophily is established in the citation above, it will be appreciated in light of the disclosure that it may be an excessively low baseline for such empirical analyses. Therefore, when possible, H values are used for community pairs where there may be expected low/high values (e.g., ideologically separate/ideologically aligned communities) in the same networked terrain as the case study as a baseline.

Commitment M

Commitment to a particular campaign is measured in two ways: 1.) $M_E$, the number of subsequent engagements with the campaign by an actor; or 2.) $M_T$, the length of time between first and last recorded engagement with the campaign by an actor.

Semantic Diversity Ω

Semantic diversity of a particular actor's/segments/campaign's messaging is based on the assignment of messages to topics. As known in the art, LDA is a common method for identifying topics in text data. Once messages have been assigned to topics, a semantic diversity score may be calculated for the message set. The authors of the referenced work may represent their measure of semantic diversity as the probability that two documents chosen from the corpus at random with replacement will be on the same topic. By way of these examples, the corpus may be the message set, and the documents may be user Tweet histories, post histories, etc. aggregated by user. In many examples, the LDA algorithm may run for 15 iterations, with a number of topics no less than 20% of the number of documents and no more than 30 iterations and may average semantic diversity over 20 distinct runs of the LDA algorithm on the same corpus to smooth out variations due to the initial conditions for a particular run. For topics that do not co-occur in documents, a topic may be assigned a distance score of 1000.

In embodiments, versions of Ω are run for individual users ($\Omega_A$), communities ($\Omega_C$), or entire campaigns ($\Omega_E$). These metrics can also be run for all messages within a particular time period ($\Omega_{T*}$) to calculate the change in semantic diversity over time.

Semantic diversity scores of less than one may represent users who exclusively post about the same topic, characteristic of fabricated campaigns. Semantic diversity scores between 1 and 100 may represent users who post on a variety of topics, characteristic of normal human activity. Finally, semantic diversity scores above 100 may represent users who post on an extremely diverse set of topics, characteristic of spambots or users who bridge different cultural and/or linguistic communities (e.g., users who post in different languages, etc.)

Campaign Peakedness P

Campaign Peakedness may be defined as the fraction of all activity that occurs in the day with the most campaign-related activity during some time frame. In the toy example, P=¼=0.25.

Dynamic Time Warp Alignment D*

The Dynamic Time Warp is an algorithm known in the art for comparing two temporal sequences of activity. In the many embodiments, the Dynamic Time Warp may be used to compare the activities of individual users (DU) or entire segments (DS). In general, the Dynamic Time Warp between two sequences S1 and S2 is the number of warping transformations that are required to change S1 into S2. In many examples, Dynamic Time Warp may be used to identify bots and trolls in a different social media setting.

In many examples, this framework and these metrics on eighteen case studies of political campaigns have been tested in seven different sociocultural settings, spanning three continents and six years in all. These studies included ten groups of Twitter™ hashtags linked by subject matter experts (SME) to known coordinated campaigns, and eight groups of Twitter™ hashtags linked by SMEs to known spontaneous campaigns. Based on the eighteen case studies, it may be shown that clear differences between coordinated and spontaneous campaigns across sociocultural setting and time for four of the metrics listed above: Entropy H, Commitment by subsequent engagements $M_E$, Time delta, and Peakedness P. The same analysis also showed that at least one especially coordinated campaign showed extremely low values of Semantic Diversity by Event $\Omega_E$ and high Dynamic Time Warp alignment DS between the activity of different segments.

In further embodiments, methods and systems are disclosed for identifying markers of coordinated activity in social media movements that may identify a large number of accounts that may be controlled by a small number of coordinated entities that may result in a measurable lack of diversity of a similar number of accounts controlled by uncoordinated individual actors. To facilitate the methods and systems of identifying markers of coordinated activity in social media movements, a framework of signals (or metrics) along at least three dimensions may be constructed and may include, without limitation:

A Network dimension that may, for example, represent how accounts are connected;

A Temporal dimension that may represent, for example, patterns of messaging across time; and A Semantic dimension that may represent, for example, diversity of topics and meaning.

From this framework, a plurality of hypotheses may be derived for "signals" exploring potentially hidden coordination on social media movements on a social media channel such as Twitter™, Facebook™ or the like. The exploring potentially hidden coordination on social media movements on a social media channel may occur at the level of the entire campaign (e.g., nine signals), a cluster level of the campaign (e.g., a set of well interwoven accounts), at the individual account level, and the like. In embodiments, the plurality of hypotheses may include twenty-five or more such hypotheses. Empirical evidence associated with these signals can be shown across a number of case studies of known coordinated (i.e., inorganic, centrally-controlled) and spontaneous (i.e., organic, individually) campaigns. In embodiments, three of the campaign signals may systematically reveal coordination in social media movements on Twitter™, Facebook™ and other platforms. Some signals, either at the cluster or at the individual account level, may facilitate campaign analysis, and some of them may be transformed into campaign-level signals.

Campaign/Cluster/User—Each campaign may include a set of "seeds" from a specified timeframe that may be, for example, a hashtag, a sentence shared in posts, a URL shared in posts, or the like. In embodiments, clusters may be communities of users active within the campaign. In embodiments, users may be defined by their individual accounts, defined by their Twitter™ handle, Facebook™ identification defined by their user name on other social media platforms, or the like.

Network Terrain—Campaigns may occur in a specific context referred to as the "network terrain." In one example, it will be appreciated in the light of the disclosure that the #BlackLivesMatter movement may be better analyzed within its "network terrain," which displays the US political conversation on Twitter™, Facebook™ or other relevant social media platforms. In a representative model, social media platforms like Twitter™, Facebook™ may constitute a cyber-social "network terrain" formed by the relationships (such as following in Twitter™, Facebook™, or the like among actors. The structure of the network or social media platform may determine who and what may be visible to whom, and thus it may be the social landscape on which the struggle for influence may occur. The methods and systems may include analyzing case study campaigns across specific network terrain maps in order to understand the relationships between participants and the patterns of campaign propagation across specific online communities (e.g., clusters or clusters discovered using machine learning analysis of network relationships and the like).

Campaign versus Investigatory Signals—Signals measured at the cluster and individual actor (user) levels may facilitate investigating the inner workings of specific campaigns, building a more qualitative understanding of how these campaigns unfolded, and helping form campaign level metrics among other things.

Case Studies—To date, the methods and systems may include testing signals set on a set of case studies and exemplary campaigns.

Signal Summary

Exemplary Investigatory Signals—The investigatory signals may operate at the cluster or at the individual level. The investigatory signals may facilitate building a qualitative understanding of the dynamics of a campaign and may provide tools to build campaign-level signals. [C] indicates a signal operating at the cluster level, and [U] indicates a signal is operating at the user level.

The following are exemplary priority signals:

Concentration in Lead Cluster [C];
Concentration via Entropy [C];
Day—peakedness [C];

Temporal coordination per cluster [C];
Temporal coordination per user [U];
Client diversity per cluster [C]; and
Time delta between clusters [C].
Other signals include:
Commitment by user [U];
Commitment by cluster [C];
Account creation date diversity for cluster [C];
Homophily [C];
Language mismatch [C];
Russian language profile % [C];
% in cluster also active [C];
% of hits in own cluster [C];
Account creation date diversity [C];
Semantic diversity by user for user Tweets™ (or other postings) [U];
Semantic diversity by time slice by cluster [C]; and
Semantic diversity by time slice by user [U].

In embodiments, a priority signal name is Concentration in Lead Cluster.

The concentration in lead cluster signal description—Large-scale spontaneous campaigns may be more likely to engage participants from a range of different clusters, whereas coordinated campaigns are typically highly concentrated in a specific cluster of the network or social media platform. The concentration in lead cluster signal (metric) evaluates the degree to which an entire campaign's activity is concentrated in a particular cluster of participants. The concentration in lead cluster signal (metric) may measure by the fraction of all campaign participants who are members of the most campaign-active cluster in the network terrain map.

The range of score value range of the concentration in lead cluster signal (metric) is zero to 100%. In embodiments, the concentration in lead cluster signal (metric) value is computed by determining the value of the concentration of the fraction of a campaign's participants that are members of the most active community in the campaign. In an example including a 3-community map, if 50 participants are from community A, 25 from community B, and 25 from community C, then the value of the concentration in lead cluster signal (metric) for the campaign on this map equals 50%. In embodiments, possible values of the concentration in lead cluster signal (or metric) may be between 0 (i.e., not concentrated) and 100% (i.e., fully concentrated in 1 cluster).

The concentration in lead cluster signal (or metric) may be consistent across a set of campaigns, which may cover a variety of geographies and dates. It will be appreciated in light of the disclosure that coordinated campaigns, on average, may be shown to have larger values of the concentration in lead cluster signal (or metric) than those of spontaneous campaigns. It will also be appreciated in light of the disclosure that there may be some overlap between the coordinated and spontaneous ranges due at least in part to a large number of sociocultural settings and time periods in the data sets.

An exemplary average value of the concentration in lead cluster signal for coordinated campaigns is 48%.

An exemplary range of values of the concentration in lead cluster signal score for coordinated campaigns is 20% to 89%. The range here is the full range between the lowest value and the highest value for this category in the campaign.

An exemplary value of the standard deviation of the concentration in lead cluster signal for coordinated campaigns is 0.21.

An exemplary average value of the concentration in lead cluster signal for spontaneous (organic) campaigns is 22%.

An exemplary range of values of the concentration in lead cluster signal score for spontaneous campaigns is 9% to 50%.

An exemplary value of the standard deviation of the concentration in lead cluster signal for spontaneous campaigns is 0.12.

In embodiments, the performance of the concentration in lead cluster signal (metric) may be sensitive to the specific terrain map being used because the signal (metric) may be less successful if the terrain map used only captures the active participants in a campaign. The concentration in lead cluster signal (metric) may be more successful when capturing the broader terrain in which the campaign under scrutiny unfolds.

The methods and systems described herein also include computing the value of the concentration in lead cluster signal (or metric) using actions rather than users and may measure what proportion of the total actions (Tweets™ or the like) in the campaign that came from the most active community. This approach can be shown to be reliable because heavy posters (those who Tweet™ or the like) may create skews in the measurements.

In embodiments, a priority signal name is Concentration via Entropy.

The concentration via entropy signal description—The concentration via entropy signal is another approach to measuring concentration that looks at how the participants are distributed among the active communities in the campaign rather than simply looking at how many of them belong to the most prevalent community. The concentration via entropy signal (metric) may be shown to be a useful signal for knowing if more than one community is driving a coordinated campaign, which could be missed relying on the concentration in lead cluster signal (metric) alone. The concentration via entropy signal (metric) may calculate the concentration of distribution among all clusters. In embodiments, coordinated campaigns generally tend to have values of the concentration via entropy signal (metric) that are less than 2.0.

The concentration via entropy signal value range—Relatively higher values of the concentration via entropy signal (metric) reflect more even distributions of participants between the communities active in the campaign. The lowest score is zero (all participants belong to the same community). The highest score depends on the number of communities active in the map. Because the highest number of communities in an exemplary case study map may be 50, the highest entropy value in this example would be four (assuming a perfectly even distribution of participants amongst the 50 communities).

How the concentration via entropy signal is computed—The concentration via entropy signal (metric) may be an entropy of the distribution of participants among communities. In an example with a two-community map, the value of the Concentration via Entropy signal would be 1.0 when 50 participants are from community A, 50 participants are from community B, and thus the distribution would be 0.5, 0.5.

Exemplary formula for the concentration via entropy signal (metric):

$$E = -\sum_{i=1}^{|c|} p(c(i)) \log_b(c(i))$$

In the formula, c (i) is the count of participants in the ith cluster and p(c(i)) is the fraction of all participants coming from the ith cluster.

In embodiments, the concentration via entropy signal (metric) is based on a logarithmic scale, so a small difference in entropy belies a large difference in the unevenness of the underlying distribution. It will be appreciated in light of the disclosure that a very rough rule of thumb is that a difference of one point in the value of the concentration via entropy signal may be equivalent a change in concentration by a factor of three, so a campaign with the concentration via entropy signal equal to two is three times more concentrated in a few clusters than a campaign with the concentration via entropy signal that is equal to three.

Analysis in case studies—The concentration via entropy signal (metric) can be shown to be consistent across campaigns despite the variety of geographies and dates. It will be appreciated in light of the disclosure that coordinated campaigns, on average, have a lower concentration via entropy signal.

An exemplary average value of the concentration via entropy signal for coordinated campaigns is 1.43.

An exemplary average range of values of the concentration via entropy signal for coordinated campaigns is 0.46 to 2.19.

An exemplary standard deviation of the value of the concentration via entropy signal for coordinated campaigns is 0.57.

An exemplary average value of the concentration via entropy signal for spontaneous campaigns is 2.52.

An exemplary average range of values of the concentration via entropy signal for spontaneous campaigns is 0.69-3.38.

An exemplary standard deviation of the value of the concentration via entropy signal for spontaneous campaigns is 0.71.

In embodiments, the concentration via entropy signal (metric) may be useful to analyze "battleground campaigns" where a few clusters fight for control over the social media narrative, e.g., on a dedicated hashtag, where these campaigns may be concentrated in these few communities and simply using a measure focused on the lead community may miss this activity.

In embodiments, a priority signal name is DayPeakedness.

The daypeakedness signal description—A coordinated campaign, typically, may exhibit sustained activity by the accounts promoting it. Spontaneous activity, in contrast, is characterized by "bursty" cascades of activity. In embodiments, the daypeakedness signal may detail the percentage of all activity that the busiest day of the campaign may represent.

The daypeakedness signal (metric) of a campaign is measured as the percentage of campaign actions (Tweets™ or the like) that take place on the most active day of the campaign. It will be appreciated in light of the disclosure that generally spontaneous campaigns appear to be more "bursty" because, for example, spontaneous campaigns exhibit more of a peak (or more of a number of peaks) than coordinated campaigns.

In embodiments, the range of the values of the daypeakedness signal (metric) is 0% to 100%.

In embodiments, the value of the daypeakedness signal (metric) is computed by determining the fraction of all activity that occurs on the day with the most campaign-related activity. Examples include a campaign that proceeds over the course of ten days, and the first of those days features the highest level of campaign activity, with one-quarter of all actors participating. In this example, the value of the daypeakedness signal (metric) is 25%.

It will be appreciated in light of the disclosure that one-eighth of all activity in coordinated campaigns, on average, happens during peak day, whereas over one-third of all activity for spontaneous campaigns happens during peak day. In embodiments, the daypeakedness signal (metric) can be shown to be consistent across campaigns despite the variety of geographies and dates. By way of this example, coordinated campaigns, on average, may have a lower value of the daypeakedness signal (metric) than spontaneous campaigns. It will be appreciated in light of the disclosure that there may be some overlap between the coordinated and spontaneous ranges due to the large number of sociocultural settings and time periods in the campaign.

An exemplary average value of the daypeakedness signal for coordinated campaigns is 0.14.

An exemplary range of values of the daypeakedness signal for coordinated campaigns is 0.08 to 0.22.

An exemplary standard deviation of the value of the daypeakedness signal for coordinated campaigns is 0.05.

An exemplary average value of the daypeakedness signal for spontaneous campaigns is 0.41

An exemplary average range of values of the daypeakedness signal for spontaneous campaigns is 0 to 0.71.

An exemplary standard deviation of the value of the daypeakedness signal for spontaneous campaigns is 0.21.

The daypeakedness signal (metric) may be sensitive to date-boundary/time-zones most notably when the campaign is being analyzed only over the last few days. In embodiments, the sensitivity of the daypeakedness signal (metric) may be improved by allowing it to be less sensitive to time zones.

It will be appreciated in light of the disclosure that there are other possibly more complex ways to calculate the value of the daypeakedness signal. In embodiments, the peak time may be identified as the median of time stamps of a dynamic phenomenon to be able to observe a logarithmic distribution of volume around the peak. The methods and systems described herein may identify peaks as days when volume exceeds two standard deviations above the median, and may calculate the value of the daypeakedness signal as a fraction of all content that occurred during a 24-hour period. It will be appreciated in light of the disclosure that the median volume may be used instead of mean volume due in part to the observation that volume follows a skewed distribution, so the mean may not be an appropriate statistic to use to characterize it. The measure of peakedness in the methods and systems described herein may be relatively less sophisticated and, therefore, may be easier to interpret while giving a good initial impression of the utility of the signal from a social media platform for identifying coordinated campaigns.

In embodiments, the value of the daypeakedness signal (metric) may be affected by the overall time range of a campaign. By way of this example, if a campaign lasts three days, then the value of the daypeakedness signal may not go below 33% but if the campaign lasts 10 days, then the value of the daypeakedness signal cannot go below 10%. In embodiments, campaigns may last as little as one week and may last as long as several months. The value of the daypeakedness signal may be shown to follow the pattern described in the campaign value examples across these time ranges.

In embodiments, a signal name is Commitment: Average Posts Count in the Campaign.

The commitment: average posts count in campaign signal description-Campaigns typically feature numerous die-hard supporters who post repeatedly and fewer casual participants who merely chime in. This commitment: average posts count in campaign signal (metric) may capture the degree to which a campaign's body of actors sticks with further posting after their first engagement with the social media platform. In embodiments, the value of the commitment: average posts count in campaign signal (metric) can include the average number of campaign-related posts that participants publish after their first campaign post.

The range of values of the commitment: average posts count in campaign signal (metric) is bounded by the lowest value being zero which corresponds to a user only posting once about the campaign. In embodiments, the commitment: average posts count in campaign signal (metric) may have a range of values between 0 and 10 posts. It will be appreciated in light of the disclosure that the maximum value of the commitment: average posts count in campaign signal (metric) could be much higher. In one example, participants in a campaign may be very dedicated and may post 100 times about a certain subject during the scope of analysis, and the like.

To compute the value of the commitment: average posts count in campaign signal (metric), the methods and systems disclosed herein determine the average number of subsequent participation actions, e.g., Tweets™ (or other posting) with campaign hashtag, across all participants in a campaign. In embodiments, participants (i.e., posters) in a campaign can be a smaller subset of participants in a map. In embodiments, the map may capture some of their followers and/or other members of the network terrain when those are highly connected to active participants in the campaign. In order to compute the commitment: average posts count in campaign signal (metric), only participants who actually posted about the campaign are taken into account. For example, when a participant posted through Twitter™, Facebook™, or the like with a campaign-related hashtag twice, their commitment is 1.0. In embodiments, campaign participation can include Tweets™ or the like with campaign-related hashtags (for campaigns organized around a hashtag), Tweets™ or the like with links to a video or article (for campaigns organized around a video or article), retweets of the above tweets and the like. Examples of out of scope for participation include favorites of tweets with campaign-related hashtags or links or @-replies or @-mentions of Tweets™ (or the like) with campaign-related hashtags or links.

It will be appreciated in light of the disclosure that participants in spontaneous campaigns post more about their campaigns than participants in coordinated campaigns. It will also be appreciated in light of the disclosure that this pattern may be counterintuitive, as one may expect participants in coordinated campaigns to be extrinsically motivated to hit certain participation targets (e.g., by being paid by number of posts) and thus to post more than participants in spontaneous campaigns, who lack such motivation.

An exemplary average value of the commitment: average posts count in campaign signal (metric) for coordinated campaigns is 2.52.

An exemplary average range of values of the commitment: average posts count in campaign signal (metric) for coordinated campaigns is 1.28 to 3.40.

An exemplary standard deviation of the value of the commitment: average posts count in campaign signal (metric) for coordinated campaigns is 0.84.

An exemplary average value of the commitment: average posts count in campaign signal (metric) for spontaneous campaigns is 3.53.

An exemplary average range of values of the commitment: average posts count in campaign signal (metric) for spontaneous campaigns is 1.39 to 6.07.

An exemplary standard deviation of the value of the commitment: average posts count in campaign signal (metric) for spontaneous campaigns is 1.48.

In embodiments, the commitment: average posts count in campaign signal (metric) can be analyzed at the community level, at a cluster level, and a participant level. The commitment: average posts count in campaign signal (metric) can be analyzed at the community level to single out communities with participants being particularly committed to a campaign. The commitment: average posts count in campaign signal (metric) can be analyzed at the participant level to represent individuals who have extremely high commitment values, e.g., posting about a campaign one hundred times.

In embodiments, the commitment: average posts count in campaign signal (metric) is focused on participations after the first post and complemented by a measurement of the proportion of participants in the campaign who have only participated once.

In embodiments, the commitment: average posts count in campaign signal (metric) may be combined with a commitment: average time range of participation signal (metric) into a commitment: post regularity signal (metric) that may capture the deviation of campaign participants from natural human attention patterns.

In embodiments, other statistical properties of the distribution of posts per user may be part of refining the commitment metrics. In embodiments, there may be a natural shape of this distribution for spontaneous campaigns and that natural shape may be skewed. It will be appreciated in light of the disclosure that the commitment: average posts count in campaign signal (metric) may make average post count an inappropriate metric in many long duration situations. Instead, it may be possible to be able to identify coordinated campaigns by a lack of skewness and/or the presence of a second moment at some value above one, which may both be indicative of an unusually large percentage of participants posting multiple times about a campaign, e.g., due to a coordinating body paying these participants per post.

In embodiments, the commitment: average posts count in campaign signal (metric) may be normalized to take into account average posts per users in order to control for users with a very heavy activity across all campaigns.

In embodiments, a priority signal name is Commitment: Average Time Range of Participation.

The commitment: average time range of participation signal description—In the desire to determine whether participants in this campaign are die-hard supporters or just people who chime in, the commitment: average time range of participation signal (metric) may be used to facilitate looking at how long (in days) participants remained engaged in pushing the campaign. In embodiments, the loyalty of participants to the campaign may be measured by time range (in days) for their campaign-related Tweets™ (or other postings) that may be averaged across all participants.

The range of the values of the commitment: average time range of participation signal (metric) is an unbounded value and therefore can be zero days to the total length of the campaign.

In embodiments, the commitment: average time range of participation signal (metric) may look at the time frame between first and last participation action that can be averaged across all participants in a campaign. By way of this example, the commitment: average time range of participation signal (metric) may measure whether actors participate in a "one-off" way (one Tweet™ and done) or demonstrate a commitment to the campaign (multiple Tweets™ or other postings over time).

It will be appreciated in light of the disclosure that participants in coordinated campaigns engage with the campaign over a longer period than participants in spontaneous campaigns. It will also be appreciated in light of the disclosure that participants in coordinated campaigns may be more likely than participants in spontaneous campaigns to receive extrinsic motivation, such as payment, for engaging with the campaign and, as such, the extrinsic motivation may lead to a longer engagement period than intrinsic motivation.

An exemplary average value of the commitment: average time range of participation signal (metric) for coordinated campaigns is 7.24.

An exemplary average range of values of the commitment: average time range of participation signal (metric) signal for coordinated campaigns is 0.08 to 22.33 days.

An exemplary standard deviation of the value of the commitment: average time range of participation signal (metric) for coordinated campaigns is 9.04 days.

An exemplary average value of the commitment: average time range of participation signal (metric) for spontaneous campaigns is 1.53 days.

An exemplary average range of values of the commitment: average time range of participation signal (metric) for spontaneous campaigns is 0 to 3.36 days.

An exemplary standard deviation of the value of the commitment: average time range of participation signal (metric) for spontaneous campaigns is 1.23 days.

It will be appreciated in light of the disclosure that the commitment: average time range of participation signal (metric) may be affected by the overall time range of a campaign, e.g., if a campaign lasts three days, then this metric cannot go above a value of three. In embodiments, the commitment: average time range of participation signal (metric) may be combined into a commitment: post regularity signal that may capture the deviation of campaign participants from natural human attention patterns.

In embodiments, a signal name is Semantic Diversity for all Messages.

The semantic diversity for all messages signal (metric) description—The semantic diversity for all messages signal (metric) looks to detail how generally on-message is the campaign. The semantic diversity for all messages signal (metric) also looks to determine whether the interaction or activity appears like a diverse conversation covering a range of topics and expressions or may be a fairly uniform campaign with low semantic diversity. It will be appreciated in light of the disclosure that people tend to Tweet™ (or otherwise post) on a variety of topics related to their daily lives, work, and interests. A group trying to promote a coordinated campaign, however, may be interested only in the narrow range of topics relevant to that campaign. In embodiments, bots or propaganda accounts may also be interested in any Tweet™ (or applicable posting) relevant to any campaign they are trying to push, and therefore could be Tweeting™ (or otherwise posting) on an extremely wide range of topics. In embodiments, the semantic diversity for all messages signal (metric) may be measuring the extent to which participants in the campaign are Tweeting™ (or otherwise posting) on an intermediate range of topics, which suggests that their activities are spontaneous and human rather than automated or coordinated to propagate a specific message.

In embodiments, the range of values of the semantic diversity for all messages signal (metric) is zero to 100%.

In embodiments, raw values of the semantic diversity for all messages signal (metric) fall into three categories: (i) When the value of the semantic diversity for all messages signal (metric) is <1 (less than one), then it may represent users who exclusively post about the same topic, which may be a characteristic of fabricated campaigns. (ii) When the value of the semantic diversity for all messages signal (metric) is between one and 100, then it may represent users who post on a variety of topics and being characteristic of normal human activity. (iii) When the value of the semantic diversity for all messages signal (metric) is above 100, then it may represent users who post on an extremely diverse set of topics, characteristic of spambots or users who bridge different cultural and/or linguistic communities (e.g., users who post in different languages, etc.). In embodiments, the semantic diversity for all messages signal (metric) may be set to be bounded at 1000 because it may be necessary to fix a maximum value for the "distance" between any pair of topics, for which no document includes terms from both topics. It will be appreciated in light of the disclosure that mathematically the distance should be infinity but, typically, it can be to set the value to 1000. The percentage of users with the semantic diversity for all messages signal (metric) may be greater than or equal to 1.0 and less than 100 and thus varies between zero and 100%.

How the semantic diversity for all messages signal (metric) is computed—The value of the semantic diversity for all messages signal (metric) of a particular actor's (or cluster's, or campaign's) messaging may be based on the assignment of messages to topics. In embodiments, the computation of the semantic diversity for all messages signal (metric) may use a Latent Dirichlet Allocation algorithm. By way of this example, once messages have been assigned to topics, the semantic diversity for all messages signal (metric) is determined for the message set. In embodiments, the measure of the value of the semantic diversity for all messages signal (metric) is determined as the probability that two documents chosen from the corpus at random with replacement will be on the same topic.

In the current exemplary case, the corpus is the message set, and the documents may be user Tweet™ (or other posting) histories, aggregated by user. The Latent Dirichlet Allocation (LDA) algorithm may be run for fifteen iterations with a number of topics no less than 20% of the number of documents and no more than 30%. An average value of the semantic diversity for all messages signal (metric) over twenty distinct runs of the LDA algorithm is used on the same corpus to smooth out variations due to the initial conditions for a particular run. In embodiments, a topic distance score of 1000 may be assigned to the semantic diversity for all messages signal (metric) for topics that do not co-occur in documents.

Because the focus of the many embodiments is differentiating coordinated and/or automated campaigns from spontaneous and human-driven campaigns, the semantic diversity for all messages signal (metric) as the percentage of all users in a campaign is computed with raw diversity score falling into the range of normal human activity, i.e., the metric being greater or equal to 1.0 but less than 100. In embodiments, the semantic diversity for all messages signal (metric) may refer to all campaign-related messages.

The values below show the percentage of users with the semantic diversity for all messages signal (metric) greater than or equal to 1.0 and less than 100.0.

An exemplary average value of the semantic diversity for all messages signal (metric) for coordinated campaigns is 55%.

An exemplary average range of values of the semantic diversity for all messages signal (metric) for coordinated campaigns is 17% to 90%.

An exemplary standard deviation of the value of the semantic diversity for all messages signal (metric) for coordinated campaigns is 36.59%.

An exemplary average value of the semantic diversity for all messages signal (metric) for spontaneous campaigns is 71.3%.

An exemplary average range of values of the semantic diversity for all messages signal (metric) for spontaneous campaigns is 50% to 98%.

An exemplary standard deviation of the value of the semantic diversity for all messages signal (metric) for spontaneous campaigns is 21.2%.

In embodiments, the semantic diversity for all messages signal (metric) may be very sensitive to confounds. By way of this example, news organizations may tend to have low semantic diversity because news organizations may post the same story headlines over and over even though such news organizations are not coordinated actors. Moreover, Tweets™ (or other postings) in one language tend to be more coordinated than Tweets™ (or other postings) in multiple languages, because the Latent Dirichlet Allocation (LDA) algorithm may not translate terms across languages.

At the same time, the semantic diversity for all messages signal (metric) may point to the differentiation between natural language use and the use of language to push a particular message. It will be appreciated in light of the disclosure that coordination around a message may require that that message may be as clear and simple as possible, whereas natural language can be complex, metaphorical, and even slightly confusing. To that end, coordinated campaigns may, therefore, not wish to increase the semantic diversity of their messages even if the technical or organizational opportunity was available.

In embodiments, the semantic diversity for all messages signal (metric) includes separating language diversity from semantic diversity either by grouping Tweets™ (or other postings) by post language prior to analysis or using automated machine translation to pre-convert all Tweets™ (or other postings) to the same language. The semantic diversity for all messages signal (metric) also includes leveraging existing natural language processing approaches to identify certain kinds of low-semantic diversity language that may not be of interest, e.g., news headlines and press releases.

In embodiments, the semantic diversity for all messages signal (metric) may measure the temporal alignment of campaign-related Tweets™ (or other postings) for all participants. It will be appreciated in light of the disclosure that users generally do not time their Tweets™ (or other postings) to coincide with the Tweets™ (or postings) of others. When the Tweet™ (or other posting) histories of campaign participants follow the same pattern of ebb and flow, especially across time zone boundaries, this may be evidence that an actor is coordinating the activities of participants to create a concentrated temporal burst of engagement. The semantic diversity for all messages signal (metric) may include temporal coordination of Tweets™ (or other postings) between campaign participants measured by alignment of Tweet™ (or other posting) histories across all participants in the campaign.

In embodiments, the range of the values of the semantic diversity for all messages signal (metric) is between 0% and 100% and represents the percent alignment of two users' temporal normalized sequences of participation in the campaign. Toward that end, 0% alignment may mean that the users' sequences do not match at all, while 100% alignment may indicate a perfect match.

In embodiments, the semantic diversity for all messages signal (metric) may be computed with a dynamic time warp algorithm for comparing two temporal sequences of activity. In general, the dynamic time warp algorithm between two sequences S1 and S2 is the number of warping transformations that are required to change S1 into S2. The methods and systems described herein may, for example, use the dynamic time warp algorithm to identify bots and trolls in a different social media setting. The number of warping transformations may be normalized by the length of both sequences S1 and S2 and multiplied by 100 to get a percent value. Finally, the normalized number may be subtracted from 100 in order to calculate the percent alignment of S1 and S2.

In embodiments, a priority signal name is temporal coordination per cluster.

The temporal coordination per cluster signal (metric) description—The temporal coordination per cluster signal (metric) may look at the communities who participate in this campaign to identify different communities exhibiting very similar patterns of engagement that may be considered as being odd. In embodiments, the pattern of the temporal coordination per cluster signal (metric) may be even odder when postings exist in different time zones. The temporal coordination per cluster signal (metric) is measuring the temporal alignment of campaign-related Tweets™ (or other postings) aggregated at the cluster level. With that in mind, communities generally do not time their Tweets™ (or other postings) to coincide with the Tweets™ (or other postings) of other communities. When the Tweet™ (or other posting) histories of participating clusters follow the same pattern of ebb and flow, especially across time zone boundaries, this may be evidence that an actor is coordinating the activities of participants to create a concentrated temporal burst of engagement.

The range of values for the temporal coordination per cluster signal (metric) is zero percent to 100%. The value of the temporal coordination per cluster signal (metric) represents the percent alignment of two users' temporal normalized sequences of participation in the campaign. Toward that end, 0% alignment may mean that the users' sequences do not match at all, while 100% alignment indicates a perfect match.

The temporal coordination per cluster signal (metric) description—The temporal coordination per cluster signal (metric) is a per-user take on examining temporal coordination, which might be helpful when other metrics are noisy. Temporal coordination per user is technically the temporal coordination between pairs of users. In embodiments, the temporal coordination per cluster signal (metric) may measure the temporal alignment of campaign-related Tweets™ (or other postings) between individual campaign participants. As noted before, users generally do not time their Tweets™ (or other postings) to coincide with the tweets of others. When the Tweet™ (or other posting) histories of campaign participants follow the same pattern of ebb and flow, especially across time zone boundaries, this may be evidence that an actor is coordinating the activities of participants to create a concentrated temporal burst of engagement.

The temporal coordination per cluster signal (metric), especially its heatmap visualization, may provide a good high-level description of the rate of unusual coordination across the users participating in a campaign. The temporal coordination per cluster signal (metric), however, may suffer from the same overestimation of actual temporal coordination so the algorithm may be adjustable for including in the calculation the average temporal coordination across users.

In embodiments, a signal name is client diversity per cluster.

The client diversity per cluster signal (metric) description—The client diversity per cluster signal (metric) may determine how accounts in a given cluster use Twitter™, Facebook™, or other social media platforms. The client diversity per cluster signal (metric) may also determine how Twitter™ users (or other posters or various relevant platforms) go through a mobile device, a computer, or directly access APIs of Twitter™ to Tweet™ (or other social media postings). In one example, some clients may be used to coordinated Tweets™ (or other social media postings) and the client diversity per cluster signal (metric) may be used to determine how coordinate are the Tweets™ (or other social media postings), and are such coordinating Tweets™ (or other social media postings) those that are used heavily in some of the communities who participate in this campaign. It will be appreciated in light of the disclosure that client diversity per cluster signal (metric) is the same as the client diversity at campaign scale signal (metric) but analyzed at the cluster level.

There is no specific range of values applicable to the client diversity per cluster signal (metric) because it is a qualitative signal (metric)

The value of the client diversity per cluster signal (metric) is computed by using the "source" field of the Tweet™ (or other posting) to identify the client used to make the Tweet™ (or other posting), as in the Client diversity at campaign scale signal (metric). Then the Tweets™ (or other postings) are aggregated into clusters of the author of the Tweet™ (or other posting) in the campaign map.

In embodiments, a signal name is Time Delta between Communities.

The time delta between communities signal (metric) description—the time delta between communities signal (metric) may identify a community that is engaging with the campaign significantly ahead of others. In one example, this is due to kick-starting that campaign or being significantly behind maybe because there is a need to coordinate talking points before engaging. It will be appreciated in light of the disclosure that the time delta between communities signal (metric) was inspired by qualitative analysis initially done in the Syrian Civil War context such that communities pretending to portray civilians while being led by military intelligence engaged with popular topics with a lag of several hours to days. Toward that end, the time delta between communities signal (metric) may examine when clusters are most active in the campaign. By way of this example, the time delta between communities signal (metric) may measure the distance between a given cluster's peak and the more general peak of the overall campaign.

In embodiments, the range of values of the time delta between communities signal (metric) represents a number of days. Negative values may indicate that a community's peak of temporal activity happens before the average peak date for all other communities. Positive values may indicate the peak happens after the average peak date for all other communities. A score of zero may indicate a community peaking in sync with the rest of the communities.

How the time delta between communities signal (metric) is computed—This metric measures the number of days between the peak date of campaign participation in a given cluster and peak date of campaign participation averaged across all other clusters. In one example with three clusters, where activity in cluster A peaks on 25 Jan. 2017, activity in cluster B peaks on 26 Jan. 2017, and activity in cluster C peaks on 27 Jan. 2017, the value of the time delta between communities signal (metric) for A equals −1.5, the value of the time delta between communities signal (metric) for B equals zero, and the value of the time delta between communities signal (metric) for C equals 1.5.

In embodiments, the time delta between communities signal (metric) may be helpful to analyze disputed hashtags, with both spontaneous and coordinated clusters engaging in the same campaign. In embodiments, the time delta between communities signal (metric) may point to the natural logistical cost of coordinating a message of a campaign in response to a sudden event, such as a late-breaking news story. It will be appreciated in light of the disclosure that even the most sophisticated coordinated campaigns cannot anticipate such events and at the same time, they cannot respond to these events spontaneously as it may distract from their message and may hurt the overall aim of the campaign. It will also be appreciated in light of the disclosure that all coordinated campaigns will need at least a little time to respond to late-breaking events, and their responses will measurably lag behind spontaneous human reactions to the same. In embodiments, the time delta between communities signal (metric) may include automatic identification of sudden events as they happen, e.g., by matching campaign-related terms against Google™ News, other news sources, and the like. A subsequent step may be to automatically track responses to the same events from campaign compared to non-campaign-related clusters.

In embodiments, a signal name is Commitment by User.

The commitment by user signal (metric) description-Loyalty of participants to the campaign may be measured by the number of times the participants Tweet™ (or otherwise post) about the campaign and time range (in days) for their campaign-related Tweets™ (or other postings). The commitment by user signal (metric) may be measured by the user. In embodiments, the commitment by user signal (metric) looks at whether individual users are particularly committed to a campaign. In embodiments, the commitment by user signal (metric) may facilitate looking at users and their own commitments by determining whether there are, for example, people who Tweet™ (or otherwise post) exactly 100 times, or some predictable predetermined amount. The value of the commitment by user signal (metric) may facilitate identifying and singling out accounts that might be incentivized to participate x number of times or for x days straight.

The range of values of the commitment by user signal (metric) are unbounded values starting at zero, i.e., no subsequent actions, zero days pass between first and last action. In embodiments, values for the commitment by user signal (metric) by subsequent actions are between zero and ten actions, those for commitment by time frame are between zero and thirty days.

In embodiments, there may be users whose commitment by user signal (metric) is extremely high and such behavior may also contribute to higher values associated with the Commitment: average time range of participation signal (metric) noted above.

In embodiments, a signal name is Commitment by Cluster.

The commitment by cluster signal (metric) description—The commitment by cluster signal (metric) may be used to determine whether a specific cluster is particularly committed to a campaign. In embodiments, the commitment by cluster signal (metric) may facilitate looking at clusters and their own commitments. By way of this example, the commitment by cluster signal (metric) may facilitate the determination of whether there are clusters that Tweet™ (or otherwise post) exactly 100 times. In embodiments, the commitment by cluster signal (metric) may be used to single out clusters that might be incentivized to participate a certain number of times or for a certain length of time. In one example, the commitment by cluster signal (metric) may be used to determine whether a group of accounts showed up, Tweeted™ (or otherwise posted) 100 times over five days, and then left.

In embodiments, the commitment by cluster signal (metric) may look at the loyalty of participants to the campaign that may be measured by the number of times the participants Tweet™ (or otherwise post) about the campaign and time range (in days) for their campaign-related Tweets™ (or other postings). In embodiments, the commitment by cluster signal (metric) may measure the degree to which a body of actors in the campaign stick with it after their first engagement with the campaign. It will be appreciated in light of the disclosure that the value of the commitment by cluster signal (metric) for most human activity is a skewed distribution in measurable contrast to coordinated activity that may include those who participate once with a few die-hard supporters that participate a lot. Deviations from the skewed distribution detailing human activity may, therefore, may reveal coordination. By way of this example, if an actor participates in a campaign exactly 100 times, this may suggest that they were incentivized by a coordinating body to meet that threshold.

The range of the values of the commitment by cluster signal (metric) are unbounded values starting at zero, i.e., no subsequent actions, zero days pass between first and last action. In embodiments, the value of the commitment by cluster signal (metric) by subsequent actions is between zero and ten actions. In further embodiments, the value of the commitment by cluster signal (metric) by time frame is between zero and thirty days.

How the value of the commitment by cluster signal (metric) is computed—There are two commitment metrics: (i) counting the number of subsequent participation "actions" (i.e., Tweets™ or other postings with a campaign hashtag), and (ii) the time frame (in days, can be fractional) between first and last participation action. Both metrics may be averaged across all participants in a campaign. Both metrics may measure whether actors participate in a "one-off" way (i.e., one Tweet™ or other posting and done) or may demonstrate a commitment to the campaign (e.g., multiple Tweets™ or other postings over time).

In embodiments, a signal name is Account Creation Date Diversity for Cluster.

The account creation date diversity for cluster signal (metric) description—this signal (metric) may facilitate observing how close in time all accounts participating in a campaign were created. If 90% of participating accounts within a given cluster were created within a span of five days, for example, then such activity may indicate a heavy coordination within that cluster. The account creation date diversity for cluster signal (metric) may be particularly helpful to spot bots, troll farms, and the like on networks using fake accounts generated in bulk.

The range of values of the account creation date diversity for cluster signal (metric) is zero to 4,015 days. It will be appreciated in light of the disclosure that the maximum range may range from zero to the total day since the founding of Twitter™ or the other applicable social media platforms. The values of the account creation date diversity for cluster signal (metric) in datasets evaluated have included a range of zero to 1,200 days.

How the account creation date diversity for cluster signal (metric) is computed-Account creation date diversity for a particular cluster and campaign combination is the standard deviation (in days) of Twitter™ (or other applicable social media platform) account creation dates for all accounts in that cluster who engaged with the campaign in question. As a baseline, embodiments may compare account creation date diversity for a particular cluster to account creation date diversity for the entire campaign.

In embodiments, a signal name is Homophily.

The homophily signal (metric) description—This signal (metric) may facilitate looking for communities that pay a "disproportionate" amount of attention to one another, for instance across ideologies, language, culture, or the like. In embodiments, the homophily signal (metric) can identify disproportionate attention relationships between clusters measured by a number of following relationships between clusters. When looking at communities (clusters), it will be appreciated in light of the disclosure that it is just as important to understand who the community pays attention to as who is in the community. With this in mind, the homophily signal (metric) may measure deviations from expected patterns of attention in social media. By way of this example, it will be appreciated in light of the disclosure that most people may pay most of their attention to like-minded friends and the vast majority of people may pay most of their attention to friends in the same cultural and linguistic environment or in their affinity. In further examples, the homophily signal (metric) may facilitate the identification of patterns of intense inter-attention across ideologies, culture, and language that may imply evidence for coordination.

The range of values of the homophily signal (metric) can be shown to be zero to ten.

How the homophily signal (metric) is computed—The homophily signal (metric) as a telltale of cluster attention is a ratio of the actual number of edges connecting members of the clusters compared to what would be expected under conditions where each cluster paid attention to every other cluster strictly in proportion to the cluster's size. Typically, the baseline for such a signal (metric) in is random connection patterns. In embodiments, the homophily signal (metric) includes relatively more aggressive baselines because no actual human relationships follow a random pattern.

In embodiments, a signal name is Language Mismatch.

The language mismatch signal (metric) description—The default language for a new Twitter™ (or other social media) account appears to be English. Users may, however, choose to change their profile language if they want. It will be appreciated in light of the disclosure that users posting frequently in a language that differs from their default Twitter™ (or other social media) profile language may be part of a foreign-language propaganda operation on behalf of some coordinated entity.

The language mismatch signal (metric) may measure the percentage of a campaign's Tweets™ (or other postings)—at both the cluster and campaign level—that is in a language that differs from the users' default Twitter™ (or other social media) profile language.

The range of values of the language mismatch signal (metric) is zero to one hundred percent, where one hundred percent would have indicated that all campaign participation actions in this cluster/campaign are Tweeted™ (or otherwise posted) in a language different from their accounts' default profile language.

How the language mismatch signal (metric) is computed—For each Tweet™ (or other posting) with the campaign-related hashtag, the language mismatch signal (metric) may identify the language of the Tweet™ (or other posting) and the language profile setting in the Twitter™ API or the API of another social media platform. In embodiments, the language mismatch signal (metric) may also aggregate the Tweets™ (or other postings) by the cluster of the author of the Tweet™ (or other posting) in a campaign map. By way of this example, the % of Tweets™ (or other postings) for each cluster whose tweet language did not match the poster language of the Tweet™ (or other posting) may be reported.

In various embodiments, the monitor of contagious activity may also permit users to pick out targets that are especially relevant to a particular map of social activity and network connections over time. In doing so, the monitor of contagious activity may obtain contagion scores for targets that are especially relevant or of significant focus selected in a dedicated map. The monitor of contagious activity may determine the value of a metric descriptive of a comparison between the focus of the dedicated map of the given targets and their relative usage relative to overall usage by the targets in other maps accessible to the monitor of contagious activity. Put another way, the metric is descriptive of how much more attention does the dedicated map pay to the target, compared to the attention the target is getting from all other maps. With this metric, the contagion monitor can rank targets in the dedicated map and select for highest map-focus. In embodiments, the monitor of contagious activity can be configured to provide multiple maps at a time and automatically rank targets in each map independently. From there, the monitor of contagious activity may assist users in collecting map-specific insights from multiple maps at once.

Platform

In example embodiments, a computing platform 3800 comprising one or more computing systems may be configured to perform any of the techniques described herein. The platform may be configured to perform any of the attentive clustering techniques described herein, may be configured to perform any of the stance detection techniques described herein, may be configured to perform content-based clustering (e.g., single network or cross-network), may be configured to perform knowledge graph generating and embedding, may be configured to perform any of the analysis techniques described herein, etc. In example embodiments, the computing platform 3800 may perform various techniques using the same or different sets of data. For example, the computing platform 3800 may collect a set of social media data, generate various networks/graphs using the social media data, perform various clustering techniques, perform stance detection on some or all of the social media data, and/or the like. Additionally or alternatively, the platform may perform various techniques described herein on different sets of data. For example, the platform may perform one or more attentive clustering techniques on a first set of social media data, may perform stance detection on a second set of social media data, and in a like fashion may perform any of the techniques described herein on other sets of social media data.

In example embodiments, the computing platform 3800 may be configured to perform any or all of the techniques described herein in parallel and/or at different times. For example, the platform may be configured to perform attentive clustering techniques described herein in parallel with knowledge-graph-embedding based clustering or any other of the techniques described herein. As another example, the stance detection techniques described herein may be used to characterize the various clusters generated using any of the clustering techniques.

Figure 38:
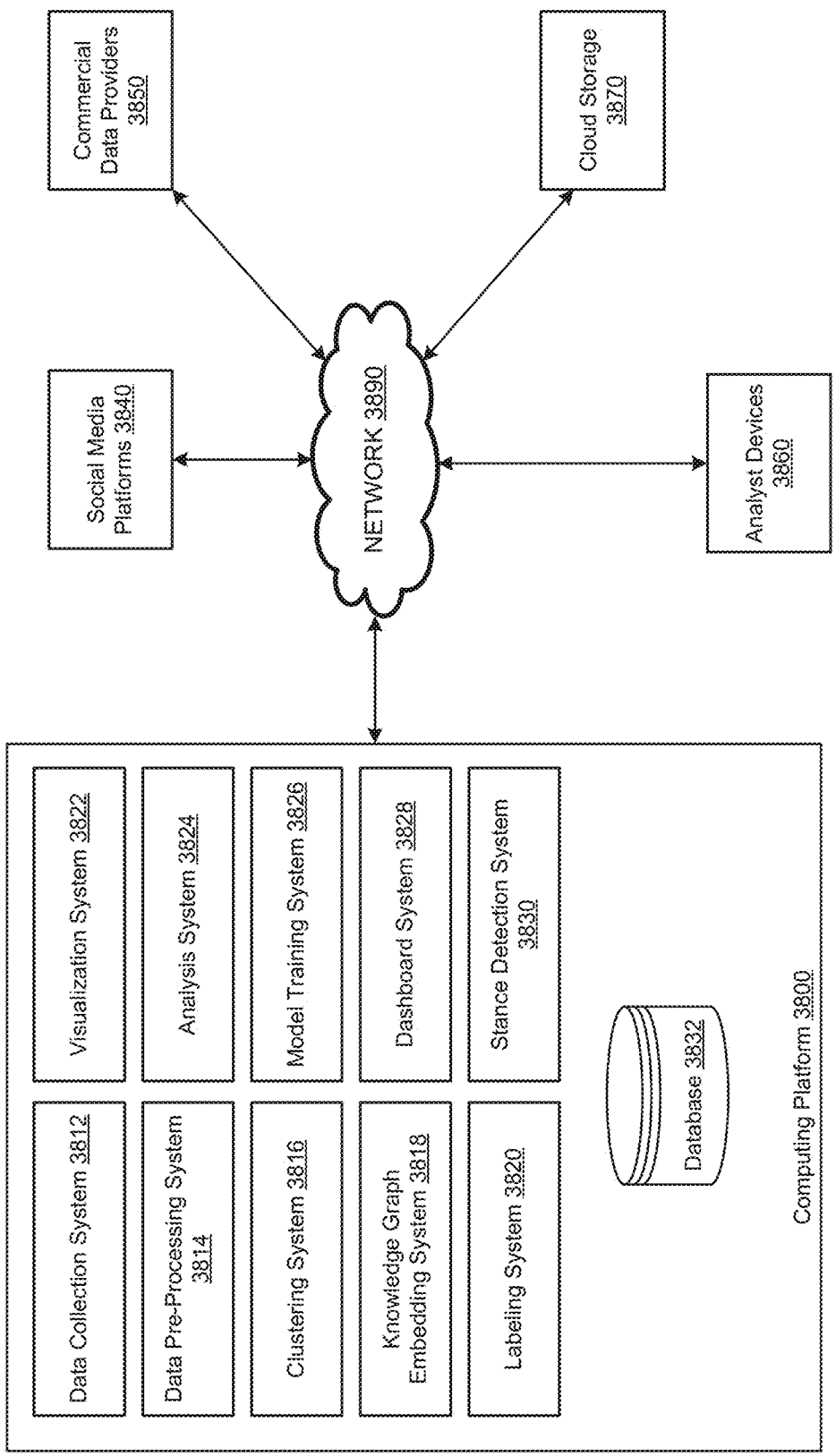
FIG. 38 is a schematic illustrating an example environment of a computing platform according to some embodiments of the disclosure.

FIG. 38 illustrates an environment including the computing platform 3800 and other components according to some example embodiments of the disclosure. The environment includes the computing platform 3800, one or more social media platforms 3840, one or more commercial data providers 3850, cloud storage 3870, and one or more analyst devices 3860. The computing platform 3800, one or more social media platforms 3840, one or more commercial data providers 3850, the cloud storage 3870, and one or more analyst devices 3860 may communicate via a communication network 3890 (e.g., the Internet and/or a cellular network, etc.).

In example embodiments, the computing platform 3800 may perform data intake and pre-processing of social media data according to the various techniques described herein. The computing platform 3800 may further include systems for clustering, knowledge graph embedding, and/or stance detection, which may be used to implement the various techniques described herein. In example embodiments, the computing platform 3800 may include systems for labeling, analysis, visualization, model training, and/or providing a dashboard to implement the various techniques described herein for analyzing and visualizing analyzed social media data. The computing platform 3800 may include several sub-systems that may perform different functions according to various example embodiments.

In example embodiments, a data collection system 3812 may retrieve various social media data from sources, such as the social media platforms 3840 themselves, and/or one or more commercial data providers 3850 that may supply social media data. The data collection system 3812, for example, may implement the node selection 110 as shown in FIG. 1, may collect and/or format data for stance detection, may perform steps 4002 and/or 4004 of FIG. 40, may perform step 4102 of FIG. 41, may perform some or all of step 4202 of FIG. 42, may perform step 4302 of FIG. 43, may implement the data service 4502A, data service 4502B, and/or data collection 4506 of FIG. 45, and/or the like.

In example embodiments, a data pre-processing system 3814 may clean up the social media data and/or otherwise filter the social media data, perform named entity recognition, generate one or more network graphs, and/or perform other data pre-processing steps to prepare the social media data for clustering, knowledge graph embedding, stance detection, analysis, or any other techniques described herein. For example, the data pre-processing system 3814 may implement some or all of the node selection 110 (e.g., link selection 112, network 130) as shown in FIG. 1, may pre-process data for stance detection, may perform some or all of steps 4002 and/or 4004 of FIG. 40, may perform some or all of steps 4102 or 4106 of FIG. 41, may perform some or all of step 4202 of FIG. 42, may perform steps 4304-4308 of FIG. 43, may implement the data collection 4506, data parsing 4508, and/or preparation for embedding 4510 of FIG. 45, and/or the like.

In example embodiments, a clustering system 3816 may cluster the processed social media data to generate various types of clusters described herein. The clustering system 3816 may use any of the clustering techniques and/or algorithms described herein and may be reconfigurable so that it may perform various types of clustering, use different techniques on different data sets, and/or the like. For example, the clustering system 3816 may generate a matrix 130, perform source node clustering 114, and/or perform outlink clustering 118 as shown in FIG. 1, may perform steps 4204-4210 of FIG. 42, and/or the like.

In example embodiments, a knowledge graph embedding system 3818 may perform knowledge graph embedding, as described in more detail with respect to the relevant section of the disclosure. For example, the knowledge graph embedding system 3818 may perform step 4310 of FIG. 43, may perform the embedding training and evaluation 4512 and/or the embedding visualization and characterization 4514 of FIG. 44, and/or the like.

Figure 28B:
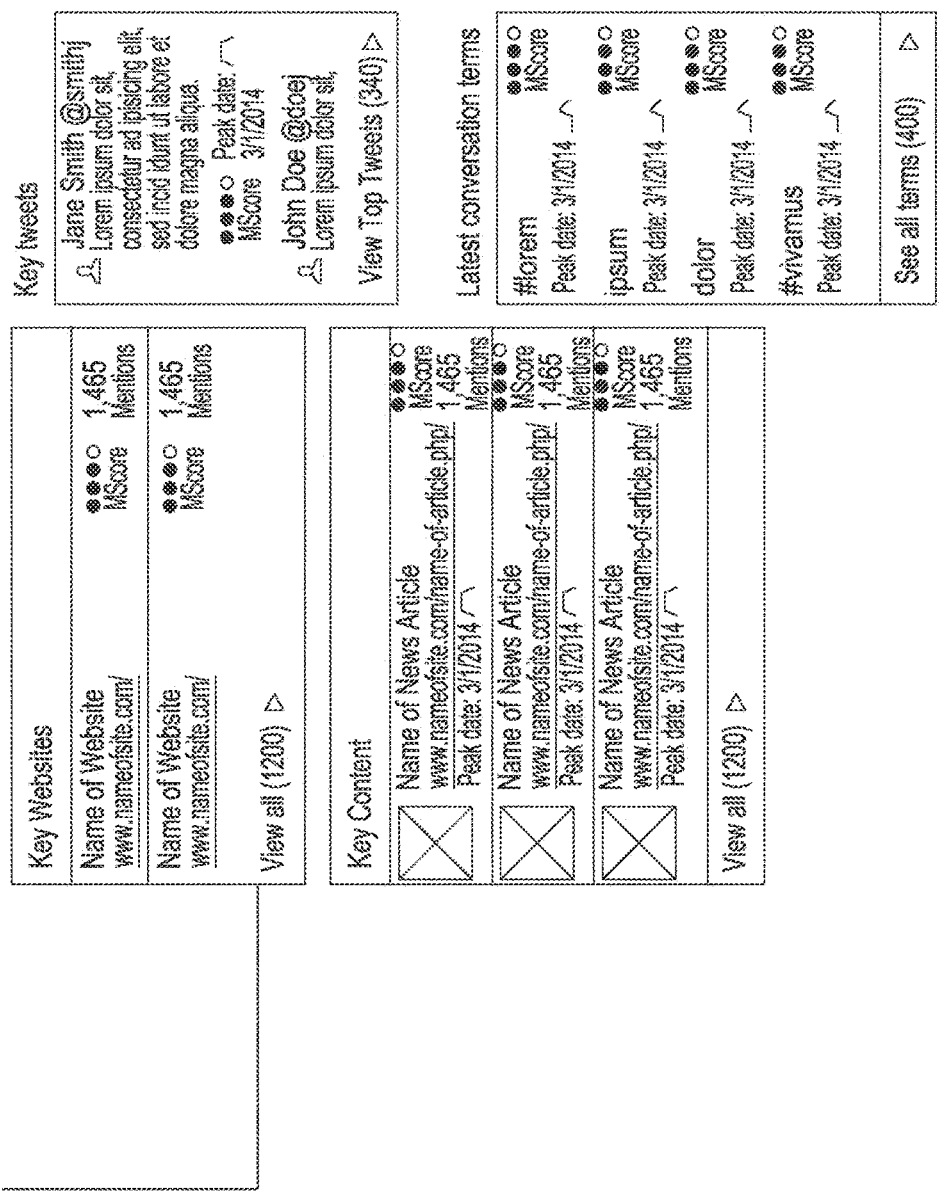
Figure 29B:
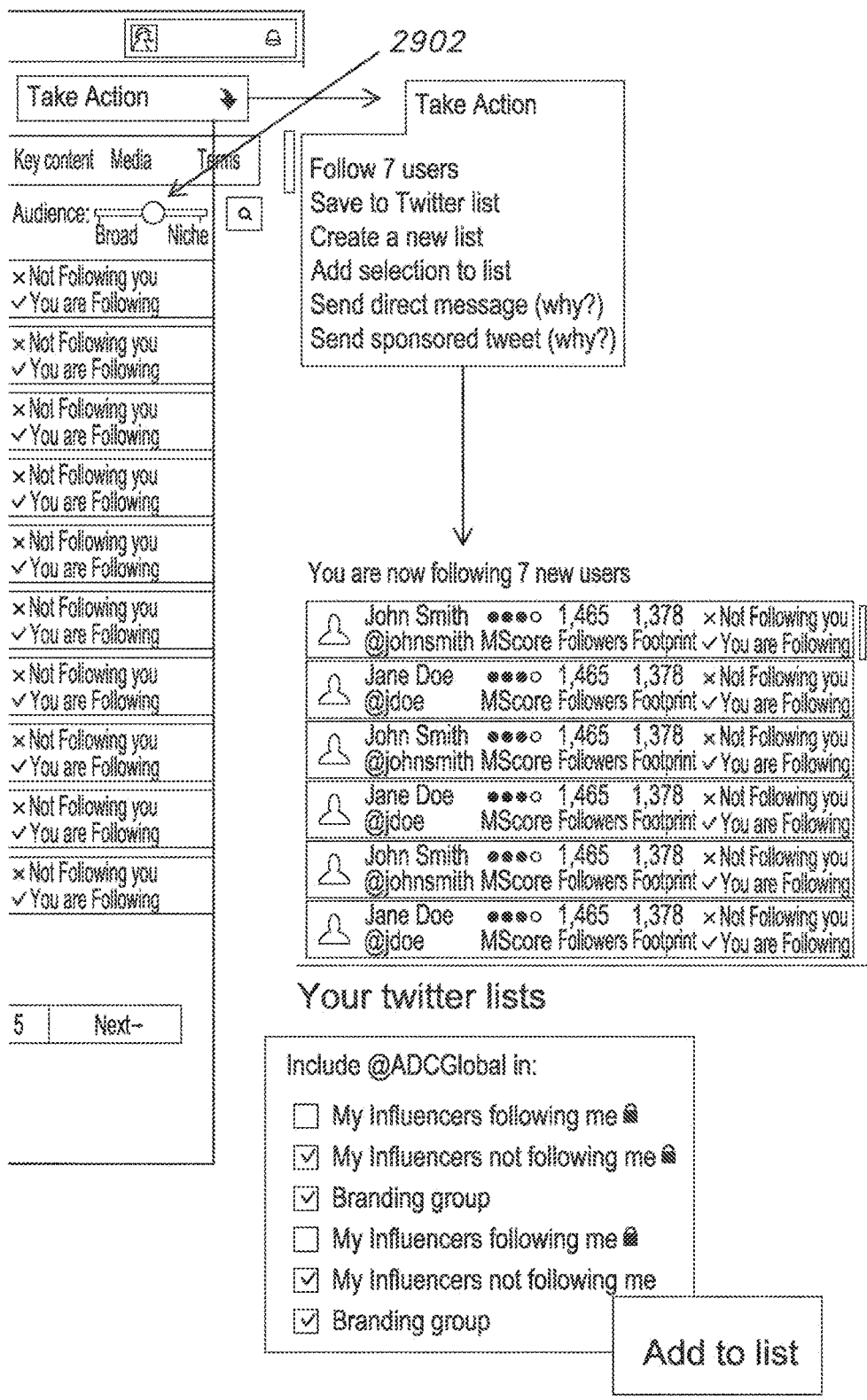

In example embodiments, a labeling system 3820 may use artificial intelligence techniques to automatically label clusters using various labelling techniques as described in more detail herein. In example embodiments, a visualization system 3822 may generate various visualizations of the clusters and/or stance detection (e.g., to further analysis and verification of the clustering, to show the structure of a network graph, to show various analyses, etc.). For example, the visualization system 3822 may generate social network maps 200, 300, 400, 500, 600, valence graphs 800, graphs of CFI scores 900, 1000, bi-polar valence graphs 1100, interactive burstmaps 1200, valence graphs of outlink targets 1300, peakedness vs. commitment graphs (e.g., the graphs shown at FIGS. 18, 19A, 19B), distribution visualizations (e.g., as shown at FIGS. 20-21), chronotope visualizations (e.g., as shown at FIGS. 22A-C), visualizations of recent activity (e.g., as shown at FIGS. 24-25), various overview visualizations (e.g., as shown at FIGS. 26, 28A-B), interactive maps (e.g., as shown at FIG. 27), influencer visualizations (e.g., as shown at FIGS. 29A-B, 30), conversation leader visualizations (e.g., as shown at FIG. 31), tweet visualizations (e.g., as shown at FIGS. 32A-B), website and/or other content visualizations (e.g., as shown at FIGS. 33, 34A-B, 35, 36, and 37), and/or the like.

In example embodiments, an analysis system 3824 may process cluster data and/or other data using various analysis techniques described herein to perform various analyses, generate various signals, evaluate the performance of trained models, evaluate the performance of clustering parameters, etc. as described in more detail in the disclosure. For example, the analysis system 3824 may generate the outputs 108 of FIG. 1, perform steps 4008 and/or 4012 of FIG. 40, perform steps 4212, 4218, and/or 4222 of FIG. 42, perform steps 4312 and/or 4318 of FIG. 43, provide analysis services 4504, clustering and characterization 4530, and/or other analysis services of FIG. 45, and/or the like.

In example embodiments, a model training system 3826 may train and/or retrain various models (e.g., machine learning and/or other artificial intelligence models) used for the techniques described herein. The model training system 3826 may gather, process, and compile training data, execute one or more algorithms (e.g., gradient descent) to train various models using unsupervised, semi-supervised, or supervised learning, and/or perform other model training tasks. For example, the model training system may perform steps 4006, 4010 of FIG. 40, steps 4108, 4110 of FIG. 41, and/or otherwise train the models described herein (e.g., labelling models, clustering models, etc.).

In example embodiments, a dashboard system 3828 may generate and provide interactive user interfaces to users (e.g., users of analyst devices 3860). The user interfaces may include, for example, visualizations generated by the visualization system 3822. For example, the dashboard system 3828 may generate an interactive user interface as shown at FIGS. 2-6, 8-13, 18-22, 24-37, and 44, which may include various visualizations as well as one or more user interface elements for interacting with the visualization, viewing additional data, or otherwise providing information and interactive elements to users.

In example embodiments, a stance detection system 3830 may be used for stance detection/analysis. The stance detection system 3830 may use one or more trained models (e.g., as trained by the model training system 3826) to analyze the stance of one or more data items or groups of data items (e.g., a set of tweets sent by a group of users). For example, the stance detection system 3830 may perform step 4014 of FIG. 40 and/or step 4112 of FIG. 41.

In example embodiments, the computing platform 100 may include one or more databases 3832. The database(s) 3832 may store collected social media data, processed social media data, training data, various trained models, analyzed data, visualization data, and/or any other data as described herein.

Social media platforms 3840 may include various social media websites and/or applications, such as TWITTER, REDDIT, FACEBOOK, YOUTUBE, and other such sites, various news sites (e.g., CNN, FOX, etc., video news channels on YOUTUBE, or any other source of news), various forums, various commenting mediums or blogging platforms, and/or other sources of social data. The social media platforms 3840 may provide social media data, either directly through social media websites and/or applications, or via various application programming interfaces (APIs). In some embodiments, the data collection system 3812 of the computing platform 3800 may interface with the social media platforms 3840 to obtain social media data, for example, by calling APIs provided by the social media platforms 3840.

Additionally or alternatively, the computing platform 3800 may obtain social media data from commercial data providers 3850, which may provide social media datasets for various social media platforms, cross-platform data sets, and the like. Thus, the computing platform 3800 may obtain social media data directly or indirectly from social media platforms.

The computing platform 3800 may interface with analyst devices 3860, which may access data indicating clusters, knowledge graph embeddings, various analyses (e.g., stance detection, characterizations of clusters, etc.), and any other data generated by the computing platform 3800. In example embodiments, the analyst devices 3860 may interface with a dashboard system 3828 of the computing platform 3800 in order to interactively browse data, request data or various analyses based on the data, view visualizations of the data, and/or the like. The analyst devices 3860 may be devices associated with customers of the computing platform 3800, researchers, or any other parties that may have an interest in analyzing social media data. In some examples, the computing platform 3800 may also provide analysis and other data to social media platforms 3840 (e.g., if the social media platforms 3840 request to track data manipulation occurring on their platform, on other platforms, across all platforms, etc.).

Stance Detection

Social media data may be used to determine stance detection or sentiment analysis. In example embodiments, stance detection may be increasing in social media analytics given there may be some limitations of sentiment analysis. A definition of "stance detection" may be a speaker's attitude and/or position toward a topic or specific thing. A definition of "sentiment analysis" may focus on whether people are talking positively or negatively in general but may not be directed toward any specific viewpoint. In example embodiments, stance and sentiment may be orthogonal. For example, "Candidate X is the best" and "I'm so sad Candidate X lost" both express approving stances of Candidate X but have polar opposite sentiments. In example embodiments, target evaluations may be likely stance detection and not sentiment.

System Process Overview

In example embodiments, a system process may be carried out by a computing platform 3800, as shown in FIG. 38. In example embodiments, a system process may include labeled stance dataset creation, creating geolocated maps, and/or feature engineering.

The computing platform 3800 may perform data collection (e.g., using data collection system 3812). Stance detection may be trained on one dataset and then may be applied to many data sets, which may prove advantageous with regards to applications across multiple regional maps. To avoid conflicting annotation data with testing data, the computing platform 3800 may make use of vast data collection efforts (e.g., COVID-related conversation on TWITTER). For example, the computing platform 2800 may collect a large number of tweets over a given time period, and may use the tweets to create an initial annotation dataset for stance detection.

The computing platform 3800 may store the gathered data in cloud storage (e.g., the cloud storage 3870) and/or in storage of the computing platform 3800 (e.g., database 3832). The computing platform 3800 may process features that may also be stored in cloud/local storage. For example, the computing platform 3800 may filter raw tweets to identify English tweets pertaining to a given topic (e.g., a list of public health interventions). In example embodiments, the computing platform 3800 may extract user identification (ID), raw text, hashtags, message identification (ID), and/or any location-relevant information, and save these (e.g., to JSON files) associated with the selected topic within the data store.

Figure 39A:
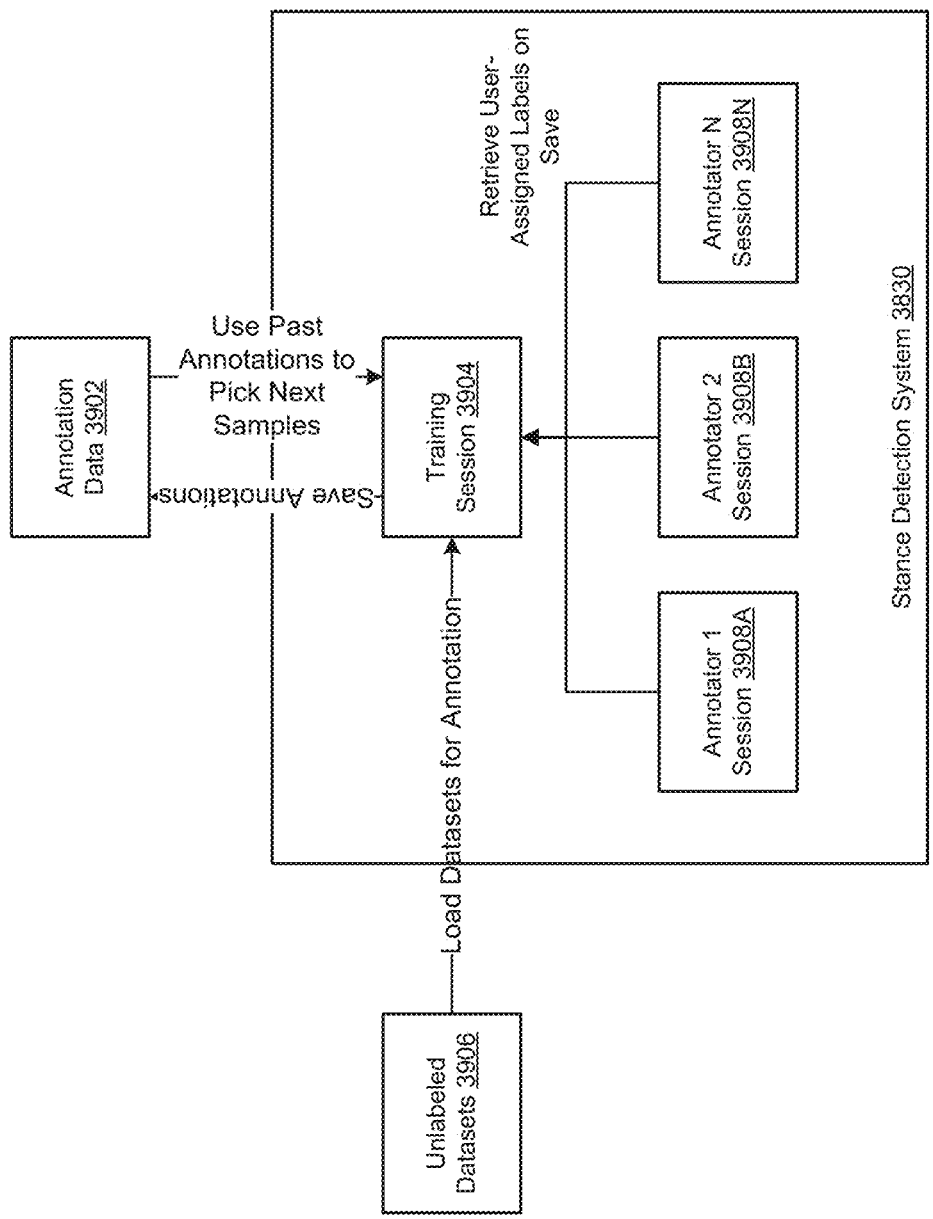
FIGS. 39A-B illustrate example diagrams of a stance detection system according to some embodiments of the disclosure.

In example embodiments, the stance detection system 3830 of the computing platform 3800 may be configured to perform data annotation, as illustrated by FIG. 39A. The stance detection system 3830 may be configured to provide a training session 3904. For example, the training session 3904 may use PRODIGY, an annotation software system. PRODIGY is a downloadable PYTHON package that includes a web interface for annotations. The PRODIGY system may be installed on the computing platform 3800 and/or in a cloud storage instance (e.g., an EC2 instance located in an AWS environment). The computing platform 3800 may utilize PRODIGY's data loader class to build a custom plugin to pull the raw datasets (e.g., unlabeled datasets 3906) directly from cloud/local storage during a training session; the benefit of this approach may be to easily recreate the annotation environment in the event of a session drop or cloud storage failure. One annotator session 3908 may be run per time, and a session 3908 may be specific to a given dataset. While the training session 3904 is running, multiple annotators 3908 (e.g., annotator 1 session 3908A, annotator 2 session 3908B, annotator N session 3908N) may access their individual sessions (e.g., by adding their unique session IDs to a URL). In the backend, PRODIGY may add the annotator label to a training session 3904. When an annotator clicks the save icon (e.g., via web interface provided for an annotator session 3908), labeled annotation data 3902 may be stored by the training session to a provided database backend (e.g., cloud/local storage). The training session 3904 (e.g., PRODIGY) may use POSTGRES or other database(s) and may require appropriate credentials. The annotation data 3902 may be stored using a database and the computing platform 3800 may be configured to write directly to the database. The training session 3904 may read from the database and apply an internal active learning system to choose, based on previously annotated examples stored as annotation data 3902, which data may provide the most information for a future classifier. The data in the database may be used to train stance models.

In example embodiments, the stance detection system 3830 may be configured to create geolocated maps. The stance detection system 3830 may collect and analyze social media data for this purpose. To create a map specific to a geographic region, the stance detection system 3830 may combine a bounding-box search approach with a search for key terms to find influential accounts that meet both criteria. The stance detection system 3830 may then sample outward from identified audiences' immediate relationships to create a social network. The stance detection system 3830 may map social network terrains using a combination of network analytic and machine learning algorithms. These algorithms may discover the overall topology of a network and identify granular communities of interest within it. Clustering may be based on patterns of connections from the mapped accounts (e.g., subgraph) to accounts across the entire platform. This technique may be more precise than traditional network community detection, and may typically reveal thirty to seventy specific microsegments within the network.

Some locations may be better represented on analyzed social platforms (e.g., TWITTER) than others, due to regional differences in population counts and the platform's popularity. For this reason, the stance detection system 3830 may be unable to gather sufficient accounts to create a statistically reliable map for certain locations. To address this, the stance detection system 3830 may develop maps that combine under-represented areas into geographic regions based on their local proximity and cultural similarities.

Location may be challenging to infer from social platform (e.g., TWITTER) data due to infrequency of geotagging or other reasons. The stance detection system 3830 may utilize a mixture of example features such as those below to maximize the ability to identify users' locations based on their social media post (e.g., a tweet) and profile metadata.

| Feature | Description | Relevance | Reliability |
|---|---|---|---|
| Geotag | Content feature | If this setting is enabled, content may include longitude/latitude coordinates in their metadata. | Very reliable if available, but may be rare due to privacy settings. |
| Place | Content feature | Platforms (e.g., TWITTER) may | Sufficiently reliable - to place, not exact |

-continued

| Feature | Description | Relevance | Reliability |
|---|---|---|---|
| | | provide the option to tag a location. including coordinates and country/state code. | location, found in roughly 0.03% Tweets ™ from example COVID maps |
| User location | Free text field on user profile. May require processing to identify and extract locations. | May be used to share user location with others. | May be unreliable due to co-option of this field for humor and other non-factual purposes. Could be different than where the individual is located. |
| Reference in text | Content text | People may mention their location as part of their ongoing messages. | May be unreliable due to the diversity of this text and the frequency with which people discuss locations other than where they are currently located. Entity extraction may have middling performance. |
| Friends' locations | User's follows links | People may be friends with people in the same location. | This may be less reliable as users have more friends who are likely to be geographically dispersed. Those with small followings are more likely to have ties born from local interactions. |

In example embodiments, the computing platform 3800 may perform data collection (e.g., using the data collection system 3812) for the stance detection system 3830. For example, the computing platform 3800 may create maps with target keywords and geographic region bounding boxes. Upon map completion, the computing platform 3800 and/or stance detection system 3830 may access map members, the social network, and cluster memberships via API endpoints. The stance detection system 3830 and/or computing platform 3800 may extract and process the associated content (e.g., tweets) into storage (e.g., cloud/local storage) for easy access. For example, the computing platform 3800 may store content in PARQUET files under map-specific directories.

In example embodiments, the stance detection system 3830 may perform feature extraction. For each map member, the stance detection system 3830 may pull content corresponding to a specific time period (e.g., 30 days of the most recent tweets) for stance detection. The stance detection system 3830 may additionally pull features potentially relevant for stance prediction or inference, including other hashtags or other content markers associated with user content (e.g., posts, retweets, etc.). Finally, the stance detection system 3830 may use maps to extract users' social networks and similar users' behaviors, which may be used to infer likely effects of social influence and homophily.

In example embodiments, the stance detection system 3830 may perform feature engineering. Beyond simple word tokens, there are other features the stance detection system 3830 may incorporate into a model to strengthen its ability to detect stance in lieu of sufficient textual indicators. The table below contains example feature candidates that may be used for a TWITTER analysis:

| Feature | Description | Relevance |
|---|---|---|
| Number of Hashtags | Count unique hashtags across user's content | Some studies indicate that a broader range of topics may indicate weaker stances on specific topics. |
| Top N Hashtags | N most frequently used hashtags across user's content | Hashtags can provide context and include opinionated words that indicate stance. |
| Number of Retweets | Count unique retweeted users across user's content | A broader range of people retweeted may weaken the importance of any single retweet. |
| Top N Retweets | N most frequently retweeted users across user's content | Retweeting, or sharing without comment (unlike quoting), indicates implicit agreement and can be helpful for extrapolating stance for users more prone to this behavior than writing original content. |
| Homophily | Frequency of user to connect to others within their segment, relative to statistical norm | Previous research indicates the stance of social ties can indicate a user's stance. |
| Heterophily | Frequency of user to connect to others outside of their segment, relative to statistical norm | Previous research indicates the stance of social ties can indicate a user's stance. |
| Focus | Relevancy of a particular feature, e.g., hashtag or word phrase, to the user's cluster. | Focus is a statistical measure of attentiveness to particular content features that may be correlated with stance, e.g., an opinionated hashtag or news article URL. |
| Topic modeling | Consistent themes across content as found through standard topic modeling procedures like Latent Dirichlet Analysis (LDA). | Topics are words that may frequently co-occur together; opinionated words co-occurring with the target may indicate stance. |

Figure 39B:
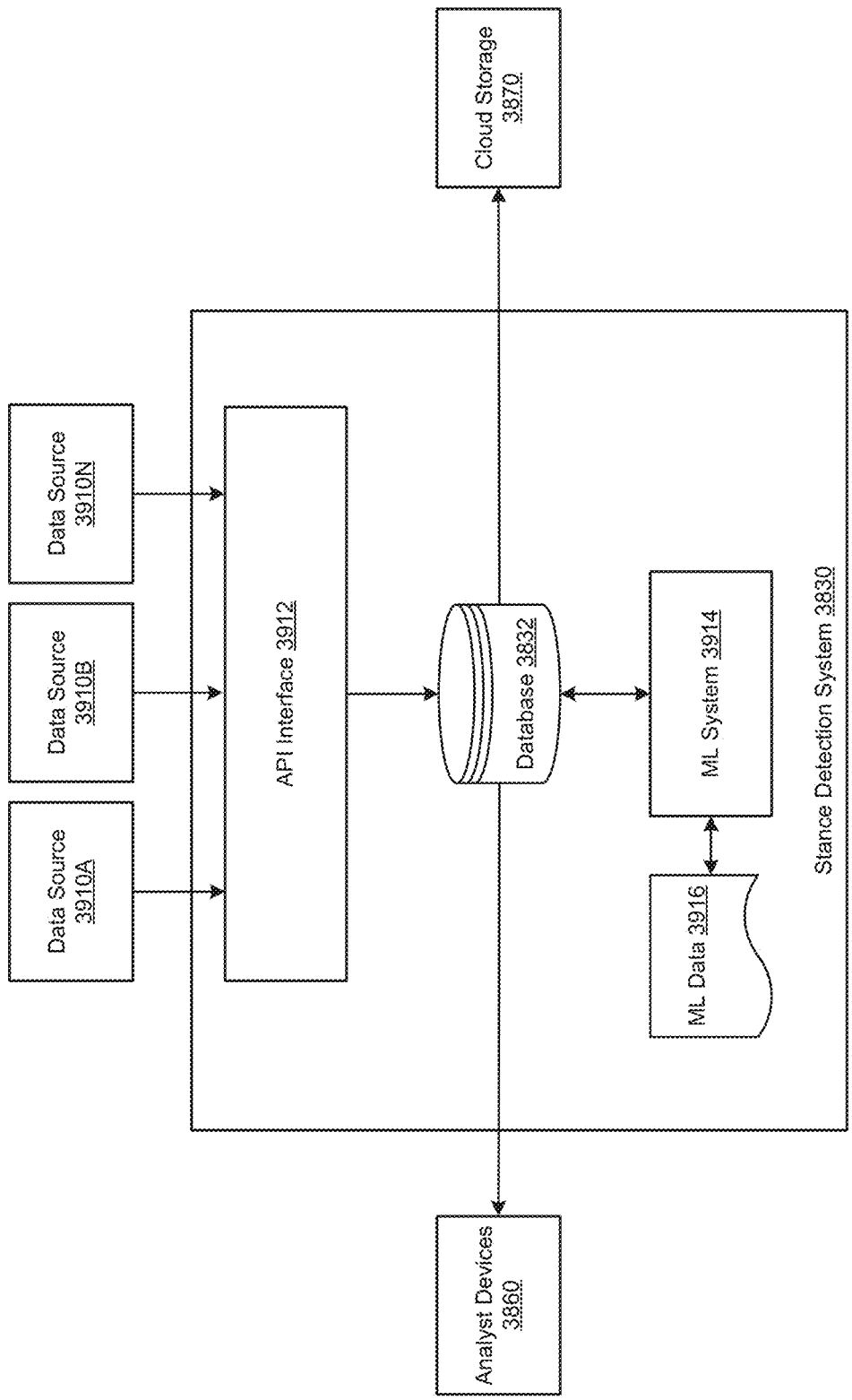

The stance detection system 3830 may be configured for stance detection as shown in FIG. 39B. In example embodiments, the stance detection system 3930 may make use of cloud computing tools (e.g., AMAZON AWS) instead of or in addition to the illustrated system setup and deployment. The entire stance detection system 3830 may be set in an isolated environment from the rest of the software. In example embodiments, the software may be written in PYTHON and containerized using DOCKER. In example embodiments, these containers may be stored within an AMAZON Elastic Container Registry (ECR), which may allow for easy deployment using FARGATE. Individual components, including AN EC2 instance, S3 bucket, and RDS database, may be provisioned using TERRAFORM, which may allow for easy configuration and deployment of similar systems in the future. System logging may be sent to CLOUDWATCH with high priority error and warning logs delivered directly to a channel in an internal chat system. Finally, the stance detection system 3830 may utilize ANSIBLE for setting up users and permissions to connect to machines and define software requirements.

In example embodiments, the stance detection system 3830 may be configured to pull text data from various data sources 3910 (e.g., data source 3910A, data source 3910B, data source 3910N). For example, an API system (e.g., API Interface 3912) and/or AWS FARGATE system may be used to pull the data from various data sources and store it (e.g., in a database 3832 and/or cloud storage 3870). In example embodiments, the stance detection system 3830 may process the text data either before or after storing it, as described elsewhere herein. In example embodiments, the stance detection system 3830 may store data in raw, processed, and final formats in various subdirectories organized by topic. In example embodiments, the cloud storage 3870 may include an AMAZON S3 and/or GLACIER cloud storage instance.

In example embodiments, the stance detection system 3830 may perform model training and testing. For example, a machine learning (ML) system 3914 may pull features for training from the database 3832, and may generate and/or train various ML data 3916, including by writing ML models, forecasts, predictions, and evaluations. Additionally or alternatively, the ML system 3914 may retrieve models and results at decision points for evaluation and retraining. In example embodiments, the ML system 3914 may be executed by an AMAZON M5 instance. In example embodiments, the ML data 3916 may be stored in a POSTGRES or other database format.

In example embodiments, the model training and evaluation pipeline may be monitored by MLFLOW. For example, MLFLOW may maintain a model registry (e.g., to save and load trained models), and may handle automation and logging for training, prediction, evaluation, and forecasting tasks. The generated logs and artifacts may be used by the ML system 3914 and/or analyst devices 3860 to evaluate ongoing performance.

In example embodiments, the stance detection system 3830 may output results (e.g., to analyst devices 3860).

For example, the stance detection system 3830 may generate a downloadable report, allowing users to view stance detection results by segment and/or location where location data is available. Additionally or alternatively, the stance detection system 3830 may create a demonstration feature page to showcase the use of stance in various integrations. Users (e.g., of analyst devices 3860) may be engaged by understanding how stance towards a target or target group differs across a map, and in particular across separate communities. To that end, the stance detection system 3830 may generate a unique visualization to show the distribution of stance by segment. An example visualization may show two dimensions: one axis that represents the volume of conversation related to the target or target group in the segment, and one that represents the stance of segments. The stance detection system 3830 may enable the user to interrogate the data, e.g., to see when stance results are based on a very small number of tweets or other content available, or when there is a large amount of mixed-stance conversation. Each segment may be represented in this graph, with additional information available upon hoverover. Furthermore, the stance detection system 3830 may make this visualization filter-able by location so only content (e.g., tweets) with definite locations are included. The availability and usefulness of location-based filtering may be dependent on the number of tweets or other content with valid location data, which may vary based on target, location, or time frame.

Learning Models for Stance Detection—Supervised, Semi-Supervised, and Unsupervised "Supervised machine learning models" (may also be referred to as "supervised learning", "supervised models", "supervised approaches", and the like) may be the most common type of algorithm used for stance detection. In example embodiments, support-vector machines (SVMs) are supervised learning models that may often have the best or nearly the best performance (and may allow for scaling to modeling large volumes of data).

In some example embodiments, "semi-supervised machine learning models" (may also be referred to as "semi-supervised learning", "semi-supervised models", "semi-supervised approaches", and the like) may be used in a system and/or process for providing stance detection. In some examples, semi-supervised learning models may be attention-based models such as Bidirectional Encoder Representations from Transformers (BERT)) for providing stance detection. In some examples, semi-supervised models may use a combination of language data and network data (e.g., two-step modelling) to provide stance detection. In other example embodiments, semi-supervised learning may use machine learning with active learning. Semi-supervision techniques may be applied to models that may be traditionally supervised.

In other example embodiments, "unsupervised machine learning models" (may also be referred to as "unsupervised learning", "unsupervised models", "unsupervised approaches", and the like) may be used in a system and/or process for providing stance detection. In some examples, unsupervised learning or unsupervised approaches may use language and network data together to provide stance detection.

In example embodiments, various types of learning model approaches may be used to provide stance detection.

Zero-Shot Learning (ZSL)

In example embodiments, supervised learning with no additional training may be accomplished with "zero-shot learning" (ZSL) approaches that have been developed and may serve as an intermediary between supervised and unsupervised approaches. In example embodiments, a zero-shot learning (ZSL) process may include a learner observing samples from classes that were not observed during training and may need to predict a class that they belong to (e.g., associating observed and non-observed classes through auxiliary information). Zero-shot learning (ZSL) may relate to a variant of a multi-class classification problem where no training data may be available for some of the classes. This means that ZSL may fit in supervised or unsupervised learning. Most ZSL algorithms may use some connection between available information (e.g., labeled training data and/or notional constructs of missing classes) and unseen classes (e.g., unlabeled data). For example, ZSL may use information from a supervised task to perform an unsupervised task. In example embodiments, a ZSL model may be trained but the volume of training data needed may be less than a fully supervised process. There may be a need for adequate training data (e.g., where fewer data points may not equate to less work) and appropriate transfer of learning through notional frameworks.

In example embodiments, a ZSL application may be using an image classification. For example, if a system has not seen a zebra but has seen a horse, the system may provide a notional framework by communicating to a user that, for example, "a zebra is like a horse with stripes". Then, the system may be able to recognize a photo of a zebra. To do this, the system may need to visually understand what a horse is and what visual variables may be required to identifying a horse. For example, the system may need to understand and be able to measure "stripes". If conditions are met, the system may recognize a zebra with some acceptable level of accuracy.

In example embodiments, with respect to ZSL, there may be contextual examples (e.g., in social networks). For example, a contextual example for ZSL may refer to a notional construct of variables that may be needed to be able to detect or predict stance. In some examples, ZSL may be used for a prediction task as opposed to a detection task, but the ZSL process may need the notional construct for the types of information that may be needed to make a prediction or determine classification. In reference to the "horse-zebra" example, a horse may be identified based on variables such as height, weight, shape, body features, placement of facial features, sounds, etc. For stance, a similar notional construct may be required to allow for prediction or detection of stance. This may be accomplished using word or topical distributions and/or known stance on a target. For example, in a network (e.g., social network), there may be one or more nodes and accounts (e.g., Twitter™ accounts) where some users have a stance on food (e.g., vegetarian, cat all meat, or cat fish only) or a stance on political candidates such as a stance against Candidate A who is running for office in competition with Candidate B. From this information, it may be determined that users have a stance for Candidate B. With the food example, some users may have stance against eating all meat such that it may be determined that these users have a stance for eating vegetables. By abstracting this information to a level of essentially complimentary or opposing targets, stance on complimentary versus opposing targets may be determined. For example, stance on an opposing candidate (e.g., some other political figures) or stance on food may be inferred. For example, a notional construct may include a stance for a particular node towards complimentary targets that may be an aggregated value. ZSL may be used to take the notional construct and use all necessary variables to be able to make a prediction or a classification. This may allow for filling in missing information based on related data. For the "zebra" example, this may allow for piecing together of information from different pieces of data. For example, the system may not have seen a zebra image but may have seen a tiger image. A tiger has stripes that may be identified. The process and/or system may piece together from the training data that there are sufficient variables to make an identification. For stance, it may be similar, where there may be variables that the system knows that it needs. These example variables may include presence of a stance on a complimentary target, network position, a topical distribution or a diversity of hashtag usage, and the like. The process and/or system may use these example variables to fill in missing data from different points. One of the benefits of using network data may be the ability to use data retrieved for a particular node from multiple different networks. In other examples, the system may fill in data that may be extracted from similar nodes to make the same identification. In example embodiments, a position in a network or other variables may be identified as needed to fill in data. Since the system may already identify this data in other nodes, the system may also identify this same type of data in the subject node of this example. For stance or other network-related analyses, the process may identify the variables needed and then use an abstract level to fill in information from training data of the system. Detection may relate to a user that has used a target (e.g., a word, construct or other measurements) by extracting information that is already in a data set. In contrast, a prediction task may relate to a user that may not have mentioned a particular target for which the system may be trying to understand associated stance.

Stance Detection Process Inputs

In example embodiments, example elements, traits, and/or characteristics may be input to the stance detection process as part of stance analysis. Some examples of elements that may be input into a stance detection modeling pipeline may include semantic representations of user social media content (e.g., Twitter™ content from Twitter™ social network) that may be measured by a model (e.g., a generative statistical model such as Latent Dirichlet Analysis (LDA), an algorithm or model for topic modeling and semantic search such as Top2Vec, a bespoke algorithm, or the like) which may incorporate stylometric content patterns into one of these models. Metrics on user social media content (e.g., Tweet™ content) may include diversity of hashtag usage, network features (e.g., homophily/heterophily), position within a network, object focus (e.g., a measure of importance for a particular hashtag or object), and the like. Other example elements, traits, and/or characteristics may be considered for other example embodiments of the systems and methods in the disclosure.

In example embodiments, there may be other example inputs. For example, other semantic representations of user social media content (e.g., Tweet™ content) may involve topic or thematic extraction. Other examples may be word embeddings. For example, the Top2Vec model may capture embeddings as part of that process. The Top2Vec algorithm or model may detect topics in text and generate topic, document, and word vectors. Other examples may include knowledge graph-based solutions with stance prediction which may be separate from LDA or Top2Vec models because of the differing output.

Stance Detection Process Factors and Algorithms

In example embodiments, there may be specific factors and algorithms that may be used as part of at least one example stance detection process. For example, the stance detection process may include a pipeline iteration including various actions. Initially, in example embodiments, the process may collect data on which to train and run a stance detection model through a network mapping process (e.g., including a map-making pipeline). For example, the network mapping process may involve collecting of data such that least-connected users are filtered out and then maps may be drawn using a visualization algorithm (e.g., Fruchterman-Reingold visualization algorithm). In some examples, the map-making pipeline or network mapping process may be a general mapping process such as a computational social network mapping process in combination with human and automated content analysis. The network mapping process may incorporate data collection sub-processes for stance detection as well as metadata and some selected features to be retrieved. Specifically, the process may use a software as a service (SaaS) (e.g., Graphika's Starship™ application and/or platform) to create relevant maps. In terms of the network mapping aspect, the stance detection process may include another network mapping process that may also use a Fruchterman-Reingold visualization algorithm or similar algorithm. The network mapping process may provide data collection, reduction, clustering, and visualization. Design of the process may be adjusted slightly with respect to data ingestion, data cleaning, and/or expansion of metadata of additional features that are generated (e.g., improving our focus scores or the way that the process may compute terms or words). The network mapping process of the stance detection process may be similar to a process for attentive clustering and analytics as described above and throughout the disclosure.

Upon map completion, the stance detection process may access map members, a social network, and cluster memberships via application programming interface (API) endpoints. The process may extract and process associated social media data (e.g., Tweets™) into storage. For example, the storage may be an S3 bucket on Amazon™ Web Services (AWS) that may provide easy access and storing in a column-oriented data storage format such as in the form of a columnar storage format (e.g., Apache™ Parquet™ file format). In some examples, Parquet™ may be used as a type data store or data structure because it may support the infrastructure. In other example embodiments, other data structures or other data storage types may be used. Using Parquet™ may provide an implementation that may allow for storing larger data sets while still allowing for quick and accessible access to the data (e.g., Parquet™ may be relatively more efficient and more optimal than commonly used file types such as tab-separated value (TSV) file format or comma-separate value (CSV) file format). The process may analyze maps prior to generating a final feature list and training the model to identify thresholds for features and gain some knowledge to evaluate an end model's results. The process may provide map analysis in generating some feature lists via the Starship™ platform that may provide a back-end apparatus. In example embodiments, the stance detection process and/or system may utilize the map-making process and may also compute focus which may be attention paid to a particular object (e.g., hashtag or the like in a map). Some of the metrics such as a particular community that a node belongs to, the homophily score of that community, how clusters roll-up into larger groups, or the like may be retrieved as part of the map analysis. In example embodiments, this may be conducted semi-supervised where some tasks are automated and other tasks may be reviewed by an analyst. In example embodiments, the process may pull out some ranked N-grams (e.g., bigrams related to two words together). In some example embodiments, this continuous extraction of features may be entirely automated. These features may include topics or a style of metric markers, presence of either complimentary or opposing targets as related to prediction, markers of hashtag diversity or diversity of word usage, etc. For topic modeling, a topic modeling code base may leverage code and thresholding. In some example embodiments, the process may utilize a model and features to optimize for maximum accuracy or optimize for other reasons. For example, an optimization framework (e.g., a hyperparameter optimization framework that may automate searching such as Optuna™) may be utilized.

In example embodiments, as discussed in the system process overview in this disclosure, the system and/or process may provide various other example features and implementations. For example, one specific feature that may be used is embeddings (e.g., using known training processes for high-quality word vector representations). This process may use a pre-existing library for learning word representations and sentence classification (e.g., fastText™). For example, fastText™ may be used to learn text representations and text classifiers. In some example embodiments, BERT may be used instead or in addition to fastText™ depending on performance. In other example embodiments, fastText™ may be used instead BERT (e.g., where BERT may provide richer embeddings but may be relatively slow as compared to fastText™). In example embodiments, feature lists may be analyzed for how well these lists represent a separability of data by stance. For example, a diversity of hashtags may be analyzed to measure whether Tweets™ for a "For" stance may use a more diverse set of hashtags as compared to "Against" stance Tweets™. Regularization techniques (e.g., regularized regression such as elastic net, least absolute shrinkage and selection operator (LASSO), etc.) may be used to down-weight or remove features that may not improve performance of the classification model. In some example embodiments, hyper parameters may be automatically tuned using a Bayesian optimization algorithm. In example embodiments, minimal model performance may be assessed on a suite of accuracy-related metrics (e.g., precision, recall, measure of accuracy such as F1-score or F-measure, etc.) as compared to labeled data. The benefit of active learning compared to a fully unsupervised approach may be that new labeled data may be ingested as needed over time. Ideally, there may be a mechanism that allows users to correct a model error and trigger retraining.

In an example embodiment, Tweets™ may be pulled from 2020 COVID-19 centric maps as a training set. The system and/or process may use an annotation tool (e.g., Prodigy™ scriptable annotation tool) to distribute labeling tasks across an organization. The process may train per-target SVMs first as a baseline procedure before iterating to find an optimal methodology. When the training is complete, the process may store the resulting model and evaluation results in a dedicated bucket location. The process may run the model on each map as it is completed. The results may be added to the original training output allowing for the process to compare outputs of different models as iterations may continue. Detection results may be placed into a separate bucket accessible for report generation and ultimately a Starship™ integration.

In example embodiments, the features and/or variables that may be used to determine a particular user stance on a target may be engineered features. This may mean that models may be built to extract information in a complex way from text. The results of these multiple layers of processing may become the variables that assist in extracting stance about a particular target. In the COVID-19 example (e.g., related to COVID-19 Nonpharmaceutical Interventions (NPIs)), there may tasks related to deciding what may count as an NPI and what may actually denote a target that the process may use to compute stance. Because COVID-19 NPI may provide various meanings to different people and it may be unlikely that users may be Tweeting™ with the term COVID-19 NPI, there may be a need for the system to take the actual target that may be used to compute stance of topics (e.g., mask wearing, lockdown, vaccination, social distancing, etc.). The system may identify which documents or data (e.g., Tweets™ data) may relate to the target and then the system may handle the logic for how this may be rolled up into the target of interest such as COVID-19 NPI. This is one example layer of algorithmic logic. When referring to analyzing semantic features, the process may run various tasks in order to generate variables (e.g., using a topic extraction may be one model that may run over a large corpus of Tweets™). This may result in data per Tweet™ and/or a distribution of topics including a probability distribution as a variable. Another variable may be a present or a score of diversity of hashtags (e.g., similar to another algorithmic process that may result in one variable that may be fed into a model). In examples, the process may analyze this semantic information and network information separately. Also, for each semantic variable in each network variable, there may be an underlying layer of processes that may be run. For example, homophily or heterophily or node positions in a network may be network features. These network features or node positions may be computations that may occur to generate the value(s) that may be fed into a stance detection model.

In example embodiments, if there is a hashtag that may be overtly against something (e.g., "#I don't like meat"). A person who may use this hashtag in a Tweet™ such as "I really don't understand people who use #I don't like meat as meat is great". In this case, if the target is "meat", then the system may identify that the word "meat" may be used in a Tweet™, may identify that within a hashtag that the word "meat" may be used, may identify that the hashtag "#I don't like meat" was used, and/or may identify the particular context usage for these identified Tweet™ data. With the Tweet™ example: "I really don't understand people who use #I don't like meat as meat is great", the context of this Tweet™ is actually pro meat. In example embodiments, multiple stages of data pre-processing, labeling, and active learning may be used together as part of this process.

In some example embodiments, once it may be determined where users fit in terms of topics (e.g., agrees with meat or is a vegetarian that does not like meat) the system may pull in data about the users themselves to build connections to what types of users fit in one group or another group as part of this analysis. In general, the process may perform network analysis first and stance detection analysis second. Stance may be used as a variable to reorient network information of the system such that stance may be used to cluster users or connect users. In example embodiments, a robust stance detection model may be applied to network data to either make different types of networks or enrich the connections between users. By analyzing the network first, it may allow for leveraging the full power of the existing network analysis for stance. This may allow the system to be able to determine that a particular cluster of users (e.g., part of a named cluster) that have specific interests (e.g., based on what URLs the users click on, hashtags used) has an overall positive stance on a topic (e.g., eating meat).

Stance Detection Processes and Pipelines

In example embodiments, an annotation pipeline may be used to pull data from a production map (e.g., S3 production map) to be processed, re-batched, and uploaded to the AWS environment S3 bucket. For example, the annotation tool (e.g., Prodigy™) may be used to expose this data to annotators and upload annotations to a training data location for creating models. In other example embodiments, a data flow pipeline may be used to initiate a map request in the Starship™ platform using a combination of targets and geolocation coordinates. Upon the map completion, metadata may be retrieved, and texts may be communicated (e.g., via Tweets™). This may be accomplished via scripts that may slowly transition over to a serverless data integration service (e.g., Azure™ Data Factory services). This pull may happen locally on machines. In some examples, making this a fast container management service task (e.g., Amazon™ clastic container service (ECS) task) may allow the system to run automatically. In example embodiments, stance models may be stored/called from a centralized model store, set of APIs, and user interface (UI) (e.g., MLflow™ Model Registry) using an S3 backend. Stance results may be stored in an S3 bucket with specific permissioning so that an interface embedded in the Starship™ platform may access it. A user may access specific maps with specific permissioning based on a feature flag. The Starship™ platform may load the data directly rather than utilize an application programming interface (API). In a production level system, an API call may be designed and used.

Examples and Advantages of Supervised Learning Approach for Stance Detection

In example embodiments, the system and/or process of the disclosure may utilize or apply a "supervised learning approach" with stance detection. The supervised learning approach may use labelled data and then may classify new data points. In some examples, advantages of using the "supervised learning approach" may include an case of software development as compared to some unsupervised and semi-supervised approaches. In some examples, the supervised learning approach may provide higher precision and fidelity as compared to some unsupervised approaches. The supervised learning approach may require user oversight to provide constant training of data (e.g., in relation to labeling data). For example, if a new situation is introduced to the process or there is an expansion of an array of stances that may be detected, a large new batch of labeled data may be needed. For example, in some embodiments, stance detection may be used as a predictor for a social movement where stances may be used to segment populations utilizing the supervised learning approach. For example, a segmenting process may include taking up several nodes of user online accounts and segmenting them into groups. This may be accomplished largely through following relationships or engagements (e.g., relationship or share or mention). In some examples, this process may use natural language and psychographic factors. For example, the process may be able to take not only these network relationships but also the stances any subgroups take. This may be an approach to find hidden networks within a network. This may be a cohesive option that may provide granular topic-based clustering.

In example embodiments, natural language features may add to this approach. For example, the process may provide community detection and segmentation for a social network (e.g., Twitter™) based on relationships (e.g., following). For example, two users have Twitter™ accounts where the two users follow each other and follow other users. The patterns of follows relationships may be used to determine who belongs in a community together. Stance or other natural language features may be integrated such that the process may use probability distributions of word groupings (e.g., based on denoting of word groupings). Incorporating this feature may be used for distance or weight of edges in the underlying network. Nodes may be segmented into communities (e.g., based on edges between two Twitter™ accounts). Nodes may be connected via follows relationships. Currently, the edge may be binary where the user either follows or does not follow. Incorporating natural language features such as shared stance towards a target or opposing stance towards a target or an array of stances towards some list of targets based on a user's preferences may allow for weighting of edge or distance between Twitter™ accounts as nodes in a network. Currently, networks and distances are visualized as meaningful. Closer in the visualization may indicate more connections shared such that the closer users are together in the network, the closer the network relationships. Using a natural language feature to enrich may change how relationships may be measured that may shift from a follows-based relationship to shared content generation, shared stance towards a target, and/or shared or opposing co-occurring language patterns (e.g., style and metric patterns). These rich relationships may provide more nuance and more significance to the edge for segmentation purposes. For example, the system may have tens of thousands or hundreds of thousands of individual features. This information may provide for a relatively powerful profile. While it may not be easy to generate stances on about ten thousand different topics, each individual stance may be more meaningful and may indicate other information about the user than whether users follow users on Twitter™.

In example embodiments, part of how the system may label groups in a map and how the system may position them in a map may incorporate some of the network features (e.g., homophily, focus on various objects such as hashtag URLs, accounts, etc.). Adding in stance may relate to positioning groups within a map, looking at inter-group connections, or looking at density as related to stance (e.g., computing density of co-occurring stance). Currently, every group in a map may have a particular position based on all of these computations. Adding stance may be done in a variety of ways such as binary or continuous stance based on a more granular metric. For example, one group may be primarily "for" something which may be used to show groups as having a similar makeup allowing for positioning of maps accordingly.

In example embodiments, stance may be one feature in a model that may help infer psychographics or demographics. For example, stance may be used to create a second layer of the model to extract psychographic information about groups or features. For example, if the system has ground truth data such as access to demographic information or psychographic information for at least most of the users in a group of Twitter™ users. This information may be mapped. In other examples, features may be extracted that may be helpful in detecting this type of information. In general, the process may determine stance towards a particular target or a list of targets (e.g., compute stance for a list of targets) and then may provide a profile of either a node, a group, or a network as a whole (e.g., comparing network to network). In example embodiments, there may be a notion of personas that may be linked to demographics and psychographics. These personas may be extracted from some maps to identify persona stance for or against a particular marketing campaign that may be valuable for predicting a success of the campaign.

In example embodiments, mapping technology such as the network mapping process of this disclosure may be used, for example, processes described elsewhere throughout this disclosure may be used. In example embodiments, segmentation may be provided by stance. New or existing joint networks and natural language processing (NLP) methods for networks of stance, topic networks, etc. may be used. For example, the process and/or system may segment by stance or incorporate stance into the methods described in the disclosure. This methodology may generally relate to signed graphs that may not use stance and the process may be fully supervised and dependent on human annotations of the edge type. In an example embodiment, the network mapping processes may be used with edge types or weights being determined by stance towards a particular target (e.g., positive if both nodes are for or both against, negative may mean that the nodes have opposing stances). In example embodiments, stance edge weights may be used to connect to clustering (e.g., as described for attentive clustering methods and systems above and throughout the disclosure).

In example embodiments, the process may include edges that may be binary (e.g., they exist or do not exist). For Twitter™, this may refer to "follows" relationships (e.g., user following user). With stance, the edge type may be replaced where instead of an edge being a "follows" relationship, the edge may be a stance relationship. There may be signed edges that may include a positive edge or a negative edge. The positive edge may be a co-occurring stance two users have the same stance on the same target (e.g., two users for social distancing, both for wearing masks, both users are against cats but for dogs, both users prefer meat). If it is a co-occurring stance, the two users may share the same stance on the same target such that there may be a positive edge. If a first user is against masks and the second user is for masks, a first user is against meat and the second user is for meat, or the first user is for dogs and the second user is against dogs, then this relationship may be referred to as a negative edge. An alternative may be maintaining a "follows" based edge, but weighting based on stance. This may be stance of one target or a list of targets. An edge exists and may be determined based on a "follows" relationship. Each edge may be fortified by stance, or each edge may be diminished by stance. The edge and the binary "follow" relationship may be visualized as needing the edge to be wider in terms of mathematical context (e.g., higher numbers). For example, instead of a binary, there may be a continuous variable that may be based on co-occurring or diverging stances. For example, there may be a target, two users that follow each other on Twitter™ such that both users are for meat may result in a value of one which may be the highest weighted edge. If two users follow each other but both have opposing stances on a single target, then the edge width may be half of what it would have been otherwise. If two users follow each other on Twitter™ but have opposing stances on all the targets, then there may be an edge that may be particularly weak. In some examples, two users that follow each other may account for about 0.1 of all possible edge values between zero and one. Each stance that you share may add as a slightly incremental value. In general, there may be either an assigned edge where it may be clearly positive or negative. In other example embodiments, incorporation with a "follows" based relationship using Twitter™, the edge types may be slightly different. In example embodiments, stance-based relationships may be incorporated for more than two targets (e.g., three targets). It may be preferred to aggregate these stances into a profile whereby there may be a single edge that may be weighted. In some example embodiments, distance may be used to denote edge weights and shared edges (e.g., often distances may be useful visuals).

In example embodiments, segmenting in a network space (e.g., within network analysis) via stance or using stance as a relational type (e.g., an edge type between nodes) may be particularly useful to the process. For example, creating fingerprints of groups of actors based on stance may be interesting to the process. In examples embodiments, stance may be used as a segmenting feature or as a feature in a profile of a node such as the profile on which the process may segment or cluster.

In example embodiments, stance may be added as a feature vector. For example, edges may be weighted by stance. This may utilize a decision boundary, for example with SVM, as a measure of a degree of a node's stance. Other implementations may include co-occurring stances on multiple targets and patterns of stance agreement or disagreement over a period of time (e.g., the feature vector may be similar to a "fingerprint" but only for stance). Stance may be part of other implementations using feature vectors to identify and segment groups in a network.

Examples and Advantages of Unsupervised Learning Approach for Stance Detection

In example embodiments, the system and/or process of the disclosure may utilize an "unsupervised learning approach" that is similar to the supervised approaches described in this disclosure but instead includes automation of manual supervision steps. The "unsupervised learning approach" may use natural language processes to understand words that may be complex. In some examples, the unsupervised learning approach may perform both exploratory work up-front as well as trial and error. These approaches (e.g., both unsupervised and supervised approaches) may be used in determining a set of business rules and that a methodology may be sound for classification.

In example embodiments, there may be several advantages to utilizing the unsupervised learning approach. For example, the unsupervised approach may be preferred due to less training data needed compared to the supervised approaches which may need thousands to tens of thousands of identified observations or instances. While the unsupervised approach may require more resources initially, over the lifetime of this technology there may be constant decreasing of resources and related costs per use. Once the unsupervised system is developed, it may be used with some regularity with mainly computing costs remaining. In some examples, the unsupervised approach may be relatively accurate in classifying individuals (e.g., 95% accuracy) as compared to supervised approach (e.g., same if not better accuracy).

In example embodiments, the entire mapping system of the stance detection process may be based off unsupervised clustering and may reveal these communities based off latent information about who the users follow. Utilizing unsupervised approaches may allow for performance of various kinds of models at a much larger scale that may be easier to scale since there is no need for any manual inputs (e.g., provide a report to customers without needing any extra information). For example, companies (e.g., car companies) or organizations may want to know main groups, main issues, and stances on issues. With the unsupervised approach, the companies do not need to provide any information to the system but instead this information may be provided in the system maps (e.g., showing communities that discuss automobiles in Europe and noting the main issues being discussed and stances on those issues). Theoretical descriptions of some of the steps in the unsupervised process may allow for providing large scalability without requiring much input data (e.g., less labeled data and fewer observations/instances). While unsupervised learning may require no labeling of data, it may require extensive feature engineering and algorithmic logic to ensure that appropriate information may be extracted from data users provide. There is a lack of need for any labeled training data that may naturally increase scalability where model outcomes may be tied to a number of human hours at an input stage such that scalability may not be limited to these human hours.

In example embodiments, unsupervised learning and stance detection may not include any labeled data. The stance detection unsupervised process may provide classification where there may be limited or no ground truth. Instead of classifying with a label, the process may analyze an extensive list of features and perform several rounds of trial and error to figure out which suite of features provide the most accurate segmentation for stance. With unsupervised learning, the process may still need to develop a notional construct of what features may be input to identify a node or a group stance on a particular target. This process may require more logic as well as more trial and error as compared to other approaches.

Examples and Advantages of Semi-Supervised Learning Approach for Stance Detection In example embodiments, the system and/or process of the disclosure may utilize a "semi-supervised learning approach". In example embodiments, the semi-supervised approach may be combined with active learning may be a particularly effective implementation. For example, the semi-supervised learning approach may include analysts that may go through a map and tag a few important cases (e.g., 10 or 100 instances of users who may have a particular interest in driving discourse on some issue). These tagged cases may then be used as starters to seed a semi-supervised model. For example, semi-supervised or unsupervised processes may be used to classify a significant amount of data (e.g., every single political blog that existed on Amazon). For example, two books by political figures (e.g., where one political figure is a member of one party and the other political figure is a member of an opposite party) may be used as seeds for a classifier. This may provide some predictions that there may be an output to users that one book may represent views of the first party, and the other book may represent views of the second party. A developer may be used for one round or a loop of supervision before proceeding with an unsupervised process. In some examples, the system and/or process may become fully unsupervised and scale from thousands to millions of data points. This semi-supervised approach may provide an opportunity for a median between getting some supervision but also letting the unsupervised portion of the system do the scaling into the millions.

In example embodiments, for these approaches, there may be a variety of processes and/or neural networks that may be utilized. For example, these approaches may utilize kernal methods (including a support-vector machine (SVM) model). In other examples, a reliable Bayesian hyperparameter tuning method may be used to provide quality results for an SVM model with much less effort and relatively low risk. If a neural network is incorporated at some stage, a supervised neural network may be preferred (e.g., including a feedforward neural network (FFNN), a recurrent neural network (RNN), an artificial RNN such as a long short-term memory (LSTM) network, a convolutional neural network (CNN) such as U-Net, and/or a machine learning framework called generative adversarial network (GAN)). The specific algorithm that may be appropriate for this system and/or process may depend on a final feature list (e.g., use either RNN or CNN). In some example embodiments, neural networks for clustering high dimensional data may be utilized such as a self-organizing map (SOM), self-organizing feature map (SOFM), or a Kohenon's self-organizing map (KSOM) which may be akin to k-means. In example embodiments, traditionally supervised neural networks may be used in a semi-supervised pipeline that may be supported by active learning or some other semi-supervision procedure. In some examples, less computationally complex models such as SVM may be used.

Semi-Supervised Approach for "Cobra Effect"

In example embodiments, a semi-supervised approach to stance detection may involve solving some degree of a "cobra effect" problem (e.g., when viewing a sentence and there are multiple subjects and objects in the sentence, how do you know who is referring to whom in any given sentence?) using natural language technology. This may be overcome with software that may provide stylometric analysis, grammatical analysis, etc. This software may be automated and a framework may be built to be turned into a model.

In example embodiments, "cobra effect" solutions may be implemented with the semi-supervised learning approach having an active learning framework that may address coreference resolution, a need for large amounts of training data, etc. In one implementation, the stance detection process may use Prodigy™ which may be an existing tool to help with active learning. In another implementation, Prodigy™ may be replaced with a similar software developed internally. Active learning may be a way to determine which examples may be most useful for a model in terms of labeling. For example, if there is unlabeled data and the system may only label five examples, the system may determine which five examples are going to help the model learn enough to improve its accuracy and be able to make classifications or predictions about stance for a maximum number of nodes. This may be determined partially through an approach that may be similar to zero shot learning where there may be a notional construct of what information may be helpful to make a classification or a prediction. Active learning may have similar underlying logic that may identify the most important data points, which may be given to a model to train the model to make a prediction or a classification. Then, the system may present these observations to a labeler for labeling. Using the active learning approach instead of a fully supervised approach (e.g., where there may be all labeled data) may be saving an extraordinary amount of human time and some computational time labeling the data. One key difference between the active learning framework and a relatively traditional weak supervision may be that the weak supervision approach may have some element of randomness.

Target and Modeling Processes for Stance Detection

In example embodiments, a "single target" process may be used where most stance detection models may be target-specific. This means that a model may be trained to predict stance toward one specific target (e.g., a particular food such as meat, or a particular politician). In other example embodiments, a "multi-target" process may be used where often model targets that are closely related and oppose each other may indicate that support for one target may imply opposition to the other target (e.g., vegetarian vs. pro-meat, Candidate A vs. Candidate B, pro-mask vs. anti-mask, etc.).

In other example embodiments, "networks of targets" may be used where stance toward one target may help in classifying/predicting stance toward another target (e.g., someone who is a vegetarian and pro-mask may be likely interested in health information such as exercise or nutritional information). Currently, the initial plan for stance detection (e.g., classification) may not include prediction of a node's stance towards multiple topics based on a node's stance towards one topic. Stance detection may be a classification problem whereas the "networks of targets" approach may be typically applied to stance prediction (e.g., related but different task). For stance prediction, the networks of targets approach may be used and combined with other network and semantic variables supported by an active learning framework to predict current or future stance of a node towards a target. In example embodiments, while transfer learning may be used (e.g., in the same realm as zero shot learning) to apply a model trained on one target to a novel target, there may be a model that may be capable of supporting multi-target classification but starts with a single test target and expand in the future. This process may support both the single target and the multi-target (e.g., multi-networked).

In example embodiments, nodes may have different meanings. For example, a network of Twitter™ users may refer to the nodes as accounts. A network of targets may refer to nodes as the targets. For "networks of targets", each node may be a target and edges between the targets may be relationships. Similarity may be measured between targets. For example, using a topic of politicians, there may be a network of targets that may include Candidate A, Candidate B, and Candidate C. In another example, using a topic of food such as meat, there may be a network of targets that may include vegetarians, meat caters, and fish caters. There may be some ground truth on the relationship between these targets and knowledge that users who are for vegetarians may be typically against eating meat. With this information, a measure of similarity between these entities or targets may be computed. This may be computed in a variety of different ways creating a network of targets.

In example embodiments, there may be various ways to construct the "networks of targets" to provide stance detection and/or stance prediction. In some example embodiments, the "networks of targets" may be fed a stance detection model. In other example embodiments, the "networks of targets" may be fed the stance detection model and some active learning. In other example embodiments, the "networks of targets" may be fed a knowledge graph. For example, "networks of targets" may use the stance that an account on Twitter™ has towards one particular target to infer the account's stance on a related but different target. For example, where the topic is about meat and fish, the system may use Twitter™ accounts and associated stances on meat to indicate that the accounts are against meat. This one feature may be part of a suite of features that may be fed into a prediction model to determine stance on fish. This may be a distinct machine learning task from classification in relation to stance and the "networks of targets".

In example embodiments, switching between two approaches may refer to switching between two different models. For example, the stance detection system may have a model that may be intended to work for a single target (e.g., one model per target) and may have a suite of models (e.g., 100,000 models to infer stance for 100,000 targets) but may run one instance of a model per target. The difference may be that one model may be trained for a single target versus another model may be trained for multiple targets. This allows the system to use a different instance of a model or a different model altogether. For example, with a multi target classification, then the process may shift from a stage of having a binary classification where there may be "for" and "against" to moving to a multi-class classification where there may be for target A, for target B, against target A, against target B, etc. A network of targets may be utilized for either approach. For example, information may be extracted from a network of targets to engineer features for either of these approaches.

In example embodiments, a workflow may be one model per target. This may refer to single target models where results may be assembled across models. If there may be one instance of a model per target, even with the same model type and same model architecture, the difference may be the data that is fed into a particular instance of a model for training. In example embodiments, the modeling pipeline may require at least one of: different feature engineering, active learning, combination of programmatic labeling and active learning, and the like based on the target.

In example embodiments, when applying stance detection models to data, there may be a need for a target on which to extract stances and data that may only relate to that target. For example, if a modeler may be interested in identifying Twitter™ users' stances on Candidate A or meat, the modeler may only receive posts on Candidate A or meat, otherwise the model may generate erroneous results based on unrelated posts.

Two-Step Modeling Process

In example embodiments, a "two-step modeling" process may be used to create a model in order to: 1) identify posts that may be related and unrelated to a given target, after which 2) related posts may be fed to the stance detection model. This process may rely on strongly supervised models for which every post in a sample may be known a priori to be related or unrelated to the target. In some examples, modelers may have a large sample of social media content that they know beforehand may be mostly related to the target (e.g., labels may not exist for every post).

Three-Stage Modeling Process

In example embodiments, a "three-stage modelling" process may be used in industry applications. The "three-stage modelling" process may include: 1) a model that may be first trained on data that has labels for related/unrelated content, after which 2) the model may be applied to a full sample of social media data, and then 3) the related data may be sent to the stance detection model. This "three-stage modelling" process may differ from the "two-step modeling" process in that the "two-step modeling" process may not require a reapplication of the stage-one model to another dataset before data may be sent to the stance detection model. This limitation may be significant where thousands of labeled posts of industry applications for the target may be rare. In example embodiments, the "three-stage modelling" process may allow for model training and application to be supported by an active learning framework to limit a need for extensive labeling of training data. In example embodiments, the "three-stage modelling" process that was outlined may be a generic workflow. The "three-stage modelling" process may include active learning. For the three-stage modeling process, a model may be trained on data that has labels which may then be applied to a full sample. Then, there may be an additional active learning step of labeling additional data, retraining the model, etc.

Example Modelling Solution for Stance Detection

In example embodiments, the stance detection system and process may include a modeling solution to address issues and/or problems described in the disclosure. One opportunity for better circumventing some issues may be to use programmatic labeling (e.g., Snorkel™-open-source system that may generate training data for information extraction systems) to filter out noisy and irrelevant data and then may use semi-supervised learning (e.g., with possible active learning) with language and network data. This may include segment-level metadata from a system mapping engine that may infer a relevance of a large sample of texts in one portion of the process with far fewer labeled examples (e.g., dozens instead of thousands). In example embodiments, active learning implementations may be utilized. For example, active learning may be used to extract some specific semantic components of stance (e.g., known active learning approaches may be used for speculation, contrast, condition, and the like). Some stance detection methods may utilize small "off the shelf" datasets for training, such as SemEval which is a series of natural language processing research data sets. In some example embodiments, the process of this disclosure may be specifically designed and trained to run-on real-world data at a relatively massive scale. The collection and usage of real-world data for model training may allow this process to run on real-world data. The scale may be supported by software architecture and design that may utilize horizontal scaling. In some example embodiments, use of SVM for stance detection may be combined with automated Bayesian hyperparameter tuning. This combination may be interesting and unique especially in its usage.

Stance Detection Using Programmatic Labeling and Semi-Supervised Learning

In example embodiments, stance detection may use programmatic labeling and semi-supervised learning. This may allow for both notable scientific advancement and high accuracy while automating removal of noisy and irrelevant data as well as limiting amount of labeled data required for industry applications. In an example embodiment, network mapping/community detection may be combined with topic extraction, named entity recognition, and sentiment classification to perform macro-level classifications of network clusters based on their stance (e.g., for/neutral/against) towards a particular topic, person, or organization. In example embodiments, combining "programmatic labeling" with "semi-supervised learning" may be a unique combination. Programmatic labeling may mean that the system may derive a set of rules that may be used to assist in the labeling of training data in an automated way via a classification model. This may include exploratory work and then providing pattern matching functions to engineer features for a classifier. Supporting this process via an active learning framework may limit the number of human touchpoints significantly. For example, typical supervised learning may require 1K data points whereas, in some example embodiments, the process may generate usable results with 20% of that data using programmatic labeling. Then, the process may further reduce the number of human hours by leveraging active learning thereby limiting labels required for most informative data points. Programmatic labeling may rely on pattern matching and an additional classification model. With Twitter™, for example, programmatic labeling may consist of engineering some text-based features (e.g., distribution of grammatical structures, extraction of specific words and phrases, etc.) and building an additional classification model to assign labels in an unsupervised setting. The additional step of active learning may both reduce the number of human hours spent on validation, re-labeling, etc.

In example embodiments, this combination of functions for stance detection in a semi-supervised SVM-based pipeline may be particularly interesting. For example, active learning may be combined with SVM, embeddings, and a network. In example embodiments, this process may include the following high-level steps. For example, a Twitter™ network may be collected and organized using the map-making pipeline or the network mapping process of the disclosure. Next, raw social media data (e.g., Tweet™ data) may be pulled out such that filtering may occur of Tweets™ containing the desired target. The process may provide a user interface for manual labeling of a small set of training data (e.g., 100 randomly sampled Tweets™). The process may perform named entity recognition using a syntactic dependency parser (e.g., a spaCy™ named entity recognition (NER) parser). This parser may include a word embedding strategy using sub-word features, "Bloom" embeddings, a deep convolutional neural network with residual connections, and/or a transition-based approach to named entity parsing. In example embodiments, the process may extract other relevant semantic features. This may include n-grams, word embeddings, stylometric patterns, topical distributions from a model (e.g., LDA or Top2Vec), and the like. The process may build a model. The process may include initial training and automated hyperparameter tuning (e.g., known next generation hyperparameter optimization software).

In example embodiments, the process may build an active learning apparatus. In some example embodiments, current implementations may be used or leveraged from third parties (e.g., text classification models of Prodigy™ and/or known multi-label active learning approaches for text classification). In example embodiments, the active learning apparatus may provide increased support for multiple types of sampling methods or the ability to provide multiple labels per document (e.g., cither to automate aggregation or to deal with multi-label classification). The active learning apparatus may be interesting in terms of its integration with the rest of the software ecosystem of the stance detection system and process of the disclosure. In example embodiments, the process may include some iteration of earlier steps to improve results, validate feature engineering decisions, label additional training data via active learning, etc.

Stance Detection System and Process Solutions

Stance detection may often use small data samples (e.g., ~4K amount of data) whereas, in example embodiments, the system and/or process may be set up and designed for large complex networks with multiple targets. For example, one known method that may be used is the "SemEval Task-B" process which may contain 78K observations for unsupervised classification on a single target. In other examples, a SemEval Task-6 process uses an even smaller dataset (~4K) and is fully supervised. The SemEval Task-B process is limited to sentiment and not stance. In example embodiments, the process may provide or include stance and sentiment classification, stance detection modeling pipelines, and information retrieval methods. While the SemEval Task-B process is exclusively for sentiment and uses a relatively small dataset, the stance detection process of this disclosure may be able to function across networks at a much larger scale (potentially orders of magnitude larger). For example, the stance detection system and/or process of this disclosure may be built to handle about 100 million or more documents in a computationally efficient way. In example embodiments, this may be accomplished by the implementation having specific data structures, computational operations, and software architecture.

In example embodiments, the process may use or include datasets (e.g., SemEval datasets) and modeling pipelines (two-stage, unsupervised, supervised, semi-supervised) as described in the disclosure. The system and/or process of this disclosure may provide a pipeline that may work with unique data, may be semi-supervised, may use Bayesian hyperparameter tuning methods, may use programmatic labeling, and may work with data orders of magnitude larger than currently known approaches. Further, this process may combine network and semantic features. For example, this process may be used for detecting stance toward targets in a data set (e.g., COVID-19 Nonpharmaceutical Interventions (NPIs)). The combination of these features may be particularly interesting with respect to social media use cases as described in this disclosure.

Data for Stance Detection

In example embodiments, most datasets may be used to train stance detection models that may be typically supervised. Most datasets may be created for target-specific models. In some examples, unsupervised datasets may be used (e.g., political debates) and may usually include a focused sample of texts that may only be relevant to a given target. In example embodiments, there may be accessible tables with extensive lists of these data resources.

Applications-Data Process

In example embodiments, a stance detection pipeline may be applied for use in maps that may be highly focused on a specific target. This approach may allow for text data collected from such maps close to what may be available for the aforementioned unsupervised models. In some examples, the process may need to remove a number of irrelevant posts. Once this data is set, the process may then apply a "programmatic labeling procedure" to remove as many noisy and irrelevant posts as possible. Then, the process may extract a random sample (e.g., 100 posts from each map cluster that analysts may believe are representative of groups that support/oppose a given target). Then analysts may label these posts and may verify the posts as either supporting, opposing, or irrelevant toward the given target. This dataset may then be used for the remainder of the stance detection pipeline of the process in this disclosure. The process may use a particularly unique network mapping methodology that may allow the stance detection process to function in a unique way by using network mapping for the data collection method. The system may create a unique data clearing and ingestion process given that the map-making process may result in a higher amount of relevant data on which to compute stance relative to a broad data collection (e.g., via a social listening tool). In example embodiments, using small and medium-sized enterprises (SMEs)-influenced programmatic labeling in combination with active learning (or programmatic labeling for stance detection using a semi-supervised model) may be interesting. Programmatic labeling may be as simple as an algorithm made up of a series of if-then rules or may be achieved using an existing tool (e.g., Snorkel™ tool). Further, in example embodiments, use of the semi-supervised approach may involve subject matter experts and active learning in combination with a myriad of other techniques as described in this disclosure. In example embodiments, active learning may be used via a bespoke type of software to identify the most important unlabeled data points in a set (e.g., points that maximize a model's ability to accurately classify other points) which may be presented to an SME-user for labeling. This presentation may be through a bespoke front-end interface or through manual annotation in a database. In some example embodiments, as described in this disclosure, an existing annotation tool (e.g., Prodigy™) may be used. In example embodiments, the process having a pipeline of map creation, joint network and language feature use, SME-influenced active learning and programmatic labeling, and SVM may be interesting.

Stance Detection System and Process Development

In example embodiments, the stance detection process and/or system may use or include general models, may use parts of speech (POS) to mask names, and/or may use weakly supervised learning to train on labeled sets (e.g., pro-meat vs. anti-meat/vegetarian, Candidate A vs. Candidate B) which may be applied to different datasets (e.g., data of other contexts). This may allow for transfer learning where the process may train on a larger corpus of X vs Y labeled sets. For example, an example use case for active learning may include a modular active learning framework (e.g., modAL), a Snorkel™ tool, custom setups with an optimized tensor library for deep learning (e.g., PyTorch™), etc. In example embodiments, a network approach may be used to infer potential stance groups. This network approach may use Bayesian language polarization techniques to learn which words may be most indicative of polarization between two groups and use this determination for the language part of "stance." Combining stance and sentiment may allow for improved comfort and confidence in providing this data analysis to users. In example embodiments, the process and/or system may provide an abstract modeling pipeline capable of handling novel targets. Most known stance detection processes use a small set of curated datasets (e.g., datasets from SemEval). These datasets typically have labels and metadata that indicate to a modeler the target for each document and the stance. In contrast, in some example embodiments, the process and/or system of this disclosure may provide a pipeline that may be both built on and used on real world data from social networks (e.g., Twitter™) that may not be packaged and labeled well with priory stance labels. In example embodiments, it may be preferred to have a model with data that may be curated and organized for a specific modeling task. In other example embodiments, the process may detect both targets and stance. This pipeline may be capable of handling complex logic for stance aggregation. The pipeline may be "abstract" in that it may be applicable to any target.

For example, the process may be used with a dataset of social media data (e.g., Twitter™ data) that may contain conversations (e.g., about NPIs for COVID-19). These social media uses are particularly interesting for stance detection. It may also be interesting that the process may incorporate segmentation or network structures where most similar systems are largely restricted to the stance of neighboring nodes to predict stance as opposed to classifying stance. In example embodiments, a combination of programmatic labeling, active learning, feature engineering, and SVM may be particularly interesting to stance detection. Combining stance detection (or prediction) with the Bayesian polarization technique may be particularly interesting as well. This may provide additional output of word lists that may be indicative of polarity. Combining this process with existing segmentation methodology may also be interesting.

In example embodiments, there are other interesting features to the process and/or system of this disclosure. For example, categorization of users or groups of users in network based on stances may be interesting. Also, for example, use in social networks (e.g., social network mapping) may provide a combination that appears to be relatively interesting in this field (e.g., implementations of stance detection in a social network space).

Figure 40:
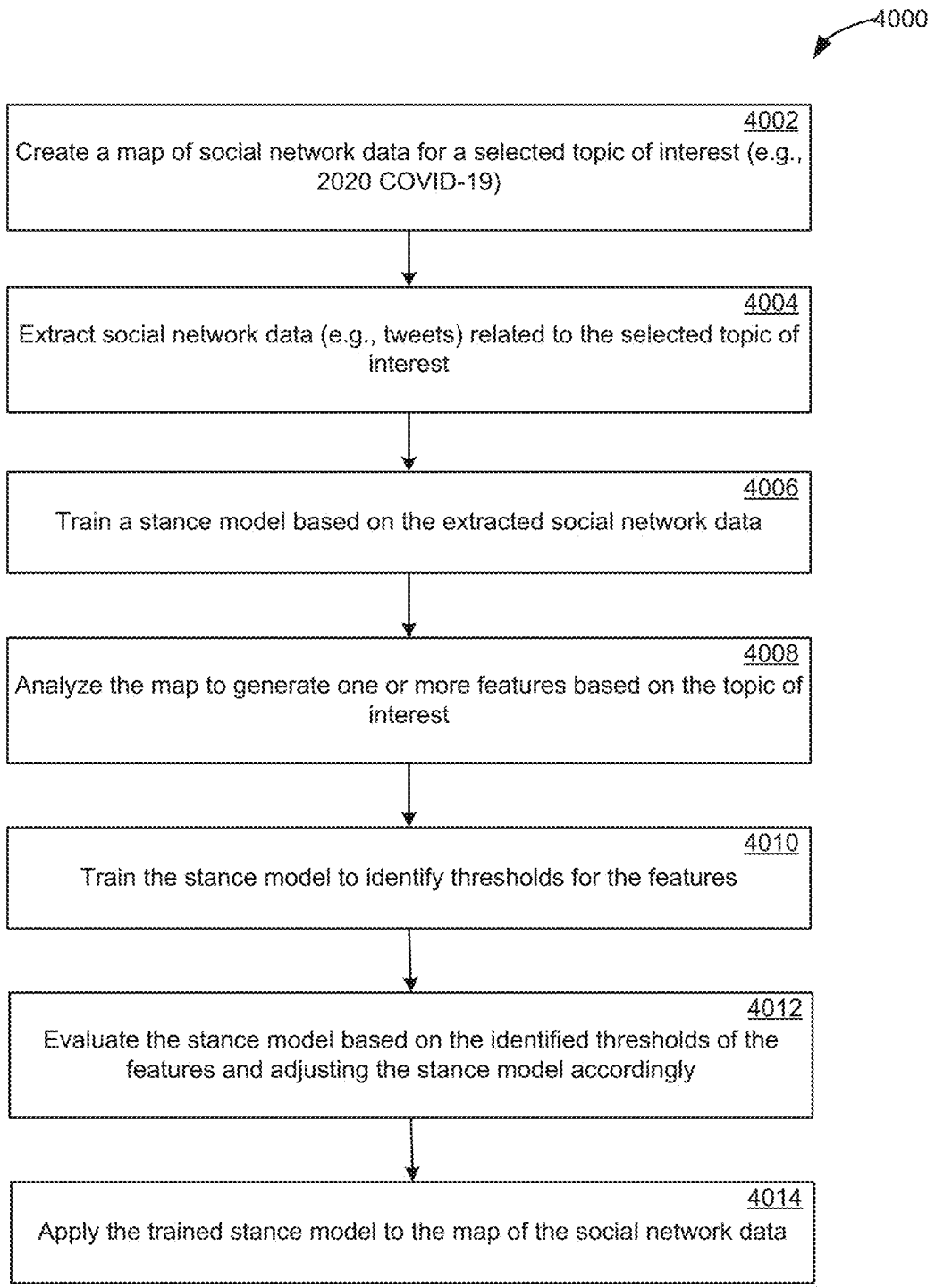
FIG. 40 is a flow chart illustrating a set of operations for a stance detection process according to example embodiments of the disclosure.

FIG. 40 shows an example flow chart for a stance detection process at 4000. In example embodiments, this process 4000 may create a map of social network data (e.g., using a data collection system 3812) for a selected topic of interest (e.g., 2020 COVID-19), at 4002. Social network data (e.g., tweets) related to the selected topic of interest may be extracted (e.g., by a data pre-processing system 3814), at 4004. A stance model may be trained (e.g., by a model training system 3826) based on the extracted social network data, at 4006. The map may be analyzed (e.g., by an analysis system 3824) to generate one or more features based on the topic of interest, at 3908. The stance model may be trained (e.g., by the model training system 3826) to identify thresholds for the features, at 4010. The stance model may be evaluated (e.g., by the analysis system 3824) based on the identified thresholds of the features and the stance model may be adjusted accordingly (e.g., by the model training system 3826), at 4012. The trained stance model may be applied (e.g., by the stance detection system 3830) to the map of the social network data, at 4014.

Figure 41:
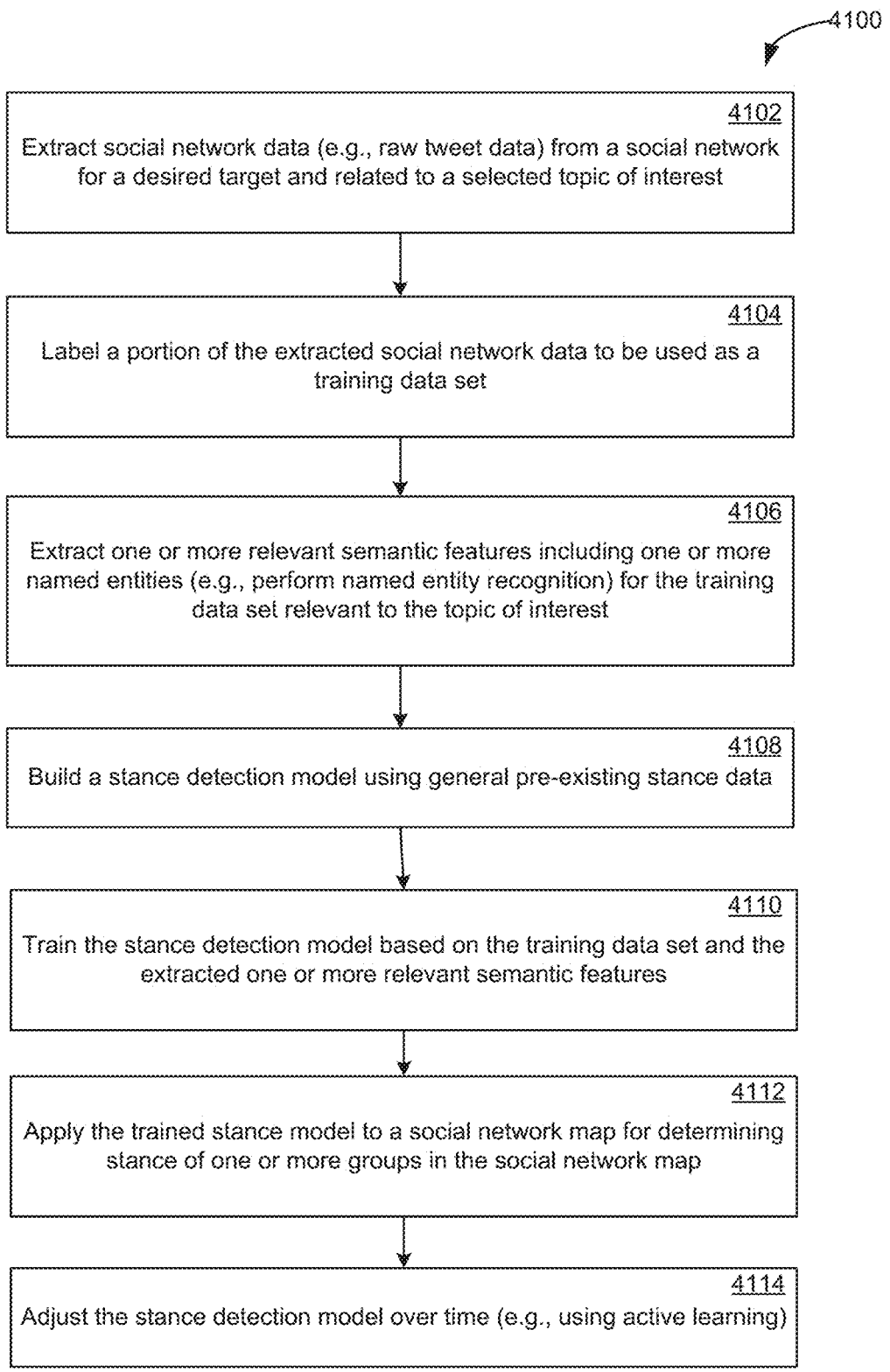
FIG. 41 is a flow chart illustrating a set of operations for another stance detection process according to example embodiments of the disclosure.

FIG. 41 shows another example flow chart for another stance detection process with a model adjustment process at 4100. In example embodiments, this process 4100 may extract social network data (e.g., raw tweet data) from a social network (e.g., by a data collection system 3812 and/or data pre-processing system 3814) for a desired target and related to a selected topic of interest, at 4102. The process 4100 may label a portion of the extracted social network data (e.g., by the data pre-processing system 3814) to be used as a training data set, at 4104. One or more relevant semantic features including one or more named entities may be extracted (e.g., the data pre-processing system 3814 may perform named entity recognition) for the training data set relevant to the topic of interest, at 4106. A stance detection model may be built (e.g., by the model training system 3826) using general pre-existing stance data, at 4108. The stance detection model may be trained (e.g., by the model training system 3826) based on the training data set and the extracted one or more relevant semantic features, at 4110. The trained stance model may be applied to a social network map (e.g., by the stance detection system 3830) for determining stance of one or more groups in the social network map, at 4112. The stance detection model may be adjusted over time (e.g., by the model training system 3826 using active learning), at 4114.

Content-Based Clustering and Analysis

According to techniques described herein, a computing platform 3800 may be configured to cluster social media source/target data (e.g., a source-target matrix) to yield target clusters in addition to, or as an alternative to, source clusters. As described herein, target clusters (also referred to as "content clusters") may be clusters of social media content entities, such as URLs shared via social media, hashtags, n-grams (e.g., common words or phrases), and other such content entities. Content clusters may be detected when sources interact with similar content (e.g., sources may tend to cite the same two hashtags in their social media posts) and in other situations when content tends to be related to other content. By contrast, source clusters may be clusters of social media accounts, social media influencers, domain names, or the like, which may form when accounts or other sources follow each other, interact with similar content, and otherwise act as groups. As described in more detail herein, the target clusters may be generated from the same data, and using similar tools (e.g., the same tools but using different configurations), that may be used to generate source clusters. Moreover, the computing platform may then analyze the target clusters, either alone or as compared to the source clusters and/or other data, in order to track the spread of narratives and other collections of content (e.g., campaigns, news, disinformation, etc.) across social media.

Techniques described herein may identify large-scale online communities based on patterns of similarity in their relationships and may measure the propagation of information in real time across complex networks. Techniques described herein may cluster large network subgraphs based on patterns of relationships between subgraph nodes and selected types of other relevant nodes, content sources, and content features. In example embodiments, this process may involve constructing a bipartite graph between subgraph nodes (e.g., "sources") and selected types of nodes, content providers, and content features (e.g., "targets"). Techniques described herein may cluster subgraph nodes based on patterns of co-attention to the same set of other nodes, content sources, and content features. Additionally or alternatively, techniques described herein may reuse a clustering engine by applying the clustering engine to the target mode of the bipartite graph, thus "flipping the axis," in order to discover clusters of nodes, content sources, and content features that are cited by similar actors or in the same posts.

In example embodiments, techniques for generating content-based maps may use co-occurrence of target nodes where the size of the node may indicate volume of a particular topic. In example embodiments, nodes may then be clustered and machine labeled using co-occurrence patterns. These maps may be created in one language at a time or for multiple languages across online and social media sources. Additionally, techniques described herein may improve on such clustering practices by creating fine-grained community segmentation based on a common set of actors interacting with the content (e.g., not just co-occurrence).

Additionally, techniques described herein may scale up network analysis capabilities and provide automated signals of malign influence campaigns. For example, techniques described herein may leverage advanced network clustering methods in order to detect clusters of content sources (e.g., domains, social influencers) and object types (e.g., URLs, words, phrases, hashtags, visual content, etc.) that are propagated by similar actors, advancing on techniques of co-citation analysis.

For example, the computing platform 3800 may reuse a source clustering algorithm to cluster "targets" (e.g., URLs, hashtags, and/or n-grams)—based on patterns of co-citation by sources (e.g., accounts that engage with these content markers). This process may involve "reversing" a clustering matrix to calculate similarity between targets by co-citing sources instead of calculating similarity between sources by co-cited targets. Additionally or alternatively, the source clustering algorithm may be expanded to include additional metrics of similarity as well as analyzing the interactions between source clusters of accounts created using the regular matrix and target clusters of content markers created using the reversed matrix. Additionally, the process may involve integration of target clustering with advanced reporting such as a Contagion Monitor and Coordination Framework to automatically detect emerging narratives in cyber-social landscapes.

Techniques described herein may focus on modeling network structures at scale (e.g., as captured online via friending, liking, following, and other micro-behaviors that express an individual's interests, attitudes, and affiliations), making detailed maps of the online communities that emerge from these behaviors. Techniques described herein may involve clustering the network to create a fine-grained community segmentation, which may then be leveraged to measure which objects and/or content are more highly concentrated in each community, for example by creating a "focus" score for every feature in every community. Techniques described herein may include (1) constructing the apparatus for generating source/content-based maps along with actor-based maps, (2) automatically characterizing the communities in these maps, and (3) extracting analytic insights from them. Techniques described herein may allow for tracking and measuring the flow of information and influence across large-scale online networks and understanding the various patterns of propagation in network space.

A challenge addressed by techniques described herein may include determining how information that flows in social media networks is represented at the individual feature level. For example, in Community X, certain URLs, images, hashtags, words, phrases, etc. may predominate, but in Community Y a different set of features may be more salient. Accordingly, in some examples the power of understanding unlocked on the actor side, in which authors and accounts are aggregated into distinct structural communities, providing significant dimensional reduction for analysis, may not yet be matched by sophisticated methods for aggregating the content (target) side. Some approaches to this kind of content aggregation, like topic modeling, may be challenging to interpret, and others that may be more intuitively understood by analysts, such as narrative detection, may require significant human engagement to train models, which may limit usefulness at scale.

Benefits of the techniques described herein may come from clustering information sources (e.g., social influencers and internet domains of shared URLs) in order to understand patterns in how the sources are amplified and consumed. Techniques described herein may also provide the opportunity to examine a number of historical information operations (e.g., based on existing historical actor maps and activity data from a relevant time frame).

As described in detail herein, a computing platform may configure and use a clustering algorithm on a source-target matrix in order to generate source clusters, and then may proceed to transpose the source-target matrix before re-clustering the same data in order to generate target/content clusters. In some embodiments, the computing platform 3800 may use different clustering configurations (e.g., it may cluster based on different edges) when it generates the source clusters and when it generates the target clusters. Thus, for example, the computing platform may be configured to calculate similarity between content based on co-cited sources, as well as to calculate similarity between sources based on friendship or following relations.

As non-limiting examples of source and target clusters provided for further explanation, source clusters may include identifiable groups of similar social media accounts and/or websites, such as accounts and/or sites that support a political party from a certain country, or accounts and/or sites that tend to report certain types of news. Content clusters may include content associated with certain topics (e.g., hashtags, words, phrases, and other content markers that may tend to occur in social media posts about alternative medicine) or other content types.

Techniques described herein provide several benefits. By clustering based on any combination of actors, sources, and content, the computing platform 3800 may generate data identifying sources and/or targets (e.g., discover sets of sources and/or targets) that are being amplified and cited in coordinated or structured ways, and may enable the identification of emerging narratives in social networks, generate data indicating how different audiences engage with such narratives, and may generate indicators of whether narrative spread is organic or coordinated. Moreover, such techniques may reduce the dimensions of data describing large-scale content flows in online networks, thereby simplifying further analysis (whether manual or automated).

Such techniques may be particularly useful when applied to the task of identifying and analyzing disinformation and other content manipulation. After the computing platform generates data indicating the patterns of interactions between network communities and information streams, the computing platform may use further coordination analysis techniques and other analysis tools (as described in the disclosure) to detect and analyze the artificial manipulation of content. For example, by clustering both modes of an author-network/content feature matrix, patterns of interaction between network communities and similarly propagated information streams may be identified. This may lead to detection of both natural (e.g., sets of content features and sources with similar audience-interest signatures) and coordinated (e.g., information operations) phenomena.

Figure 42:
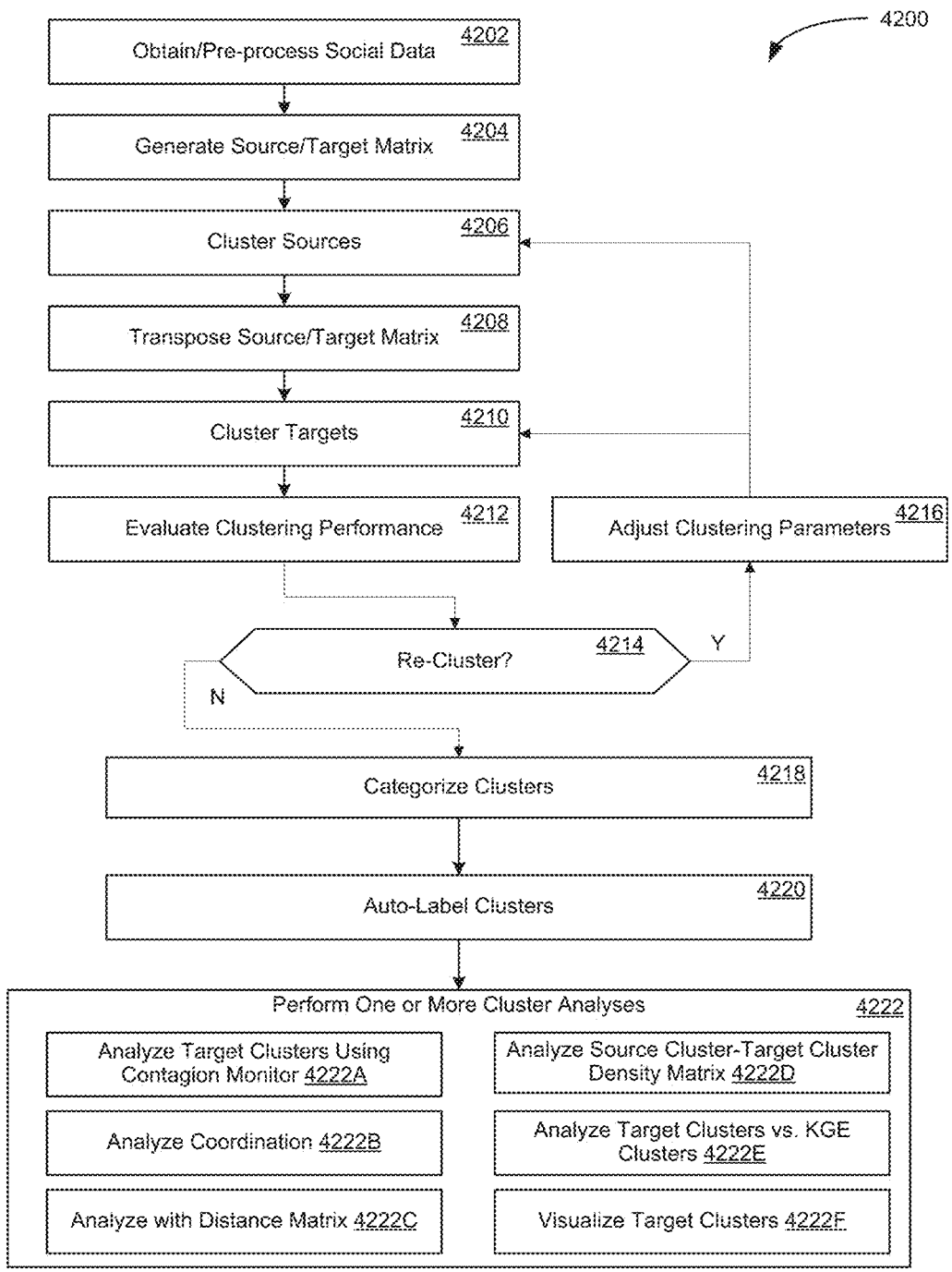
FIG. 42 illustrates an example process performed by a computing platform to generate and analyze content clusters according to some embodiments of the disclosure.
Figure 43:
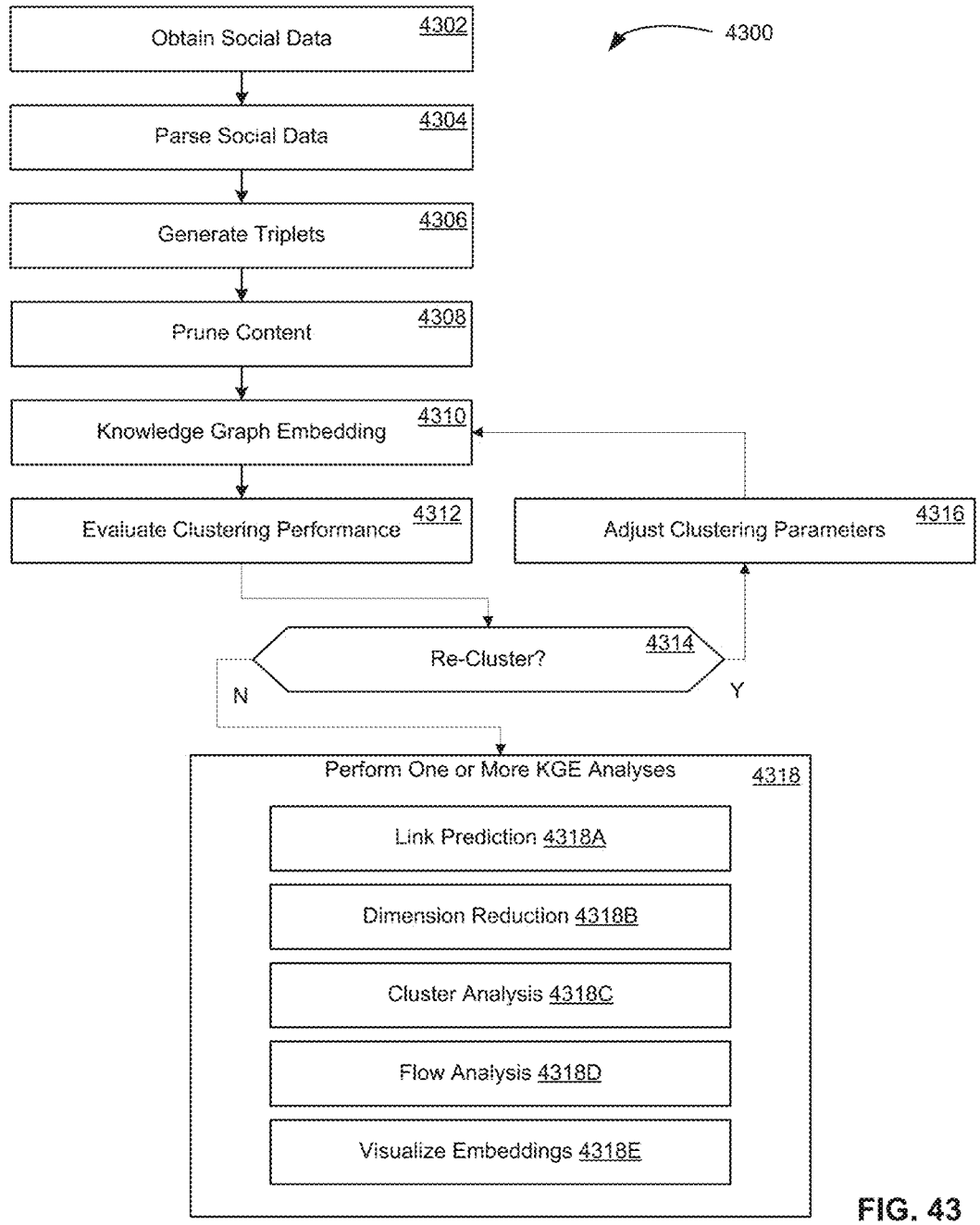
FIG. 43 illustrates an example process performed by a computing platform to generate and analyze cross-platform knowledge graph embeddings according to some embodiments of the disclosure.

Referring to FIG. 42, at step 4202, the computing platform 3800 (e.g., leveraging the data collection system 3812) may retrieve and pre-process data and/or a sub-set of data describing social media activity for one or more platforms. The computing platform 3800 may retrieve the data from the social media platforms 3840 and/or from commercial data providers 3850. The data may correspond to a particular time period (e.g., the past 30 days, a particular calendar year, a range between two dates, etc.). For example, at least 30 days of activity may be collected for actor nodes in a network, which may be leveraged to identify common actor interactions and segment content. In example embodiments, the computing platform 3800 may filter out low-engagement data sources to reduce the content set to a core of the most relevant and impactful activity in a cyber-social terrain. The social media data may indicate various data about social media accounts, such as what content each social media account posted or re-posted, cited, liked or otherwise interacted with, who accounts followed, mentioned, or responded to, and the like. In general, the process of gathering and pre-processing social media data is described in this disclosure with respect to Attentive Clustering and Analysis.

In example embodiments, large networks may be characterized by a skewed distribution of connectivity and activity. In other words, an overwhelming proportion of the actors in these networks may produce very little content and/or may be poorly connected to the rest of the population. The behavior of these actors does not shape key dimensions of their cyber-social terrain: these actors do not coalesce into influential communities, affect the behavior of many others, or introduce key topics into the content space around the terrain. Accordingly, the data gathering and pre-processing (e.g., network sampling methodology) performed by the computing platform 3800 may first remove these peripheral actors in order to identify the key dimensions of each cyber-social terrain.

In particular, networks may have a hierarchical structure, with increasingly dense and influential cores at each level of the hierarchy. The computing platform 3800 may therefore perform network reduction to surface this structure by representing each hierarchical level once the peripheral actors are removed.

In example embodiments, the computing platform 3800 may initialize mapping with a data collection query to discover nodes that match an intended scope of the map (e.g., a list of terms and hashtags). A node may be a social media account, such as a TWITTER account, a FACEBOOK public page, or a YOUTUBE channel, or any other entity described herein. The computing platform 3800 may use a combination of public APIs and commercial data providers to identify every node in scope for a map, as well as the network connections between the nodes.

Typically, tens to hundreds of thousands, or even millions, of nodes may make it into an initial mapping. The vast majority of these nodes may be inactive or poorly connected, however, the computing platform 3800 may use simple activity filters in combination with a sophisticated iterative process based on "k-core" network reduction to identify the influence core, the most active, best-connected nodes in a network terrain. Typically, ten to fifteen thousand nodes may make it past these filters and into the influence core, which may be further processed as source and target data.

As an example of data collection, the computing platform 3800 may use a TWITTER API to collect TWITTER post content data over a period of seven days associated with about 15,000 TWITTER users, active around COVID-19 vaccine-related disinformation. The 15,000 TWITTER users may have been identified using manual techniques (e.g., expert qualitative analysis), automated techniques (social network mapping, as described elsewhere herein), and/or using a combination. The computing platform 3800 may then select types of features available in the content to use in network construction. For example, a feature may be an element of the text (e.g., a word or phrase within it) or associated metadata (e.g., a URL referenced along with the text) in a particular post, or even a higher-level derived entity, such as the topic of the text generated using a topic modeling approach. The computing platform 3800 may then extract hits on each feature matching one of the types selected. In this example, a hit may be a particular instance of a feature, in conjunction with its associated time of use, social media post identifier, and social media account handle. The TWITTER API may automatically identify all the URL, hashtag, and @-mention features associated with a tweet. As a more specific example, a tweet including a hashtag and an @-mention may yield two hits: a first hit on a hashtag feature and a second hit on the @-mention feature.

As an example of data filtering, the computing platform 3800 may apply several filters to select the specific features to include in the content network. First, the computing platform 3800 may limit features by number of hits per feature to the top k for each feature type. The computing platform 3800 may set k to 5000. URLs may be particularly informative in some analyses (e.g., disinformation), so the computing platform 3800 may further filter hits by post identifiers to only those posts that include at least one URL. The computing platform 3800 may then generate network arcs from all hits for this filtered set of features. In this example, network areas are edges between features that appear in the same posts (e.g., co-posting), and are assigned an edge-weight, m, equal to the number of posts in which both features appear. The computing platform 3800 may filter the network arcs to have a minimum edgeweight, m. Because very low values of m (e.g., <5) may result in networks with too much density to distinguish topically specific content clusters from background conversation, and high values of m (e.g., >10) may omit such specific clusters altogether, the computing platform 3800 may filter based on a value of m of about 5-10. The computing platform 3800 may construct a network by feeding the filtered arcs into a network building engine that performs a k-core reduction and some additional pruning.

At step 4204, the computing platform 3800 may generate a source-target matrix defining rows and columns corresponding to the sources and targets derived from the social media data. Then, at step 4206, the computing platform 3800 may use a clustering algorithm to generate clusters of sources based on the source-target matrix. For example, the computing platform 3800 may generate user-based maps that segment into clusters of user accounts with similar interest patterns (e.g., Indian BJP Politicians or International Pro-Kremlin Conspiracy Journalists). In example embodiments, the clustering algorithm may use an incidence matrix of actors on one mode and selected object types (targets) on the other mode to calculate a pairwise distance matrix of actors. In the example embodiments, the clusters may combine influential social accounts and web domains at the source level. The process of generating a source-target matrix and deriving source clusters is described in more detail in the disclosure with regard to attentive clustering and analysis.

At step 4208, the computing platform 3800 may transpose the source-content matrix (e.g., the incidence matrix/matrices) to yield an inverted version of the same matrix and may tune the clustering process for optimal results. In other words, the computing platform 3800 may convert the rows to columns and the columns to rows. In some embodiments, the computing platform 3800 may also fill in data or prune data from the transposed matrix in order to yield better results. For example, the computing platform 3800 may remove certain types of source/content interactions (e.g., mentions) because such interactions may be too weak of a signal for the generation of useful narrative clusters. As another example, the computing platform 3800 may remove various content types based on their level of "peakedness" (described in more detail elsewhere herein) to identify particularly bursty or, alternatively, particularly persistent content interactions. Furthermore, the computing platform 3800 may choose to remove content types based on the sources interacting with the content, for example to filter out content interacted with by sources in communities not relevant to a particular analysis. Other such techniques may be used to enhance or otherwise prepare the data for content clustering.

At step 4210, the computing platform 3800 may leverage the clustering system 3816 to cluster the transposed source-content matrix (e.g., the inverted matrix). For example, the computing platform 3800 may construct one or more content-based maps that cluster features based on co-citation patterns by actors. The one or more content-based maps may segment into clusters of URLs, words, and/or phrases with similar co-citation patterns (e.g., Fact-checking Websites or Alternative Medicine Websites). Thus, the computing platform 3800 may generate clusters that combine content features (e.g., words, bigrams, hashtags, images, content URLs, etc.) at the content level. In some example embodiments, the computing platform 3800 may create clusters per feature type, such as clusters of hashtags, clusters of URLs, clusters of images, clusters of bigrams, clusters of words or phrases, and the like. Thus, the computing platform 3800 may create and examine a map of hashtags, a map of URLs, a map of images, a map of influencers, a map of web domains, and/or the like. Additionally or alternatively, the clusters may include a mix of feature types, such that a single cluster may include any of hashtags, URLs, images, bigrams, and other such content. The clustering algorithm may find clusters based on a node distance matrix generated using various distance measures, as described in more detail below.

In example embodiments, the computing platform 3800 generates a density matrix between an actor map and source/content maps. For example, a content-based clustering process may be developed to allow for a variety of techniques and tradecraft for examining how content is shared online. In some examples, content-based clustering may reveal topical groupings, representing coherent "dimensions of interest" for an actor network. Some of these dimensions of interest may be specific to a single community within the actor network, others may be of very broad interest, and still others may be of interest to specific communities that otherwise focus on divergent content streams. In an example embodiment relating to elections, there may be a political actor or persona (or hashtag) that may have unusually high positions of influence in specific fringe political communities ostensibly on an opposite side of the political spectrum from the actor or persona (or the position represented by the hashtag).

The computing platform 3800 may use any number of clustering algorithms to cluster the inverted matrix, including hierarchical agglomerative, divisive, k-means, spectral, and the like, each of which may have various merits for different networks and/or objectives. To cluster around one or more features, the computing platform 3800 may generate, from the source-content matrix and/or inverted source-content matrix, at least one distance matrix (e.g., a first distance matrix providing a distance metric between each source item and every other source item and/or a second distance matrix providing a distance metric between each content item and every other content item), which may be derived using co-citation measures (e.g., two content items, such as hashtags, may be determined to be closer in distance if they are cited by the same or similar sources). Additionally or alternatively, a distance metric for generating the density matrix may be derived using co-posting measures (e.g., two content items, such as hashtags, may be closer in distance if they tend to occur in the same social media posts). In particular, the distance between two content items may be derived based on one or more of these or other measures. In some embodiments, the computing platform 3800 may generate a "co-tweetedness" metric that measures the distance between content items based at least in part on the use of the content items together in the same or similar social media post(s). Additionally or alternatively, the computing platform 3800 may measure the distance between content items based at least in part on the use of the content items in different social media posts by the same content source (e.g., by the same social media account). Additionally or alternatively, the computing platform 3800 may measure the distance between content items based at least in part on the use of the content items in different social media posts by similar social media accounts (e.g., social media accounts with a small difference in a source distance matrix). Using one or more of the techniques described above, at least one distance matrix may be determined and the computing platform 3800 may derive the clusters using various clustering methods based on the at least one distance matrix.

In some embodiments, the computing platform 3800 may generate and use a multi-feature distance matrix for the clustering algorithm (e.g., a single distance matrix providing the distances between the various content items, including hashtags, URLs, n-grams, images, and any other content items). Additionally or alternatively, the computing platform 3800 may generate and use separate distance matrices for different features, for example, a first distance matrix may provide distances between hashtags, a second distance matrix may provide distances between images, a third distance matrix may provide distances between n-grams, and/or the like. Additionally or alternatively, as mentioned in the disclosure, the computing platform 3800 may generate and use at least one or more distance matrix providing the distance between source items. Similarly, the source distance matrices may be multi-feature source distance matrices (e.g., a single matrix with differences between each pair of accounts, domains, and/or other sources) and/or per-feature source distance matrices (e.g., a first matrix with distances between source pairs, a second matrix with distances between domain pairs, and/or the like).

In example embodiments, at step 4212 the computing platform 3800 may evaluate the performance of the clustering of sources and/or targets before analyzing the clusters. Clustering performance may be dependent on several factors. For example, clustering model parameters that configure the clustering models may not be optimal, such that the clustering results may include too many clusters, too few clusters, poor separation between clusters, or otherwise sub-optimal clustering. Accordingly, in example embodiments, the computing platform 3800 may be configured to evaluate the clustering performance at step 4212, and if the clustering performance evaluation indicates the clustering parameters should be adjusted, to adjust the clustering parameters at step 4216, and to then re-run the clustering (e.g., the source clustering 4206 and/or the target clustering 4210) using the adjusted parameters. In example embodiments, this process may repeat iteratively until the computing platform 3800 determines that the clustering parameters used to generate the source and/or target clusters are optimal and/or otherwise satisfactory. In example embodiments, the computing platform 3800 may determine, based on the evaluation 4212, that one particular clustering map (e.g., out of a plurality of clustering maps generated via the illustrated looping process) may be the best clustering map and proceed to analyze the clusters from the selected clustering map (e.g., using steps 4218-4222).

In example embodiments, the computing platform 3800 may be configured to evaluate the clustering results at step 4212 by comparing the clustering results to one or more metrics. As a simple example, the computing platform 3800 may determine whether less than a threshold number of clusters are generated (e.g., less than 20 clusters) or more than a threshold number of clusters are generated (e.g., more than 50 clusters). If the number of clusters generated falls outside the range defined by the minimum and maximum thresholds, the computing platform 3800 may determine to re-cluster at 4214 and adjust the clustering parameters at 4216 before re-clustering the sources and/or targets at 4206 and/or 4210 and re-evaluating.

Additionally or alternatively, the computing platform 3800 may evaluate the clustering performance at 4212 by evaluating the distinctness of the clusters (e.g., based on a silhouette score or some other metric of distinctness). In example embodiments, the computing platform 3800 may combine the distinctness metric and the cluster count metric in order to evaluate whether a large number of distinct clusters have been generated.

Additionally or alternatively, the computing platform 3800 may evaluate the clustering performance at 4212 by comparing the generated clusters to one or more previously-generated cluster maps. For example, an analyst may have marked a previously-generated cluster map as having optimal or otherwise satisfactory clustering, and the clustering map generated at 4206 and/or 4210 may be compared for similarity to the previously-generated cluster map. The computing platform 3800 may therefore analyze a similarity criterion in order to determine whether the generated clusters are sufficiently similar or not, and determine whether to re-cluster at 4214 based on the similarity criterion analysis. In example embodiments, the previously-generated clustering map may have been generated using a different process. For example, the previously-generated clustering map may have been generated using a knowledge graph embedding process, as described in more detail in the disclosure.

At 4214, the computing platform 3800 may determine whether to re-cluster (e.g., re-rerun the clustering algorithm using different clustering parameters) based on one or more of the criteria analyzed in step 4212. Additionally or alternatively, the computing platform 3800 may require a minimum number of iterations of clustering using various clustering parameters, such that the computing platform 3800 may automatically determine to re-cluster if the clustering has been performed less than a minimum number of times. Thus, if desired, the computing platform 3800 may perform a large number of clusterings using different clustering parameters in order to have the best chance at finding the optimal parameters. Similarly, the computing platform 3800 may define a maximum number of attempts (e.g., so that the process may not get stuck in an infinite loop). Additionally or alternatively, the computing platform 3800 may determine whether or not the evaluated metrics are trending better or worse compared to previous iterations though the re-clustering loop. Thus, for example, the computing platform 3800 may decide to continue adjusting the clustering parameters if the evaluated metrics are trending better, and/or to stop attempting to re-cluster if the evaluated metrics are trending worse.

If the computing platform 3800 determines to re-cluster, at 4216 the computing platform 3800 may adjust the clustering parameters. In example embodiments, clustering parameters may be selected from an optimal range defined for some or all of the clustering parameters. The computing platform 3800 may use different algorithms for finding an optimal set of clustering parameters, such as by randomly adjusting one or more clustering parameters in a particular direction and determining whether the clustering performance improves or deteriorates, then continuing to adjust a particular parameter in the same direction (e.g., if the performance improved) or attempting to adjust the parameters in the opposite direction (e.g., if the performance deteriorated) until a local optimum is found according to the criteria evaluated at step 4212.

At step 4214, in example embodiments, the computing platform 3800 may automatically categorize the content clusters generated in step 4210 (e.g., from the selected optimal cluster map as evaluated at step 4212) into one or more categories or "major groups." For example, the computing platform 3800, at step 210, may have generated a large number of clusters (e.g., 40-75 clusters), each containing some number of content features. This large number of clusters may be difficult or time-consuming to analyze, whether manually or automatically, without further processing to provide additional context on the clusters. Accordingly, the computing platform 3800 may group the clusters into a smaller number of categories for easier analysis (e.g., 4-12 categories).

In some examples, the computing platform 3800 may automatically map the various clusters to various pre-defined categories using AI-driven approaches, such as unsupervised, semi-supervised, or supervised machine learning approaches. Thus, for example, the computing platform 3800 may train an artificial intelligence algorithm that may map the cluster to one of a pre-defined number of categories based on a training data set that maps training clusters to the various pre-defined categories. Additionally or alternatively, the computing platform 3800 may use summarization techniques (e.g., text summarization techniques such as Huggingface text summarization) to dynamically generate descriptions of various clusters that may be used as categories, thus assigning the various clusters to dynamically generated categories. Other similar approaches may be used to auto-categorize the clusters into pre-defined and/or dynamically-generated categories.

For example, clustering techniques described herein may reveal 40-75 individual clusters across a large network, which may then be assigned to 4-12 major groupings/categories. In example embodiments, both the actor and source maps may have a similar granularity of individual clusters, which may allow the use of similar approaches to aggregating clusters into a more easily understood set of major groupings.

In some example embodiments, for actor-based maps, the grouping may be performed by manual inspection by an analyst. However, auto-grouping approaches may be more useful for content side mappings due to the rapidly changing data streams that may require ongoing monitoring and analysis. Thus, the computing platform 3800 may use auto-grouping capabilities that can be tuned for appropriate feature types such that grouping can occur at scale.

At step 4220, in example embodiments, the computing platform 3800 may leverage the labeling system 3820 to automatically label the content clusters using one or more descriptive labels. In some embodiments, the computing platform 3800 may store a database of descriptive labels that may be used for the labeling. Additionally or alternatively, in some examples, labels may be selected from one or more terms taken from the content cluster and/or that are related to terms taken from the content cluster.

Various approaches may be used to auto-generate the labels. For example, the computing platform 3800 may use a semi-supervised or supervised machine learning approach to train a model that maps clusters to one or more labels (e.g., labels appearing in a database of descriptive labels) based on training data correlating training clusters to labels. For example, the computing platform 3800 may use a supervised machine learning system on top of a large database of descriptive labels that may provide more context than single word mentions. Additionally or alternatively, unsupervised approaches may be used, such as automatic detection of one or more centroids from the corresponding cluster, and automatic selection of one or more terms associated with the centroids (e.g., hashtags, n-grams, or the like may be extracted and used as cluster labels if they are associated with a centroid of the cluster).

In example embodiments, the computing platform 3800 may use a machine learning-based system trained to provide descriptive label suggestions for actor-based map clusters. Such a system may be leveraged and adapted to bring a similar automated characterization capability to clusters in source/content maps, such that the library of content-based maps grows in correlation with the growth of machine learning training datasets.

At step 4222, the computing platform 3800 may perform one or more analysis steps (e.g., cluster analyses) after generating the clusters and (optionally) providing additional contextual data, such as category and label data. Such contextual data may enable a variety of manual and automatic analyses that may reveal various patterns of various actors or groups of actors interacting with various content clusters. For example, the user-based maps and/or content-based maps generated by the clustering techniques described herein may reveal the structure of communication and/or (dis) information flow in online social networks by identifying both segments of frequently co-cited content and patterns of interconnections between these segments across a cyber-social terrain. For example, the analysis may segment by web domain, hashtag, and/or other content-based networks into dozens of fine-grained clusters that represent foci of discussion and (dis) information production, (e.g., from alternative media to bundles of hashtags co-tweeted as part of malign influence campaigns). In example embodiments, the computing platform 3800 may leverage an ongoing collection of data to perform real-time or near-real-time detection, alerting, and trend analysis capabilities on top of content mapping. Additionally or alternatively, the computing platform may compare an actor-based map, a content-based map, and an embedding-based map on the same cyber-social terrain through measuring actor-content interaction densities and/or mixed-methods analysis of content-based clusters alongside embedding-based clusters.

Any or all of the analysis steps may be performed by, or in conjunction with, one or more analyst subject matter experts (SMEs). For example, analyst SMEs may examine the newly created source/content-based mappings, which may use a 30-day window of data, in order to characterize the broad nature of the results and their analytic application. These analytic assessments may compare each type of feature map and/or assess the comparative analytic value of the various feature maps. Additionally, the analysts may specifically look for patterns related to foreign state IO assets, overt and covert.

In example embodiments, the clusters may be analyzed with respect to changes over time. For example, to realize the analytic value of content clusters either in real time or in a historical context, the computing platform 3800 may generate activity metrics of related content features. In these example embodiments, the relative frequency of individual features may vary wildly. The computing platform 3800 may generate several sets of such metrics (e.g., the "peakedness" of a feature) to identify unusually regular patterns of engagement indicative of malign influence operations. These metrics may leverage the computing platform's custom list capabilities. Any of the analyses described herein may involve a temporal aspect and/or activity metrics.

In example embodiments, the computing platform 3800 may perform a first analysis 4222A that analyzes the clusters by inputting the cluster data to a contagion monitor. A contagion monitor process may automatically identify signatures of social reinforcement associated with units of content propagating on a network. Furthermore, the contagion monitor process may anticipate the critical mass inflection point at which content transitions to self-sustaining rapid propagation. The contagion monitor may analyze the most popular content flowing through data pipelines. By analyzing content clusters (e.g., lists of content automatically extracted from target-clustered maps), the computing platform 3800 may enable targeted virality prediction of different behaviors (e.g., fringe behaviors), including malign influence campaigns and other such behaviors, as early as possible. Thus, the enhanced monitor may be able to detect a viral influence campaign before it becomes too popular to counteract or fact-check, providing analysts with a critical temporal advantage in combatting online disinformation.

The contagion monitor process is described in more detail in the disclosure. Briefly, a contagion score may indicate a level of virality associated with an item of content, which may be used to distinguish when a particular content item (e.g., a hashtag) has gone from no or low-spread to a significant level of spread that may continue to propagate without any further promotion by the original promoters of the content. The computing platform 3800 described herein may be configured to generate contagion scores not merely for individual targets, but for target clusters. In example embodiments, the contagion score for a cluster may be derived from contagion scores for some or all of the elements of the cluster. For example, contagion scores for each target of a target cluster may be determined (e.g., using the contagion score process described in the disclosure), and a contagion score for the cluster may be derived therefrom (e.g., by averaging, weighted averaging, or a similar process). In embodiments, the computing platform 3800 may generate two contagion scores. For example, a complex contagion score may be generated based on the density of connections between sources engaging with a target. The complex contagion score may measure a spread of ideas (e.g., political and/or controversial ideas) in terms of social reinforcement. The computing platform 3800 may further generate a criticality score that may be used to detect when a trend or idea associated with a particular candidate feature (target) is about to "break out." As used herein, breaking out may refer to a candidate feature achieving enough popularity in a local group to enable the candidate feature to travel widely (e.g., in a time window) outside of that initial group of adopters. In these embodiments, the criticality score may be measured based on the time series of adoptions of the target and the density of connections between sources engaging with a target.

In example embodiments, the computing platform 3800 may perform a second analysis 4222B that analyzes coordination using various methods, which may include a coordination framework algorithm. As used herein, coordination may refer to specific patterns of citation and amplification involving source and/or content clusters, which may be either natural or artificial (e.g., manipulated). By comparing clusters of sources and content as against each other (e.g., using information fingerprinting), as well as against historical patterns previously determined to involve, for example, manipulated information, the computing platform 3800 may enable the detection and discovery of various forms of coordination.

In example embodiments, a coordination framework may be expanded with content-based maps. In particular, the computing platform 3800 may use a coordination framework tool to perform the coordination analysis, which may identify signals of coordinated behavior along three dimensions-network, temporal, and semantic-associated with particular units of content (e.g., hashtags, URLs). The framework may require that content units be identified or pulled from a pre-compiled list (e.g., most popular content sources in an actor-based map). In some examples, the framework's capability may be extended with an additional entry point through extracting content lists automatically from target-clustered maps. Again, such a tool is described in the disclosure. The computing platform 3800 may go beyond the analysis of individual signals related to individual pieces of content, but instead may develop signals of coordination for the content clusters as a whole. This process may involve combining the coordination signals associated with some or all of the items of content belonging to a content cluster (e.g., via averaging, weighted averaging, or the like), in order to develop a coordination score for a content cluster.

In embodiments, the computing platform 3800 may further analyze the success of coordinated attempts to promote content narratives. For example, if a particular content narrative (e.g., as represented by a content cluster) is being promoted in coordination by a particular group of actors (e.g., as represented by a source cluster), then the computing platform 3800 may measure the success of the coordinated promotion campaign based on whether the content narratives later spreads to other content groups (e.g., as represented by different source clusters interacting with the content cluster) and starts being promoted by other content groups. In some embodiments, this analysis may leverage distance and/or density matrices, as described in further detail in the disclosure.

In example embodiments, generating the content/source-based clusters may result in a pairwise distance matrix for all features. This distance matrix provides a potentially useful way to surface content features with a maximally similar pattern of online citation to a list of given features (e.g., in order to identify candidate IO assets). In example embodiments, the computing platform 3800 may thus perform a third analysis 4222C that uses the distance matrix (e.g., a distance matrix generated in step 4210, as described in the disclosure) to detect content features that are similar as indicated by citation patterns with one or more other content features. For example, using a distance matrix that provides a distance measurement between various content items, the computing platform 3800 may provide (e.g., to analyst devices 3860) an option to allow the analyst devices 3860 to submit one or more content items in order to receive a list of one or more similar content items, as indicated by the distance matrix. Thus, for example, the computing platform 3800 may receive a selection of one or more content items from an analyst device 3860 (e.g., content items that a particular analyst is investigating, such as one or more hashtags associated with a potential data manipulation campaign). The computing platform 3800 may, in response to receipt of the one or more content items, compare the one or more content items to other content items using the distance matrix, and select one or more other content items that are within a certain measure of similarity as the content items specified by the analyst. For example, the computing platform 3800 may select content items that may be above a threshold similarity (e.g., that have a distance score that may be less than a certain threshold) and return such content items to the analyst. In some example embodiments, the specified threshold may be received from the analyst device 3860 (e.g., it may be specified by an analyst). Additionally or alternatively, the analyst may specify whether the computing platform 3800 should return only content items within a threshold distance of each of the specified content items, whether the computing platform 3800 should return content items that are within a threshold distance of at least one of the specified content items, and/or the like. Such options and specifications may be transmitted from the analyst device 3860 to the computing platform 3800 (e.g., as part of a query submitted to the computing platform 3800), and the computing platform 3800 may responsively return the one or more content items that match the conditions specified by the query.

In example embodiments, the computing platform 3800 may perform a fourth analysis 4222D by generating a density matrix containing a density measurement for each source cluster/content cluster pair, and then analyzing the density matrix (e.g., cluster density matrix). In other words, the computing platform 3800 may generate an M×N matrix, where M is the number of source clusters (e.g., as determined at step 4202) and N is the number of target clusters (e.g., as determined at step 4212). Each density value in the M×N density matrix may indicate a measurement of the interactions between the source clusters and the target clusters (e.g., how frequently a particular group of sources interacts with a particular set of content). Thus, in example embodiments, the computing platform 3800 may construct a matrix of activity density between clusters of an actor network and clusters of associated source/content networks to reveal groupings and their relationships to the actor network. The computing platform 3800 may determine the density measurement based on various measures of interaction, such as a frequency measurement, a measurement of the fraction of a source cluster that engages with the target cluster at least a threshold number of times, and other such measures, which may be normalized in various ways. For example, density may comprise a normalized measure of engagement between a cluster of actors and a cluster of content, e.g., the fraction of all content engaged with an actor cluster that comes from a particular content cluster. Density may be normalized in various ways in order to observe meaningful relationships among online communities and sets of information sources and narratives.

In example embodiments, the fourth analysis 4222D may use a "two-mode" clustering approach, which may involve clustering nodes and outlinks to allow a variation of blockmodeling in which nodes are clustered on one axis, and outlinks on another, thus allowing for the study of link densities from each "attentive cluster" (the bipartite graph clustered on nodes) to each "outlink bundle" (the same graph clustered on outlinks). In these example embodiments, one measure of link density may be the number of links from members of the same attentive cluster to members of the same outlink bundle, divided by the number of possible links.

The computing platform 3800 may further provide the density matrix information to analyst devices 3860 for manual analysis, and/or may automatically detect strong relationships between source and content clusters, for example by selecting source/content cluster pairs that have particularly high density measurements. After detecting the strong relationships, the data indicating the strong relationships may be provided to analyst devices 3860 and/or to social media platforms 3840, which may take action if/when the relationships are indicative of manipulation or disinformation.

In example embodiments, the computing platform 3800 may perform a fifth analysis 4222E by analyzing target clusters with respect to clusters generated on top of (e.g., using) a knowledge graph embedding (KGE) and dimensionality reduction process, which is described in more detail in the disclosure with respect to the method of FIG. 43. Briefly, the KGE process may generate clusters that combine actors, sources, and content into complex, multi-platform clusters. By comparing the target clusters (e.g., as generated at step 4210) to KGE clusters (e.g., as generated by the process of FIG. 43), additional information about cross-platform behaviors may be detected and analyzed. In particular, this approach may provide powerful insights about cross-platform behavioral signatures of malign influence operations.

The computing platform 3800 may enable the analysis of the target clusters vis a vis the KGE clusters in various ways, including manual and/or automated. For example, the computing platform 3800 may provide similar target and KGE clusters (e.g., target clusters and KGE clusters with overlapping content) to analyst devices 3860 for further manual analysis. In some examples, the computing platform 3800 may generate silhouette scores or other such metrics of clustering effectiveness, and provide the metrics to the analyst devices 3860 as indicators of which clustering technique was more effective for a particular topic, social media dataset, etc. Additionally or alternatively, the computing platform 3800 may use the KGE clusters to automatically detect the spread of information from one social media platform to another, for example by correlating a target cluster associated with one social media platform to a KGE cluster that describes activity across multiple social media platforms, thus revealing if and when content clusters move from one platform to another.

Pure content-based mapping and knowledge graph embedding may have different strengths. For example, knowledge graph embedding may be computationally and analytically intensive, although it may be more comprehensive, while a pure content-based mapping may be faster and more accessible. Thus, the computing platform 3800 may compare the clusters generated by the two approaches on the same cyber-social terrain using both quantitative (e.g., silhouette score) and qualitative (e.g., analyst evaluation of the insights generated by the clusters) approaches. This comparison may provide a more nuanced understanding of the use cases when knowledge graph embedding maps are more analytically useful than content-based maps, and vice versa.

In example embodiments, the computing platform 3800 may compare the single platform maps (e.g., as generated using the process of FIG. 42) with the cross-platform maps (e.g., as generated using the process of FIG. 43) at multiple levels, including at an influencer level, at a cluster level, and at an account level. For the account level, the computing platform 3800 may determine, for each account in a single platform map that may also be in a cross platform map, whether the same edges are present. If the same edges are not present, the computing platform 3800 may determine whether it is because the pair is not in the map. The computing platform 3800 may analyze cluster-level information to understand how the cross platform map may add to information learned from the single platform map and how it differs.

For the cluster level, the computing platform 3800 may compare the maps to understand how the cross platform communities map onto the single platform communities. For example, the computing platform 3800 may compare nodes between the single-platform and cross-platform clusters, and may find that multiple cross-platform clusters combine to correspond highly to a single platform cluster, with some additional spread over the single platform clusters. In example embodiments, this comparison may require that the computing platform 3800 generates (or has already generated) single-platform maps from the data used to generate the cross platform map(s). In example embodiments, the comparison may involve the computing platform 3800 computing a density matrix or similar object that allows for visualizing connections in a matrix form in order to make the analysis easier.

For the influencer level, the computing platform 3800 may take the top N influencers from the single platform map, and may determine what cross platform clusters include the top N influencers. The computing platform 3800 may then thematically compare the result with the single platform clusters (e.g., based on cluster labels). Additionally or alternatively, the computing platform 3800 may determine what entities the top N influencers connect to in the cross platform maps. The computing platform 3800 may then analyze which additional edges in the cross platform map may be absent in the single platform map. Additionally or alternatively, the computing platform 3800 may determine whether the top N influencers are also influencers in the cross platform map.

In example embodiments, the computing platform 3800 may perform a sixth analysis 4222F by generating visualizations of the target clusters for further analysis (e.g., by analyst devices 3860). The computing platform 3800 may generate such visualizations in order to visually represent network proximity through position in a layout space and/or to represent clustering outcomes by visually distinguishing data point associated with each cluster (e.g., by color) in order to reveal the effectiveness of the clustering technique, allow interactive analysis, and the like. For example, clusters may be dimensionally reduced and plotted as 2D or 3D plots on two or three visual axes.

Figure 44A:
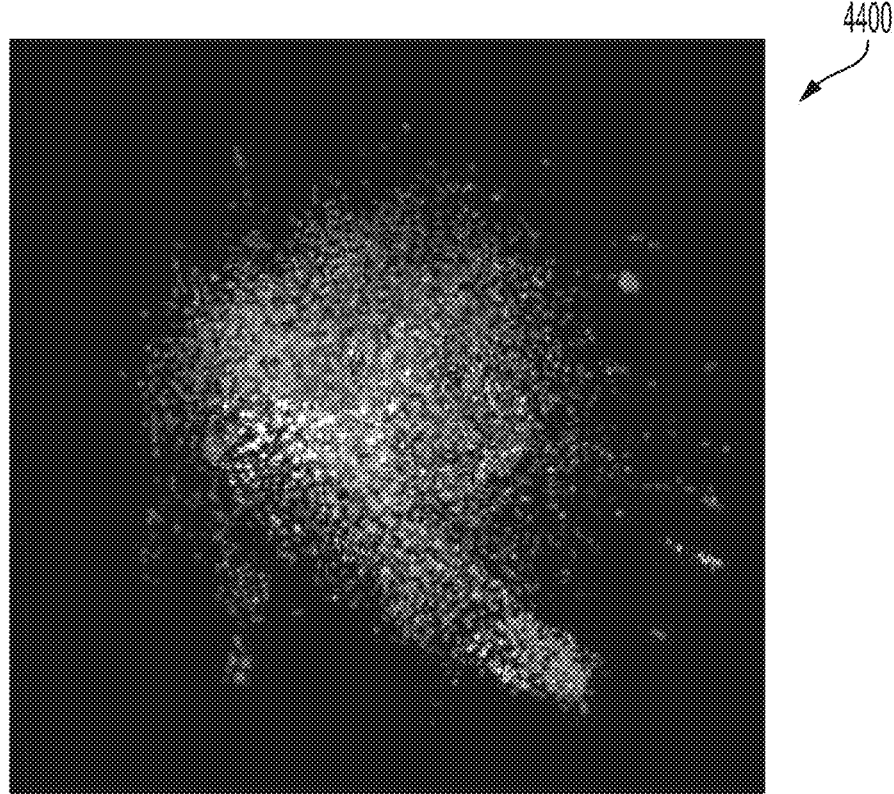
FIGS. 44A-B illustrate example visualizations generated by a computing platform according to some example embodiments of the disclosure.
Figure 44B:
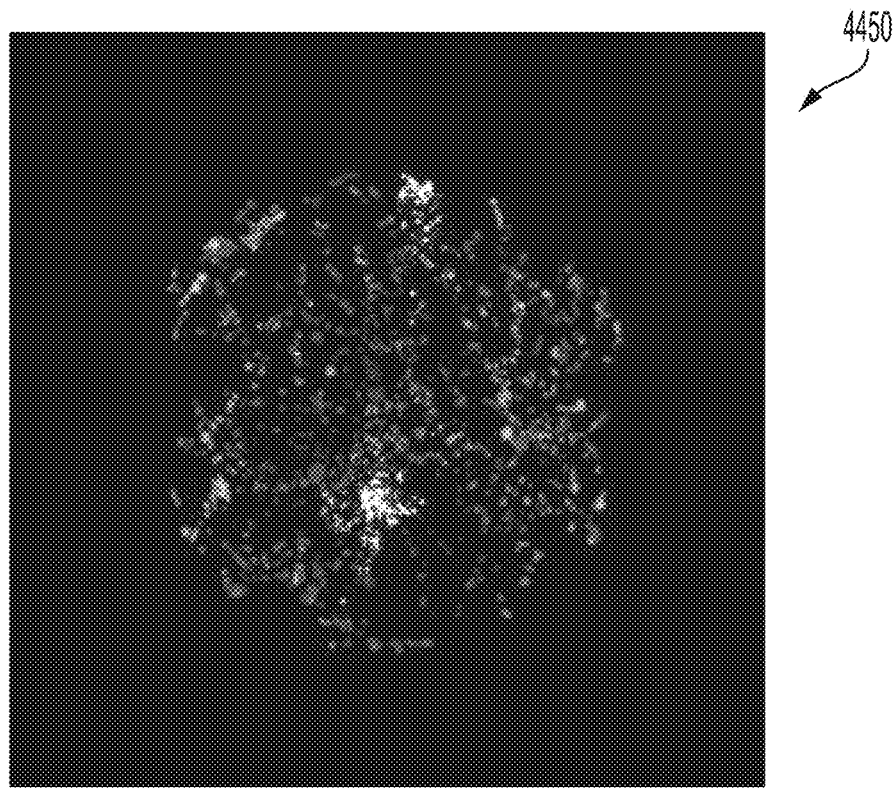

FIGS. 44A and 44B illustrate two example visualizations generated according to the methods described herein. For example, the example visualization 4400 shown in FIG. 44A may be a map of targets generated for a REDDIT network. The visualization 4400 illustrates several clusters of items in a layout space. In embodiments, different items (e.g., sources and/or targets) may be distinguished as illustrated in the example visualization 4400 and/or may appear in one of various colors, shades (e.g., grey shading), patterns, and/or the like such that clusters are observable according to the layout and illustrated colors, shades, patterns, and/or the like. Similarly, FIG. 44B shows an example visualization 4450 of different target types for a TWITTER network, where each item is displayed in a layout space such that clusters of target types are visible within the visualization 4450.

By providing one or more of the analyses 4222A-4222F, the computing platform 3800 allows for a deep and intuitive understanding of the grouping and spread of content across one or more social networks. Results of any or all of the analyses 4222A-4222F may be provided to analyst devices 3860, social media platforms 3840, and/or other devices, which may leverage the analyses (either manually or automatically) to detect content clusters, detect the artificial manipulation of content, take action against the spread of disinformation (e.g., delete disinformation posts, temporarily or permanently ban accounts that spread disinformation, etc.), and perform any other such actions in response to the various analyses provided by the computing platform 3800. Results of the various analyses described in the disclosure may be used to improve marketing of products and/or services based on identification of views, concerns, interests, etc. of at least a portion of people or users that are part of a consumer base.

Additionally or alternatively, results of any of the analyses 4222A-F may be used to expand understanding of digital fingerprinting and/or expand information operation (IO) archives. For example, the computing platform 3800 may store a variety of maps and datasets surrounding attributed information operations over several years, including by state and non-state actors. The computing platform 3800 may leverage attributed IO campaigns to analyze whether IO assets reveal specific patterns of citation and amplification related to source/content clusters. Additionally or alternatively, the computing platform 3800 may maintain a public database of publicly attributed IO assets. The results of the analyses 4222A-F may be leveraged to expand this archive to discover patterns in the citation of assets and content usable for fingerprinting new campaigns.

Knowledge Graph Embedding

The computing platform 3800 may further use knowledge graph embedding techniques to obtain and analyze cross-platform source-content clusters generated based on knowledge graph embeddings and/or dimensionality reduction techniques using various social media data. The knowledge graph embedding process may relate to and be used with analysis of cyber-social landscapes. As used herein, knowledge graphs may include semantic networks representing different kinds of semantic relationships between different types of entities. For example, knowledge graphs for social media platforms may include graph networks in which both user and content entities (e.g., users, tweets, hashtags, named entities, n-grams, etc.) may be represented as nodes with various relations between them (e.g., follows, retweets, co-occurrences). Thus, for example, two nodes corresponding to users may be related by a relationship specifying that one user follows the other. As another example, a user node and a hashtag node may be related by a relationship specifying that the user included the hashtag in a social media post. As a third example, two hashtag nodes may be related by a relationship specifying that the two hashtags co-occurred in social media posts.

In example embodiments, knowledge graphs may be used to model and visualize multiple types of entities/relations in maps. Knowledge graphs may combine content and user information, and combine content information across platforms (e.g., data on the same named entity across Twitter, Reddit, and VK). The analysis of knowledge graphs may occur via embeddings as described herein. In example embodiments, techniques described herein may use knowledge graph embedding to generate a high-dimensional representation of all "entities" active in a cyber-social landscape. In example embodiments, an entity may be an account, hashtag, URL, n-gram, or any other content marker (e.g., an individual post). In example embodiments, entities may come from any platform or data source within the same cyber-social landscape. Then, techniques described herein may use dimensionality reduction and cluster the entities into meaningful communities, visualize the embedding, and/or characterize the clusters for analytical value. In example embodiments, the resulting maps may support the comparison of cross-platform network structure and information flows within a cyber-social landscape, and/or the identification of emergent narratives as clusters of content markers. Additionally or alternatively, to assist in characterization, techniques described herein may generate a focus score to identify entities of particular interest to abstract communities.

In example embodiments, knowledge graphs are special types of graphs with specific terminology. As described herein with relation to knowledge graphs, entities may include any item (e.g., specified user, piece of content) that corresponds to a node in a graph. For example, each entity may be the knowledge-graph equivalent of a node in a typical graph. Each entity may be associated with an entity type indicating the type of entity, such as user, hashtag, bigram, etc. Relations may correspond to edges between the various nodes. In other words, the relations may indicate how the various entities are connected to each other. Each relation may also be associated with a type (e.g., relation type) that indicates how the entities are related. For example, one relation type may be a "follow" relation, which indicates that one entity (e.g., a first user) follows another entity (e.g., a second user). A second example relation type may be a "posted" relation, which indicates that one entity (e.g., a particular user) posted a second entity (e.g., a particular content item). A knowledge graph may be represented using triplets, which may include a head, a tail, and a relationship. Each triplet may be a trio of objects describing one connection in the graph. The head (e.g., head (h)) may indicate a first entity, the tail (e.g., tail (t)) may indicate a second entity, and a relationship (e.g., relation (r)) may indicate how the head entity and tail entity are related. Together, the head (h), tail (t), and relation (r) may form a triplet (h, r, t) which may be used as the structure of data for representing knowledge graphs. For example, a particular triplet may include a first user as a head entity, a second user as a tail entity, and a "follow" relationship. Because a knowledge graph indicates a plurality of relationships between a plurality of entities, triplets may be used to construct the knowledge graph.

In some example embodiments, temporal knowledge graphs may be generated for specific time slices in order to allow for time-based observations and clustering. For example, a first temporal knowledge graph may show relationships between entities that were created during a first time period (e.g., one user followed another user during the first time period, a hashtag was tweeted by a third user during the first time period, etc.), a second knowledge graph may show relationships between entities that were created during a second time period (which may be subsequent to the first time period), a third knowledge graph may show relationships between entities that were created during a third time period (which may be subsequent to the second time period), etc. In example embodiments, knowledge graph embedding techniques described in more detail in the disclosure may aggregate the plurality of temporal knowledge graphs to generate a single knowledge graph embedding with clusters representative of the overall temporal information.

The use of temporal knowledge graphs may enable the computing platform 3800 to gather insights and generate clusters with a time component. For example, instead of generating a cluster of social media entities associated with, for example, US conservatives or US liberals, the computing platform 3800 may detect and generate clusters showing US conservatives spreading messages during a particular time period (e.g., a particular month or year), US liberals spreading messages after a particular event, and/or the like. Thus, by using temporal knowledge graphs, the computing platform 3800 may use knowledge graph embedding techniques to produce clusters that may be based around certain moments in time and/or time periods, and thus may allow for a more fine-grained analysis that takes time into account.

Knowledge graph embedding (KGE) refers to a process of generating clusters based on knowledge graph triplets (which may come from a single knowledge graph and/or a plurality of temporal knowledge graphs). The clusters may include any type of entity represented by the triplets (e.g., the KGE clusters described in the disclosure may include both source and target entities). As used herein, the computing platform 3800 may be configured to perform the knowledge graph embedding process using triplets that correspond to entities in a plurality of social media networks, thereby generating cross-platform clusters that characterize entities on multiple social media platforms. For example, a single KGE cluster may include accounts and/or content on TWITTER, REDDIT, and FACEBOOK, indicating that similar information may be posted by a group of social media accounts across the three social media platforms. Furthermore, using knowledge graph embeddings, different entities such as tweets, users, hashtags, and/or named entities (NERs), etc. may all be represented by a high-dimensional set of numbers. Thus, clustering the embeddings may generate clusters that contain some tweets, some users, some hashtags, etc.

The process described herein significantly improves the state of the art because it may allow for the automatic identification and analysis of cross-platform information flows, and the detection of groups of accounts associated with those information flows, thereby significantly reducing the amount of time and labor necessary to detect and respond to organized disinformation campaigns and other similar tasks. Furthermore, the KGE process as described herein may beneficially allow for the simultaneous analysis of both source and content entities as a group, thereby speeding up the task of finding and correlating source groupings with content groupings.

Additionally, the use of temporal knowledge graphs may significantly improve the field by allowing for cross-platform clustering and analysis that further takes time into account, allowing for a fine-grained analysis that may identify, as just one example, when (dis)information flows from one platform to another, as well as other time-based analyses. As another example, adding the time dimension may allow the computing platform to detect not just stable communities, but also communities that coalesce around a particular narrative or influence operation at a particular time, during a specific time period, in response to a particular event, etc.

These approaches may be combined. For example, a knowledge graph that does not include time information (e.g., it is not a temporal knowledge graph) may be clustered using various techniques, and the clusters may then be compared to the clusters generated using temporal knowledge graphs for various analyses. As a result of including time information, the temporal knowledge graph clusters may be expected to be smaller and to relate to more specific moments in time. Comparing the larger clusters to the smaller time-based clusters may generate insights that reveal the structure of communities or narratives over long stretches of time as well as developments and changes over time. Thus, for example, a specific set of themes, hashtags, and/or other content markers associated with a coordinated narrative push may be revealed by comparing temporal content clusters to similar non-temporal content clusters.

The computing platform 3800 may also use the KGE process for link prediction, which refers to a process of predicting relationships that may not be represented in the knowledge graph (e.g., due to incomplete or incorrect information, or simply for predicting future activity). As described in further detail in the disclosure, link prediction allows, for example, the computing platform 3800 to predict that a particular knowledge graph entity is (or may be) related to another knowledge graph entity (e.g., that a particular user may be likely to follow another particular user, that a particular user may be likely to post a particular piece of content, that a particular piece of content may be likely to be posted together with a similar piece of content, etc.). For example, the computing platform 3800 as configured herein may be able to use link prediction to identify the users likely to tweet a particular hashtag/named entity, or retweet/follow a particular user. The link prediction process thus beneficially may allow for the enrichment of incomplete knowledge graphs (e.g. due to incomplete data), as well as for predictions of future activity that may be used in a variety of use cases (e.g., predicting future entity interactions, targeted advertising, suggestions of users to follow, etc.) and analyses. The use of temporal knowledge graphs may further improve the ability to predict future links by embedding time information that may reveal, for example, the rapid evolution of a particular narrative that may be likely to spread among certain subsets of a network.

Referring to FIG. 43, at step 4302, the computing platform 3800 (e.g., using the data collection system 3812) may retrieve and/or pre-process social media data from social media platform 3840 and/or commercial data providers 3850. The social media data may be formatted into a structured data format (e.g., JSON, XML, and/or the like) and stored in the database 3832 of the computing platform 3800 and/or cloud storage 3870. The data collection system 3812 and/or the data pre-processing system 3814 may perform various data pre-processing steps, such as spell correction, conversion from a first data format into the structured data format, and/or the like. Social media data may be collected from multiple platforms 3840, each of which may require different pre-processing steps (e.g., depending on a data format provided by an API of the respective social media platform). Additionally or alternatively, data may be collected from commercial providers 3850 that may use their own data format, which may require additional pre-processing configurations tailored to each commercial provider 3850.

At step 4304, the computing platform 3800 (e.g., using the pre-processing system 3814) may parse the data (e.g., social media data) in the structured data format to obtain parsed data prior to generating a knowledge graph. For example, the parsing process may recognize various entities (e.g., names of user accounts, hashtags, n-grams, URLs), and the like, that may appear in the social media data. In some examples, the computing platform 3800 may selectively parse for certain types of entities (e.g., common words, words of less than a certain length, etc. may be omitted) in order to reduce excess data collection. The computing platform 3800 may generate, through the parsing process, arc data that may describe arcs for social media entities. In example embodiments, the structured data may be timestamped to allow for the generation of temporal knowledge graphs.

In example embodiments, parsing may involve cross-platform entity recognition and matching. For example, the same hashtag (or variations of it) may appear across social media platforms, sometimes in various formats (e.g., TWITTER designates hashtags with a "#" character, whereas other social media platforms may use different characters), and the computing platform 3800 may recognize that the various versions of the same hashtag may be the same, assign them a canonical identifier, and/or the like. Similarly, the computing platform 3800 may, in some embodiments, recognize that various user accounts appearing in different social media networks may actually belong to the same user, assign the accounts a canonical identifier, and/or the like. In some embodiments, the computing platform 3800 may identify that different accounts may be related to the same user based on account names (e.g., a user may reuse accounts names across different platforms) and/or may refer to third-party resources (e.g., commercial data providers 140) that may indicate that different user accounts belong to the same user. The use of entity recognition and/or canonical identifiers may further allow for the tracking of entities across temporal knowledge graphs.

At step 4306, the computing platform 3800 (e.g., using the pre-processing system 3814) may generate triplets describing a knowledge graph involving the social media platforms for which data may be received at step 4302. The generated triplets may include entities that may be recognized during the parsing step 4304. Thus, the computing platform 3800 may generate, for each relation between two entities, a triplet specifying the two entities (e.g., user accounts, domain names, hashtags, n-grams, URLs, etc.) and the relationship (e.g., one user follows another, one user posted a content entity, two content entities appear together in the same post, etc.). In example embodiments, the triplets may be cross-platform triplets. For example, a first example triplet may specify that a first user on a first social network mentioned a second user on another social network. Similarly, a second example triplet may specify that a first user reposted content from one social network to another (e.g., posted a tweet on FACEBOOK or the like). In example embodiments, the triplets may be timestamped in order to allow for the generation of temporal knowledge graphs.

In some embodiments, the triplets may be stored in storage of the computing platform 3800 (e.g., in database 3832) and/or in cloud storage 160. In some examples, parts of the knowledge graph (e.g., the triplets that describe entities and their relations) may be used to generate a cross-platform knowledge graph from scratch. Additionally or alternatively, social media data may be collected iteratively over time, entities may be parsed from the recently collected data, and triplets may be generated and added to an existing cross-platform knowledge graph in order to iteratively update the knowledge graph over time. Thus, the computing platform 3800 may continuously collect data and thereby expand a knowledge graph over time. Additionally or alternatively, if temporal knowledge graphs are being generated, the computing platform 3800 may obtain and pre-process data for a particular time period, generate a temporal knowledge graph for that time period, and repeat the process for other time periods in order to generate the temporal knowledge graphs. In these example embodiments, the computing platform 3800 may continuously add new temporal knowledge graphs over time as time passes and additional data may be obtained and pre-processed.

At step 4308, the computing platform 3800 may prune content that may not be needed or desired for a particular analysis. For example, the clustering analyst devices 3860 may specify lists of topics, lists of entities, and/or other methods of identifying a subset of social media data in order to tailor the analysis to a particular field, topic, etc. In such examples, the computing platform 3800 may remove triplets that may not be within a certain distance (e.g., N degrees of separation) of the specified entities, or otherwise use methods of pruning the content so that the KGE process may not unnecessarily process extra data for a particular analysis.

At step 4310, the computing platform 3800 may perform knowledge graph embedding to generate clusters from the knowledge graph data (e.g., the triplets). Knowledge graph embeddings may be high-dimensional representations of the entities and/or relations in a knowledge graph that may encode all the information about each entity into a vector. In embodiments, the knowledge graph embedding 4310 may include, as a preliminary operation, the generation of a knowledge graph and/or a plurality of temporal knowledge graphs by combining the triplets into one or more data structures.

In example embodiments, the computing platform 3800 may use dgl-ke (a python library) to generate knowledge graph embeddings. To generate the knowledge graph embeddings, the computing platform 3800 (e.g., using dgl-ke) may sample the data and, for each sample, generate a set of numbers for each entity that may minimize the distances between related nodes. The cluster platform 100 may use deep learning or other neural network-based approaches to generate and optimize such numbers for the knowledge graph embedding. Over successive samples, the computing platform 3800 may minimize the distance as the embedding improves, thereby generating clusters.

In example embodiments, the computing platform 3800 may use the ComplEx or RotatE models of the dgl-ke library. For example, according to the ComplEx model, the score function (which may be a function of a head h, relation r, and tail t) may be Real (hT diag(r)t). According to the RotatE model, the score function may be $-\|h \circ r - t\|2$.

In particular, the computing platform 3800 may use negative sampling techniques to generate "composition" relationships, among other relationship types. In example embodiments, training may occur through negative sampling. Composition relationships may be those where a relation may be composed of two other relations. As an example to illustrate the principle, if Tom was born in Quebec and Tom is located in Canada, then Tom may be "from" Canada (e.g., a "from" relationship for the two entities may be deduced based on two other existing relationships where Tom may be both born in and currently residing in Canada).

Additionally or alternatively, in example embodiments that use temporal knowledge graphs, the computing platform 3800 may use RE-Net (a PyTorch package) to aggregate timestamped knowledge graph data into a plurality of temporal knowledge graphs and to perform the knowledge graph embedding using the temporal knowledge graphs.

At steps 4312-4316, the computing platform 3800 may evaluate the clustering performance of the clusters generated by the knowledge graph embedding at 4312, determine whether to re-cluster at 4314, and adjust the clustering parameters at 4316. In example embodiments, the computing platform 3800 may perform steps 4312-4316 as described for steps 4212-4216. In particular, the computing platform 3800 may, as described above, evaluate whether a large number of distinct communities were generated and may repeatedly run the KGE algorithm using different parameters to find an optimum set of parameters that generate a large number of distinct communities. Additionally or alternatively, the computing platform 3800 may compare the cross-platform clusters generated using the KGE process to the single-community clusters that were generated as described in the disclosure in order to determine whether the cross-platform clustering parameters were selected optimally or not. In particular, cross-platform clustering may be susceptible to sub-optimal clustering based on platform differences, such as differences between TWITTER and REDDIT, as one example. In this example, sub-optimal clustering parameters may tend to group TWITTER entities into one cluster (or a first set of clusters) and to group REDDIT entities into another cluster (or a second set of clusters) based on different data formatting, different length of content, use of hashtags or other tagging formats in one platform versus another, account name formatting, and/or other such platform differences, thus reducing the value of cross-platform clustering. In order to solve this problem and provide more optimal clustering that does not overly focus on minor platform differences, the cross-platform clusters may be compared to clusters generated by clustering single-platform data (e.g., as described elsewhere in this disclosure, such as by using a process according to FIG. 42 on single platform data) to determine how similar or different the clusters are to one another. For example, the computing platform 3800 may compare, for example, whether the same set of entities (e.g., a set of three social media influencers) appear in both a cross-platform cluster and a single platform cluster, whether other sets of entities recur in cross-platform clusters and single platform clusters, and/or the like.

At step 4318, various analyses may be performed on the clusters generated by the knowledge graph embedding process and/or information derived therefrom. For example, the computing platform 3800 may evaluate knowledge graph embeddings by performing link prediction or qualitative examination of embeddings and clusterings.

In example embodiments, the computing platform 3800 may perform a first analysis 4318A that predicts links that are missing from the knowledge graph (e.g., link prediction). In some examples, the system may evaluate how well a trained embedding may perform at predicting links in a graph. This may be predominantly how different algorithms may be evaluated against each other (e.g., testing embeddings). The computing platform 3800 may use a mean reciprocal rank measurement to predict links (e.g., measure of link prediction accuracy). For example, the computing platform 3800 may generate a validation set of triplets and, for each triplet in the set, may "corrupt" the triplet by swapping out a head entity and/or a tail entity. In some example embodiments, the computing platform 3800 may then take a random sample of the triplets and/or corrupted triplets. The computing platform 3800 may then score and rank both types of triplets (e.g., the real triplet vs. the corrupted triplets) based on a probability score for each triplet. The computing platform may then generate per-triplet reciprocal ranks, and then may generate the mean reciprocal rank based on where in the ranking each real triplet ends up.

In example embodiments, the computing platform 3800 may calculate a mean reciprocal rank using the following formula:

$$MRR = \frac{1}{|Q|} \sum_{i=1}^{|Q|} \frac{1}{\text{rank}_i}.$$

As a simple example, the computing platform 3800 may have two real triplets, each with two corrupted pairs. If the prediction generated by the computing platform 3800 ranks both the real pairs as the least likely to occur out of the three, their reciprocal rank may be 1/3, and the overall MRR may be 1/3. If both occur first, their reciprocal rank may be 1, and the MRR may thus be 1. The MRR may theoretically range from some very small number if every real triplet is ranked last up to 1, where every real triplet may be ranked first.

By performing link prediction, the computing platform 3800 may be able to generate missing or probable links for many purposes. For example, a predicted link may indicate that data may be missing from a knowledge graph. Additionally or alternatively, a predicted link may indicate a future connection between two entities (e.g., that a user may be likely to follow another user, that a user may be likely to post a specific content entity, that two specific content entities may be likely to be posted together, etc.), which may enrich the understanding of social media knowledge graphs and clusters, especially when data may be sparse (e.g., when only limited data is available and/or when a social media narrative is new). Moreover, because the knowledge graph embeddings may be cross-platform, the link predictions may indicate, for example, the likely spread of content from one social media network to another, the likely interaction of an actor on a first platform with content on a second platform, and/or the like. Additionally, when temporal knowledge graphs are used to create the knowledge graph embeddings, the embeddings may include time information that may be used to better predict future interactions (e.g., the continued spread of content). In other words, time-based knowledge graph embeddings may have extrapolation capabilities (e.g., for the spread of content throughout a platform and/or from one platform to another) based on time information contained within the embeddings.

In example embodiments, the computing platform 3800 may perform a second analysis 4318B where a trained embedding may be analyzed using dimension reduction techniques in order to generate more readily analyzable clusters from the clusters generated by the KGE process. Because the KGE process may generate relatively high dimensional data clusters (e.g., clusters within a 512-dimensional data space), the clusters may be difficult to manually or automatically analyze to yield useful information about social media. For example, when an embedding may be trained and the evaluation may be completed, there may still be a high-dimensional object (e.g., maps made may reduce the embedding to only 512 dimensions during training which may be considered relatively large). These 512 dimensions may be mathematically useful but may not always be analytically accessible without further processing. Additional methods may be provided to extract meaning from the embeddings.

In example embodiments, processes may be applied to cluster a trained embedding. Dimensional reduction techniques such as a topological learning algorithm (e.g., UMAP algorithm) may be applied to create familiar-looking clusters from the trained embedding. For example, the UMAP algorithm may be used to reduce dimensions of a dataset such as this high-dimensional data down to a much smaller number of dimensions (e.g., ten dimensions), which may allow direct analysis of the reduced dimension data. At the reduced number of dimensions, a clustering algorithm such as HDB-SCAN may leverage computational optimizations (e.g., K-D trees or the like) to generate clusters indicating source-content communities, and/or other analysis techniques allowing for more efficient clustering. This may allow for clustering of relatively large networks (e.g., hundreds of thousands or even millions of nodes) from a knowledge graph embedding.

In example embodiments, after reducing the dimensionality of the data and clustering the reduced data, the computing platform 3800 may perform a third analysis 4318C to characterize the "reduced" clusters and/or entities of the reduced clusters. Additionally or alternatively, in example embodiments, the computing platform 3800 may characterize segments or other portions of a knowledge graph based on the embedding data. The clustering platform 3800 may provide various types of analyses (e.g., on request). For example, the computing platform 3800 may generate a focus score for one or more of the source or content entities in a cluster in order to identify objects of particular interest in the cluster. Methods for determining a focus score for a particular entity are described throughout this disclosure. Briefly, a focus score may measure the degree to which a particular entity is disproportionately cited by at least one entity node of a particular cluster. After generating the focus scores for each entity in the cluster, the computing platform 3800 may select one or more of the cluster entities (e.g., one or more entities that may have a focus score that exceeds a predefined threshold, one or more entities that may have a focus score in the top X % of focus scores for the cluster, and/or the like) and characterize the cluster based on the selected cluster entities (e.g., label the cluster based on the selected entities). In some examples, because the clusters may include cross-platform data, the computing platform 3800 may then perform platform-based analyses that may characterize, for example, what content or source entities are most prominent on a first social media network vs. a second social network based on the focus scores.

In example embodiments, the computing platform 3800 may generate a word cloud for each cluster or other segment of the knowledge graph. For example, the computing platform 3800 may generate a word cloud using the most common words that occur in relation to each cluster/segment.

Additionally or alternatively, the computing platform 3800 may characterize clusters against other clusters. For example, the computing platform 3800 may generate homophily and/or heterophily metrics that may characterize similarities or differences of two clusters. The computing platform 3800 may thus generate metrics indicating how isolated or interconnected a particular cluster may be with regard to other clusters. For example, a heterophily metric may indicate how connected two communities (e.g., of user account entities) or other clusters/segments are compared to a baseline level of connection (e.g., the ratio between actual connections between two communities and a baseline assumption that all communities are uniformly connected). Similarly, a homophily metric may measure interconnectedness between entities within a single community/cluster/segment (e.g., the ratio between actual connections between entities of a community and a baseline assumption that all entities are equally connected).

Additionally or alternatively, the computing platform 3800 may characterize clusters in terms of entity type, social network, or other such entity-specific metrics. For example, one cluster may be predominantly content-based and/or may tend to have content items of a particular feature type (e.g., hashtags), whereas another cluster may be predominantly source-based (e.g., mostly user accounts). Clusters may further correspond primarily to particular social media networks. The computing platform 3800 may analyze the entities belonging to each cluster in order to detect the composition of the clusters and may thereby characterize the cluster in terms of its composition. For example, the computing platform 3800 may determine, for each cluster/segment, what platforms are dominant (e.g., which entities are associated with each platform). In example embodiments, each entity may be associated with one platform (e.g., a REDDIT account or an item of content that was posted on REDDIT) and/or some entities may be associated with multiple platforms (e.g., a canonical user identifier associated with a user account on TWITTER and an account for the same user on REDDIT, or a hashtag that may be used on multiple platforms). In example embodiments, the computing platform 3800 may generate a distribution of platforms for the cluster/segment.

Additionally or alternatively, the computing platform 3800 may characterize clusters/segments based on how interconnected the segment is. For example, the clustering platform 3800 may determine, for each cluster/segment, how many edges (e.g., relationships) go into the segment, how many edges go out, a proportion and/or a difference of edges in and edges out, and/or the like. In example embodiments, various interconnectedness metrics may indicate how important a segment is to the spread of content within a network.

Additionally or alternatively, the computing platform 3800 may determine the top (e.g., most common) relationship types for each cluster/segment. For example, the computing platform 3800 may determine the most common type of in-link relationship (e.g., a relationship between two entities within a segment/cluster) and/or out-link relationship (e.g., a relationship between an entity within a cluster/segment and an entity outside the cluster/segment). Relationship types may include, for example, a follow relationship (e.g., one user entity follows another), a posted relationship (e.g., a user entity posted a content entity), or any other type of relationship described herein. The computing platform 3800 may determine a percentage of each type of relationship for a given cluster/segment, a count of each type of relationship for a given cluster/segment, and/or some other frequency measurement.

In example embodiments, the computing platform 3800 may characterize a cluster/segment by generating entity-level information for one or more entities within the segment/cluster (e.g., all of the entities within the segment/cluster, the top 5 entities of a segment/cluster as measured by interconnectedness, or some other subset of entities within the cluster). The generation of focus scores is described in detail elsewhere in the present disclosure (e.g., with respect to attentive clustering and analysis in the disclosure). Focus scores may be generated for any type of entity (e.g., account, n-gram, URL, etc.).

In example embodiments, the computing platform 3800 may generate a relevance score for each of a subset of entities of the cluster/segment of the knowledge graph. The calculation of various relevance metrics is described throughout the present disclosure. The computing platform 3800 may use any of the described methods/metrics to calculate relevance. Each relevance score may indicate, for example, how a particular cluster or a particular community is engaged with a particular entity, and/or the concentration of one community onto one entity. Relevance may be measured for any type of entity (e.g., account, n-gram, URL, etc.).

In some example embodiments, a relevance metric may be based on an assumption that the number of edges (e.g., unique interactions) between a community and an entity is binomially distributed with the parameters K and theta (where K is the total number of links to the community across all entities in a map, and theta is the probability that a link to the community is the link to the object in question), with theta indicating the relevance. In these example embodiments, the computing platform 3800 may straightforwardly estimate the probability theta by dividing the total number of edges between the community and the objects by the total number of edges outgoing from the community K. However, in some examples, this straightforward estimate may lead to artificially high estimates of theta if K (e.g., the total number of links to the community) is relatively low. This approach may be improved upon by using a Bayesian framework. In other words, the computing platform 3800 may assume a prior probability and try to calculate the probability of the expected value of theta given X, where X is the number of edges between the community and the object. Using such a Bayesian framework, the computing platform 3800 may estimate the expected value of theta given X as follows:

$$E[\Theta|X] = \frac{X + dk_{obj}/m}{K + d}$$

where Theta, X and K are defined above, d is the average number of edges between an object and all communities, k_obj is the total number of edges to an object, and m is the total number of edges between all objects and all communities in the map.

In some example embodiments, although either a focus score and/or a relevance may be calculated to measure an importance of an entity to a community/segment/cluster of a knowledge graph, a focus score and a relevance score may be used for different purposes due to different strengths and weaknesses of each type of score. For example, the relevance score calculation using the Bayesian approach may be simpler and thus quicker to generate, and accordingly a computing platform 3800 may generate a relevance score for a greater number of entities (e.g., all entities of a map/graph), whereas the more complex focus score may be generated for a smaller number of entities (e.g., a subset of all entities). Additionally or alternatively, a focus score may be mathematically invalid in situations where there may be insufficient statistics for the calculation of a focus score and/or a node may be assigned to multiple clusters. For example, the computing platform 3800 may segment and/or otherwise cluster a knowledge graph by assigning a first set of entities to only a single cluster, in which case either a focus score or a relevance score may be generated for the first set of entities. Additionally or alternatively, a computing platform 3800 may assign a second set of entities to multiple clusters, in which case a relevance score may be generated for the second set of entities because the focus score is not mathematically valid for the second set of entities in some examples. Additionally, for similar reasons, the computing platform 3800 may generate a relevance score for cross-map comparisons (e.g., computing relevance for a first entity based on a first map where the first entity may be assigned to a first cluster and further based on a second map where the first entity may be assigned to a second cluster).

In example embodiments, the computing platform 3800 may compute relevance scores between various combinations of entities. For example, the computing platform 3800 may calculate relevance as between a narrative (e.g., a collection of content entities) and a community (e.g., a collection of user entities). In other words, the Bayesian relevance approach described throughout the disclosure may be used to calculate relevance for (and between) various entity collections in addition to calculating the relevance between a single entity and its corresponding cluster.

Additionally or alternatively, the computing platform 3800 may perform any of the characterization operations described in the disclosure with respect to FIG. 42. For example, the computing platform 3800 may categorize the clusters/segments into one or more categories as described in the disclosure with respect to step 4218, may use automatic labeling techniques to label the clusters/segments as described for step 4220 in the disclosure, may use the contagion monitor and/or coordination framework tools to analyze the clusters/segments as described for the analyses 4222A and/or 4222B, compare the clusters/segments to target clusters as described for the analysis 4222D, compare cross-platform maps to single platform maps as described for step 4222E, and/or perform other such analyses of the clusters/segments.

In example embodiments, the computing platform 3800 may perform one or more fingerprinting operations to characterize a cluster or other set of entities. The computing platform 3800 may fingerprint a set of entities using a unique mathematical signature for a particular set of entities (e.g., that may be linked to influence operations, disinformation campaigns, etc.). For example, the computing platform 3800 may calculate the average embedding coordinates (e.g., in the high-dimensional space generated by the knowledge graph embedding) across all entities of a set of entities in order to uniquely characterize the set of entities. Additionally or alternatively, the computing platform 3800 may calculate how dispersed the set of entities are (e.g., within the high-dimensional space).

Additionally or alternatively, the computing platform 3800 may fingerprint a set of entities by combining an average location (e.g., geographic location for accounts that indicate a geolocation) with an embedding vector generated based on words associated with the set of entities.

Additionally or alternatively, the computing platform 3800 may fingerprint a campaign based on annotations applied to the campaign (e.g., by analysts). For example, the annotations may include various categorical labels that designate various characterizing information for a campaign (e.g., a topic label, one or more labels indicating whether a campaign used digitally edited imagery and/or manually-edited imagery, a label indicating whether deep learning technologies were used in the campaign, a label indicating whether media objects were used in the campaign, a label indicating an amount of manipulation used by the campaign, a label indicating a country associated with the campaign, a label indicating presumed campaign source, a label indicating an intended audience, a label indicating a short phrase that is descriptive of the campaign, etc.). The computing platform 3800 may then fingerprint the campaign by clustering the annotation data (e.g., using K-modes clustering).

In example embodiments, the computing platform 3800 may generate fingerprinting information using stylometry data. For example, the computing platform 3800 may analyze statistical regularities in the texts of content to identify authors that post in similar ways. The computing platform 3800 may use stylometry techniques to detect coordinated behavior or disinformation in cross platform networks, such as when an influence operation tends to use a certain style or manner of spreading information. For example, the computing platform 3800 may identify a set of accounts that post similarly according to stylometry techniques, and to cross reference the set of accounts against various maps, cluster information, and other analysis and characterization information described herein.

In example embodiments, the computing platform 3800 may use the fingerprinting to compare clusters or campaigns with fingerprints of other clusters or campaigns to determine whether coordinated activity, or otherwise may be used to identify and/or analyze a particular set of content markers, a campaign, and/or the like.

In example embodiments, the computing platform 3800 may perform a fourth analysis 4318D by analyzing information flows (e.g., movement of content entities across a network/graph via time and/or the platform) for one or more entities (e.g., entities selected by an analyst). For example, the computing platform 3800 may analyze the location of a particular content entity within a knowledge graph (e.g., in what cluster or segment it appears) and how the entity is being engaged with. Additionally or alternatively, the computing platform 3800 may analyze the occurrence of a content entity across clusters and/or platforms. Accordingly, the computing platform 3800 may reveal the types of relationships for an entity (e.g., revealing patterns of engagement), who interacts with an entity (e.g., what types of users), and the like. Moreover, the computing platform 3800 may analyze how these and other factors change according to time in order to provide a better understanding of information flow within a knowledge graph, which may include cross-platform movements, within-platform movements, increases and decreases in popularity or other metrics, and/or the like.

In example embodiments, the computing platform 3800 may compute a cross platform bridging metric for one or more entities. The cross platform bridging metric may indicate an amount by which an entity may serve as a bottleneck for information flow. In example embodiments, the computing platform 3800 may indicate the number of different clusters to which an entity is directly connected. For example, the computing platform 3800 may calculate the bridging metric by calculating a sum of edge weights that exist between a selected entity and all entities that are not in the same community/cluster/segment as the selected entity.

In this example, the computing platform 3800 may calculate the edge weight between two nodes as the size of the union of the set of platforms on which both nodes appear. For example, if a content entity (e.g., a hashtag) is connected to a user on a first platform (e.g., TWITTER) and the same user (e.g., a node with the same user ID) on a second platform (e.g., FACEBOOK), the edge weight in this example may be three. Alternatively, the computing platform 3800 may calculate the bridging metric as the product of the betweenness centrality of an entity and the bridging coefficient of an entity. The betweenness centrality of an entity is the fraction of shortest paths between entity pairs in the knowledge graph, which paths include the focal entity. The bridging coefficient of an entity may be defined as:

$$\frac{1/\text{degree}(n)}{\sum_{nbr \in nbrs}(1/\text{degree}(nbr))}$$

where degree (n) is the degree, or number of outgoing/incoming edges for an entity in the knowledge graph, and nbr is one of the entity's neighbors in the knowledge graph.

In example embodiments, by using temporal data within the embeddings (e.g., when the embedding process uses temporal knowledge graphs), the computing platform 3800 may estimate probable ranges during which entities (e.g., content entities) were active (e.g., being spread) on a network and how the use of the entities changes over time. For example, the computing platform 3800 may track the movement of a hashtag over time and across platforms.

In example embodiments, the computing platform 3800 may further perform a fifth analysis 4318E of visualizing a trained embedding (e.g., visualize embeddings). This analysis 4318E may be performed by further reducing the dimensionality of the KGE data to two or three dimensions and then providing visualizations of the 2D or 3D data such as creating familiar-looking 2-D or 3-D visualizations of an embedding (e.g., to analyst devices 3860). These visualizations may appear similar to maps described in the disclosure (e.g., maps with dots of different colors may represent entities in different clusters) such that the dimensionality of the embedding may be reduced to the familiar two or three dimensions. In these visualizations, due to the knowledge graph embedding process, the node coordinates may correspond to the knowledge encoded about the nodes in the embeddings, so they may have absolute significance (e.g., two nodes may be close to each other not because of their relative interests to each other but because of their absolute behavioral and/or structural profiles). The computing platform 3800 may thus generate embedding visualizations that capture all of the behavior and relationships of an entity, not just its social network neighbors (e.g., visualizing networks based on clustering information rather than based on social network). These embeddings may provide a relatively richer and more accurate view of behavior than only social networks such that each embedding may capture all behavior and relationships of an entity and not only its network neighbors. In example embodiments, a dimension reduction technique such as uniform manifold approximation and projection for dimension reduction (UMAP) may be used to visualize the embeddings.

In example embodiments, a trained embedding may be characterized. For example, a mapping process may be executed such that a number of scripts (e.g., Python scripts) may be run to utilize algorithms and/or math to output various insights. These insights may include: who is in each cluster?; how do they connect to one another?; what are they interested in?, etc. These insights may be used to label the clusters. The scripts may include an adaptation of a cluster focus index (e.g., "focus score") to extract objects of interest from clusterings of knowledge graph embeddings.

Figure 45:
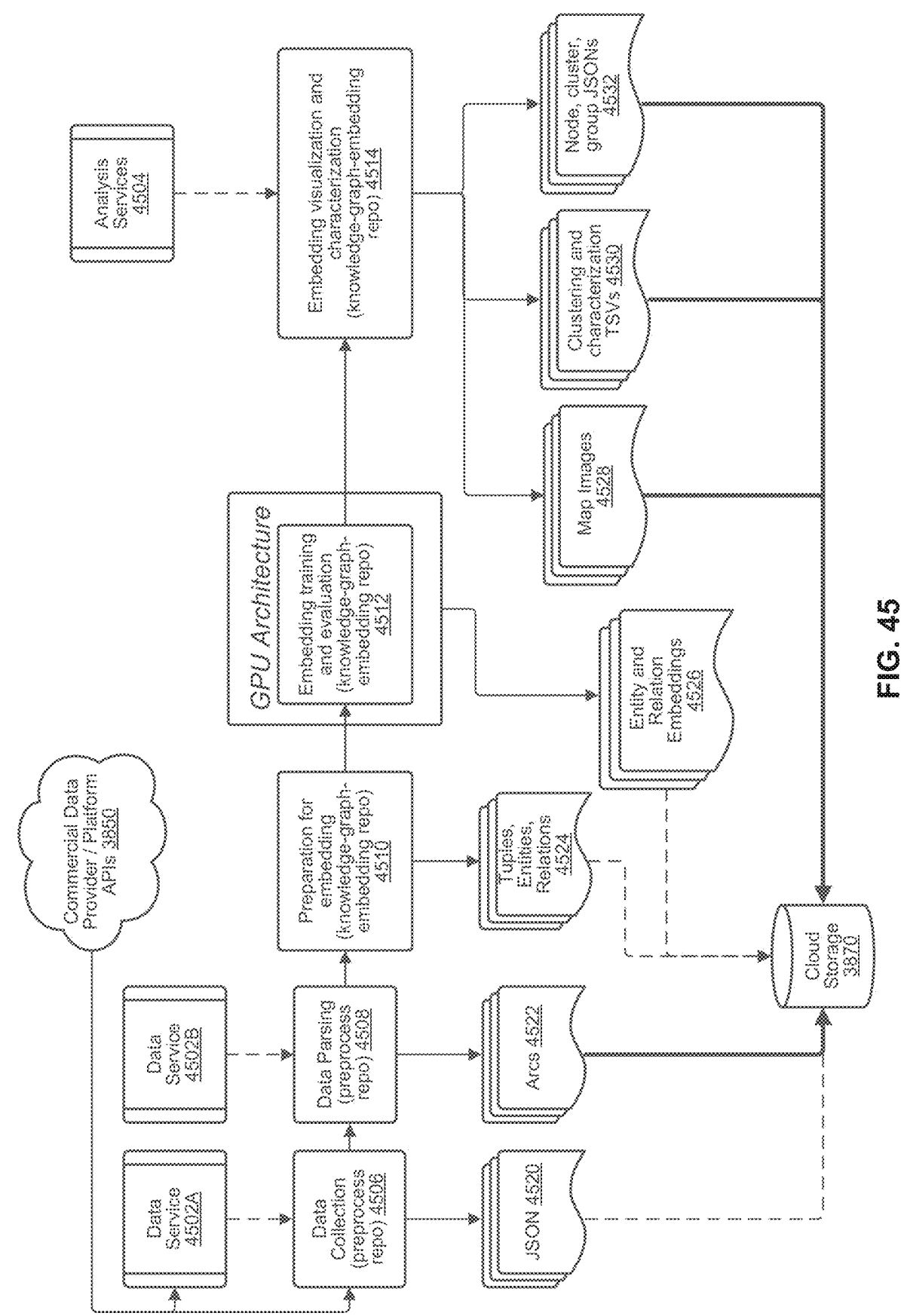
FIG. 45 illustrates an example diagram of a data flow for generating and analyzing cross-platform knowledge graph embeddings according to some example embodiments of the disclosure.

FIG. 45 illustrates an example diagram of a data flow for generating and analyzing cross-platform knowledge graph embeddings. In example embodiments, the data flow illustrated by FIG. 45 may be implemented by the computing platform 3800, the commercial data provider 3850, the cloud storage 3870, and/or any other device shown in FIG. 38. Moreover, the services illustrated in FIG. 45 (e.g., the data services 4502A-B and/or analysis services 4504) may be implemented by components of the computing platform 3800 (e.g., the data collection system 3812, pre-processing system 3814, knowledge graph embedding system 3818, visualization system 3822, and/or analysis system 3824). Additionally or alternatively, the code repositories ("repos") shown in FIG. 45 may be stored and/or executed by components of the computing platform 3800 (e.g., the data collection system 3812, pre-processing system 3814, knowledge graph embedding system 3818, visualization system 3822, and/or analysis system 3824).

The data flow may occur with reference to a particular topic selected for analysis. For purposes of illustration, an example scope may be a topic related to anti-vaccination. At the outset, the computing platform 3800 may identify the scope of interest using one or more keywords (e.g., keywords provided by analysts).

The data flow may begin with a data collection step 4506 for collecting data from multiple platforms (shown as commercial data provider/platform APIs 3850). In other words, data may be collected using one or more APIs or other data access methods for obtaining data pertaining to multiple social media platforms. The computing platform 3800 may collect the data (e.g., using a Data Service 4502A) as inputs. The input data may be, for example, raw data collected from multiple platforms. In example embodiments, the data service 4502A may receive the data, clean up the data, generate content features, generate actor features, and/or perform other such pre-processing steps. After collection and processing, the data may be formatted according to a structured data format (e.g., as JSON data 4520). The computing platform 3800 may store the structured data in cloud storage 3870. The structured data may include, for example, account handles and/or other information about social media users, as well as content features such as hashtags, websites, at-mentions, etc. (although, in some example embodiments, the various entities and relationships between them may not yet be identified). In example embodiments that use temporal knowledge graphs, the collected data may be time-stamped and/or stored in various collections according to one or more time periods.

According to a second step 4508 for parsing data (e.g., as performed by a second Data Service 4502B), relations between the various structured data (e.g., arcs 4522) may be identified. This data may represent identified users as well as content features related to the identified users. The computing platform 3800 may store the structured data in cloud storage 3870.

According to a third step 4510 for preparing for the embedding (knowledge-graph embedding repo), the computing platform 3800 may generate triplets (e.g., source, destination, and relationship data) or other tuples, identify entities, and identify relations. An illustrative example triplet may indicate that a source (e.g., Tom) is related to (e.g., tweeted) a target (e.g., an anti-vax hashtag). Another example triplet may indicate a first source (e.g., Tom) is related to (e.g., mentioned) a second source (e.g., John). Accordingly, the triplets may be used to represent multiple types of relationships between different entities of various types. The computing platform 3800 may store the tuples, entities, and relations data 4524 in cloud storage 3870. In some example embodiments, the computing platform 3800 may timestamp the triplets and/or otherwise associate with the triplets with a particular time or time period.

In example embodiments, a knowledge graph embedding step 4512 (e.g., embedding training and evaluation may then be carried out by the computing platform 3800 using the triplet data. The knowledge graph embeddings may allow for an understanding of relationships that exist as specified by the triplets.

The knowledge graph embedding step 4512 may generate the knowledge graph embeddings by selecting numbers that cause the various entities to be connected or closely nearby (e.g., in vector space) entities that have more similar vectors/signatures. For example, if a hashtag is frequently used by a particular set of user accounts, then the hashtag may have a signature that may be relatively more similar to the signatures corresponding to the set of user accounts. Additionally, the signatures of the various user accounts may transitively be similar to each other. In example embodiments, the knowledge graph embedding step 4512 may output entity and relation embeddings 4526 that may be stored in the cloud storage 3870.

The computing platform 3800 may generate the knowledge graph embeddings using deep learning neural networks, which may leverage a training set, a validation set, and a test set. The ground truth for the deep learning neural network may be the actual links observed in the knowledge graph, as specified by the triplets used as inputs for the knowledge graph embedding. The output of the knowledge graph embedding may be a data structure (e.g., a list) comprising the entities in the map and a unique vector signature and unique key for each entity.

The key generated by the knowledge graph embedding may be a relatively long key, which may be used to richly represent the complexity of the relationships in the cyber-social space. For example, the key may be 512 dimensional (e.g., 512 characters/numbers per key).

According to step 4514, the computing platform 3800 (e.g., using various analysis services 4504) may analyze the knowledge graph embeddings in various ways (e.g., relating to embedding visualization and characterization). Some of the analyses may seek to reduce the complexity of the knowledge graph embeddings in order to improve the understandability of the knowledge graph embeddings. In example embodiments, the embedding visualization and characterization step 4514 may output map images 4528, clustering and characterization tab-separated values (TSVs) 4530, and/or node, cluster, group JSONs 4532 that may be stored in the cloud storage 3870.

For example, the computing platform 3800 may generate map images 4528 to visualize the knowledge graph by using a UMAP algorithm to reduce the knowledge graph embeddings from a large set of dimensions (e.g., 512 dimensions) to two and three dimensions more appropriate for visualization and generating the map images from the reduced dimensionality data.

Additionally, the computing platform 3800 may reduce the dimensionality to a relatively small number (e.g., 10 dimensions) using the UMAP algorithm and may subsequently use a clustering algorithm (e.g., HDBSCAN) to cluster the entities. Thus, in addition to having unique key, each entity may have an assigned cluster. The computing platform 3800 may then analyze the clusters to understand what is in each cluster. The computing platform 3800 may thus analyze the different entities and the types of the entities. For example, the computing platform 3800 may determine if a given cluster contains hashtags, hashtags and people, etc. and/or may determine other different characterizations of the clusters as described throughout the disclosure.

The computing platform 3800 may further analyze the connections between clusters. For example, the computing platform 3800 may determine that two clusters may have many connected edges using various measures, such as homophily and heterophily, as described in detail in the disclosure. The computing platform 3800 may further detect popular entities (e.g., across the map and/or in any given cluster), popular content entities, etc. The computing platform 3800 may also perform any other analyses, such as the creation of word clouds, the analysis of information flows, the flow of data from one platform to another, the detection of groups of actors spreading groups of content, etc. as described elsewhere herein.

In example embodiments, the computing platform 3800 may generate assessments from one or a plurality of maps. For example, the computing platform 3800 may create a first map from data collected on a particular day, a second map from data collected on a different day, etc., to yield a plurality of maps (e.g., 10 maps). The computing platform 3800 may then be able to detect, for example, that one cluster is engaging with a particular piece of information (e.g., an anti-vax hashtag) on a first day, that by day two the hashtag has spread to a second platform, that by day three larger groups of people are engaging with the hashtag, etc. In example embodiments, the computing platform 3800 may perform link prediction using the knowledge graph embeddings. For example, based on a first example triplet connecting a user Tom to a hashtag, the computing platform 3800 may use knowledge graph embedding techniques to predict that Tom should also be connected to a second hashtag (e.g., using link prediction). The knowledge graph embeddings may associate each entity (e.g., an account, a hashtag, a URL, etc.) with a vector in a high dimensional space, which may be akin to a signature representing the entity.

Thus, techniques described herein may enable a plurality of analyses, including analyses that include a temporal dimension. In example embodiments, the computing platform 3800 may store the data inputs and outputs for the various analyses in the cloud storage (e.g., as clustering and characterization tab-separated values (TSVs) 4530 and/or node, cluster, group JSONs 4532).

CONCLUSION

Detailed embodiments of the present disclosure are disclosed herein; however, it is to be understood that the various disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions, and the like. The processor may be or may include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, Internet server, intranet server, cloud server, and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (Saas), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flowcharts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above-described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A computerized method comprising:

retrieving timestamped social media data indicating a plurality of social media events involving a plurality of source entities and a plurality of content entities;

generating, from the timestamped social media data, a plurality of temporal knowledge graphs, wherein each temporal knowledge graph corresponds to a different time period;

generating, from the plurality of temporal knowledge graphs, knowledge graph embeddings, wherein the knowledge graph embeddings comprise a plurality of cross-platform clusters of the plurality of source entities and the plurality of content entities; and analyzing the knowledge graph embeddings to detect an influence operation in the social media data, wherein analyzing the knowledge graph embeddings comprises:
generating a digital fingerprint for at least one cluster of the plurality of cross-platform clusters, the at least one cluster being linked to the influence operation.

2. The computerized method of claim 1, wherein the social media data comprises social media data from at least two platforms, wherein the temporal knowledge graphs are cross-platform temporal knowledge graphs.

3. The computerized method of claim 2, wherein a user account for a first platform and a user account for a second platform correspond to a single node of a temporal knowledge graph.

4. The computerized method of claim 1, further comprising:
performing dimension reduction on the knowledge graph embeddings to yield reduced dimension data; and
performing density-based clustering on the reduced dimension data to yield the plurality of cross-platform clusters of the plurality of source entities and the plurality of content entities.

5. The computerized method of claim 4, further comprising characterizing the plurality of cross-platform clusters of the plurality of source entities and the plurality of content entities based on social media data associated with each cluster.

6. The computerized method of claim 4, further comprising generating an information flow metric for at least one content entity within a cluster of the plurality of cross-platform clusters, wherein the information flow metric indicates one or more of:
movement of the content entity within a cross-platform knowledge graph over time; or
engagement with the content entity within the cross-platform knowledge graph over time.

7. The computerized method of claim 1, further comprising predicting a future connection between a first entity of the knowledge graph embedding and a second entity of the knowledge graph embedding, wherein the prediction represents a likelihood of the first entity engaging with the second entity via a social media platform.

8. The computerized method of claim 1, further comprising:
repeatedly generating knowledge graph embeddings using different machine learning parameters;
comparing the knowledge graph embeddings generated using the different machine learning parameters; and
determining optimal machine learning parameters based on the comparing.

9. The computerized method of claim 1, wherein analyzing the knowledge graph embeddings further comprises comparing the digital fingerprint for the at least one cluster to other digital fingerprints of other clusters.

10. The computerized method of claim 9, wherein analyzing the knowledge graph embeddings further comprises determining whether there is coordinated activity between the at least one cluster and the other clusters based on the comparison.

11. The computerized method of claim 1, wherein generating the digital fingerprint for the at least one cluster comprises:
receiving annotation data characterizing the at least one cluster linked to the influence operation; and
clustering the annotation data.

12. The computerized method of claim 1, wherein generating the digital fingerprint for the at least one cluster comprises utilizing stylometry data to detect coordinated behavior or disinformation.

13. The computerized method of claim 1, wherein generating the digital fingerprint for the at least one cluster comprises averaging embedding coordinates across entities within the at least one cluster.

14. The computerized method of claim 1, wherein generating the digital fingerprint for the at least one cluster comprises utilizing a geolocation for entities within the at least one cluster.

* * * * *